United States Patent [19]

Bowles et al.

[11] 4,374,408

[45] Feb. 15, 1983

[54] MULTI-PASS SYSTEM AND METHOD FOR SOURCE TO SOURCE CODE TRANSLATION

[75] Inventors: Stephen W. Bowles; George E. Bethke, Jr., both of Goleta, Calif.

[73] Assignee: Burroughs Corporation, Detroit, Mich.

[21] Appl. No.: 153,767

[22] Filed: Jun. 16, 1971

[51] Int. Cl.[3] .......................... G06F 9/00; G06F 15/38
[52] U.S. Cl. .................................... 364/200; 364/300
[58] Field of Search ............................................ 444/1

[56] References Cited

PUBLICATIONS

Wilson, D. M. et al, "CAT: A7090-3600 Computer-Aided Translation", *Commun. of the ACM*, vol. 8, Issue 12, Dec. 1965, pp. 777-781.
McEwan, A. T., "An Atlas Autocode to Algol 60 Translator", *The Computer Journal*, vol. 9, Issue 4, Feb. 1967, pp. 353-359.

*Primary Examiner*—Raulfe B. Zache
*Attorney, Agent, or Firm*—Mervyn L. Young

[57] ABSTRACT

This disclosure relates to a system embodied in a data processor for source to source code translation of programs, and to the method by which such translation is accomplished. The particular system disclosed is one for translation of programs in the RPG source language to the COBOL source language. The method involves the sequence of four passes through the RPG source code during which, each record is read. On the first pass, the RPG syntax is checked for error and required tables are created. The second pass reads intermediate files and generates COBOL data declarations and also builds tables and switches for later passes. The emitted code is stored on intermediate disk files. During the third pass, executable instructions in COBOL code for the first part of COBOL procedures are generated from a first half of the RPG source and the code thus generated is stored in the COBOL source language file. During the fourth pass, the COBOL source language routines are generated by reading or examining all the entries in the intermediate RPG source file created during the second pass of the routine.

19 Claims, 8 Drawing Figures

MULTI-PASS SYSTEM AND METHOD FOR SOURCE TO SOURCE CODE TRANSLATION

This invention relates to a system and the method implemented therein for the translation of programs from one source code to another source code for compilation into the machine language of a data processing system and more particularly to such method and implementation for the translation of business oriented program languages.

BACKGROUND OF THE INVENTION

Since various information processors are designed to be driven by their own particular machine language instructions or object code, the desire for program compatibility between processors has led to the creation of a number of higher level program languages which for the most part are machine independent. In order to accommodate such machine independent languages, the various information processors are provided with compiling routines as a part of their operating systems, which routines accept programs written in particular higher level languages and in turn compile the strings of machine language instructions or operation code to implement the particular program.

A particular higher level language adapted to the needs and requirements of business and accounting procedures is the COBOL language which name is an acronym for Common Business Oriented Language. COBOL is a general algorithm-specifying language with a structure such that instructions may be written in terms similar to terms in the English language which are readily comprehensible. It will be understood that because of the generality of this language, rather complex strings of machine instructions will have to be called forth to implement a particular COBOL instruction and that the complexity in length of such machine language strings would vary from processor to processor.

A particular higher level language which is similar in form to COBOL but which is nevertheless designed for very specific types of programming tasks such as reporting and business data file maintenance is the Report Program Generator which is more commonly known as RPG. Because of its simplicity and compactness, RPG is employed in many very small data processing systems. However, should the user decide to change to a larger data processing system for which RPG compiler is not provided, then his programs must be rewritten in the more general COBOL language or some other conversion technique must be provided.

The provision of a translation technique not only frees the user from being tied into his RPG program but it also provides the convenience of allowing the user to continue to write his programs in the more simple RPG language, where applicable for later translation into COBOL for use in a larger data processing system for which COBOL compilers are provided.

Various attempts have been made in the past to create translation or source to source conversion systems. However, because of the different meanings of a respective procedure statements as well as because of the different procedure formats, such systems were not very successful and required the user to manually correct inherent inconsistencies before he could achieve a workable program conversion. Of course, certain higher level languages such as ALGOL are so different in format and purpose from the COBOL language that conversion is not practical or even desirable. However, RPG and COBOL are similar in purpose and form so that a meaningful translation system can be realized. Yet even here, there have been sufficient differences between the two languages such that substantial reworking of the converted form is required to achieve an error free program that could be employed with the system having COBOL compiler.

It is, therefore, an object of the present invention to provide an automatic system for the translation of programs from one higher level program language to another higher level program language.

It is another object of the present invention to provide an improved translation system for the particularly accurate translation of programs from one source language to another source language even though particular statements and procedures in the respective languages differ in both form and significance.

It is still another object of the present invention to provide an improved translation system for the translation of programs from the RPG source language to the COBOL source language.

SUMMARY OF THE INVENTION

In order to accomplish the above described objects, the present invention resides in a system embodied in a data processor which system is adapted to receive a program in a particular higher level language form, and to read the records in sequence and in turn generate the data declarations and to build tables which are necessary for subsequent use of the converted program and to store such tables and the like in an intermediate file; to make a second pass through the initial program source code to determine and generate, in the second source language, the respective procedures and operations; and then to make a third pass through the initial source code and in response thereto to generate the respective routines which are required to complete the program in the second source language. Before the first pass, an initial pass is made to check the syntax of the program in the initial source code.

A feature then of the present invention resides in a system for translation of programs from one source language to another which system receives a particular program in the initial source language and makes multi-passes through the initial source code and generates those particular declarations, procedures and routines in an appropriate order and according to the particular pass being made so that at the end of the translation routine, the program received in an initial source language will have been translated into a second source language.

A particular feature of the present invention resides in the above described multi-pass translation system wherein during one of the passes, the structure of the program in its initial source language is created in the second source language so as to allow the program as created in the second source language to accurately reflect the same procedures and routines as were called for in the initial source language.

DESCRIPTION OF THE DRAWINGS

The above and other objects, advantages, and features of the present invention will become more readily apparent from a review of the following specification when taken in conjunction with the drawings wherein.

GENERAL DESCRIPTION OF THE TRANSLATION SYSTEM

The difficulties which arise in the translation from a program in one higher level language to a program in another higher level language are principally due to the differences in the respective language structures and formats. Therefore, the difficulties may be minimized by comparing the basic structure of the program in the respective languages and converting to the second language at those entries where the structures or substructures most readily compare and then repeating the process until complete translation has been achieved.

More specifically, the system of the present invention employs a general and flexible COBOL overstructure that can satisfy the requirements of the entire RPG source language and the system operates to make a number of sequentially passes over a particular program in RPG source language to emit whatever COBOL code is permitted during that pass. The first pass is employed to check the syntax of the RPG source program and to generate tables as required. The remaining passes are employed to generate the COBOL source file and more specifically operate to sequentially declare all data fields, emit COBOL statements to accomplish "moves" required by the RPG cycle and then to generate the COBOL source language routines as required. Thus, the RPG source statements are actually read through four times, with each of the four passes doing its part in constructing the COBOL program.

In the multi-pass design of the present system, one pass can declare a COBOL variable by name and, much later, another pass can reference it. This multi-pass translation then allows for a more accurate interpretation of the true intent of the RPG source program.

Figure 1:
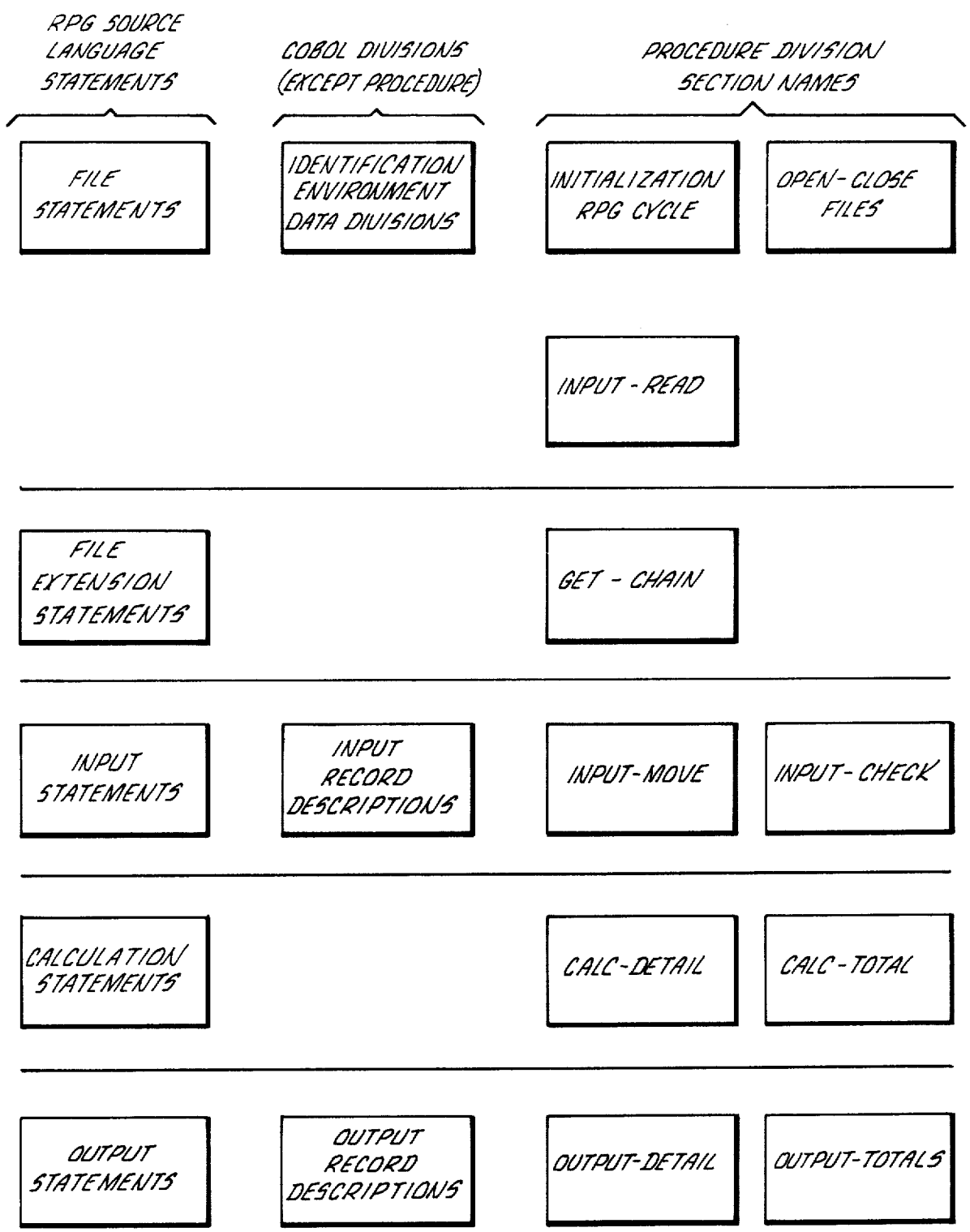
FIG. 1 is a diagram illustrating the relation between the various types of source language statements of RPG and the corresponding COBOL Divisions and Sections.

Before describing the system and the methods of the present invention, the respective program structures of the RPG source program and the desired COBOL source program will first be described in reference to FIG. 1. As illustrated therein, the RPG source language statements fall into five groups represented by the first column of statements. The remaining three columns in FIG. 1 represent the respective COBOL divisions including the section names within the procedure division which divisions and sections are associated with the RPG source statement classifications in their corresponding row. The separate classifications will now be reviewed to see what COBOL code is to be generated for the statements coded in RPG form.

The RPG File statements are really file description specifications or specifications of the files to be employed by the program. These statements or specifications probably develop more code then any of the other source statements. These specifications generate the file-control assignments and also the necessary code for the file description specifications of the Data division of the resultant COBOL program. In the file description specification format, a rather simple one line statement in RPG code will generate the code for the file handling procedures which include the indicating of the end of input, matching records between files, checking records sequence, as well as the opening and closing of files. As an example, four lines of RPG code can generate some 138 lines of COBOL code, since, with a fixed format language like that of RPG, one or two statements can specify a COBOL procedure. As indicated in FIG. 1, the corresponding COBOL entries to be generated include the Identification division of the resultant COBOL program which consists of only a few lines to identify the program and so on; the Environment division of the resultant COBOL program which specifies the computers to be used, the storage size, the number of tape units and other input and output equipment and the like; and the Data division of the resultant COBOL program which specifies the files, records, and other data items that are to be processed or produced as results. As further indicated in FIG. 1, such RPG file statements also generate code for the initialization of the RPG cycle procedure, the input-read procedure and the open-close file procedure.

The second classification of RPG source language statements as illustrated in FIG. 1 are the File Extension statements which are literally an extension of the above described file statements, when required, such as when two disk files are chained together, i.e., where a field of one file record is used as a key for the accessing of a record in another file. Such File Extension statements also allow the programmer to specify tables within his program and whether they can be loaded at an object time or if the table content is available at compile time and therefore imbedded with the COBOL code.

The third classification of RPG source language statements are the Input statements which specify, for the resulting COBOL source program, the input record descriptions including the size of the item, its usage, the class of the item and its value where required. The input statements also specify the input-move procedure and input-check procedure.

The Calculation statements from the fourth classification of RPG source statements and are to be mapped into calculation procedures for the resulting COBOL program.

The last classification of RPG statements are the Output statements from which the output record descriptions are to be generated as well as the respective output procedures.

Further information on RPG may be found in R. W. Brightman and J. R. Clark, *RPG I and RPG II Programming*, Macmillan Company (1970) and *Report Program Generator Reference Manual*, IBM System Reference Library No. GC 24-9001. For additional information on COBOL, reference is made to D. D. McCracken, *A Guide to COBOL Programming*, John Wiley & Sons, Inc. (1963) and *B2500/B3500/B4500 COBOL Reference Manual*, Burroughs Corporation.

Figure 2:
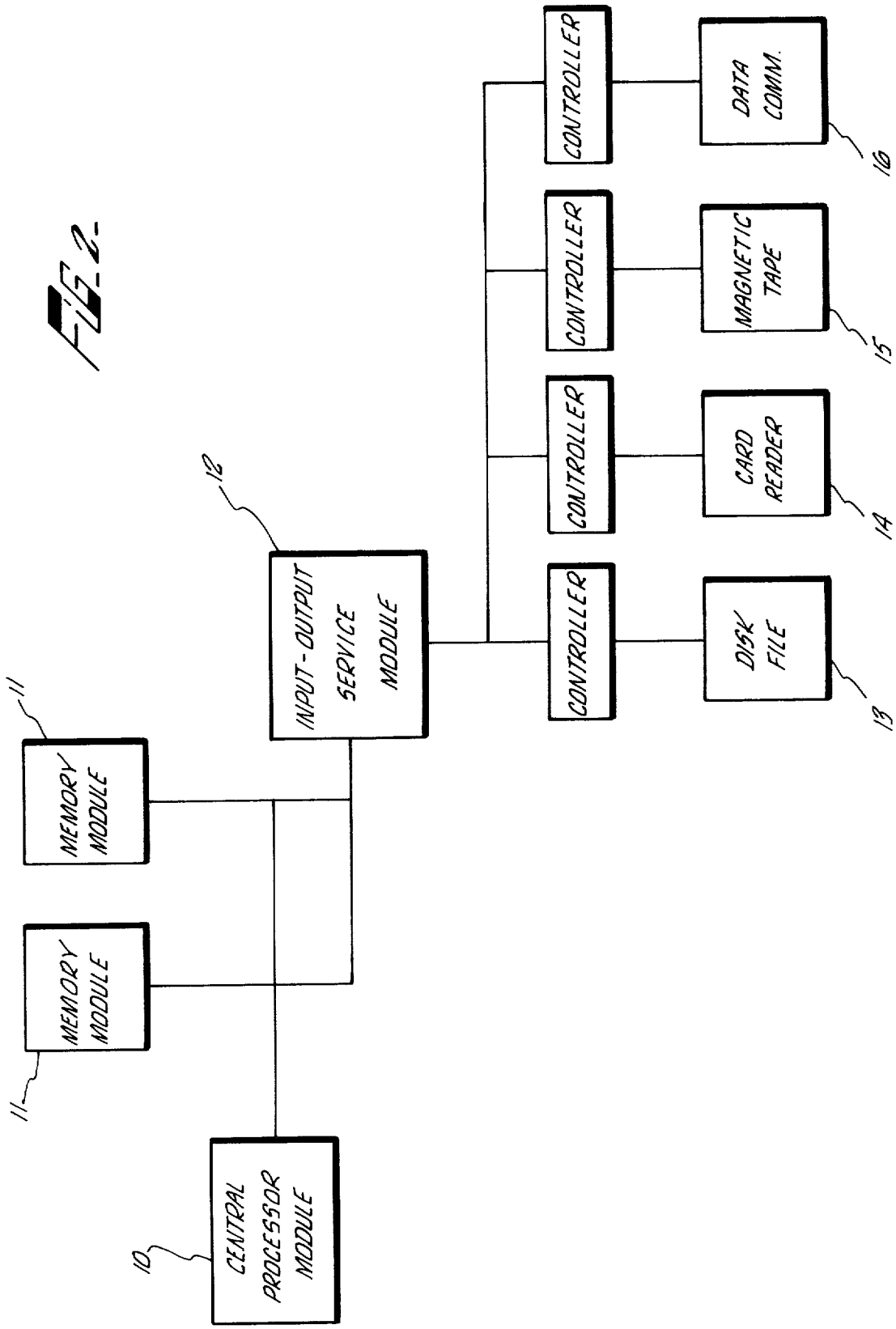
FIG. 2 is a schematic diagram of a general purpose data processing system in which the present invention may be embodied.

Referring now to FIG. 2, there is shown therein a representation of a general purpose data processing system in which the present invention is to be employed. This system may employ one or more central processor modules 10 to perform the various data manipulation and moves as may be required by particular programs; one or more memory modules 11 to store data and other information as may be immediately required by the processor and a plurality of peripheral devices including one or more disk files 13, card readers 14, magnetic tape units 15, and data line communication controllers 16 from which data may be transferred to memory modules 11 or to central processor module 10 by way of the input-out module 12. A more detailed description of such a system may be found, for example, in Lynch et al, U.S. Pat. No. 3,411,139 and Anderson et al U.S. Pat. No. 3,419,849. A particular processing module of the type that may be employed is disclosed in Barnes et al, U.S. Pat. No. 3,401,376.

Figure 3:
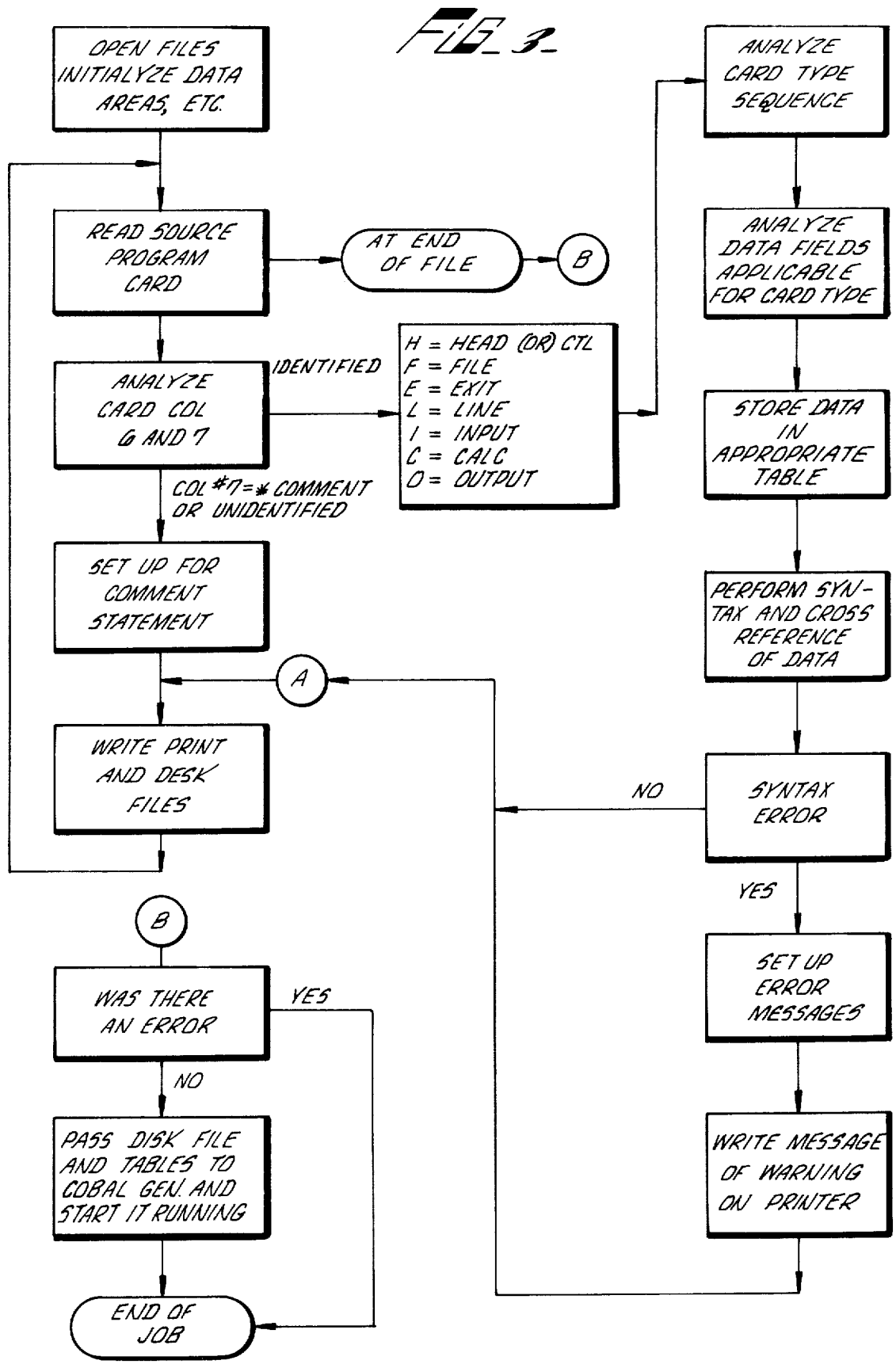
FIG. 3 is a flow diagram illustrating the routine of the initial pass performed by the system of the present invention for checking syntax of the initial source code.
Figure 4:
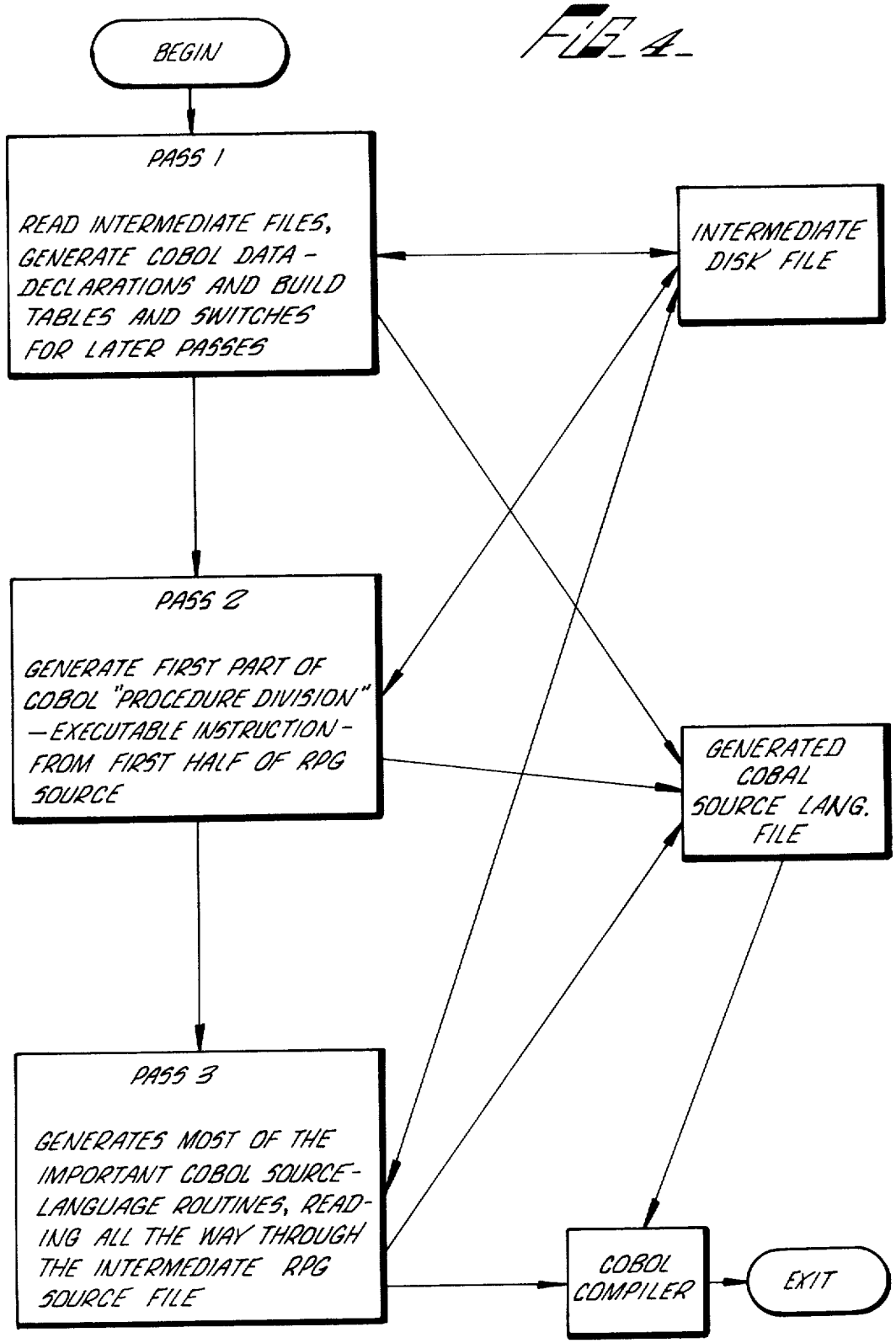
FIG. 4 is a flow diagram illustrating the routines of the remaining passes performed by the system of the present invention.

The relation between the RPG source structure and the corresponding COBOL divisions into which RPG structure is to be mapped having been described generally, the methods or algorithms by which this mapping or conversion is accomplished will now be described in relation to FIGS. 3 and 4. As was indicated generally above, the method of the present invention is that of sequential multi-passes, the first of which checks the syntax of the RPG program to ascertain tht the syntax contains no error that might be translated into the resultant COBOL source program. As indicated in FIG. 3, this first pass includes the steps of reading the source program card and analyzing those columns which specify the particular identity. If the card is unidentified or contains a comment, a comment statement is set up and written into a disk file and the routine then reads the next source program card. Should the card contain a specific card type identification, this type is determined and its data fields are analyzed to see if they are applicable to that card type. The data is stored in an appropriate table and a syntax and cross reference of the data is performed. If there is no syntax error, the source card is printed and the routine examines the next source program card until the end of the file is reached at which time the resultant disk file and tables are passed to the program generator.

After the first pass over the RPG source program to check syntax and create data tables, three more passes through the RPG source program are made each of which passes result in the emmission of generated COBOL code. The second pass reads the intermediate files and generates COBOL data declarations and also builds tables and switches for later passes. The emitted code is stored on an intermediate disk file. During the third pass, executable instructions in COBOL code for a first part of COBOL procedures are generated from a first half of the RPG source and the code thus generated is stored in the COBOL source language file. During the fourth pass, the COBOL source language routines are generated by reading or examining all the entries in the intermediate RPG source file created during the second pass of the routine.

The second pass of the routine declared all data fields, the third pass was a partial pass of the input specification and generated the RPG cycle and also emitted COBOL statements to accomplish "moves" and the last pass of the routine generated the COBOL statements required to open and close declared fields and perform the calculation procedures.

The COBOL source language thus created may then be supplied to the COBOL compiler, for the particular processor being employed, for compilation into the machine language of that processor.

DETAILED DESCRIPTION OF THE INVENTION

A. The COBOL Generator

As has been indicated above, the system of the present invention achieves translation of a program from the RPG source language into the COBOL source language by making four passes through the RPG source language code. On the first pass, the system of the present invention checks for error in syntax of the RPG code and also sets up those tables that will be later required during the translation itself. The method or algorithm of this first pass has been generally described above and examples of the tables so set up will be given below. For the sake of consistency, this first pass will be called pass No. 0 and the remaining three passes which comprise the COBOL generator program will be referred to then as passes Nos. 1, 2, and 3.

Figure 5:
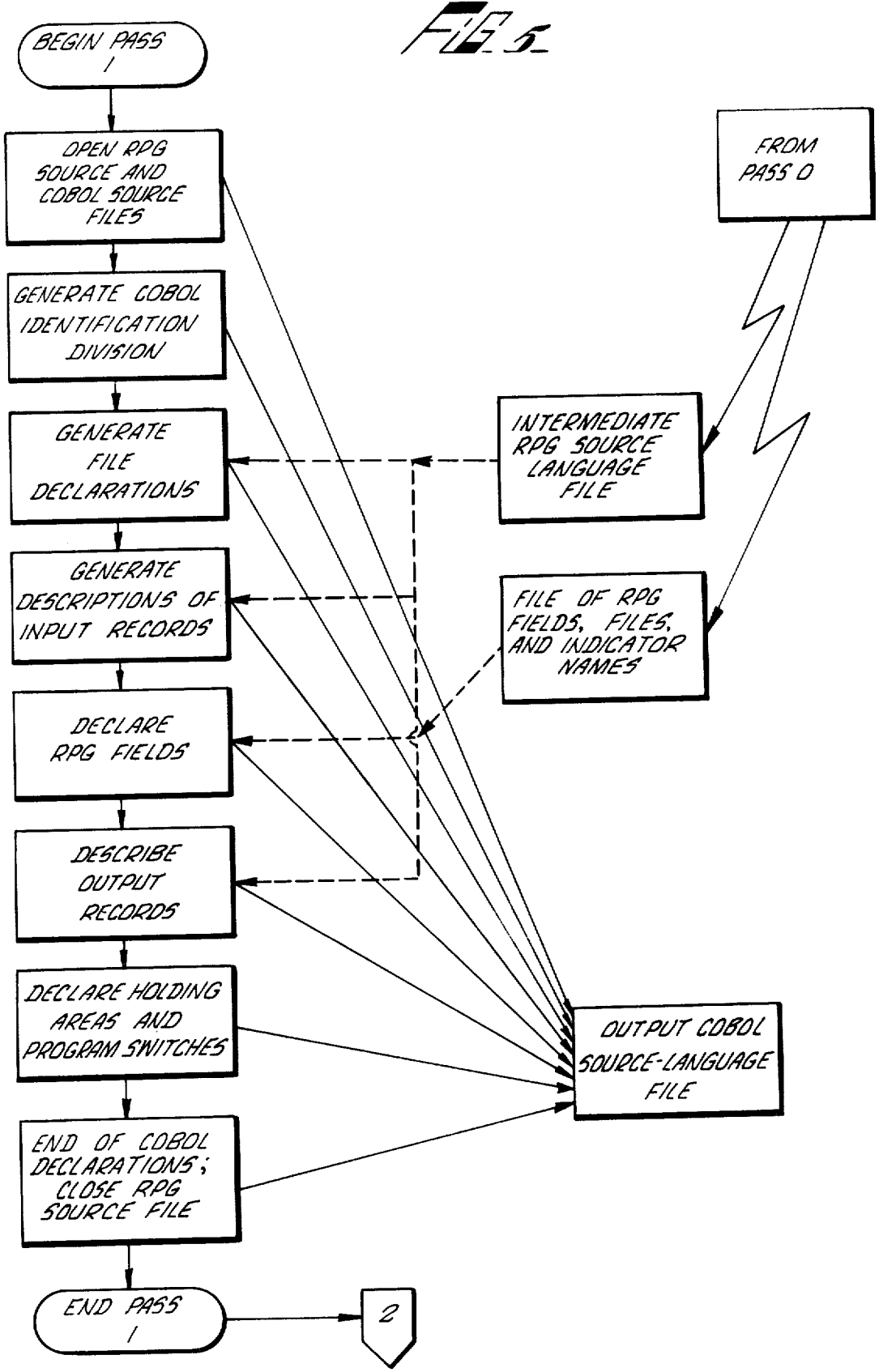
FIG. 5 is a flow diagram illustrating a routine of the second pass performed by the present invention.

The next three passes employed by the system of the present invention generate the desired COBOL source code and these three passes will now be described in reference to the flow diagrams of FIG. 5, 6, and 7. As indicated in FIG. 5, the intermediate RPG source language files and RPG field files indicator names were obtained from the first pass of the system which also checked the RPG syntax and pass No. 1 effects the beginning of the creation of the output COBOL source language file and generates the COBOL Identification Division (which was described above). During this pass, the file declarations are generated, and the RPG fields are declared. The system then proceeds to describe the output records to be generated, to declare holding areas and program switches and, at the end of the COBOL declarations, to close the RPG source file. The system then exits from pass No. 1 and enters the routine for pass No. 2.

Figure 6:
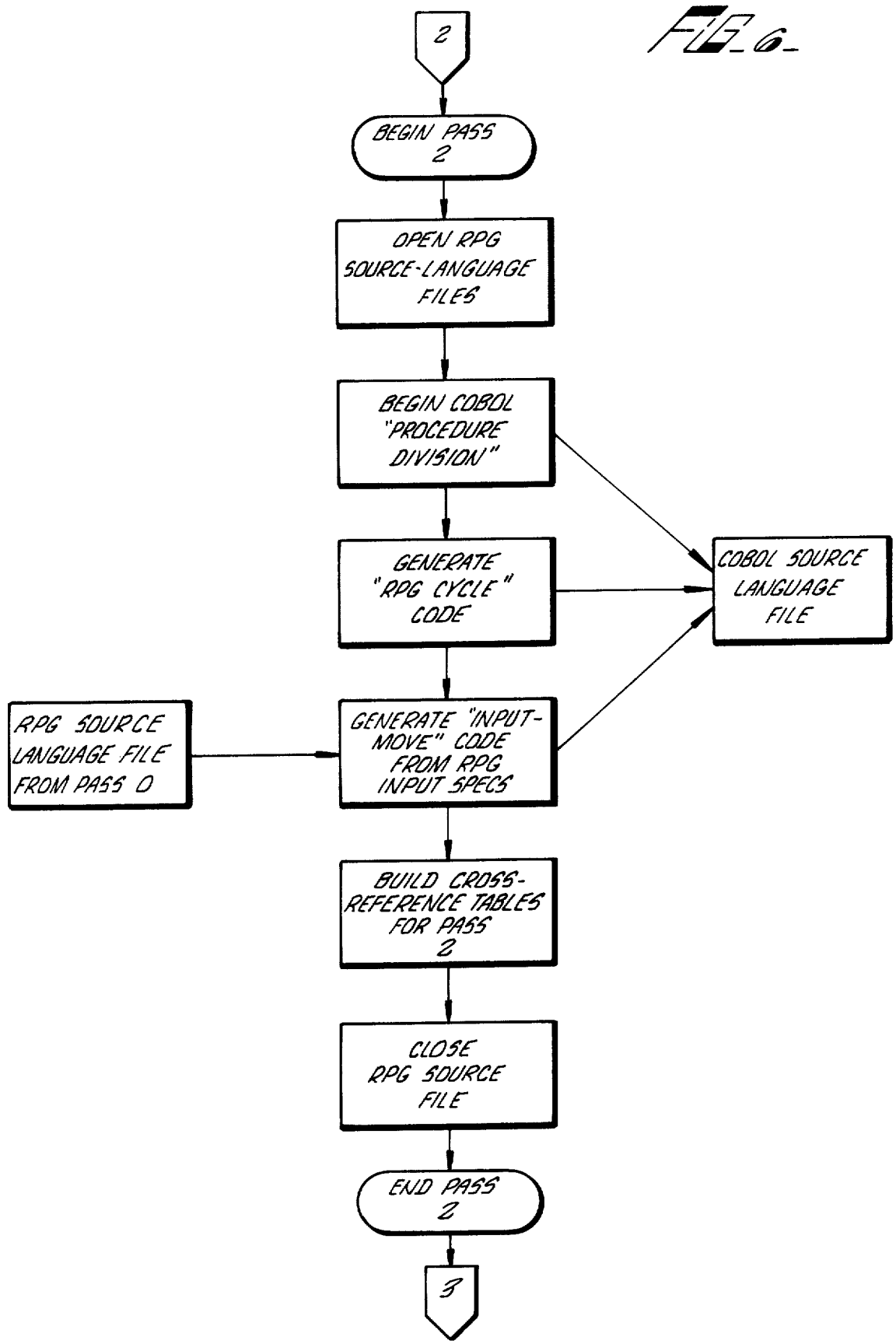
FIG. 6 is a flow diagram illustrating the routine of the third pass performed by the system of the present invention.

The routine of pass No. 2 of the COBOL generator program is illustrated in the diagram of FIG. 6. As indicated therein, pass No. 2 is effective to again open the RPG source language files and to begin the creation of the COBOL Procedure Division (which was generally described above). This routine then operates to generate the RPG cycle code (which will be more thoroughly described below), to generate "input-move" COBOL code from the RPG input specifications and to build cross reference tables for use during pass No. 3. This routine then closes the RPG source files and the system exits from pass No. 2.

Figure 7:
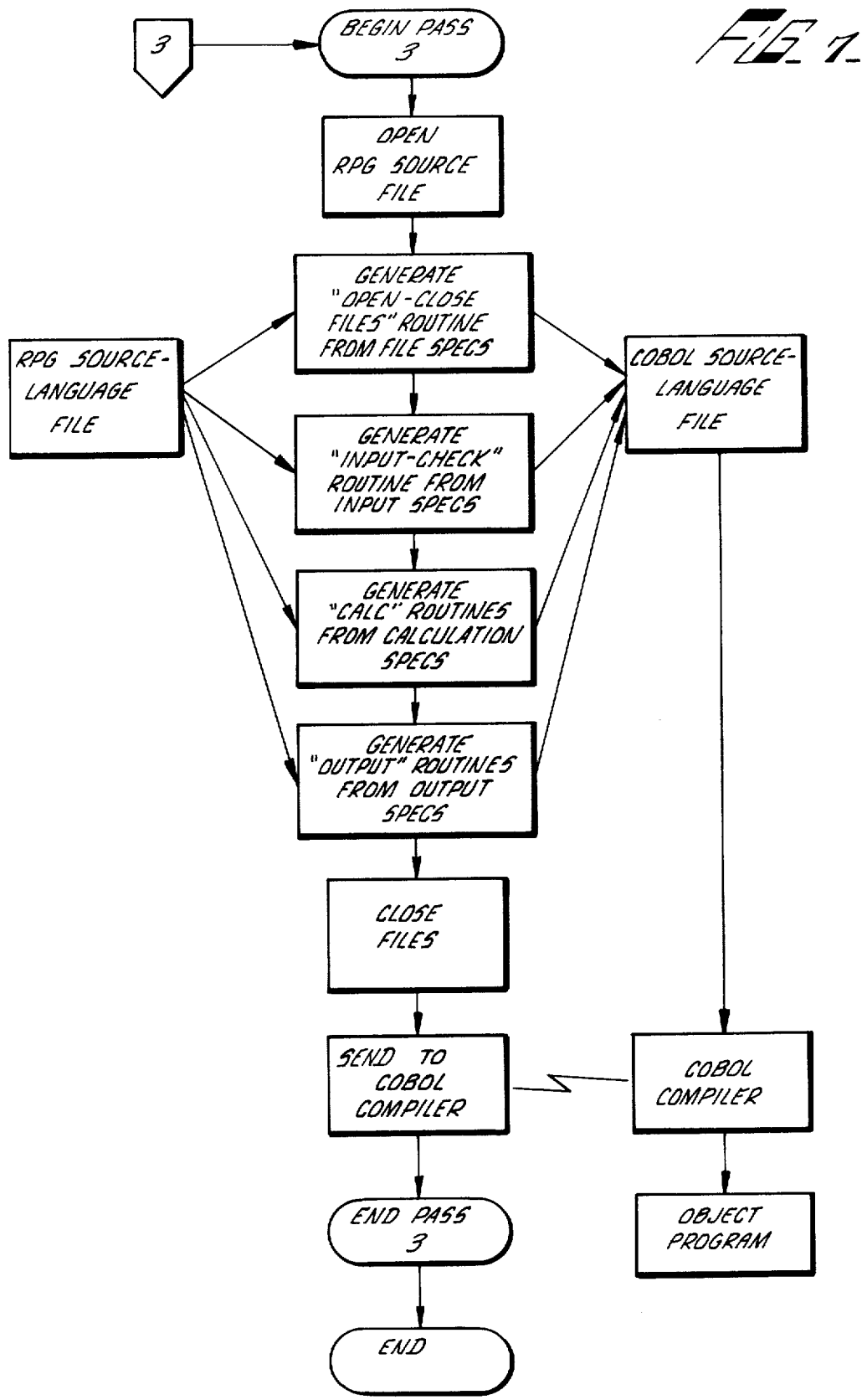
FIG. 7 is a flow diagram illustrating the routine performed by the last pass performed by the system of the present invention.

The third and final pass of the COBOL generator program is illustrated in FIG. 7. As shown therein this third routine again opens the RPG source file and proceeds to generate the "open-close files" COBOL routine from the RPG file specifications. to generate the "input-check" COBOL routine from the RPG input specifications, to generate the "calculation" COBOL routine from the RPG calculation specifications and to generate the "output" COBOL routines from the RPG output specifications. The respective files are then closed and the routine of pass No. 3 is then ready to exit to a COBOL compiler.

At this point, the program that was originated in the RPG source language has now been translated to the COBOL source language and can now be compiled into the object code or machine language of the data processing system in which the program is desired to be run.

B. The RPG cycle

Figure 8:
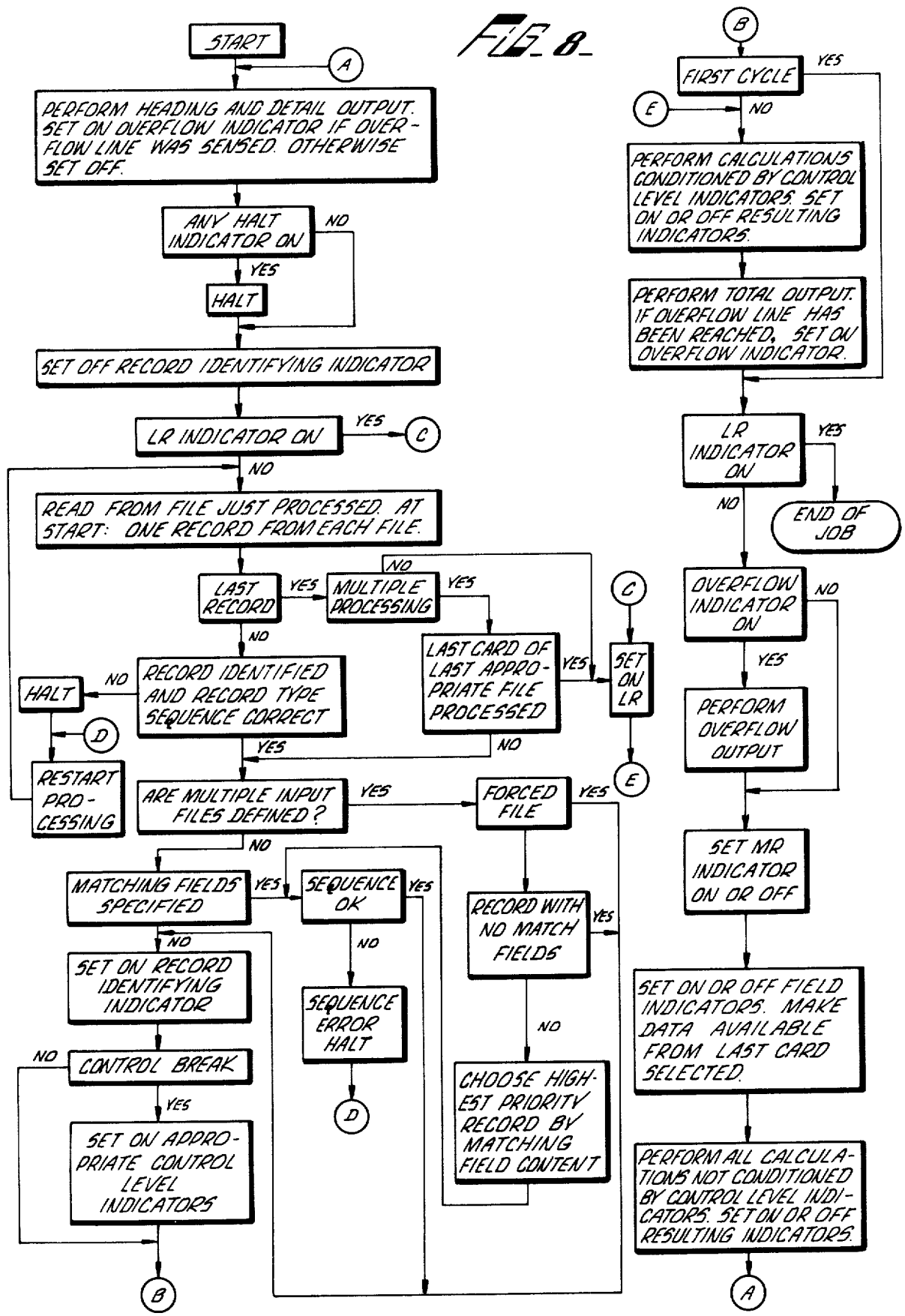
FIG. 8 is a flow diagram illustrating the routine which forms the basic structure of a program in the RPG source language.

As was indicated above in the description of pass No. 2 (See FIG. 6) this pass generates the COBOL code for the "RPG cycle" which cycle is the general structure of any program as it exists in the RPG source language. This cycle is illustrated in FIG. 8 and will now be described with reference thereto.

At the beginning of the RPG cycle, a heading and detail output is performed and checks are made of overflow, halt, and other identifying indicators. The routine begins to read one record from each file. If the record type sequence is incorrect, the routine is halted and a read from the next record is initiated. If the record just read is the last record, a check is made to see if multi-file processing is required and, if not, the calculation routine is entered which will be described below. If the record is not the last record or if the last card of the last appropriate file has not been processed, then a check is made to see if multiple input files are defined which may require the determination of the priority of respective multiple input files, a check is made of correct sequence if matching fields are specified, the record identifying indicator and the appropriate control level indicators are set and the calculation routine is then entered.

If the record just read is the last record in the file, the calculations conditioned by the control level indicators are performed and a total output is effected. If the record was the last record to have been read, this then completes the program job. If the record that was read is not the last record, an overflow check is made, the respective field indicators are set and data is made available from the last card selected. All calculations not conditioned by control level indicators are now performed and the resulting indicators are set. The RPG program cycle now has been completed and this cycle is re-entered and repeated until the end of the program job.

C. Example of RPG to COBOL Translation

In order to provide a better understanding of the present invention, a test program will now be presented, first in the RPG source language and then as converted to the COBOL source language. This program is merely a test program including of "move", "add" and "go to" RPG statements.

The test program in RPG is as follows:

```
RRCLE
IP                                  READER
AA     01    1 C1
                                         1     40C
                                         5     60A
                                         7     91J
                                        10     10 Q
                                        11     142J1
                                        15     202L
                                        21     262H

BB     02    1NC1
                                         1     60  BLNK80
                                         1     18  BLNK1A
              MOVEL≥T FIELD≥   T       120.
              MOVE  ≥END T≥    T
              GOTO BYPASS
LOOP          TAG                              C27
              Z-ADD0           E       102     C7  MOVE ZERO
              MOVEL≥         ≥ S        14     C8  MOVE SPACES
              MOVE  ≥        ≥ S               C8
              MOVELR           P        25     C9  MOVE NEQ
              MOVE BLNK1B      P               C9  LENGTH ALPHA
              MOVE C           D        40    C10 ,
              MOVE F           F        91    C11
F             ADD  M           M        91    C12
A             ADD  N           N        31    C13
J             ADD  K           K       102    C14
E             ADD  G           O       112    C15
              MOVE D           D        40    C16
              MOVELT           U       200    C17
              MOVE BLNK80      U              C17
              MOVELG           R         7    C18
              MOVE ≥         ≥ R              C18
              Z-ADD0           K       102    C19
              MOVE J1          K              C19
Q             COMP Q                         12C20
              GOTO L1                         C20
```

```
L1       TAG                              C20
R        COMP  R                        32C22
         GOTO  L3                         C22
L3       TAG                              C22
1        ADD   B     B      40            C23
E        ADD   E     E                    C24
I        ADD   I     I      52            C25
H        SUB   L            H             C30
0        COMP  H                        22C21
         GOTO  DONE                       C21
         GOTO  LOOP                       C26
BYPASS   TAG
         SETON                     H1
DONE     TAG
         SETON                     H2LR
```

As was explained above, the RPG program is read through four times by the system of the present invention. During the initial pass through the above RPG program, that program will be printed out if it is free of RPG syntax error and also, during the initial pass, the tables required by the translation will be defined or established as listed below.

TABLE ENTRIES

```
33INIT    IREAD70080
10PAGE    00040
10PAGE1   00040
10PAGE2   00040
10UDATE   00060
10UMONTH  00020
10UDAY    00020
10UYEAR   00020
11C       00040
11A       00020
11J       00031
11Q       0001A
11J1      00042
11L       00062
11H       00062
11BLNK80  0080A
11BLNK18  0018A
11T       0120A
22BYPASS
22LOOP
11E       00102
11S       0014A
11R       0007A
11P       0025A
11D       00040
11F       00091
11M       00091
11N       00031
11K       00102
11O       00112
11U       0200A
22L1
22L3
11B       00040
11T       00052
```

```
22DONE
901P
900F
90L9
90L8
901.7
901.6
90L5
90L4
90L3
90L2
90L1
90L0
99LR
9901
9002                    UNREF
9912
9932
9922
90H1                    UNREF
90H2                    UNREF
```

END OF DIAGNOSTICS NO ERRORS

During the second pass through the above RPG program, the system of the present invention generates the file declarations, descriptions of input records and declares the RPG fields. The results of this second pass are printed out as follows (the remaining print-outs are in COBOL):

```
IDENTIFICATION DIVISION.
PROGRAM-ID.   RPGTST.
DATE-COMPILED.
ENVIRONMENT DIVISION.
INPUT-OUTPUT SECTION.
FILE-CONTROL.
     SELECT OPTIONAL FX0001 ASSIGN TO READER RESERVE 1 ALTERNATE.

DATA DIVISION.
FILE SECTION.
FD FX0001
     VALUE OF ID IS "INIT".
01 INIT-X.
     05 DX-001 PC X OCCURS 80 TIMES.
WORKING-STORAGE SECTION.
01 IR-0002.
     03 IF-0003 PC  J9(0004).
     03 IF-0004 PC  J9(0002).
     03 IF-0005 PC  J9(0002)V9(1).
     03 IF-0006 PC  X(0001).
     03 IF-0007 PC  J9(0002)V9(2).
     03 IF-0008 PC  J9(0004)V9(2).
     03 IF-0009 PC  J9(0004)V9(2).
     03 FILLER PC X(0054).
01 IR-0011 REDEFINES IR-0002.
     03 IF-0011 PC  X(0080).
01 IR-0012 REDEFINES IR-0011.
     03 IF-0012 PC  X(0018).
     03 FILLER PC X(0062).
```

```
01 C-X PC S9(0004) CMP VA 0.                    NOTE C.
01 A-X PC S9(0002) CMP VA 0.                    NOTE A.
01 J-X PC S9(0002)V9(1) CMP VA 0.               NOTE J.
01 Q-X PC X(0001) VA " ".                       NOTE Q.
01 J1-X PC S9(0002)V9(2) CMP VA 0.              NOTE J1.
01 L-X PC S9(0004)V9(2) CMP VA 0.               NOTE L.
01 H-X PC S9(0004)V9(2) CMP VA 0.               NOTE H.
01 BLNK80-X PC X(0080) VA " ".                  NOTE BLNK80.
01 BLNK18-X PC X(0018) VA " ".                  NOTE BLNK18.
01 T-X PC X(0120) VA " ".                       NOTE T.
01 E-X PC S9(0008)V9(2) CMP VA 0.               NOTE E.
01 S-X PC X(0014) VA " ".                       NOTE S.
01 R-X PC X(0007) VA " ".                       NOTE R.
01 P-X PC X(0025) VA " ".                       NOTE P.
01 D-X PC S9(0004) CMP VA 0.                    NOTE D.
01 F-X PC S9(0008)V9(1) CMP VA 0.               NOTE F.
01 M-X PC S9(0008)V9(1) CMP VA 0.               NOTE M.
01 N-X PC S9(0002)V9(1) CMP VA 0.               NOTE N.
01 K-X PC S9(0008)V9(2) CMP VA 0.               NOTE K.
01 O-X PC S9(0009)V9(2) CMP VA 0.               NOTE O.
01 U-X PC X(0200) VA " ".                       NOTE U.
01 B-X PC S9(0004) CMP VA 0.                    NOTE B.
01 I-X PC S9(0003)V9(2) CMP VA 0.               NOTE I.
01 RPG-INDICATORS.
   03 IND-LO PC 9 CMP VA 1.                     NOTE IND-LO.
   03 IND-LR PC 9 CMP VA 0.                     NOTE IND-LR.
   03 IND-01 PC 9 CMP VA 0.                     NOTE IND-01.
   03 IND-02 PC 9 CMP VA 0.                     NOTE IND-02.
   03 IND-12 PC 9 CMP VA 0.                     NOTE IND-12.
   03 IND-32 PC 9 CMP VA 0.                     NOTE IND-32.
   03 IND-22 PC 9 CMP VA 0.                     NOTE IND-22.
   03 IND-H1 PC 9 CMP VA 0.                     NOTE IND-H1.
   03 IND-H2 PC 9 CMP VA 0.                     NOTE IND-H2.
01 OUT-SW PC 9(0001) VA 0.                      NOTE OUT-SW.
01 ALL-RY PC 9(0001) VA 0.                      NOTE ALL-RY.
01 SPC-SK PC 9(0003) VA 0.                      NOTE SPC-SK.
01 FIL-NO PC 9(0002) VA 0.                      NOTE FIL-NO.
01 PAR-AM PC 9(0004) VA 0.                      NOTE PAR-AM.

01 PIKTURE PC X.
01 REC-NOS VA 0.
   03 REC-NO PC 99 OCCURS 01 TIMES.
01 IF-0013 PC X(0007).
01 IG-0013 REDEFINES IF-0013.
   03 BODY.
     05 FILLER PC X(0006).
     05 ZOHN.
       07 SINE PC 9 CMP.
       07 FILLER PC 9 CMP.
01 IT-0013 PC X(0120).
01 IU-0013 REDEFINES IT-0013.
   03 BODY.
     05 FILLER PC X(0006).
     05 ZOHN.
       07 SINE PC 9 CMP.
       07 FILLER PC 9 CMP.
   03 FILLER PC X(0113).
01 IF-0014 PC X(0005).
01 IG-0014 REDEFINES IF-0014.
   03 BODY.
```

```
        05 FILLER PC X(0004).
        05 ZOHN.
        07 SINE PC 9 CMP.
        07 FILLER PC 9 CMP.
01 IT-0014 PC X(0120).
01 IU-0014 REDEFINES IT-0014.
     03 FILLER PC X(0115).
     03 BODY.
        05 FILLER PC X(0004).
        05 ZOHN.
        07 SINE PC 9 CMP.
        07 FILLER PC 9 CMP.
01 IF-0018 PC X(0007).
01 IG-0018 REDEFINES IF-0018.
     03 BODY.
        05 FILLER PC X(0006).
        05 ZOHN.
        07 SINE PC 9 CMP.
        07 FILLER PC 9 CMP.
01 IT-0018 PC X(0014).
01 IU-0018 REDEFINES IT-0018.
     03 BODY.
        05 FILLER PC X(0006).
        05 ZOHN.
        07 SINE PC 9 CMP.
        07 FILLER PC 9 CMP.
     03 FILLER PC X(0007).
01 IF-0019 PC X(0007).
01 IG-0019 REDEFINES IF-0019.
     03 BODY.
        05 FILLER PC X(0006).
        05 ZOHN.
        07 SINE PC 9 CMP.
        07 FILLER PC 9 CMP.
01 IT-0019 PC X(0014).
01 IU-0019 REDEFINES IT-0019.
     03 FILLER PC X(0007).
     03 BODY.
        05 FILLER PC X(0006).
        05 ZOHN.
        07 SINE PC 9 CMP.
        07 FILLER PC 9 CMP.
01 IF-0020 PC X(0007).
01 IG-0020 REDEFINES IF-0020.
     03 BODY.
        05 FILLER PC X(0006).
        05 ZOHN.
        07 SINE PC 9 CMP.
        07 FILLER PC 9 CMP.
01 IT-0020 PC X(0025).
01 IU-0020 REDEFINES IT-0020.
     03 BODY.
        05 FILLER PC X(0006).
        05 ZOHN.
        07 SINE PC 9 CMP.
        07 FILLER PC 9 CMP.
     03 FILLER PC X(0018).
01 IF-0021 PC X(0018).
01 IG-0021 REDEFINES IF-0021.
```

```
    03 BODY.
      05 FILLER PC X(0017).
      05 ZOHN.
        07 SINE PC 9 CMP.
        07 FILLER PC 9 CMP.
01 IT-0021 PC X(0025).
01 IU-0021 REDEFINES IT-0021.
    03 FILLER PC X(0007).
    03 BODY.
      05 FILLER PC X(0017).
      05 ZOHN.
        07 SINE PC 9 CMP.
        07 FILLER PC 9 CMP.
01 IF-0029 PC X(0120).
01 IG-0029 REDEFINES IF-0029.
    03 BODY.
      05 FILLER PC X(0119).
      05 ZOHN.
        07 SINE PC 9 CMP.
        07 FILLER PC 9 CMP.
01 IT-0029 PC X(0200).
01 IU-0029 REDEFINES IT-0029.
    03 BODY.
      05 FILLER PC X(0119).
      05 ZOHN.
        07 SINE PC 9 CMP.
        07 FILLER PC 9 CMP.
    03 FILLER PC X(0080).
01 IF-0030 PC X(0080).
01 IG-0030 REDEFINES IF-0030.
    03 BODY.
      05 FILLER PC X(0079).
      05 ZOHN.
        07 SINE PC 9 CMP.
        07 FILLER PC 9 CMP.
01 IT-0030 PC X(0200).
01 IU-0030 REDEFINES IT-0030.
    03 FILLER PC X(0120).
    03 BODY.
      05 FILLER PC X(0079).
      05 ZOHN.
        07 SINE PC 9 CMP.
        07 FILLER PC 9 CMP.
01 IF-0031 PC X(0001).
01 IG-0031 REDEFINES IF-0031.
    03 BODY.
      05 ZOHN.
        07 SINE PC 9 CMP.
        07 FILLER PC 9 CMP.
01 IT-0031 PC X(0007).
01 IU-0031 REDEFINES IT-0031.
    03 BODY.
      05 ZOHN.
        07 SINE PC 9 CMP.
        07 FILLER PC 9 CMP.
    03 FILLER PC X(0006).
01 IF-0032 PC X(0006).
01 IG-0032 REDEFINES IF-0032.
    03 BODY.
```

```
        05 FILLER PC X(0005).
        05 ZOHN.
        07 SINE PC 9 CMP.
        07 FILLER PC 9 CMP.
01 IT-0032 PC X(0007).
01 IU-0032 REDEFINES IT-0032.
        03 FILLER PC X(0001).
        03 BODY.
        05 FILLER PC X(0005).
        05 ZOHN.
        07 SINE PC 9 CMP.
        07 FILLER PC 9 CMP.
01 IF-0034 PC J9(0002)V9(2).
01 IG-0034 REDEFINES IF-0034.
        03 BODY.
        05 FILLER PC X(0003).
        05 ZOHN.
        07 SINE PC 9 CMP.
        07 FILLER PC 9 CMP.
01 IT-0034 PC J9(0008)V9(2).
01 IU-0034 REDEFINES IT-0034.
        03 FILLER PC 9(0006).
        03 BODY.
        05 FILLER PC X(0003).
        05 ZOHN.
        07 SINE PC 9 CMP.
        07 FILLER PC 9 CMP.
        03 FILLER PC X(0018).
```

During the third pass (pass No. 2) through the above described RPG program, the system of the present invention creates the COBOL Procedure division for the program and the RPG cycle code and cross-reference tables. The results of this third pass (pass No. 2) are printed out in COBOL as follows:

```
PROCEDURE DIVISION.
INITIALIZE SECTION 51.
UP-START.
    MOVE 1 TO PAR-AM PERFORM OC-FILES.
RPG-CYCLE SECTION 52.
FOUR.
    MOVE 0 TO OUT-SW
    GO TO OUTPUT-DETAIL.
FIVE.
    GO TO INPUT-READ.
SEVEN.
    IF IND-H1 = 1
    OR IND-H2 = 1
    DISPLAY "HALT" 0 IND-H1 IND-H2 0 0 0 0 0 0 0
    ELSE GO TO ELEVEN.
    ACCEPT PAR-AM .
    IF PAR-AM NOT < "STOP" GO TO TEN.
ELEVEN.
    PERFORM OFF-INDICS.
    GO TO INPUT-CHECK.
NINETEEN.
    IF ALL-RY = 0 GO TO TWENTY-FOUR.
    GO TO CALC-TOTAL.
TWENTY-FOUR.
    MOVE 1 TO ALL-RY .
```

```
        IF IND-LR = 1 GO TO FIFTY-THREE.
TWENTY-SIX.
        PERFORM INPUT-MOVE.
        GO TO CALC-DETAIL.
TEN.
        MOVE 1 TO IND-LR .
        GO TO NINETEEN.
FINALIZE SECTION 51.
FIFTY-THREE.
        MOVE 2 TO PAR-AM PERFORM OC-FILES.
        STOP RUN.
INPUT-MOVE SECTION 52.
IM-BEGIN.
        IF FIL-NO NOT = 01 GO TO BIY-001.
        IF REC-NO ( 01 ) NOT = 01 GO TO BYE-001.
        MOVE IF-0003 TO C-X.
        MOVE IF-0004 TO A-X.
        MOVE IF-0005 TO J-X.
        MOVE IF-0006 TO Q-X.
        MOVE IF-0007 TO J1-X.
        MOVE IF-0008 TO L-X.
        MOVE IF-0009 TO H-X.
        GO TO IM-EXIT.
BYE-001.
        IF REC-NO ( 01 ) NOT = 02 GO TO BYE-002.
        MOVE IF-0011 TO BLNK80-X.
        MOVE IF-0012 TO BLNK18-X.
        GO TO IM-EXIT.
BYE-002.
        EXIT.
BIY-001.
        EXIT.
IM-EXIT.
        EXIT.
TURN-OFF-INDS SECTION 52.
OFF-INDICS.
        MOVE 0 TO IND-LR IND-H1 IND-H2 IND-01 IND-02.
        MOVE 1 TO IND-LO .
```

During the fourth and final pass (pass No. 3) through the above described RPG program, the system of the present invention generates the remaining required COBOL routines. The results of this final pass (pass No. 3) are printed out in COBOL as follows:

```
OC-FILES SECTION 51.
CF-BEGIN.
        IF PAR-AM = 2 CLOSE FX0001 RELEASE
        GO TO BYE-003.
        OPEN INPUT FX0001.
BYE-003.
        EXIT.
INPUT-CHECK SECTION 52.
IC-TOP.
        IF REC-NO (01 ) = 99
        GO TO TEN.
        IF FIL-NO NOT = 01 GO TO BIY-002.
        IF REC-NO ( 01 ) = 99
        ADD 1 TO FIL-NO GO TO BIY-002.
        MOVE INIT-X TO IR-0002.
```

```
        IF ( DX-001 ( 0001 ) = "1" )
        MOVE 1 TO IND-01 ELSE GO TO BYE-004.
        MOVE 01 TO REC-NO ( 01 ).
        GO TO IC-DONE.
BYE-004.
        IF NOT ( DX-001 ( 0001 ) = "1" )
        MOVE 1 TO IND-02 ELSE GO TO BYE-005.
        MOVE 02 TO REC-NO ( 01 ).
        GO TO IC-DONE.
BYE-005.
        GO TO IDENT-ERR.
BIY-002.
        MOVE 1 TO FIL-NO GO TO IC-TOP.
SEQ-ERR.
        DISPLAY "SEQ".
        GO TO RECOVER.
IDENT-ERR.
        DISPLAY "IDENT".
RECOVER.
        ACCEPT PAR-AM .
        IF PAR-AM NOT < "STOP" GO TO TEN.
        PERFORM INPUT-READ THRU IR-DONE.
        GO TO ELEVEN.
IC-DONE.
        EXIT.
IC-EXIT.
        GO TO NINETEEN.
INPUT-READ SECTION 52.
BYE-006.
        IF FIL-NO NOT = 0 AND 01 GO TO BYE-007.
        READ FX0001 AT END
        MOVE 99 TO REC-NO (01).
BYE-007.
        IF FIL-NO = 0 MOVE 1 TO FIL-NO .
IR-DONE.
        EXIT.
IR-EXIT.
        GO TO SEVEN.
CALC-DETAIL SECTION 52.
CD-BEGIN.
        IF
        IND-01 = 1
        MOVE "T FIELD" TO IF-0013
        MOVE T-X TO IT-0013
        MOVE BODY OF IG-0013 TO BODY OF IU-0013
        MOVE SINE OF IG-0013 TO SINE OF IU-0013
        MOVE IT-0013 TO T-X.
        IF
        IND-01 = 1
        MOVE "END T" TO IF-0014
        MOVE T-X TO IT-0014
        MOVE BODY OF IG-0014 TO BODY OF IU-0014
        MOVE SINE OF IG-0014 TO SINE OF IU-0014
        MOVE IT-0014 TO T-X.
        IF
        IND-01 = 1 GO TO BYPASS-X.
LOOP-X.
```

C27

C7 MOVE ZERO

```
ADD 0   0 GIVING E-X.

MOVE "       " TO IF-0018
MOVE S-X TO IT-0018
MOVE BODY OF IG-0018 TO BODY OF IU-0018
MOVE SINE OF IG-0018 TO SINE OF IU-0018
MOVE IT-0018 TO S-X.

MOVE "       " TO IF-0019
MOVE S-X TO IT-0019
MOVE BODY OF IG-0019 TO BODY OF IU-0019
MOVE SINE OF IG-0019 TO SINE OF IU-0019
MOVE IT-0019 TO S-X.

MOVE R-X TO IF-0020
MOVE P-X TO IT-0020
MOVE BODY OF IG-0020 TO BODY OF IU-0020
MOVE SINE OF IG-0020 TO SINE OF IU-0020
MOVE IT-0020 TO P-X.

MOVE BLNK18-X TO IF-0021
MOVE P-X TO IT-0021
MOVE BODY OF IG-0021 TO BODY OF IU-0021
MOVE SINE OF IG-0021 TO SINE OF IU-0021
MOVE IT-0021 TO P-X.

MOVE C-X TO D-X.

MOVE F-X TO F-X.

ADD M-X  F-X GIVING M-X.

ADD N-X  A-X GIVING N-X.

ADD K-X  J-X GIVING K-X.

ADD O-X  E-X GIVING O-X.

MOVE D-X TO D-X.

MOVE T-X TO IF-0029
MOVE U-X TO IT-0029
MOVE BODY OF IG-0029 TO BODY OF IU-0029
MOVE SINE OF IG-0029 TO SINE OF IU-0029
MOVE IT-0029 TO U-X.

MOVE BLNK80-X TO IF-0030
MOVE U-X TO IT-0030
MOVE BODY OF IG-0030 TO BODY OF IU-0030
MOVE SINE OF IG-0030 TO SINE OF IU-0030
MOVE IT-0030 TO U-X.

MOVE Q-X TO IF-0031
MOVE R-X TO IT-0031
MOVE BODY OF IG-0031 TO BODY OF IU-0031
MOVE SINE OF IG-0031 TO SINE OF IU-0031
MOVE IT-0031 TO R-X.

MOVE "       " TO IF-0032
```

```
C8 MOVE SPACES

C8

C9 MOVE NEQ

C9 LENGTH ALPHA

C10
C11
C12
C13
C14
C15
C16
C17

C17

C18

C18
```

```
MOVE R-X TO IT-0032
MOVE BODY OF IG-0032 TO BODY OF IU-0032
MOVE SINE OF IG-0032 TO SINE OF IU-0032
MOVE IT-0032 TO R-X.
                                                              C19
    ADD 0  0 GIVING K-X.
                                                              C19
MOVE J1-X TO IF-0034
MOVE K-X TO IT-0034
MOVE BODY OF IG-0034 TO BODY OF IU-0034
MOVE SINE OF IG-0034 TO SINE OF IU-0034
MOVE IT-0034 TO K-X.
                                                              C20
    MOVE 0 TO IND-12.
    IF Q-X = Q-X MOVE 1 TO IND-12.
                                                              C20
    IF
    IND-12 = 1 GO TO L1-X.
                                                              C20
L1-X.
                                                              C22
    MOVE 0 TO IND-32.
    IF R-X = R-X MOVE 1 TO IND-32.
                                                              C22
    IF
    IND-32 = 1 GO TO L3-X.
                                                              C22
L3-X.
                                                              C23
    ADD B-X  1 GIVING B-X.
                                                              C24
    ADD E-X  E-X GIVING E-X.
                                                              C25
    ADD I-X  I-X GIVING I-X.
                                                              C30
    SUBTRACT L-X FROM H-X GIVING H-X.
                                                              C21
    MOVE 0 TO IND-22.
    IF 0 = H-X MOVE 1 TO IND-22.
                                                              C21
    IF
    IND-22 = 1 GO TO DONE-X.
                                                              C26
    GO TO LOOP-X.
BYPASS-X.
    MOVE 1 TO IND-H1.
DONE-X.
    IF
    IND-22 = 1 MOVE 1 TO IND-H2 IND-LR.
    GO TO FOUR.
CALC-TOTAL SECTION 52.
CT-BEGIN.
    MOVE 0 TO OUT-SW
    GO TO OUTPUT-TOTAL.
OUTPUT-DETAIL SECTION 52.
OD-BEGIN.
    IF OUT-SW = 1 GO TO TWENTY-SIX.
    GO TO FIVE.
OUTPUT-TOTAL SECTION 52.
OT-BEGIN.
```

```
     IF OUT-SW = 1 GO TO OUTPUT-DETAIL.
OT-DONE.
     EXIT.
OT-EXIT.
     GO TO TWENTY-FOUR.
END-OF-JOB.
```

The system thus described is a multi-pass system for translation of a program from one source language to another. In this manner statements for which there is a one for one correspondence may be translated during one pass. Yet statements which require more than one pass through the input source code are also accommodated. For example, the numerous "move" statements which appear in the above example require that the data fields and files, between which the moves are to be accomplished, first be declared or defined. In a single pass translation system, move statements are not assured of accurate translation. Another example of an RPG statement that would not be accommodated by a single pass system is that of "sequence checking" since the sequence in question must first be established in an intermediate file (in this case during pass No. 2) before the criteria for the sequence check can be specified.

The system and method by which the present invention accomplishes source to source code translation having been described, there will now be given a description of the manner in which the translation system is embodied in a data processing system to form an information processing system to accomplish such translation. As was described in relation to FIG. 2, such a data processing system would include a central processing module 10, memory modules 11, as well as peripheral devices such as a disk file 13, card reader 14, and the like. Memory modules 11 may be of any standard memory units normally employed as main memory for a data processing system such as core storage, integrated circuit memories and the like. The program listings which form the translation system may be entered into memory modules 11, for example, from a card deck by way of card reader 14. The entire program listings may be resident in memory modules 11 or, if desired in order to save core storage space, only the listings required for particular passes of the translation may be stored therein in sequence. Once the program listings are resident in main memory, a program to be translated from RPG to COBOL is then supplied to the data processing system, again by way of card reader 14, for example. During the first pass of the translation system, the RPG program source code will be checked for syntax as was described above and the data tables definitions called for thereby are transferred from the card deck to main memory. During the first pass of the translation, the error free RPG program code is transferred along with the table definitions to an intermediate file, preferably in disk file 13. At this point, the program listing to effect the first pass or pass No. 0 may then be dumped from main memory in order to provide more memory space.

The intermediate RPG files have now been created in disk file 13 and the program listings for the COBOL generator may now be entered into main memory if they were not already resident there. During the respective passes Nos. 1-3 of the COBOL generator, the COBOL source language file is created in the disk file 13. At the end of the translation, this COBOL source file may then be read out from disk file 13, for example to magnetic tape unit 15, or may be compiled into the machine language listings of the data processing system in which they are now resident should that data processor be provided with a COBOL compiler routine.

In order to provide a more complete disclosure, there are provided below six appendices which are print-outs of the five sections of the system of the present invention to effect the four passes through the RPG source code to convert that code into COBOL. The sixth appendice is a print-out of the routines called for by statements in the other sections to effect the conversion. In order to provide proper correlation between the respective appendices and the respective passes employed by the system of the present invention as identified above, the appendices will now be identified:

Appendix A: Pass No. 0 (initial pass) for syntax check and table generation.
Appendix B: Data declarations for passes Nos. 1-3.
Appendix C: Pass No. 1 to declare files and RPG fields and describe input records.
Appendix D: Pass No. 2 to create COBOL procedures and to generate the RPG cycle code.
Appendix E: Pass No. 3 to generate remaining COBOL routines.
Appendix F: Routines to be called by Passes 1-3.

The above appendices represent the complete system of the present invention except that the definitions of the working storage have been left out of Appendices A and B since such definitions are not necessary to an understanding of the present invention. All of the respective appendices are printed out in B2500/B3500/B4500 COBOL.

EPILOGUE

A system and method have been disclosed for the automatic translation of programs from the RPG source language to the COBOL source language. This system and method produce an accurate translation even though the substance and format of various statements and procedures differ in their respective languages. The value of the RPG source language is its simplicity and compactness which allow very simple programs to be written in a relatively few number of statements. Conversely, the disadvantage of the RPG language is its inability to accommodate more complex business oriented programs the latter of which can be accommodated by COBOL. Furthermore, while the user may find the RPG language to be advantageous for use in small data processing systems, he must be provided with some conversion technique if he is to change to a larger data processing system which is provided with a COBOL compiler but not with an RPG compiler.

With the system and method of the present invention, the user receives all the benefits of the more generalized COBOL compiler for use in a larger data processor and yet may continue to write simple programs in the RPG language where appropriate. Furthermore, the system and method of the present invention allows the user to convert from a smaller data processing system to a larger data processing system without having to rewrite his RPG programs. The system and method of the present invention provide for accurate translation even though the various "move" and "edit" statements and the like differ in form and substance in the respective languages which differences may be detected from a comparison of the test program illustrated above in both languages.

While but one particular embodiment of the present invention has been disclosed, it will be apparent to those skilled in the art that variations and modifications may be made therein without departing from the spirit and the scope of the invention as claimed.

APPENDIX A: PROGRAM LISTING TO EFFECT PASS NO. 0

```
IDENTIFICATION DIVISION.
PROGRAM-ID. RPGSTX.
ENVIRONMENT DIVISION.
CONFIGURATION SECTION.
OBJECT-COMPUTER. TIME 60.
INPUT-OUTPUT SECTION.
FILE-CONTROL.
SELECT RPGSRC ASSIGN TO READER RESERVE 1.
SELECT RPGLST ASSIGN TO PRINTER.
SELECT RPGINT ASSIGN TO DISK.
SELECT RPGTAB ASSIGN TO DISK.
DATA DIVISION.
FILE SECTION.
FD RPGSRC.
01 TYPE-REC.
   03 SEQ  PC 9(5).
   03 TPE  PC X.
   03 COMN PC X.
   03 FILLER PC X(73).
01 CCCC.
   03 FILLER PC X(5).
   03 CCRD   PC X(75).
01 CTL-REC.
   03 FILLER PC X(10).
   03 CTL  PC X.
   03 FILLER PC X(5).
   03 CSTX PC X.
   03 CFTK PC X.
   03 CCOB PC X.
   03 COME PC X.
   03 FILLER PC XX.
   03 PTRP PC XXX.
01 F-REC.                                         FILLER ADDED
   03 FILLER PC X(6).
   03 FDSW   PC X(6).
   03 FILLER PC XX.
   03 FTYP   PC X.
   03 FILLER PC XXXX.
   03 FRL    PC XXXX.
   03 FRL9 REDEFINES FRL PC 9999.
   03 FRL    PC XXXX.
   03 FRL9 REDEFINES FRL PC 9999.
   03 FMOD PC X.
   03 FKEL PC XX.
   03 FKE9 REDEFINES FKEL PC 99.
   03 FRAT PC X.
   03 FTFU PC X.
   03 FCFI PC XX.
   03 FKFS PC XXXX.
   03 FECD PC X.
```

```
03 FDEV     PC X(7).
03 FSYS     PC XXX.
03 FSDV     PC XXX.
03 FILLER PC X.
03 FUSE PC X(6).
03 FDAM.
   05 FKEY.
      07 FD1 PC X.
      07 FILLER PC XX.
   05 FRPA PC XXX.
03 FADD PC X.
 L-REC.
03 FILLER PC X(14).
03 LNTRY OC 12 TIMES.
   05 LLNO PC XXX.
   05 LCHN PC XX.
 F-REC.
03 FILLER PC X(6).
03 EXXF.
   05 ESCF PC XX.
   05 ENCF PC XX.
03 EFMF PC X(6).
03 FILLER PC XX.
03 ETOF PC X(6).
03 FILLER PC XX.
03 ETN1 PC Y(6).
03 EEPR PC XXX.
03 EEPT PC XXXX.
03 ELT1 PC XXX.
03 EPP1 PC Y.
03 EDP1 PC X.
03 ESQ1 PC X.
03 ETN2 PC Y(6).
03 ELT2 PC XXX.
03 EPP2 PC Y.
03 EDP2 PC Y.
03 ESQ2 PC X.
 I-REC.

03 FILLER PC X(6).
03 IPFN   PC X(6).
03 FILLER PC X.
03 ADRS.
   05 ANDO PC X.
   05 ISEQ PC XX.
03 DAND REDEFINES ADRS.
   05 CODR PC XX.
   05 FILLER PC X.
03 ISNO PC X.
03 ISOP PC X.
03 IRII   PC XX.
03 IRIC.
   05 IRI1.
      07 IPN1 PC XXXX.
      07 IYN1 PC X.
      07 ICD1 PC X.
      07 ICH1 PC X.
   05 IRI2.
      07 IPN2 PC XXXX.
```

FILLER ADDED

```
       07 IYN2 PC X.
       07 ICD2 PC X.
       07 ICH2 PC X.
    05 IRI3.
       07 IPN3 PC XXXX.
       07 IYN3 PC X.
       07 ICD3 PC X.
       07 ICH3 PC X.
    03 ISKS PC X.
    03 IPAC PC X.
    03 IFRM    PC XXXX.
    03 ITO     PC XXXX.
    03 IDPN    PC X.
    03 IFLN    PC X(6).
    03 ILVL    PC XX.
    03 IMR     PC XX.
    03 IFRR    PC XX.
    03 IFII.
       05 IFIP PC XX.
       05 IFIM PC XX.
       05 IFIZ PC XX.
    03 FILLER PC X(10).
01 C-REC.
    03 FILLER PC X(6).
    03 CIND-LVL.
       04 CLVL PC XX.
       04 CIND.
          05 FILLER PC X.
          05 CI1.
             07 FILLER PC X.
             07 CIX PC X.
          05 FILLER PC X.
          05 CI2    PC XX.
          05 FILLER PC X.
          05 CI3    PC XX.
    03 FAC1.
       05 CF1.
          07 CF11 PC X.
          07 FILLER PC X(5).
       05 FILLER PC XXXX.
    03 COPD   PC X(5).
    03 FAC2.
       05 CF2.
          07 CF21 PC X.
          07 FILLER PC X(5).
       05 FILLER PC XXXX.
    03 CRF    PC X(6).
    03 CFDP.
       05 CFL PC XXX.
       05 CDP PC 9.
    03 FILLER PC X.
    03 CCRI.
       05 CCR1 PC XX.
       05 CCR2 PC XX.
       05 CCR3 PC XX.
    03 FILLER PC X(21).
01 D-REC.
    03 FILLER PC X(6).
    03 OPFN   PC X(6).
```

```
   03 FILLER PC XX.
   03 OHDT   PC X.
   03 OSTK   PC X.
   03 OPSS.
      05 OSPB PC X.
      05 OSPA PC X.
      05 OSKB PC XX.
      05 OSKA PC XX.
   03 OUTIND.
      05 OI1N PC X.
      05 OI1.
         07 FILLER PC X.
         07 OIX PC X.
      05 OI2N PC X.
      05 OI2    PC XX.
      05 OI3N PC X.
      05 OI3    PC XX.
   03 OFDN   PC X(6).
   03 OZSP   PC X.
   03 OBAF   PC X.
   03 OENP   PC XXXX.
   03 OPAC   PC X.
   03 OCEW   PC X(26).
FD RPGINT
   FILE CONTAINS 20 BY 300 RECORDS
   RECORD CONTAINS 100 CHARACTERS
   VA OF ID INT-F-NAME.
01 RPGINT-REC PC X(100).
FD RPGTAB
   FILE CONTAINS 10 BY 100 RECORDS
   RECORD CONTAINS 30 CHARACTERS
   VA OF ID TAB-F-NAME.
01 RPGTAB-REC.
   03 EDEF PC 9 CMP.
   03 EREF PC 9 CMP.
   03 FFID PC X(17) VA SPACES.
   03 EMES PC X(12) VA SPACES.
FD RPGLST.
01 LIST-SRC.
   03 FILLER PC X(132) VA SPACES.
01 LIST-TAB.
   03 TDEF PC 9.
   03 TREF PC 9.
   03 TENT PC X(17).
   03 TMES PC X(12).
01 HEAD VA "BURROUGHS RPG TO COBOL TRANSLATOR   DATE  /  /   T
   "IME  :          -- PB --          COFIRS VERSION - CSR
   "1.1".
                                                    FILLER ADDED
   02 HEADA.
      03 FILLER PC X(40).
      03 HMO PC XX.
      03 FILLER PC X.
      03 HDY PC XX.
      03 FILLER PC X.
      03 HYR PC XX.
      03 FILLER PC X(7).
      03 HHR PC XX.
      03 FILLER PC X.
      03 HMI PC XX.
```

```
   02 HEADB.
     03 FILLER PC X(51).
     03 CSR PC XXX.
 01 EX-STP VA "EX RPGFTR VALUE 1 = 000000 FILE RPGINT=      FIL
    "E RPGTAB=     .".
     03 FILLER PC X(22).
     03 HSW3 PC 9.
     03 HSW4 PC 9.
     03 HSW5 PC 9.
     03 HSW6 PC 9.
     03 FILLER PC X(13).
     03 ZIP-INT PC X(6).
     03 FILLER PC X(13).
     03 ZIP-TAB PC X(6).
     03 FILLER PC X.
 01 LINE-ONE PC X(89) VA " ".                     FILLER ADDED
                                                  FILLER ADDED

WORKING-STORAGE SECTION.

PROCEDURE DIVISION.
BEGIN-EXECUTE.
     GO TO INIT-OLAY.
GET-CARD.
     READ RPGSRC AT END GO TO PHASE-TWO.
     IF COMN = "*" GO TO PUT-LINE-COMMENT.
     IF TPE  = "H" GO TO CONTROL-CARD.
     IF TPE  = "F" GO TO FILE-DESC-ROUTINE.
     IF TPE  = "E" GO TO FILE-EXT-ROUTINE.
     IF TPE ="L" GO TO LINE-COUNTER-ROUTINE.
     IF TPE  = "I" GO TO INPUT-ROUTINE.
     IF TPE  = "C" GO TO CALC-ROUTINE.
     IF TPE  = "O" GO TO OUTPUT-ROUTINE.
     IF COSW=1 GO TO COMMON-PUT.
COMMON-ERR.
     MOVE "9" TO SERR.
     MOVE "COL 6 INCORRECT. CARD BECOMES COMMENT (COL 7 *)"
     TO MESS MOVE "*" TO COMN.
COMMON-PUT.
     MOVE CCRD TO DATC.
     IF CTLSW NOT = " " AND SERR = " " GO TO DO-MORE-OUT.
     IF SERR = "S" GO TO PRINTOUTA.
     IF SERR NOT = " " MOVE MESS TO LINE-ONE PERFORM PRINTOUT.
PRINTOUTA.
     MOVE LINE TO LINE-ONE.
                                                  RECEIVING FIELD
PRINTOUT.
     WRITE LIST-SRC MOVE " " TO LIST-SRC.
DO-MORE-OUT.
     IF COMN = "*"AND CMSW NOT=1 AND COSW NOT=1
     GO TO GET-CARD.
     MOVE " " TO LIST-SRC SERR MOVE 0 TO CMSW.
     WRITE RPGINT-REC FROM LINE.
                                                  RECEIVING FIELD
     MOVE SPACES TO LINE.
     GO TO GET-CARD.
```

```
PUT-LINE-COMMENT.
    PERFORM SOURCE-SEQUENCE.
    MOVE 1 TO CMSW GO TO COMMON-PUT.
STATEMENT-NUMBER.
    ADD 1 TO STCT.
    MOVE STCT TO STMT.
SOURCE-SEQUENCE.
    IF SEQ NOT > HSEQ MOVE "S" TO SERR.
    MOVE SEQ TO HSEQ.
    MOVE SEQ TO CSEQ.
TAB-OFLOW-NOW SECTION 67.
TAB-OFLOW.
    MOVE"SYMBOL OR INDICATOR TABLE OVERFLOW - TERMINATE -"
    TO MESG PERFORM POS-ERR GO TO PHASE-TWO.
GLOBAL-ROUTINES SECTION.
SCANTABFF.
    MOVE 0 TO KFFTAB.
ENTER-NAME.
    ADD 1 TO KFFTAB.
    IF KFFTAB > 300 GO TO TAB-OFLOW.
    IF NAMEFF(KFFTAB) = SPACES MOVE FFHOLD TO NAMEFF(KFFTAB).
    IF NAMEFF(KFFTAB) NOT = FFHOLD GO TO ENTER-NAME.
INDSCAND.
    ADD 1 TO KINTAB.
    IF KINTAB > 130 GO TO TAB-OFLOW.
    IF NAMEIN(KINTAB) = " " MOVE IHOLD TO NAMEIN(KINTAB).
    IF NAMEIN(KINTAB) NOT = IHOLD GO TO INDSCAND.
    MOVE 9 TO DEFI(KINTAB) MOVE 0 TO KINTAB.
INDSCANR.
    ADD 1 TO KINTAB.
    IF NAMEIN(KINTAB) = " " MOVE IHOLD TO NAMEIN(KINTAB).
    IF NAMEIN(KINTAB) NOT = IHOLD GO TO INDSCANR.
    MOVE 9 TO REFI(KINTAB) MOVE 0 TO KINTAB.
DO-CTL.
    MOVE LEVEL TO FFHOLD  PERFORM SCANTABFF THRU ENTER-NAME
    MOVE DRH TO DEFF(KFFTAB) REFF(KFFTAB).
    IF AA(KFFTAB)="N"MOVE"N"TO AT3.
    IF AT2 =ADI(KFFTAB) OR ATTRFF(KFFTAB) = " " MOVE
    ATTR TO ATTRFF(KFFTAB) MOVE " " TO ATTR ELSE MOVE
REDEFINED LENGTHS CONTRUL OR MATCHING FIELDS"
    TO MESG PERFORM POS-ERR MOVE " " TO ATTR.
BEGIN-SYNTAX.
    MOVE TYPE-REC TO CD-COLCK MOVE ALL"X" TO MASKCK
                                            RECEIVING FIELD IF
    MOVE 1 TO BASE MOVE 7 TO LIMIT
    PERFORM REMOVE-X-ALL.
END-SYNTAX.
    IF MASKCK NOT = " " AND POSER = " " MOVE "WARNING" TO
    POSER MOVE "W" TO SERR WNSW MOVE
DATA IN CARD NOT NEEDED TO GENERATE CODE" TO MESG
    WRITE LIST-SRC FROM MESS.
    MOVE MASKCK TO MESG.
WARN-NOW.
    MOVE"WARNING"TO POSER MOVE "W" TO WNSW SERR.
    WRITE LIST-SRC FROM MESS MOVE " "TO MESG.
BOMB-OUT.
    MOVE "MIXED CARD TYPES OR WRONG TYPE SEQUENCE" TO MESG.
    PERFORM POS-ERR.
POS-ERR.
```

```
        MOVE "SYNTAX "TO POSER MOVE "M" TO SERR BOSW.
        WRITE LIST-SRC FROM MESS.
        MOVE " " TO MESG.
CON-EDIT-SCAN.
        IF CD-COL(BASE) NOT ="≥" PERFORM POS-ERR ELSE MOVE " "
        TO MASK(BASE) ADD 1 TO BASE ADD -1 TO LIMIT PERFORM
        NEG-SCAN VARYING J FROM LIMIT BY -1 UNTIL CD-COL(J) = "≥".
        IF J > BASE ADD 1 TO LIMIT PERFORM REMOVE-X-ALL.
NEG-SCAN.
        IF J = BASE PERFORM POS-ERR.
NSCAN.
        MOVE 0 TO EFLG.
        EXAMINE NF REPLACING ALL " " BY "0".
        IF NF NOT NUMERIC OR ELD < MIN OR > MAX MOVE 1 TO EFLG.
SCANNUM.
        PERFORM NSCAN IF EFLG = 1 PERFORM
        POS-ERR ELSE PERFORM REMOVE-X-ALL.
COMM-IND-SCAN.
        IF IND1 =" " OR" +" AND YN1 =" " PERFORM REMOVE-X-ALL
        ELSE IF YN1 =" " OR"N"
        MOVE IND1 TO IHOLD PERFORM IND-ALL-SCAN.
        ADD 3 TO BASE LIMIT.
        IF IND2 = " " PERFORM REMOVE-X ELSE IF YN2 = " " OR = "N"
        MOVE IND2 TO IHOLD PERFORM IND-ALL-SCAN.
        ADD 3 TO BASE LIMIT IF IND3 = " " PERFORM REMOVE-X
        ELSE IF YN3 = " " OR = "N" MOVE IND3 TO IHOLD PERFORM
        IND-ALL-SCAN.
IND-ALL-SCAN.
        IF IHOLD="CV"OR"LR"OR"MR"OR"1P"OR(NOT<"H0"AND NOT>"H9")
        OR(NOT<"L0"AND NOT>"L9")OR(NOT<"0A"AND NOT>"0G")
        PERFORM REMOVE-X-ALL ELSE
        MOVE 1 TO MIN MOVE 99 TO MAX MOVE ICTR TO NF ELD
        PERFORM SCANNUM.
INSERT-SP.
        MOVE " " TO MASK(J).
REMOVE-X-ALL.
        PERFORM INSERT-SP VARYING J FROM BASE BY 1 UNTIL J=LIMIT.
CON-IN-SP.
        IF CD-COL(J) = " " MOVE " " TO MASK(J).
REMOVE-X.
        PERFORM CON-IN-SP VARYING J FROM BASE BY 1 UNTIL J=LIMIT.
BLANK-CHECK.
        MOVE 0 TO SFLG EFLG COMPUTE J = LIMIT -1.
        PERFORM EMBED VARYING J FROM J BY -1 UNTIL J = BASE.
EMBED.
        IF CD-COL(J) NOT=" " MOVE 1 TO SFLG.
        IF(CD-COL(J) = " " OR"-") AND SFLG = 1 MOVE 1 TO EFLG.
FILE-NAME-SCAN.
        IF CD-COL(J)="+"OR"-"OR"."OR"≥"OR>"Z"PERFORM POS-ERR ELSE
        PERFORM BLANK-CHECK
        IF EFLG = 1 PERFORM POS-ERR ELSE PERFORM REMOVE-X-ALL.
FIELD-NAME-SCAN.
        IF CD-COL(J)="+"OR"-"OR"."OR"≥"OR>"Z"PERFORM POS-ERR ELSE
        PERFORM BLANK-CHECK IF EFLG=1 PERFORM POS-ERR MOVE
        0 TO EFLG ELSE
        IF CD-COL(J) = "T" PERFORM TAB-CHECK.
        IF EFLG = 1 PERFORM POS-ERR ELSE PERFORM REMOVE-X-ALL.
TAB-CHECK.
        COMPUTE J = BASE +1.
```

```
        IF CD-COL(J) = "A" ADD 1 TO J IF CD-COL(J) ="B" AND DEFF
        (KFFTAB) NOT = 7 MOVE"INVALID FIELD NAME TAB---"TO MESG
        MOVE 1 TO EFLG.
INIT-OLAY SECTION 60.
INIT-OLAY-START.
        OPEN INPUT RPGSRC.
        MOVE TIME TO TFLD.
        MOVE TI-X TO I-NUMB MOVE I-NUMB TO T-NUMB
        OPEN OUTPUT RPGINT.
        OPEN OUTPUT RPGLST.
        MOVE " " TO LIST-SRC.
        MOVE "BURROUGHS RPG TO COBOL TRANSLATOR   DATE    /    /      T
    "IME  :  " TO HEADA.
        MOVE  "      -- BP --      COFIRS (PAT. PEND.) VERSION - CSR"
        TO HEADB MOVE CSRNO TO CSR.
        MOVE TODAYS-DATE TO TDAT MOVE TMO TO HMO MOVE TDY TO HDY
        MOVE TYR TO HYR MOVE THR TO HHR MOVE TMI TO HMI
        WRITE LIST-SRC BEFORE 3.
        MOVE " " TO LIST-SRC GO TO GET-CARD.
CONTROL-CARD SECTION 66.
CONTROL-START.
        IF SW NOT = 0 GO TO COMMON-ERR.
        MOVE 0080 TO WKH4.
        MOVE CTL TO CTLSW.
        IF CSTX="C"MOVE 0 TO SW6 ELSE IF CSTX="A"MOVE 1 TO SW6
        ELSE IF CSTX="N"MOVE 2 TO SW6.
        IF CFTR="N"MOVE 0 TO SW5 ELSE IF CFTR="I"MOVE 1 TO SW5
        ELSE IF CFTR="L"MOVE 2 TO SW5.
        IF CCOB="L"MOVE 0 TO SW4 ELSE IF CCOB="E"MOVE 1 TO SW4
        ELSE IF CCOB="N"MOVE 2 TO SW4.
        IF COME="T"MOVE 1 TO SW3.
        MOVE 1 TO SW.
        GO TO COMMON-PUT.
FILE-DESC-ROUTINE SECTION 61.
FILE-DESC-START.
        IF SW = 0 GO TO NO-HEADER.
        PERFORM STATEMENT-NUMBER THRU SOURCE-SEQUENCE.
        IF SW > 2 PERFORM BOMB-OUT.
        MOVE FRL TO RECH.
        MOVE FBL TO BLKH.
        IF FDEV="PRINTUF" MOVE"OV" TO FOFI.
        IF FOFI NOT =" " MOVE FOFI TO IHOLD PERFORM INDSCAND.
        GO TO FIX-UP.
F-U-END.
        IF FDEV="PRINTER"MOVE 0132 TO BLKH RECH.
        IF RECH = 0 MOVE WKH4 TO BLKH MOVE WKH4 TO RECH.
        MOVE FDSN TO FFHOLD.
        PERFORM SCANTABFF THRU ENTER-NAME.
        MOVE  FTYP TO AT1.
        MOVE FDEV TO AT2.
                                           RECEIVING FIELD TRUN
        MOVE RECH TO AT5.
        IF ATTE = ATTRFE(KFFTAB) OR ATTRFE(KFFTAB) = " " MOVE
        ATTE TO ATTRFE(KFFTAB) MOVE " " TO ATTE ELSE MOVE
REDEFINED FILE NAME DIFFERENT ATTRIBUTES    CC  7 - 14"TO MESG
        PERFORM POS-ERR MOVE " " TO ATTE.
        MOVE 3 TO DEFF(KFFTAB).
        PERFORM FILE-DESC-SYNTAX THRU FILE-DESC-NEXT.
        MOVE 2 TO SW.
        GO TO COMMON-PUT.
```

```
FIX-UP-OLAY SECTION 71.
NO-HEADER.
     STOP "MISSING CONTROL CARD"
     GO TO GET-CARD.
FIX-UP.
     IF FDEV="TAPE" OR "PRINTER" OR "READER" OR"PUNCH" OR
     "DISK" GO TO F-U-END.
     IF FTYP="I" AND(FDEV="READ01" OR "MFCM1" OR "MFCM2"
     OR"READ40"OR"READ20"OR"READ42"
     OR"CCPRI" OR "CCSEC" OR "CRP" OR "RRP"
     OR "CRP20") MOVE "READER" TO FDEV.
     IF FTYP="O" AND(FDEV="MFCM1" OR"MFCM2" OR "CRP20" OR
     "READ40"OR"READ20"OR"READ42"OR
     "CRP" OR "POWPNCH" OR "RRP" OR
     "PUNCH20" OR"PUNCH42")MOVE "PUNCH" TO FDEV.
     IF FTYP ="O" AND (FDEV ="PRINTUF" OR "PRINTLF" OR
     "PRINT63" OR "PRINT48" OR "PRINT16") MOVE "PRINTER"
     TO FDEV.
     IF(FTYP="I"OR"O"OR"U")AND(FDEV="DISK11F"OR"DISK11"OR
     "DISK14")MOVE"DISK"TO FDEV.
     GO TO F-U-END.
FILE-DESC-MORE SECTION 61.
FILE-DESC-SYNTAX.
     PERFORM BEGIN-SYNTAX.
     IF KEFTAB>20 MOVE"TOO MANY FILES"TO MESG PERFORM POS-ERR.
     MOVE 7 TO BASE J MOVE 15 TO LIMIT MOVE "INVALID FILE NAME
 "   CC 7 - 14"TO MESG.
     PERFORM FILE-NAME-SCAN.
     MOVE "INVALID FILE TYPE AND/OR DEVICE   CC 15 AND 40 - 46"
     TO MESG.
     PERFORM DEVICE-SCAN.
     MOVE 16 TO J
     MOVE"INVALID FILE DESIGNATION  CC 16"TO MESG.
     IF CD-COL(J)="D"OR"S"OR"T"OR"C"OR"R"OR" "MOVE" "TO MASK
     (J) ELSE PERFORM POS-ERR.
     MOVE 17 TO J
     MOVE"INVALID ENTRY END OF FILE   CC 17"TO MESG.
     IF CD-COL(J) = "E" OR " " MOVE " " TO MASK(J) ELSE
     PERFORM POS-ERR.
     MOVE"INVALID FILE SEQUENCE   CC 18"TO MESG.
     MOVE 18 TO J IF CD-COL(J)="D"MOVE 1 TO DESW.
     IF DESW=0 AND(CD-COL(J)=" "OR"A") MOVE" "TO MASK(J) ELSE
     IF DESW=1 AND(CD-COL(J)=" "OR"D")MOVE" "TO MASK(J)ELSE
     PERFORM POS-ERR.
     MOVE"INVALID FILE FORMAT   CC 19"TO MESG.
     IF CD-COL(19)="V"AND FDEV="TAPE"MOVE" "TO MASK(19)ELSE
     IF CD-COL(19)=" "OR"F"MOVE" "TO MASK(19) ELSE PERFORM
     POS-ERR.
     IF FDEV="PRINTER"MOVE 20 TO BASE MOVE 28 TO LIMIT
     PERFORM REMOVE-X-ALL IF FRL9=0132 GO TO FILE-DESC-NEXT
     ELSE MOVE"PRINTER RECORD LENGTH ASSUMED 132 POSITIONS" TO
     MESG PERFORM WARN-NOW GO TO FILE-DESC-NEXT.
     MOVE"INVALID BLOCK - RECORD LENGTH   CC 20 - 27" TO MESG.
     IF FRL NOT=" "AND CD-COL(19)NOT="V"DIVIDE FRL9
     INTO FRL9 GIVING BLKH
     REMAINDER RECH IF RECH NOT = 0 PERFORM POS-ERR GO TO
     FILE-DESC-NEXT ELSE NEXT SENTENCE ELSE
     IF FRL NOT=" "SUBTRACT 4 FROM RECH
     MOVE RECH TO AR(KEFTAB).
```

```
     MOVE 20 TO BASE MOVE 24 TO LIMIT.
     MOVE"INVALID BLOCK LENGTH    CC 20 - 23"TO MESG.
     IF FBL NOT = " " MOVE FBL TO NF ELD MOVE 1 TO MIN MOVE
     9999 TO MAX PERFORM SCANNUM ELSE PERFORM REMOVE-X-ALL.
     MOVE 24 TO BASE MOVE 28 TO LIMIT.
     MOVE"INVALID RECORD LENGTH    CC 24 - 27"TO MESG.
     IF FRL NOT = " " MOVE FRL TO NF ELD PERFORM SCANNUM
     ELSE PERFORM REMOVE-X-ALL.
FILE-DESC-NEXT.
     MOVE 33 TO BASE MOVE 35 TO LIMIT.
     IF FOFI =" "OR"OV"OR NOT<"OA"AND NOT>"OG" PERFORM
     REMOVE-X-ALL ELSE MOVE"INVALID ENTRY OVERFLOW INDICATOR
     "CC 33 - 34"TO MESG PERFORM POS-ERR.
     MOVE"INVALID MODE OF PROCESSING    CC 28"TO MESG.
     IF(FMOD=" "OR"I"OR"R")AND FDEV="DISK" MOVE" "TO MASK(28)
     ELSE  IF FDEV NOT="DISK"AND FMOD=" "MOVE" "TO MASK(28)
     ELSE PERFORM POS-ERR.
     IF FKEL NOT=" "MOVE"INVALID LENGTH    CC 29 - 30"TO MESG
     MOVE 1 TO MIN MOVE FRL9 TO MAX MOVE FKEL TO NF ELD
     MOVE 29 TO BASE MOVE 31 TO LIMIT PERFORM SCANNUM ELSE
     MOVE 29 TO BASE MOVE 31 TO LIMIT PERFORM REMOVE-X.
     MOVE"INVALID RECORD ADDRESS TYPE    CC 31"TO MESG.
     IF(FRAT=" "OR"A"OR"K"OR"I")AND FDEV="DISK"MOVE" "TO MASK
     (31)
     ELSE IF FDEV NOT="DISK"AND FRAT=" " MOVE" "TO MASK(31)
     ELSE PERFORM POS-ERR.
     MOVE"INVALID TYPE OF ORGANIZATION    CC 32"TO MESG.
     IF(FTFO=" "OR"I"OR"D"OR"T"OR>"O")AND(FDEV="DISK"OR"READER"
     OR"TAPE")MOVE" "TO
     MASK(32) ELSE IF FDEV NOT="DISK"AND FTFO=" " MOVE" "TO
     MASK(32)ELSE IF FDEV="READER"AND FTFO="T"MOVE" "TO MASK
     (32)ELSE PERFORM POS-ERR.
     IF FKFS NOT=" "MOVE"INVALID KEY FIELD START LOCATION    CC
"    35 - 38"TO MESG MOVE 35 TO BASE MOVE 39 TO LIMIT MOVE FKFS
     TO NF ELD COMPUTE ELD=ELD + FKE9 - 1 PERFORM SCANNUM ELSE
     MOVE 35 TO BASE MOVE 39 TO LIMIT PERFORM REMOVE-X.
     IF FECD =" " OR "E" OR "L" MOVE " " TO MASK(39).
     IF FECD="E" OR CD-COL(16)="T" MOVE 1 TO HCRF.
     MOVE 47 TO BASE MOVE 53 TO LIMIT PERFORM REMOVE-X-ALL.
     IF CD-COL(J)=" "OR"S"MOVE" "TO MASK(J).
     MOVE 54 TO BASE MOVE 60 TO LIMIT.
     IF FUSE=" "PERFORM REMOVE-X ELSE    MOVE"LABLE EXIT NOT SU
"PPORTED    CC 54 - 59"TO MESG PERFORM POS-ERR.
     MOVE 60 TO BASE MOVE 66 TO LIMIT.
     IF FDAM=" "PERFORM REMOVE-X ELSE IF FD1=" "OR NOT<"0"
     MOVE 0 TO MIN MOVE 009 TO MAX MOVE 63 TO LIMIT MOVE FKEY
     TO NF ELD MOVE"INVALID ENTRY CORE INDEX    CC 60 - 65" TO
     MESG PERFORM SCANNUM MOVE LIMIT TO BASE MOVE 66 TO LIMIT
     MOVE 999 TO MAX
     MOVE FRPA TO NF ELD PERFORM SCANNUM
     ELSE MOVE                                "INVALID ENTRY D
"AM    CC 60 - 65"TO MESG PERFORM POS-ERR.
     MOVE"INVALID ENTRY    CC 66"TO MESG.
     IF FDEV="DISK"AND CD-COL(J)="A"AND FTFO="I"MOVE" "TO MASK
     (J)
     MOVE FADD TO ADA(KEFTAB) ELSE IF CD-COL(J)=" " MOVE" "TO
     MASK(J) ELSE PERFORM POS-ERR.
     MOVE 67 TO BASE MOVE 75 TO LIMIT PERFORM REMOVE-X-ALL.
     IF CD-COL(70)=" "OR"P"OR"U" NEXT SENTENCE ELSE IF CD-COL
```

```
     (70)="N"AND ADC(KFFTAB) NOT="SK" NEXT SENTENCE ELSE
    IF CD-COL(70) NOT = "R"
    MOVE"X"TO MASK(70) MOVE"ASSUME ENTRY OF -R-  CC 70"TO
    MESG PERFORM WARN-NOW.
    ADD 1 TO TLCT IF TLCT>20 MOVE"TOO MANY FILES"TO MESG
    PERFORM POS-ERR.
    IF CD-COL(16)="T"MOVE 8 TO AA(KFFTAB) ELSE
    IF CD-COL(16)="C"AND CD-COL(32)="I" AND FKEL NOT=" " AND
    FKFS NOT =" " MOVE 6 TO AA(KFFTAB) ELSE
    IF CD-COL(16)="R"AND CD-COL(32)="T" MOVE 2 TO AA(KFFTAB)
    ELSE IF CD-COL(16)="R"AND CD-COL(32)=" "AND FKEL NOT=" "
    MOVE 4 TO AA(KFFTAB) ELSE
    IF CD-COL(32)="I"AND(CD-COL(28)="L"OR"R")AND FKEL NOT=" "
    AND FKFS NOT=" " MOVE 3 TO AA(KFFTAB) ELSE
    IF CD-COL(32)="I"AND CD-COL(28)=" "AND FKEL NOT=" "AND
    FKFS NOT=" " MOVE 5 TO AA(KFFTAB) ELSE
    IF CD-COL(32)="O" MOVE 1 TO AA(KFFTAB) ELSE
    IF CD-COL(32)=" "OR >"O" MOVE 7 TO AA(KFFTAB).
    IF AA(KFFTAB)=" "MOVE"INVALID OR INSUFFICIENT FILE DESCRIP
    "TION   CC 16 AND 28 - 38"TO MESG PERFORM POS-ERR.
    PERFORM END-SYNTAX.
DEVICE-SCAN.
    IF FDEV = "PRINTER" AND FTYP = "O" OR FDEV = "PUNCH"AND
    FTYP = "O" OR FDEV = "READER" AND FTYP = "I" OR(FDEV =
    "TAPE")AND(FTYP="I" OR "O") OR (FDEV=
    "DISK")AND(FTYP = "I" OR "O" OR "U")PERFORM DEVICE-OK
    ELSE PERFORM POS-ERR.
DEVICE-OK.
    MOVE 15 TO J MOVE " " TO MASK(J).
    MOVE 40 TO BASE MOVE 47 TO LIMIT.
    PERFORM REMOVE-X-ALL.
FILE-EXT-ROUTINE SECTION 62.
FILE-EXT-START.
    PERFORM STATEMENT-NUMBER THRU SOURCE-SEQUENCE.
    IF SW > 3 PERFORM BOMB-OUT.
    IF SW <2 MOVE"MISSING FILE DESCRIPTIONS"TO MESG
    PERFORM POS-ERR.
    MOVE 3 TO SW MOVE 0 TO HCF1 HCF2 HCRF.
    IF EFMF NOT =" " MOVE EFMF TO FFHOLD PERFORM SCANTABFF
    THRU ENTER-NAME MOVE 3 TO REFF(KFFTAB)MOVE AA(KFFTAB)TO
    HCF1.
    IF ETOF NOT =" " MOVE ETOF TO FFHOLD PERFORM SCANTABFF
    THRU ENTER-NAME MOVE 3 TO REFF(KFFTAB) MOVE AA(KFFTAB)
    TO HCF2 IF ENCF >"CO"AND<"DO"MOVE ENCF TO IHOLD
    MOVE 1 TO CHNTRY(IHB).
    IF ETN1 NOT=" "AND EFMF=" "MOVE 1 TO TRSW.
    IF ETN1 NOT =" " MOVE ETN1 TO FFHOLD PERFORM SCANTABFF
    THRU ENTER-NAME MOVE EPP1 TO AT1 MOVE ELT1 TO WKH4 MOVE
    WKH4 TO AT2 MOVE EEPT TO AT5 MOVE
    "REDEFINED TABLE ENTRY DIFFERENT ATTRIBUTES   CC 27 - 45"
    TO MESG IF EDP1 = " " MOVE "A" TO AT3 ELSE IF EDP1 ="N"
    MOVE "O" TO AT3 ELSE MOVE EDP1 TO AT3.
    IF ETN1 NOT = " " PERFORM TEST-ENTER.
    IF ETN2 NOT =" " MOVE ETN2 TO FFHOLD PERFORM SCANTABFF
    THRU ENTER-NAME MOVE EPP2 TO AT1 MOVE ELT2 TO WKH4 MOVE
    WKH4 TO AT2 MOVE EEPT TO AT5 MOVE
    "REDEFINED TABLE ENTRY DIFFERENT ATTRIBUTES   CC 46 - 57"
    TO MESG IF EDP2 = " " MOVE "A" TO AT3 ELSE IF EDP2 ="N"
    MOVE "O" TO AT3 ELSE MOVE EDP2 TO AT3.
```

```
         IF ETN2 NOT = " " PERFORM TEST-ENTER.
         PERFORM EXT-SYNTAX THRU EXT-END.
         GO TO COMMON-PUT.
    TEST-ENTER.
         IF ATTE = ATTRFE(KFFTAB) OR ATTRFE(KFFTAB) = " " MOVE ATTE
         TO ATTRFE(KFFTAB) MOVE " " TO ATTE MOVE 7 TO DEFF(KFFTAB)
         ELSE PERFORM POS-ERR MOVE " " TO ATTE.
    EXT-SYNTAX.
         PERFORM BEGIN-SYNTAX MOVE 7 TO BASE MOVE 9 TO LIMIT
         PERFORM REMOVE-X-ALL.
         MOVE 9 TO BASE MOVE 11 TO LIMIT IF ENCF>"CO"AND<"DO"OR=" "
         PERFORM REMOVE-X-ALL ELSE MOVE"INVALID CHAINING FIELD     CC
      " 9 - 10"TO MESG PERFORM POS-ERR.
         MOVE"MISSING FROM FILE    CC 11 - 18"TO MESG
         IF ETN1 = " " AND EFMF = " " PERFORM POS-ERR.
         MOVE"INVALID FROM FILE    CC 11 - 18"TO MESG MOVE 11 TO J
         BASE MOVE 19 TO LIMIT IF EFMF=" "PERFORM REMOVE-X-ALL ELSE
         PERFORM FILE-NAME-SCAN.
         IF ETOF=" "AND ETN1=" "MOVE"MISSING TO FILE    CC 19 - 26"
         TO MESG PERFORM POS-ERR.
         MOVE"INVALID TO FILE    CC 19 - 26" TO MESG MOVE 19 TO J
         BASE MOVE 27 TO LIMIT IF ETOF=" "PERFORM REMOVE-X-ALL ELSE
         PERFORM FILE-NAME-SCAN.
         IF(HCF1=8 AND(HCF2=7 OR 0))OR(HCF1=0 AND(HCF2=0 OR 7))
         OR(HCF1=4 AND HCF2=3)OR(HCF1=2 AND HCF2=1)OR(HCF2=6 AND
         (HCF1=7 OR 6 OR 5 OR 3 OR 1))ADD 0 TO HCF1 ELSE MOVE
         "INVALID FROM-TO FILE RELATIONSHIP"TO MESG PERFORM
         POS-ERR.
         MOVE 27 TO BASE J MOVE 58 TO LIMIT.
         IF ETN1 NOT = " " MOVE 33 TO LIMIT MOVE
         "INVALID TABLE NAME    CC 27 - 32"TO MESG
         IF CD-COL(J) ="T" PERFORM TAB-CHECK IF EFLG = 1 PERFORM
         POS-ERR ELSE PERFORM BLANK-CHECK IF EFLG = 0 PERFORM
         REMOVE-X-ALL ELSE PERFORM POS-ERR ELSE PERFORM POS-ERR
         ELSE PERFORM REMOVE-X GO TO EXT-END.
         MOVE 33 TO BASE MOVE 36 TO LIMIT MOVE 1 TO MIN MOVE 9999
         TO MAX MOVE"INVALID ENTRIES PER RECORD    CC 33 - 35"TO MESG
         MOVE EEPR TO NF FLD PERFORM SCANNUM
         MOVE 36 TO BASE MOVE 40 TO LIMIT MOVE
         "INVALID ENTRIES PER TABLE    CC 36 - 39"TO MESG
         MOVE EEPT TO NF FLD PERFORM SCANNUM
         MOVE 40 TO BASE MOVE 43 TO LIMIT MOVE
         "INVALID LENGTH    CC 40 - 42"TO MESG MOVE FLT1 TO NF ELD
         PERFORM SCANNUM MOVE"INVALID ENTRY    CC 43"TO MESG
         IF CD-COL(43)="P"AND CD-COL(44)=" "PERFORM POS-ERR ELSE
         MOVE 43 TO J IF CD-COL(J) ="P" OR " " MOVE " " TO MASK(J)
         ELSE PERFORM POS-ERR.
         MOVE"INVALID DECIMAL ENTRY    CC 44"TO MESG MOVE 44 TO J
         IF EDP1 >"0" MOVE EDP1 TO WKH3 MOVE ELT1 TO WKH4
         IF WKH3 > WKH4 PERFORM POS-ERR.
         IF CD-COL(J) =" " OR "N" OR NOT <"0" MOVE " "TO MASK(J)
         ELSE PERFORM POS-ERR.
         MOVE"INVALID SEQ. ENTRY    CC 45"TO MESG MOVE 45 TO J
         IF CD-COL(J) =" " OR"A" OR "D" MOVE " " TO MASK(J) ELSE
         PERFORM POS-ERR.
         MOVE 46 TO BASE J MOVE 58 TO LIMIT.
         IF ETN2 NOT = " " MOVE 52 TO LIMIT MOVE
         "INVALID TABLE NAME    CC 46 - 51"TO MESG
         IF CD-COL(J) ="T" PERFORM TAB-CHECK IF EFLG = 1 PERFORM
```

```
        POS-ERR ELSE PERFORM BLANK-CHECK IF EFLG = 0 PERFORM
    REMOVE-X-ALL ELSE PERFORM POS-ERR ELSE PERFORM POS-ERR
    ELSE PERFORM REMOVE-X GO TO EXT-END.
    MOVE 52 TO BASE MOVE 55 TO LIMIT MOVE
    "INVALID LENGTH    CC 52 - 54"TO MESG MOVE ELT2 TO NF ELD
    PERFORM SCANNUM MOVE"INVALID ENTRY    CC 55"TO MESG
    IF CD-COL(55)="P"AND CD-COL(56)=" "PERFORM POS-ERR ELSE
    MOVE 55 TO J IF CD-COL(J) ="P" OR " " MOVE " " TO MASK(J)
    ELSE PERFORM POS-ERR.
    MOVE"INVALID DECIMAL ENTRY    CC 56"TO MESG MOVE 56 TO J
    IF EDP2 >"0" MOVE EDP2 TO WKH3 MOVE ELT2 TO WKH4
    IF WKH3 > WKH4 PERFORM POS-ERR.
    IF CD-COL(J) =" " OR "N" OR NOT <"0" MOVE " "TO MASK(J)
    ELSE PERFORM POS-ERR.
    MOVE"INVALID SEQ. ENTRY    CC 57"TO MESG MOVE 57 TO J
    IF CD-COL(J) =" " OR"A" OR "D" MOVE " " TO MASK(J) ELSE
    PERFORM POS-ERR.
EXT-END.
    MOVE 58 TO BASE MOVE 75 TO LIMIT PERFORM REMOVE-X-ALL.
    PERFORM END-SYNTAX.
LINE-COUNTER-ROUTINE SECTION 72.
LINE-COUNTER-START.
    IF SW > 3.5 PERFORM BOMB-OUT.
    MOVE 3.5 TO SW.
    PERFORM BEGIN-SYNTAX MOVE 7 TO BASE MOVE 15 TO LIMIT.
    IF FDSN=" "PERFORM REMOVE-X-ALL ELSE MOVE
    "INVALID FILE NAME    CC 7 - 14"TO MESG PERFORM
    FILE-NAME-SCAN MOVE FDSN TO FFHOLD PERFORM
    SCANTABFF THRU ENTER-NAME.
    IF ADL(KFFTAB)NOT="PRIN" MOVE"INVALID FILE DEVICE TYPE"
    TO MESG PERFORM POS-ERR.
    MOVE 0 TO DFLG SFLG MOVE 15 TO BASE MOVE 18 TO LIMIT.
    PERFORM L-CHECK VARYING JI FROM 1 BY 1 UNTIL JI> 12.
    IF DFLG=0 MOVE"NO CHANNEL 12 SPECIFIED" TO MESG
    PERFORM POS-ERR.
    IF SFLG=0 MOVE"NO CHANNEL 1 - 11 SPECIFIED" TO MESG
    PERFORM POS-ERR.
    PERFORM END-SYNTAX GO TO COMMON-PUT.
L-CHECK.
    IF LNTRY(JI)=" "MOVE 0 TO MIN ELSE MOVE 1 TO MIN.
    MOVE"INVALID LINE NUMBER ENTRY"TO MESG.
    MOVE LLNC(JI) TO NF ELD MOVE 199 TO MAX
    PERFORM SCANNUM ADD 2 TO LIMIT ADD 3 TO BASE.
    MOVE"INVALID CHANNEL ENTRY"TO MESG.
    MOVE LCHN(JI) TO NF ELD MOVE 12 TO MAX PERFORM SCANNUM.
    ADD 3 TO LIMIT ADD 2 TO BASE IF LCHN(JI)="12"
    MOVE 1 TO DFLG ELSE IF LCHN(JI)NOT=" "MOVE 1 TO SFLG.
INPUT-FIRST SECTION 73.
INPUT-FIRST-START.
    IF HCRF=1 MOVE"MISSING FILE EXTENSION SPEC"TO MESG
    PERFORM POS-ERR.
    IF SW <2 MOVE"MISSING FILE DESCRIPTIONS"TO MESG
    PERFORM POS-ERR.
    MOVE "PAGE" TO FFHOLD PERFORM SCANTABFF THRU ENTER-NAME
    MOVE 1 TO DEFF(KFFTAB)
    MOVE 0004 TO ADL(KFFTAB)
    MOVE 0 TO AA(KFFTAB)
    MOVE "PAGE1"TO FFHOLD PERFORM SCANTABFF THRU ENTER-NAME
    MOVE 1 TO DEFF(KFFTAB)
```

```
        MOVE 0004 TO ADL(KFFTAB)
        MOVE 0 TO AA(KFFTAB)
        MOVE "PAGE?"TO FFHOLD PERFORM SCANTABFF THRU ENTER-NAME
        MOVE 1 TO DEFF(KFFTAB)
        MOVE 0004 TO ADL(KFFTAB)
        MOVE 0 TO AA(KFFTAB)
        MOVE "UDATE"TO FFHOLD PERFORM SCANTABFF THRU ENTER-NAME
        MOVE 1 TO DEFF(KFFTAB)
        MOVE 0006 TO ADL(KFFTAB)
        MOVE 0 TO AA(KFFTAB)
        MOVE "UMONTH"TO FFHOLD PERFORM SCANTABFF THRU ENTER-NAME
        MOVE 1 TO DEFF(KFFTAB)
        MOVE 0002 TO ADL(KFFTAB)
        MOVE 0 TO AA(KFFTAB)
        MOVE "UDAY"TO FFHOLD PERFORM SCANTABFF THRU ENTER-NAME
        MOVE 1 TO DEFF(KFFTAB)
        MOVE 0002 TO ADL(KFFTAB)
        MOVE 0 TO AA(KFFTAB)
        MOVE "UYEAR"TO FFHOLD PERFORM SCANTABFF THRU ENTER-NAME
        MOVE 1 TO DEFF(KFFTAB)
        MOVE 0002 TO ADL(KFFTAB)
        MOVE 0 TO AA(KFFTAB)
        MOVE "1P"  TO IHOLD PERFORM INDSCAND
        MOVE "OF"  TO IHOLD PERFORM INDSCAND
        MOVE "L9"  TO IHOLD PERFORM INDSCANDL.
        MOVE "LR"  TO IHOLD PERFORM INDSCAND PERFORM INDSCANR.
        MOVE 4 TO SW.
        GO TO INPUT-REST.
INDSCANDL.
        ADD 1 TO KINTAB.
        IF NAMEIN(KINTAB)=" "MOVE IHOLD TO NAMEIN(KINTAB).
        IF NAMEIN(KINTAB)NOT=IHOLD GO TO INDSCANDL.
        MOVE 9 TO DEFI(KINTAB).
        IF IHOLD NOT="LO" SUBTRACT 1 FROM IHB MOVE 0 TO KINTAB
        GO TO INDSCANDL.
        MOVE 9 TO DEFI(KINTAB) MOVE 0 TO KINTAB.
INPUT-ROUTINE SECTION 63.
INPUT-START.
        PERFORM STATEMENT-NUMBER THRU SOURCE-SEQUENCE.
        IF SW > 4 PERFORM BOMB-OUT.
        IF SW < 4 GO TO INPUT-FIRST.
INPUT-REST.
        IF IRII NOT = " " MOVE IRII
        TO IHOLD PERFORM INDSCAND.
        IF IPFN NOT = SPACES MOVE IPFN TO FFHOLD
        PERFORM SCANTABFF THRU ENTER-NAME MOVE A2(KFFTAB)TO HFRL
        MOVE "O" TO HISQ MOVE 3 TO REFF(KFFTAB)
        PERFORM INPUT-RECORD-SYNTAX GO TO COMMON-PUT ELSE
        IF IFLN =" " PERFORM
        INPUT-RECORD-SYNTAX GO TO COMMON-PUT.
        IF IFLN NOT = SPACES MOVE IFLN TO FFHOLD
        PERFORM SCANTABFF THRU ENTER-NAME
        MOVE 1 TO DEFF(KFFTAB)
        MOVE IFRM TO WKH1
        MOVE ITO TO WKH2
        SUBTRACT WKH1 FROM WKH2 ADD 1 TO WKH2
        MOVE WKH2 TO AT2
        IF IDPN NOT = " " MOVE IDPN TO AT3 ELSE
        MOVE "A" TO AT3.
```

```
     IF IPAC="P"COMPUTE WKH3=WKH2 * 2 -1 MOVE WKH3 TO AT2 WKH2.
     IF IFIZ NOT=" "AND A2(KFFTAB)=" "MOVE IFIZ TO A2(KFFTAB).
     IF CDP >WKH2 MOVE"DECIMAL POSITION LENGTH ERROR  CC 52"
     TO MESG PERFORM POS-ERR.
     IF ATTR = ATTREF(KFFTAB) OR ATTREF(KFFTAB) = " " MOVE
     ATTR TO ATTREF(KFFTAB) MOVE " " TO ATTE ELSE MOVE
"REDEFINED FIELD NAME DIFFERENT ATTRIBUTES   CC 53 - 58"
     TO MESG PERFORM POS-ERR MOVE " " TO ATTE.
     PERFORM INPUT-FIELD-SYNTAX
     IF ILVL NOT=" "MOVE ILVL TO IHOLD PERFORM INDSCANR.
     IF IMR NOT = " " MOVE "MR"
     TO IHOLD PERFORM INDSCAND PERFORM INDSCANR.
     IF IFRR NOT = " " MOVE IFRR
     TO IHOLD PERFORM INDSCANR.
     IF IFII = " " GO TO COMMON-PUT.
     IF IFIP NOT = " " MOVE IFIP
     TO IHOLD PERFORM INDSCAND.
     IF IFIM NOT = " " MOVE IFIM
     TO IHOLD PERFORM INDSCAND.
     IF IFIZ NOT = " " MOVE IFIZ
     TO IHOLD PERFORM INDSCAND.
     GO TO COMMON-PUT.
INPUT-RECORD-SYNTAX.
     PERFORM BEGIN-SYNTAX.
     IF HILV NOT = " " MOVE HILV TO IPL MOVE "HLD-"TO ILFX
     MOVE 5 TO DRH
     MOVE ATTL TO ATTR  MOVE" "TO ATTL HILV PERFORM DO-CTL.
     IF HIMP NOT = " " MOVE HIMP TO IPL MOVE "HLD-"TO ILFX
     IF HIMR > "MO"
     MOVE 6 TO DRH MOVE ATTM TO ATTR MOVE " " TO ATTM HIMR
     PERFORM DO-CTL ELSE
     MOVE 8 TO DRH MOVE ATTM TO ATTR MOVE " " TO ATTM HIMR
     PERFORM DO-CTL.
     MOVE " " TO HIPR HMRD.
     MOVE 7 TO BASE J MOVE 15 TO LIMIT MOVE "INVALID FILE NAME
"    CC 7 - 14"TO MESG.
     IF IPFN =" "
     PERFORM REMOVE-X-ALL ELSE PERFORM FILE-NAME-SCAN.
     MOVE"INPUT SEQUENCE DEFINITION ERROR   CC 15 - 18"TO MESG.
     MOVE 14 TO BASE MOVE 19 TO LIMIT.
     IF AORS ="AND" OR ="OR" AND ISNO =" " AND TSOP = " "
     PERFORM REMOVE-X-ALL ELSE PERFORM INPUT-SEQ-SCAN.
     MOVE"INVALID RESULTING INDICATOR    CC 19 - 20" TO MESG.
     MOVE 19 TO BASE MOVE 21 TO LIMIT.
     MOVE 1 TO MIN MOVE 90 TO MAX
     IF IRII=" " PERFORM REMOVE-X-ALL ELSE
     IF IRII >"G9" AND <"IO"PERFORM REMOVE-X-ALL ELSE
     MOVE  IRII TO NFELD PERFORM SCANNUM.
     MOVE"INVALID RECORD ID CODES    CC 21 - 41" TO MESG.
     IF IRIC NOT = " " PERFORM I-CODE-SCAN
     ELSE MOVE 21 TO BASE MOVE 42 TO LIMIT PERFORM
     REMOVE-X-ALL.
     MOVE " " TO MASK(42).
     MOVE 43 TO BASE MOVE 75 TO LIMIT PERFORM REMOVE-X.
     PERFORM END-SYNTAX.
INPUT-FIELD-SYNTAX.
     PERFORM BEGIN-SYNTAX.
     MOVE 7 TO BASE MOVE 43 TO LIMIT.
     PERFORM REMOVE-X.
```

```
      MOVE"INVALID PACKED FIELD DEFINITION    CC 43 - 52"TO MESG.
      IF CD-COL(43)="P" AND IDPN NOT = " " OR CD-COL(43)= " "
      MOVE " " TO MASK(43)ELSE
      PERFORM POS-ERR.
      IF CD-COL(52)= " " MOVE " " TO MASK(52)ELSE
      IF IDPN <"0" PERFORM POS-ERR ELSE MOVE " " TO MASK(52).
      MOVE"INVALID FROM LOCATION    CC 44 - 47"TO MESG.
      MOVE 44 TO BASE MOVE 48 TO LIMIT.
      MOVE IFRM TO NF FLD.
      MOVE 1 TO MIN MOVE HFRL TO MAX PERFORM SCANNUM.
      MOVE 48 TO BASE MOVE 52 TO LIMIT.
      MOVE"INVALID TO LOCATION    CC 48 - 51"TO MESG.
      MOVE ITO TO NF FLD.
      IF ITO NOT < IFRM PERFORM SCANNUM ELSE PERFORM POS-ERR.
      MOVE"INVALID FIELD NAME    CC 53 - 58"TO MESG.
      MOVE 53 TO BASE J MOVE 59 TO LIMIT.
      PERFORM FIELD-NAME-SCAN.
      MOVE"INVALID CONTROL LEVEL    CC 59 - 60" TO MESG.
      MOVE 59 TO BASE MOVE 61 TO LIMIT.
      IF ILVL > "L0" AND < "H0" PERFORM REMOVE-X-ALL PERFORM
      ENTER-L-CTL ELSE IF ILVL = " " PERFORM REMOVE-X-ALL
      ELSE PERFORM POS-ERR.
      MOVE"INVALID MATCHING OR CHAINING    CC 61 - 62" TO MESG.
      MOVE 61 TO BASE MOVE 63 TO LIMIT.
      IF IMR > "C0"AND <"D0" OR >"H0" AND < "N0"
      PERFORM CHAINS-REFER PERFORM ENTER-MATCH ELSE IF IMR
      = " " PERFORM REMOVE-X-ALL ELSE PERFORM POS-ERR.
      MOVE"INVALID RECORD INDICATOR    CC 63 - 64"TO MESG.
      MOVE 63 TO BASE MOVE 65 TO LIMIT.
      MOVE 1 TO MIN MOVE 99 TO MAX.
      IF IFRR >"L0" AND NOT >"L9" PERFORM REMOVE-X-ALL ELSE
      IF IFRR NOT = " " PERFORM SCANNUM ELSE PERFORM
      REMOVE-X-ALL.
      MOVE"INVALID FIELD INDICATOR    CC 65 -70" TO MESG.
      IF IDPN = " "AND IFIP NOT =" "AND IFIM NOT = " "
      PERFORM POS-ERR.
      MOVE 65 TO BASE MOVE 67 TO LIMIT.
      IF IFIP=" "OR"H1"OR"H2"PERFORM REMOVE-X-ALL ELSE
      MOVE IFIP TO NF FLD PERFORM SCANNUM.
      MOVE 67 TO BASE MOVE 69 TO LIMIT.
      IF IFIM=" "OR"H1"OR"H2"PERFORM REMOVE-X-ALL ELSE
      MOVE IFIM TO NF FLD PERFORM SCANNUM.
      MOVE 69 TO BASE MOVE 71 TO LIMIT.
      IF IFIZ=" "OR"H1"OR"H2"PERFORM REMOVE-X-ALL ELSE
      MOVE IFIZ TO NF FLD PERFORM SCANNUM.
      MOVE 71 TO BASE MOVE 75 TO LIMIT PERFORM REMOVE-X.
      PERFORM END-SYNTAX.
CHAINS-REFER.
      IF IMR>"C0"AND<"D0"MOVE IMR TO JHOLD MOVE CHNTRY(JHR) TO
      SFLG ELSE MOVE 1 TO SFLG.
      IF SFLG NOT=1 PERFORM POS-ERR ELSE PERFORM REMOVE-X-ALL.
INPUT-SEQ-SCAN.
      MOVE 14 TO J MOVE " " TO MASK(J).
      IF ISEQ <"0" AND ISNO =" " AND ISOP = " " AND HISQ ="0"
      PERFORM REMOVE-X-ALL
      ELSE IF ISEQ > HISQ AND(ISNO = "N" OR ="1")AND (ISOP
      ="0" OR = " ")MOVE 1 TO MIN MOVE 99 TO MAX
      MOVE ISEQ TO NF FLD PERFORM
      SCANNUM MOVE ISEQ TO HISQ ELSE PERFORM POS-ERR.
```

```
I-CODE-SCAN.
    MOVE 1 TO MIN MOVE HFRL TO MAX.
    MOVE 21 TO BASE MOVE 28 TO LIMIT
    IF IRI1 =" " PERFORM REMOVE-X ELSE MOVE 25 TO LIMIT
    MOVE IPN1 TO NF FLD PERFORM SCANNUM
    MOVE 25 TO BASE MOVE 28 TO LIMIT
    IF(IYN1 = " " OR = "N")AND(ICD1 ="C" OR ="D" OR = "Z")
    PERFORM REMOVE-X-ALL ELSE PERFORM POS-ERR.
    MOVE 28 TO BASE MOVE 35 TO LIMIT.
    IF IRI2 = " " PERFORM REMOVE-X ELSE MOVE 32 TO LIMIT
    MOVE IPN2 TO NF FLD PERFORM SCANNUM
    MOVE 32 TO BASE MOVE 35 TO LIMIT
    IF(IYN2 = " " OR = "N")AND(ICD2 ="C" OR ="D" OR = "Z")
    PERFORM REMOVE-X-ALL ELSE PERFORM POS-ERR.
    MOVE 35 TO BASE MOVE 42 TO LIMIT
    IF IRI3 = " " PERFORM REMOVE-X ELSE MOVE IPN3 TO NF FLD
    MOVE 39 TO LIMIT PERFORM SCANNUM
    MOVE 39 TO BASE MOVE 42 TO LIMIT
    IF(IYN3 = " " OR = "N")AND(ICD3 ="C" OR ="D" OR = "Z")
    PERFORM REMOVE-X-ALL ELSE PERFORM POS-ERR.
ENTER-L-CTL.
    MOVE 0 TO WKH3 MOVE ATTL TO ATTR.
    IF IDPN=" "AND AT3=" "OR"A"MOVE"A"TO AT3 ELSE
    MOVE "N" TO AT3.
    IF HIRR=" "MOVE IFRR TO HIRR.
    IF(HILV=ILVL OR" ")AND IFRR=HIRR MOVE ILVL TO HILV MOVE
    AT2 TO WKH3 ADD WKH2 TO WKH3 MOVE WKH3 TO AT2 MOVE ATTR
    TO ATTL ELSE MOVE ATTL TO ATTR MOVE" "TO ATTL
    MOVE HILV TO IPL MOVE"HLD-" TO ILFX MOVE IFRR TO HIRR
    MOVE 5 TO DRH PERFORM
    DO-CTL MOVE ILVL TO HILV GO TO ENTER-L-CTL.
ENTER-MATCH.
    MOVE 0 TO WKH3 MOVE ATTM TO ATTR.
    IF IDPN=" "AND AT3=" "OR"A"MOVE"A"TO AT3 ELSE
    MOVE "N" TO AT3.
    IF HMRR=" "MOVE IFRR TO HMRR.
    IF(HIMR=IMR OR" ")AND IFRR=HMRR MOVE IMR TO HIMR MOVE
    AT2 TO WKH3 ADD WKH2 TO WKH3 MOVE WKH3 TO AT2 MOVE ATTR
    TO ATTM ELSE MOVE ATTM TO ATTR MOVE " "TO ATTM
    MOVE HIMR TO IPL MOVE"HLD-"TO ILFX MOVE IFRR TO HMRR
    IF HIMR > "MO"
    MOVE 6 TO DRH PERFORM DO-CTL MOVE IMR TO HIMR
    GO TO ENTER-MATCH ELSE
    MOVE 8 TO DRH PERFORM DO-CTL MOVE IMR TO HIMR
    GO TO ENTER-MATCH.
CALC-ROUTINE SECTION 64.
CALC-START.
    IF HILV NOT = " " MOVE HILV TO IPL MOVE "HLD-"TO ILFX
    MOVE 5 TO DRH
    MOVE ATTL TO ATTR PERFORM DO-CTL MOVE" "TO HILV.
    IF HIMR NOT = " " MOVE HIMR TO IPL MOVE "HLD-"TO ILFX
    IF HIMR > "MO"
    MOVE 6 TO DRH MOVE ATTM TO ATTR MOVE " " TO ATTM HIMR
    PERFORM DO-CTL ELSE
    MOVE 8 TO DRH MOVE ATTM TO ATTR MOVE " " TO ATTM HIMR
    PERFORM DO-CTL.
    PERFORM STATEMENT-NUMBER THRU SOURCE-SEQUENCE.
    IF SW > 5 PERFORM BOMB-OUT.
    IF SW < 4 MOVE"MISSING INPUT SPECIFICATIONS"TO MESG
```

```
     PERFORM POS-ERR.
     IF SW<5 MOVE 0 TO HCF1 HCF2 HCRF IHF1 IHF2 IHFR.
     MOVE 5 TO SW.
     IF COPD="ENTER"AND CF2="COBOL"MOVE 1 TO COSW GO TO
     COMMON-PUT.
     IF COPD="ENTER"AND CF2="RPG"MOVE 0 TO COSW GO TO
     COMMON-PUT.
     IF COSW=1 MOVE"ENTER RPG STATEMENT MISSING"TO MESG
     PERFORM POS-ERR.
     IF COPD="EXIT"OR"RLABL"OP"ULABL"MOVE"INVALID OP CODE -*- A
    "SSEMBLER SUB ROUTINE"TO MESG PERFORM POS-ERR GO TO
     COMMON-PUT.
     IF CF11="+"OR"-"OR"."OR"≥"OR>"Z"NEXT SENTENCE ELSE
     IF CF1 NOT = " "
     MOVE CF1 TO FFHOLD PERFORM SCANTABFF THRU ENTER-NAME
     MOVE KFFTAB TO HCF1
     IF COPD NOT ="TAG" AND "BEGSR" AND "ENDSR"
     MOVE 1 TO REFF(KFFTAB)
     ELSE IF DEFF(KFFTAB)=4 MOVE 2 TO DEFF(KFFTAB)
     ELSE MOVE"REDEFINED TAG NAME"TO MESG PERFORM POS-ERR.
     IF CF21="+"OR"-"OR"."OR"≥"OR>"Z"NEXT SENTENCE ELSE
     IF CF2 NOT = " "
     MOVE CF2 TO FFHOLD PERFORM SCANTABFF THRU ENTER-NAME
     MOVE KFFTAB TO HCF2
     IF COPD="GOTO"OR"EXSR"MOVE 2 TO REFF(KFFTAB)ELSE IF COPD
     NOT="CHAIN"MOVE 1 TO REFF(KFFTAB).
     IF CRF NOT = SPACES MOVE CRF TO FFHOLD PERFORM SCANTABFF
     THRU ENTER-NAME ELSE GO TO CALC-ENTER.
     MOVE KFFTAB TO HCRF.
     IF CFL = " " MOVE 1 TO REFF(KFFTAB) GO TO CALC-ENTER.
     MOVE CFL TO NHOLD MOVE NHOLD TO AT2.
     IF IDPN NOT = " "MOVE IDPN TO AT3 ELSE MOVE "A" TO AT3.
     IF CDP>NHOLD MOVE"DECIMAL POSITION LENGTH ERROR   CC 52"
     TO MESG PERFORM POS-ERR.
     IF DEFF(KFFTAB) NOT= 4 PERFORM DEFF-CHECK ELSE
     IF AT2 < ADL(KFFTAB) OR AA(KFFTAB) NOT = "V" AND AT3 < AA
     (KFFTAB) OR AT3 ="A"   AND AA(KFFTAB) > "A" AND AA(KFFTAB)
     NOT = "V" MOVE
    "DEFINITION NOT COMPATIBLE WITH USAGE    CC 49 - 52"TO MESG
     PERFORM POS-ERR.
     MOVE ATTR TO ATTREF(KFFTAB) MOVE " " TO ATTR.
     IF DEFF(KFFTAB) NOT= 7
     MOVE 1 TO DEFF(KFFTAB). GO TO CALC-ENTER.
 DEFF-CHECK.
     IF ATTR NOT = ATTREF(KFFTAB) MOVE
    "REDEFINED FIELD NAME DIFFERENT ATTRIBUTE    CC 43 - 48"
     TO MESG PERFORM POS-ERR.
 CALC-ENTER.
     IF CLVL NOT=" " AND "SR" MOVE CLVL
     TO IHOLD PERFORM INDSCANR.
     IF CIND = " " AND CCRI = " " GO TO CALC-SYNTAX.
     IF CIND = " " GO TO CNEXT.
     IF CI1 NOT=" " AND NOT="*"MOVE CI1
     TO IHOLD PERFORM INDSCANR.
     IF CI2 NOT = " " MOVE CI2
     TO IHOLD PERFORM INDSCANR.
     IF CI3 NOT = " " MOVE CI3
     TO IHOLD PERFORM INDSCANR.
```

```
CNEXT.
    IF CCRI = " " GO TO CALC-SYNTAX.
    IF CCR1 NOT = " " MOVE CCR1
TO IHOLD PERFORM INDSCAND.
    IF CCR2 NOT = " " MOVE CCR2
TO IHOLD PERFORM INDSCAND.
    IF CCR3 NOT = " " MOVE CCR3
TO IHOLD PERFORM INDSCAND.
CALC-SYNTAX.
    PERFORM BEGIN-SYNTAX.
    MOVE"MIXED DETAIL AND TOTAL CALC LEVELS  CC 7 - 8"TO MESG.
    IF CLVL<HCLV AND SPSW=0 AND CUPD NOT="BEGSR"
    AND CIX NOT="*" PERFORM
    POS-ERR ELSE IF COPD="BEGSR"MOVE"SR"TO HCLV ELSE IF CLVL
    NOT=" "AND HCLV=" "MOVE"LR"TO HCLV.
    MOVE"INVALID CALC-LEVEL   CC 7 - 8"TO MESG.
    MOVE 7 TO BASE MOVE 9 TO LIMIT.
    IF CLVL=" "OR"LR"OR"SR"OR NOT<"L0" AND NOT>"L9"
    PERFORM REMOVE-X-ALL ELSE PERFORM POS-ERR.
    IF CIX ="*" AND HINDX =" " MOVE"CC 11 CONTAINS AN * BUT PR
 "EVIOUS LINE IS BLANK" TO MESG PERFORM POS-ERR.
    MOVE CIND-LVL TO HINDX.
    MOVE"INVALID INDICATOR   CC 9 - 17"TO MESG.
    MOVE 9 TO BASE MOVE 12 TO LIMIT.
    IF CIND NOT = " " MOVE CIND TO INDC PERFORM COMM-IND-SCAN
    ELSE MOVE 18 TO LIMIT PERFORM REMOVE-X-ALL.
    IF J NOT = 16 PERFORM POS-ERR.
    MOVE 28 TO BASE MOVE 33 TO LIMIT.
    IF COPD = "ADD  " PERFORM REMOVE-X-ALL GO TO CALC-ADD.
    IF COPD = "Z-ADD" PERFORM REMOVE-X-ALL GO TO CALC-Z-ADD.
    IF COPD = "SUB  " PERFORM REMOVE-X-ALL GO TO CALC-ADD.
    IF COPD = "Z-SUB" PERFORM REMOVE-X-ALL GO TO CALC-Z-ADD.
    IF COPD = "MULT " PERFORM REMOVE-X-ALL GO TO CALC-MULT.
    IF COPD = "DIV  " PERFORM REMOVE-X-ALL GO TO CALC-DIV.
    IF COPD = "MVR  " PERFORM REMOVE-X-ALL GO TO CALC-MVR.
    IF COPD = "MOVE " PERFORM REMOVE-X-ALL GO TO CALC-MOVE.
    IF COPD = "MOVEL" PERFORM REMOVE-X-ALL GO TO CALC-MOVE.
    IF COPD = "MLLZO" PERFORM REMOVE-X-ALL GO TO CALC-MOVE.
    IF COPD = "MHHZO" PERFORM REMOVE-X-ALL GO TO CALC-MHHZO.
    IF COPD = "MLHZO" PERFORM REMOVE-X-ALL GO TO CALC-MLHZO.
    IF COPD = "MHLZO" PERFORM REMOVE-X-ALL GO TO CALC-MHLZO.
    IF COPD = "COMP " PERFORM REMOVE-X-ALL GO TO CALC-COMP.
    IF COPD = "TESTZ" PERFORM REMOVE-X-ALL GO TO CALC-TESTZ.
    IF COPD = "SETON" PERFORM REMOVE-X-ALL GO TO CALC-SETON.
    IF COPD = "SETOF" PERFORM REMOVE-X-ALL GO TO CALC-SETON.
    IF COPD = "GOTO " PERFORM REMOVE-X-ALL GO TO CALC-GOTO.
    IF COPD = "TAG  " PERFORM REMOVE-X-ALL GO TO CALC-TAG.
    IF COPD = "LOKUP" PERFORM REMOVE-X-ALL GO TO CALC-LOKUP.
    IF COPD = "EXCPT" PERFORM REMOVE-X-ALL GO TO CALC-EXCPT.
    IF COPD = "EXSR " PERFORM REMOVE-X-ALL GO TO CALC-GOTO.
    IF COPD = "BEGSR" PERFORM REMOVE-X-ALL GO TO CALC-BEGSR.
    IF COPD = "ENDSR" PERFORM REMOVE-X-ALL GO TO CALC-ENDSR.
    IF COPD = "CHAIN" PERFORM REMOVE-X-ALL GO TO CALC-CHAIN.
    MOVE"INVALID OPERATION   CC 28 - 32"TO MESG
    PERFORM POS-ERR  GO TO CALC-NEXT.
CALC-MOVE.
    MOVE "V" TO F2X PFX GO TO CALC-MOVE-COMM.
CALC-MHHZO.
    MOVE "A" TO F2X PFX GO TO CALC-MOVE-COMM.
```

```
CALC-MLHZO.
      MOVE "V" TO F2X MOVE "A" TO RFX.
      GO TO CALC-MOVE-COMM.
CALC-MHLZO.
      MOVE "A" TO F2X MOVE "V" TO RFX.
      GO TO CALC-MOVE-COMM.
CALC-NEW-OLAY SECTION 84.
CALC-EXCPT.
      MOVE 18 TO BASE MOVE 60 TO LIMIT PERFORM REMOVE-X
      GO TO CALC-NEXT.
CALC-BEGSR.
      IF SRSW=1 MOVE"MISSING ENDSR STATEMENT"TO MESG PERFORM
      POS-ERR.
      MOVE 1 TO SRSW GO TO CALC-TAG.
CALC-ENDSR.
      IF SRSW=0 MOVE"MISSING BEGSR STATEMENT"TO MESG PERFORM
      POS-ERR.
      MOVE 0 TO SRSW IF HCF1=0 GO TO CALC-EXCPT ELSE GO TO
      CALC-TAG.
CALC-SYNTAX-OVLY SECTION 74.
CALC-RESULT-IND.
      MOVE 54 TO BASE MOVE 60 TO LIMIT.
      IF CCRI NOT=" " MOVE"INVALID RESULT INDICATOR  CC 54 - 59"
      TO MESG ELSE PERFORM REMOVE-X-ALL GO TO CALC-NEXT.
      MOVE 56 TO LIMIT IF CCR1 NOT = " " MOVE CCR1 TO IHOLD
      PERFORM IND-ALL-SCAN ELSE PERFORM REMOVE-X-ALL.
      MOVE 56 TO BASE MOVE 58 TO LIMIT.
      IF CCR2 NOT = " " MOVE CCR2 TO IHOLD PERFORM  IND-ALL-SCAN
      ELSE PERFORM REMOVE-Y-ALL.
      MOVE 58 TO BASE MOVE 60 TO LIMIT.
      IF CCR3 NOT = " " MOVE CCR3 TO IHOLD PERFORM IND-ALL-SCAN
      ELSE PERFORM REMOVE-X-ALL.
CALC-NEXT.
      IF COPD="DIV"MOVE 1 TO DVSW ELSE MOVE 0 TO DVSW.
      MOVE 0 TO HCF1 HCF2 HCRF IHF1 IHF2 IHFR.
      MOVE 60 TO BASE MOVE 75 TO LIMIT.
      PERFORM REMOVE-X-ALL PERFORM END-SYNTAX.
      GO TO COMMON-PUT.
CALC-CHAIN.
      PERFORM FACT1F PERFORM FIELD-LIT-CHECK.
      PERFORM FACT2F IF DEFF(HCF2)NOT=3 OR AA(HCF2)NOT=6
      PERFORM POS-ERR ELSE PERFORM REMOVE-X-ALL.
      MOVE 43 TO BASE MOVE 54 TO LIMIT PERFORM REMOVE-X.
      IF CCR1 NOT= CCR2 MOVE"INVALID HIGH - LOW INDICATORS SPECI
   "FIED"TO MESG PERFORM POS-ERR.
      GO TO CALC-RESULT-IND.
CALC-ADD.
      PERFORM CALC-ARITHMETIC THRU CALC-ARITH-END.
      IF IHF1 > IHF2 AND IHFR < IHF1 PERFORM WARN-NOW
      ELSE IF IHFR < IHF2 PERFORM WARN-NOW.
      GO TO CALC-RESULT-IND.
CALC-Z-ADD.
      MOVE 18 TO BASE MOVE 28 TO LIMIT PERFORM REMOVE-X.
      PERFORM CALC-ARITH-COMM THRU CALC-ARITH-END.
      IF IHFR < IHF2 PERFORM WARN-NOW.
      GO TO CALC-RESULT-IND.
CALC-MULT.
      PERFORM CALC-ARITHMETIC THRU CALC-ARITH-END.
      ADD IHF2 TO IHF1 IF IHFR < IHF1 PERFORM WARN-NOW.
      GO TO CALC-RESULT-IND.
```

```
CALC-DIV.
      PERFORM CALC-ARITHMETIC THRU CALC-ARITH-END.
      SUBTRACT IHF2 FROM IHF1 IF IHFR<IHF1 PERFORM WARN-NOW.
      GO TO CALC-RESULT-IND.
CALC-MVR.
      MOVE 18 TO BASE MOVE 43 TO LIMIT PERFORM REMOVE-X.
      PERFORM CALC-ARITH-END.
      IF DVSW=0 MOVE"MVR DOES NOT FOLLOW DIV OP"TO MESG PERFORM
      POS-ERR GO TO CALC-RESULT-IND ELSE GO TO CALC-RESULT-IND.
CALC-COMP.
      PERFORM FACT1F PERFORM FACT1TYP PERFORM FIELD-LIT-CHECK
      PERFORM FACT2F PERFORM FACT2TYP PERFORM FIELD-LIT-CHECK
      PERFORM COMP-CHECK GO TO CALC-SETON.
CALC-TESTZ.
      MOVE 18 TO BASE MOVE 43 TO LIMIT PERFORM REMOVE-X.
      PERFORM RESULTF PERFORM FIELD-NAME-SCAN.
      IF AA(HCRF)=" "OR="V"MOVE 1 TO ADL(HCRF)
      MOVE"A" TO AA(HCRF) ELSE IF AA(HCRF)NOT <0 PERFORM
      POS-ERR.
      IF CFL NOT=" " PERFORM CALC-DEF ELSE MOVE 49 TO BASE
      MOVE 54 TO LIMIT PERFORM REMOVE-X.
      IF CD-COL(53)=" "MOVE" "TO MASK(53).
      IF CCRI = " " MOVE
"NO RESULTING INDICATOR   CC 54 - 59"TO MESG PERFORM
      POS-ERR GO TO CALC-NEXT ELSE GO TO CALC-RESULT-IND.
      GO TO CALC-RESULT-IND.
CALC-SETON.
      MOVE 18 TO BASE MOVE 54 TO LIMIT PERFORM REMOVE-X.
      IF CCRI = " " MOVE "NO RESULTING INDICATORS   CC 54 - 59"
      TO MESG PERFORM POS-ERR GO TO CALC-NEXT ELSE
      GO TO CALC-RESULT-IND.
CALC-GOTO.
      MOVE 18 TO BASE MOVE 33 TO LIMIT PERFORM REMOVE-X.
      PERFORM FACT2F PERFORM FIELD-NAME-SCAN.
      MOVE 43 TO BASE MOVE 60 TO LIMIT PERFORM REMOVE-X.
      GO TO CALC-NEXT.
CALC-TAG.
      PERFORM FACT1F PERFORM FIELD-NAME-SCAN.
      MOVE 33 TO BASE MOVE 60 TO LIMIT PERFORM REMOVE-X.
      GO TO CALC-NEXT.
CALC-LOKUP.
      PERFORM FACT1F PERFORM FACT1TYP PERFORM FIELD-LIT-CHECK
      PERFORM FACT2F PERFORM FACT2TYP PERFORM FIELD-LIT-CHECK
      IF DEFF(HCF2) NOT = 7 PERFORM POS-ERR.
      MOVE 43 TO BASE MOVE 54 TO LIMIT.
      IF CRF =" " PERFORM REMOVE-X ELSE PERFORM RESULTF
      PERFORM FIELD-NAME-SCAN IF DEFF(HCRF) NOT = 7 PERFORM
      POS-ERR.
      IF CFL NOT =" " PERFORM CALC-DEF.
      IF CCR1 NOT=" "AND CCR2 NOT=" " MOVE"INVALID HIGH - LOW IN
   "DICATORS SPECIFIED"TO MESG PERFORM POS-ERR.
      PERFORM COMP-CHECK GO TO CALC-SETON.
CALC-ARITHMETIC.
      PERFORM FACT1F.
      IF CD-COL(18)="+"OR"-"OR"."OR>"7"PERFORM NUM-LIT-SCAN
      PERFORM CALC-LIT-INT! ELSE MOVE HCF1 TO KEFTAB PERFORM
      CALC-ACOM.
CALC-ARITH-COMM.
      PERFORM FACT2F.
```

```
        IF CD-COL(33)="+"OR"-"OR","OR>"7"PERFORM NUM-LIT-SCAN
        PERFORM CALC-LIT-INT2 ELSE MOVE HCF2 TO KFFTAB PERFORM
        CALC-ACOM.
CALC-ARITH-END.
        PERFORM RESULTF MOVE HCRF TO KFFTAB PERFORM CALC-ACOM.
        IF CCR3 NOT=" "AND A2(HCRF)=" "MOVE CCR3 TO A2(HCRF).
        IF CFL NOT = " " PERFORM CALC-DFF ELSE
        MOVE 49 TO BASE MOVE 53 TO LIMIT PERFORM REMOVE-X-ALL.
        IF CD-COL(53)="H"OR" "MOVE" "TO MASK(53).
        PERFORM INT-COUNT.
CALC-ACOM.
        PERFORM FIELD-NAME-SCAN.
        IF AA(KFFTAB)=" "OR"V"MOVE 0 TO AA(KFFTAB)MOVE 0001 TO ADL
        (KFFTAB)PERFORM REMOVE-X-ALL ELSE IF AA(KFFTAB)="A"PERFORM
        POS-ERR ELSE PERFORM REMOVE-X-ALL.
CALC-LIT-INT1.
        IF DFLG = 1 SUBTRACT PTCT FROM TLCT MOVE TLCT TO IHF1
        ELSE MOVE TLCT TO IHF1.
CALC-LIT-INT2.
        IF DFLG = 1 SUBTRACT RTCT FROM TLCT MOVE TLCT TO IHF2
        ELSE MOVE TLCT TO IHF2.
INT-COUNT.
        IF HCF1 NOT = 0
        MOVE AA(HCF1)TO IHA MOVE IHA TO WKH1 MOVE ADL(HCF1)TO WKH2
        SUBTRACT WKH1 FROM WKH2 MOVE WKH2 TO IHF1.
                                                RECEIVING FIELD TRUN
        IF HCF2 NOT = 0
        MOVE AA(HCF2)TO IHA MOVE IHA TO WKH1 MOVE ADL(HCF2)TO WKH2
        SUBTRACT WKH1 FROM WKH2 MOVE WKH2 TO IHF2.
                                                RECEIVING FIELD TRUN
        IF HCRF NOT = 0
        MOVE AA(HCRF)TO IHA MOVE IHA TO WKH1 MOVE ADL(HCRF)TO WKH2
        SUBTRACT WKH1 FROM WKH2 MOVE WKH2 TO IHFR.
                                                RECEIVING FIELD TRUN
        MOVE"RESULT FIELD MAY NOT BE LARGE ENOUGH"TO MESG.
CALC-DEF.
        MOVE"INVALID RESULT FIELD LENGTH    CC 49 - 51"TO MESG.
        MOVE 49 TO BASE MOVE 52 TO LIMIT MOVE 1 TO MIN MOVE 999 TO
        MAX MOVE CFL TO NFELD PERFORM SCANNUM.
        MOVE"INVALID ENTRY DECIMAL POSITIONS   CC 52"TO MESG.
        IF CDP =" " OR NOT < 0  MOVE " "TO MASK(52) ELSE
        PERFORM POS-ERR.
CALC-MOVE-COMM.
        MOVE 18 TO BASE MOVE 33 TO LIMIT PERFORM REMOVE-X.
        PERFORM FACT2F PERFORM FIELD-LIT-CHECK PERFORM RESULTF
        PERFORM FIELD-NAME-SCAN IF CFL NOT =" " PERFORM
        CALC-DEF MOVE 53 TO BASE ELSE MOVE 49 TO BASE.
        MOVE 54 TO LIMIT PERFORM REMOVE-X
        IF HCF2 NOT=0 AND AA(HCF2)=" "MOVE F2X TO AA(HCF2).
        IF AA(HCRF) = " " MOVE RFX TO AA(HCRF).
CALC-MOVE-EXIT.
        GO TO CALC-RESULT-IND.
FACT1F.
        MOVE 18 TO BASE J MOVE 28 TO LIMIT.
        MOVE"INVALID FACTOR 1   CC 18 - 27"TO MESG.
        MOVE HCF1 TO KFFTAB.
        IF CF1 =" " PERFORM POS-ERR.
FACT2F.
        MOVE 33 TO BASE J MOVE 43 TO LIMIT.
```

```
        MOVE"INVALID FACTOR 2    CC 33 - 42"TO MESG.
        MOVE HCF2 TO KFFTAB.
        IF CF2 =" " PERFORM POS-ERR.
RESULTF.
        MOVE 43 TO BASE J MOVE 49 TO LIMIT.
        MOVE"INVALID RESULT FIELD   CC 43 - 48"TO MESG.
        MOVE HCRF TO KFFTAB.
        IF CRF =" " PERFORM POS-ERR.
FIELD-LIT-CHECK.
        IF CD-COL(J) NOT<"0" OR ="." OR  ="+" OR ="-"PERFORM
        NUM-LIT-SCAN ELSE IF CD-COL(J)="≥"PERFORM CON-EDIT-SCAN
        ELSE PERFORM FIELD-NAME-SCAN.
NUM-LIT-SCAN.
        MOVE 0 TO RTCT TLCT DFLG EFLG SFLG.
        MOVE LIMIT TO MAX MOVE BASE TO MIN ADD -1 TO MAX MIN.
        PERFORM DIGIT-SCAN VARYING JI FROM MAX BY -1 UNTIL JI=MIN.
        IF EFLG = 1 PERFORM POS-ERR ELSE
        PERFORM REMOVE-X-ALL.
DIGIT-SCAN.
        IF CD-COL(JI)=" " AND SFLG = 1 MOVE 1 TO EFLG.
        IF CD-COL(JI)NOT <"0" AND DFLG = 0 ADD 1 TO RTCT.
        IF CD-COL(JI)="." AND DFLG = 0 MOVE 1 TO DFLG SFLG ELSE
        IF CD-COL(JI)="." MOVE 1 TO EFLG.
        IF(CD-COL(JI)="+" OR ="-")AND JI NOT =BASE MOVE 1 TO EFLG.
        IF CD-COL(JI)NOT <"0" MOVE 1 TO SFLG ADD 1 TO TLCT.
        IF CD-COL(JI)= " " OR ="+" OR ="-" OR ="." OR NOT <"0"
        ADD 0 TO TLCT ELSE MOVE 1 TO EFLG.
FACT2TYP.
        IF HCF2 NOT = 0 AND AA(HCF2)="A" MOVE "A" TO FT2 ELSE
        IF HCF2 NOT=0 AND AA(HCF2)NOT="A" MOVE"N" TO FT2 ELSE
        IF HCF2=0 AND CD-COL(J)="≥" MOVE"A" TO FT2 ELSE
        IF HCF2=0 AND CD-COL(J) NOT="≥" MOVE "N" TO FT2.
FACT1TYP.
        IF HCF1 NOT = 0 AND AA(HCF1)="A" MOVE "A" TO FT1 ELSE
        IF HCF1 NOT=0 AND AA(HCF1)NOT="A" MOVE"N" TO FT1 ELSE
        IF HCF1=0 AND CD-COL(J)="≥" MOVE"A" TO FT1 ELSE
        IF HCF1=0 AND CD-COL(J) NOT="≥" MOVE "N" TO FT1.
COMP-CHECK.
        IF FT1 NOT=FT2 MOVE
        "FAC1 OR FAC2 NOT DEFINED YET OR MIXED MODE COMPARE"TO
        MESG PERFORM WARN-NOW.
OUTPUT-FIRST SECTION 75.
OUTPUT-FIRST-START.
        IF SW<6 AND CUSW=1 MOVE"MISSING ENTER RPG STATEMENT"TO
        MESG PERFORM POS-ERR.
        IF SW<6 AND HILV NOT=" "MOVE HILV TO IPL MOVE"HLD-"TO ILFX
        MOVE 5 TO DRH MOVE ATTL TO ATTR PERFORM DO-CTL.
        IF SW<6 AND HIMR NOT=" "MOVE HIMR TO IPL MOVE"HLD-"TO ILFX
        IF HIMR > "M0"
        MOVE 6 TO DRH MOVE ATTM TO ATTR PERFORM DO-CTL ELSE
        MOVE 8 TO DRH MOVE ATTM TO ATTR PERFORM DO-CTL.
        IF SW < 4 MOVE"MISSING INPUT SPECIFICATIONS"TO MESG
        PERFORM POS-ERR.
        IF SRSW=1 MOVE"MISSING ENDSR STATEMENT"TO MESG PERFORM
        POS-ERR.
        MOVE " " TO HINDX.
        IF OIX ="*" MOVE"CC 25 MUST NOT BE AN * ON THE FIRST RECOR
"D" TO MESG PERFORM POS-ERR.
        MOVE 6 TO SW.
        IF KFFTAB=999 GO TO PHASE-TWO-REST ELSE GO TO OUTPUT-REST.
```

```
OUTPUT-ROUTINE SECTION 65.
OUTPUT-ROUTINE-START.
     IF SW < 6 GO TO OUTPUT-FIRST.
OUTPUT-REST.
     PERFORM STATEMENT-NUMBER THRU SOURCE-SEQUENCE.
     IF OI1 NOT=" "AND NOT=" *" MOVE OI1
     TO IHOLD PERFORM INDSCANR.
     IF OI2 NOT = " " MOVE OI2
     TO IHOLD PERFORM INDSCANR.
     IF OI3 NOT = " " MOVE OI3
     TO IHOLD PERFORM INDSCANR.
     IF OPFN NOT = SPACES MOVE OPFN TO FFHOLD
     PERFORM SCANTAFFF THRU ENTER-NAME
     MOVE 3 TO REFF(KFFTAB)
     MOVE ADL(KFFTAB) TO AT2 MOVE A2(KFFTAB) TO HFRL
     PERFORM OUTPUT-RECORD-SYNTAX THRU O-LAST GO TO COMMON-PUT.
     IF(OAND="AND"OR OOR="OR")OR(OHDT="H"OR"D"OR"T"OR"E")
     PERFORM OUTPUT-RECORD-SYNTAX THRU O-LAST GO TO COMMON-PUT.
     IF OFON NOT = SPACES MOVE OFON TO FFHOLD
     PERFORM SCANTAFFF THRU ENTER-NAME MOVE 1 TO REFF
     (KFFTAB)
     IF DEFF(KFFTAB) = 4 MOVE
"UNDEFINED FIELD NAME   CC 32 - 37"TO MESG PERFORM POS-ERR.
     PERFORM OUTPUT-FIELD-SYNTAX.
     GO TO COMMON-PUT.
OUTPUT-RECORD-SYNTAX.
     PERFORM BEGIN-SYNTAX.
     MOVE 7 TO BASE J MOVE 15 TO LIMIT MOVE "INVALID FILE NAME
"  CC 7 - 14"TO MESG.
     IF OPFN = " " PERFORM REMOVE-X-ALL ELSE PERFORM
     FILE-NAME-SCAN
     IF ATYP(KFFTAB)="O"OR"U"OR"I"AND ATA="A"NEXT SENTENCE ELSE
     MOVE"INVALID FILE TYPE OUTPUT"TO MESG PERFORM POS-ERR.
     MOVE"INVALID OUTPUT TYPE   CC 15"TO MESG.
     IF OHDT="T"OR"E" MOVE 1 TO TOSW.
     IF(OHDT="H"OR"D")AND TOSW=1 PERFORM POS-ERR.
     MOVE 15 TO J IF OHDT="H"OR"D"OR"T"OR"E"OR"R"OR
     = "N" MOVE " " TO MASK(J) ELSE PERFORM POS-ERR.
     IF OIX ="*" AND(OHDT ="R" OR "N") MOVE"CC 25 MUST NOT BE
"AN * ON - AND/OR - LINES" TO MESG PERFORM POS-ERR.
     MOVE 16 TO BASE MOVE 23 TO LIMIT.
     IF OHDT="N" OR"R" PERFORM REMOVE-X-ALL GO TO O-IND.
     MOVE"INVALID PUNCH OUTPUT SPEC   CC 16 - 22"TO MESG.
     MOVE 16 TO J IF AT2="PUNC"AND(OSTK=" "OR(>"Z"AND<"4"))
     AND OPSS=" "PERFORM REMOVE-X-ALL ELSE IF AT2="PUNC"
     PERFORM POS-ERR.
     MOVE"INVALID PRINT OUTPUT SPEC   CC 16 - 22"TO MESG.
     IF AT2="PRIN"MOVE 0 TO MIN MOVE 11 TO MAX MOVE OSPB
     TO NF FLD PERFORM NSCAN IF EFLG=1 OR OSTK NOT=" "
     PERFORM POS-ERR GO TO DSK-CK ELSE MOVE OSPA TO NF FLD
     PERFORM NSCAN IF EFLG=1 PERFORM POS-ERR GO TO DSK-CK
     ELSE MOVE OSKB TO NF FLD PERFORM NSCAN IF EFLG=1 PERFORM
     POS-ERR GO TO DSK-CK ELSE MOVE OSKA TO NF FLD PERFORM
     NSCAN IF EFLG=1 PERFORM POS-ERR ELSE PERFORM REMOVE-X-ALL.
DSK-CK.
     MOVE"INVALID TAPE OR DISK OUTPUT SPEC   CC 16 - 22"TO MESG.
     IF ATA="A" AND OSTK="A" AND OSPB="D"AND OSPA="D"PERFORM
     REMOVE-X-ALL ELSE IF(ATA="A"OR"T"OR"D")AND OSTK=" " AND
     OPSS=" "PERFORM REMOVE-X-ALL ELSE IF ATA="A"OR"T"OR" "
     PERFORM POS-ERR.
```

```
O-IND.
      MOVE"INVALID INDICATOR    CC 23 - 31"TO MESG.
      MOVE 23 TO BASE MOVE 26 TO LIMIT
      IF OUTIND NOT = " " MOVE OUTIND TO INDC PERFORM COMM-IND-
      SCAN ELSE MOVE 32 TO LIMIT PERFORM REMOVE-X-ALL.
      IF J NOT = 32 PERFORM POS-ERR.
      MOVE 32 TO BASE MOVE 75 TO LIMIT PERFORM REMOVE-X.
O-LAST.
      PERFORM END-SYNTAX.
OUTPUT-FIELD-SYNTAX.
      PERFORM BEGIN-SYNTAX.
      MOVE 7 TO BASE MOVE 23 TO LIMIT PERFORM REMOVE-X.
      IF OIX ="*" AND HINDX =" " MOVE"CC 25 CONTAINS AN * BUT PR
   "EVIOUS LINE IS BLANK" TO MESG PERFORM POS-ERR.
      MOVE OUTIND TO HINDX.
      MOVE"INVALID INDICATOR    CC 23 - 31"TO MESG.
      MOVE 23 TO BASE MOVE 26 TO LIMIT IF OUTIND NOT = " " MOVE
      OUTIND TO INDC PERFORM COMM-IND-SCAN ELSE MOVE 32 TO LIMIT
      PERFORM REMOVE-X-ALL.
      MOVE"INVALID FIELD NAME    CC 32 - 37"TO MESG.
      MOVE 32 TO BASE MOVE 38 TO LIMIT MOVE 32 TO J.
      IF OFDN = " " AND OCEW NOT = " " PERFORM REMOVE-X-ALL
      ELSE PERFORM FIELD-NAME-SCAN.
      MOVE"INVALID ENTRY ZERO SUPP   CC 38"TO MESG.
      IF OZSP=" "MOVE" "TO MASK (38)ELSE IF(OZSP NOT<"1"AND NOT
      >"4" OR(NOT<"A"AND NOT>"D")OR(NOT<"J"AND NOT>"M")OR
      (NOT<"X"AND NOT>"Z"))AND OCEW=" "
      MOVE" "TO MASK(38)ELSE PERFORM POS-ERR.
      MOVE"INVALID ENTRY BLANK AFTER    CC 39"TO MESG.
      MOVE 39 TO J IF OBAF = " " OR = "B" MOVE " " TO MASK(J)
      ELSE PERFORM POS-ERR.
      MOVE"INVALID ENDING POSITION    CC 40 - 43"TO MESG.
      MOVE 40 TO BASE MOVE 44 TO LIMIT MOVE 1 TO MIN MOVE
      HERL TO MAX MOVE OENP TO NFELD PERFORM SCANNUM.
      MOVE OENP TO WKH3.
      IF OCEW=" "MOVE ADL(KFFTAB)TO WKH4 IF OPAC="P"COMPUTE
      WKH4=(WKH4 +2)/2 ELSE NEXT SENTENCE ELSE
      IF CD-COL(45)="Z"PERFORM GET-LENG.
      IF WKH4 > WKH3 MOVE"ENDING POSITION LESS THAN OUTPUT FIELD
   " OR LITERAL LENGTH"TO MESG PERFORM POS-ERR.
      MOVE"INVALID ENTRY PACKED OUTPUT    CC 44"TO MESG.
      IF OPAC=" "MOVE" "TO MASK(44)ELSE IF OPAC="P"AND AA
      (KFFTAB)NOT="A"MOVE" "TO MASK(44)ELSE PERFORM POS-ERR.
      MOVE"INVALID EDIT OF PACKED OR ALPHAMERIC FIELD"TO MESG.
      IF OFDN NOT=" "AND OCEW NOT=" "AND(OPAC="P"OR AA(KFFTAB)
      ="A")PERFORM POS-ERR.
      MOVE"INVALID CONSTANT OR EDIT WORD    CC 45 - 70"TO MESG.
      MOVE 45 TO BASE MOVE 71 TO LIMIT
      IF OCEW = " " PERFORM REMOVE-X-ALL ELSE PERFORM CON-EDIT-
      SCAN.
      MOVE 71 TO BASE MOVE 75 TO LIMIT PERFORM REMOVE-X-ALL.
      PERFORM END-SYNTAX.
GET-LENG.
      MOVE 24 TO WKH4 MOVE 70 TO LIMIT.
      PERFORM LENGTH-O VARYING J FROM LIMIT BY -1 UNTIL CD-COL
      (J) ="Z".
LENGTH-O.
      SUBTRACT 1 FROM WKH4.
PHASE-TWO SECTION 67.
PHASE-TWO-START.
```

```
        MOVE 999 TO KEFTAB GO TO OUTPUT-FIRST.
PHASE-TWO-REST.
    CLOSE RPGSRC.
    IF TRSW=1 PERFORM TAB-COMP-ENTER THRU TAB-DONE.
    OPEN OUTPUT RPGTAB
    MOVE " " TO EMES.
    PERFORM TAB-OUT VARYING J FROM 1 BY 1 UNTIL NAMEFF(J)
    = SPACES.
    PERFORM TAB-OUT-I VARYING JI FROM 1 BY 1 UNTIL NAMEIN(JI)
    = SPACES.
    CLOSE RPGTAB.
    IF CTLSW NOT = " " AND BOSW NOT = "M" GO TO EOR-EOJ.
    OPEN INPUT RPGTAB.
    IF(BOSW="M"OR CTLSW=" ")AND SW5=2 MOVE"TABLE ENTRIES"TO
    LIST-SRC.
    WRITE LIST-SRC AFTER 5 WRITE LIST-SRC FROM EMES BEFORE 2.
DO-TAB.
    READ RPGTAB AT END GO TO EOR-EOJ.
    MOVE EDEF TO TREF MOVE EREF TO TREF MOVE FFID TO TENT
    MOVE EMES TO TMES.
    IF(CTLSW NOT=" "OR SW5 NOT=2)AND EMES NOT =" "WRITE
    LIST-SRC.
    IF CTLSW=" "AND SW5=2 WRITE LIST-SRC.
    GO TO DO-TAB.
TAB-OUT-I.
    IF DEFI(JI)=4 MOVE 0 TO DEFI(JI).
    MOVE INTRY(JI)TO RPGTAB-REC.
    IF REFI(JI)=0 AND NAMEIN(JI)NOT="1P"AND"OF"AND"LO"
    AND"L1"AND"L2"AND"L3"AND"L4"AND"L5"
    AND"L6"AND"L7"AND"L8"AND"L9"
    MOVE "       UNREF" TO EMES.
    IF DEFI(JI) =  0   MOVE "SYNTAX UNDEF" TO EMES
    MOVE "M" TO BOSW.
    WRITE RPGTAB-REC MOVE" "TO EMES.
TAB-OUT.
    IF DEFF(J) =4 MOVE 0 TO DEFF(J).
    MOVE FFNTRY(J)TO RPGTAB-REC.
    IF REFF(J)=0 AND NAMEFF(J)NOT="PAGE"AND"PAGE1"AND"PAGE2"
    AND"UDATE"AND"UMONTH"AND"UDAY"AND"UYEAR"
    MOVE "       UNREF" TO EMES.
    IF DEFF(J) =   0  MOVE "SYNTAX UNDEF" TO EMES
    MOVE "M" TO BOSW.
    WRITE RPGTAB-REC MOVE" "TO EMES.
TAB-COMP-ENTER.
    OPEN INPUT RPGSRC MOVE"T"TO LINE-ONE WRITE RPGINT-REC
    FROM LINE-ONE.
TAB-READ-IN.
    READ RPGSRC AT END GO TO TAB-DONE.
    MOVE CCCC TO LINE-ONE WRITE RPGINT-REC FROM LINE-ONE
    GO TO TAB-READ-IN.
TAB-DONE.
EOR-EOJ.
    MOVE      "EX RPGFTR VALUE 1 = 000000 FILE RPGINT=         FIL
    "E RPGTAB=        ."TO EX-STP.
    MOVE INT-F-NAME TO ZIP-INT MOVE TAB-F-NAME TO ZIP-TAB.
    MOVE SW3 TO HSW3.
    MOVE SW5 TO HSW5 MOVE SW6 TO HSW6 MOVE SW4 TO HSW4.
    IF BOSW="M"AND SW6=1 CLOSE RPGTAB WITH RELEASE CLOSE
    RPGINT WITH RELEASE ZIP EX-STP ELSE IF BOSW=" "AND
```

```
(SW6 = 0 OR 1 ) CLOSE RPGTAB WITH RELEASE CLOSE RPGINT
WITH RELEASE ZIP EX-STP.
IF BOSW ="H" MOVE"SYNTAX ERRORS NO CODE GENERATED" TO
LIST-SRC WRITE LIST-SRC AFTER 5 DISPLAY"SYNTAX ERRORS"UPON
SPO IF SW6=1 MOVE"** FORCE ZIP TO CODE GENERATOR **"TO
LIST-SRC WRITE LIST-SRC AFTER 1 STOP RUN ELSE STOP RUN.
IF WNSW ="W" MOVE"END OF DIAGNOSTICS-REVIEW WARNINGS"TO
LIST-SRC WRITE LIST-SRC AFTER 5 STOP RUN.
MOVE"END OF DIAGNOSTICS NO ERRORS" TO  LIST-SRC.
WRITE LIST-SRC AFTER 5.
STOP RUN.
END-OF-JOB.
```

APPENDIX B: DATA DECLARATIONS FOR PASSES 1-3

```
IDENTIFICATION DIVISION.

PROGRAM-ID.  RPGFTR.

ENVIRONMENT DIVISION.

INPUT-OUTPUT SECTION.

FILE-CONTROL.

SELECT RPGINT ASSIGN TO DISK.

SELECT RPGTAB ASSIGN TO DISK.

SELECT SWBP  ASSIGN TO PRINTER.

SELECT SWBH ASSIGN TO DISK.

SELECT SWBT ASSIGN TO TAPE.

I-O-CONTROL.

SAME SWBH SWBT.

DATA DIVISION.

FILE SECTION.

FD RPGTAB

FILE CONTAINS 10 BY 100 RECORDS.

01 RPGTAB-REC.

03 DEFF PC 9 CMP.

03 REFF PC 9 CMP.

03 NAYME.

05 NM1.

07 NMO PC X.
```

```
    07  HALT-NO PC 9.

07  FILLER PC X.

05  NM2 PC XXX.

03 FILLER PC X.

03 LENG PC 9999.

03 DESPOS PC X.

03 TABZBI PC 99.

03 FILLER PC X(15).
01 RPGTAB-REC1.

03 FILLER PC X(7).

03 IOUC PC X.

03 ADDISION PC X.

03 FILLER PC XX.

03 DEVISE PC X.

03 FILLER PC X.

03 RL PC 9999.

03 FILLER PC X(13).

FD RPGINT

FILE CONTAINS 20 BY 300 RECORDS.

01 RPGINT-REC.

03 FILLER PC XX.

03 STMT-NO PC 9999.

03 FILLER PC X(8).

03 FORM-TYPE PC X.

03 FROM-LINE.

05 COMMENT-IF-ASTERISK PC X.

05 H-OBJECT-MACHINE PC 99.

05 FILLER PC XX.

05 H-CORESIZE PC 999.

05 H-IRIGHT PC X.

05 H-ORIGHT PC X.
```

```
        05 FILLER PC X(52).

05 H-SOLDNAME PC X(6).

03 H-PROGNAME PC XXXXXX.

03 FILLER PC X(11).

01 O-LINE.

03 FILLER PC X(15).

03 O-FILENAME PC XXXXXX.
    03 FILLER PC XX.

03 O-TYPE PIC X.

03 O-STACK PC X.

03 O-SPACE-SKIP.

05 O-SPACER PC X.

05 O-SPACEA PC X.

05 O-SKIPB PC XX.

05 O-SKIPA PC XX.

03 O-INDICATORS.

05 O-INDICATOR OC 3 TIMES.

07 O-NOT PC X.

07 O-INDIC PC XX.

03 O-FLDNAME PIC X(6).

03 O-ZSUP.

05 O-EDCODE-ZONE PC 9 CMP.

05 O-EDCODE-DIGIT PC 9 CMP.

03 O-BLANKAFTER PC X.

03 O-ENDPOS PIC 9999.

03 O-PACKED PC X.

03 O-CNST.

05 O-CHAR PC X OC 26 TIMES.

01 F-LINE.

03 FILLER PC X(15).

03 F-FILENAME PC X(6).
```

```
        03 FILLER PC XX.

03 F-ID PC X.

03 F-DESIGNATION PC X.

03 F-ENDOFFILE PC X.

03 F-AD PC X.

03 FILLER PC X.
        03 F-BL PC 9999.

03 F-RL PC 9999.

03 F-LP PC X.

03 F-KEY-LENGTH PC 99.

03 F-RATYPE PC X.

03 F-ORG PC X.

03 F-OVERFLOW.

05 FILLER PC X.

05 F-OVERFLOW-SECONDCHAR PC X.

03 F-KEY-START PC 9999.

03 FILLER PC X.

03 F-DEVICE.

05 FILLER PC XXX.

05 F-DEVISE PC X.

05 FILLER PC XXX.

03 FILLER PC X(13).

03 F-DATAKEYS PC 999999.

03 F-ADDITION PC X.

03 FILLER PC XXX.

03 F-CLOSECODE PC X.

01 C-LINE.

03 FILLER PC X(15).

03 C-CONTROLLERS.

05 C-CTLLEVEL PC XX.

05 C-INDICATORS.
```

```
            07 C-INDICATOR OC 3 TIMES.

09 C-NOT PC X.

09 C-INDIC PC XX.

03 C-FAC1 PC X(10).

03 C-OP.
            05 C-OP-FIRSTCHAR PC X.

05 ZONE-PICKER PC X OC 2 TIMES.

05 C-OP-LAST2 PC XX.

03 C-FAC2.

05 C-FAC2-FIRSTCHAR PC X.

05 FILLER PC X(9).

03 C-RESULT PC X(6).

03 C-FIELDLEN PC 999.

03 C-DECPOS PC 9.

03 C-HALF PC X.

03 C-RESINDS.

05 C-RESIND PC XX OC 3 TIMES.

03 C-COMMENTS PC X(15).

01 I-LINE.

03 FILLER PC X(15).

03 I-FILENAME PC X(6).

03 FILLER PC XX.

03 I-FORGOTTEN.

05 I-SEQNO PIC XX.

05 FILLER PC X.

05 I-OPTIONAL PC X.

05 I-RESIND PC XY.

03 RECID-CODES.

05 RECID-CODE OC 3 TIMES.

07 POSN PC 9999.

07 KNOT PC X.
```

```
            07 C7D PC X.
            07 ICHAF PC X.
        03 FILLER PC X.
        03 I-PACKED PC X.
        03 I-FROM PIC 9999.
        03 I-TO PIC 9999.
        03 I-DECPOS PIC 9.
        03 I-FLDNAME PIC X(6).
        03 I-CTLLEVLL.
          05 FILLER PIC X.
          05 I-LEVNO PIC 9.
        03 I-MATCHCHAIN.
          05 I-MC PC X.
          05 I-MCNO PC 9.
        03 I-RELATION PC XX.
        03 I-FIELD-RESINDS.
          05 I-PLUS PC XX.
          05 I-MINUS PC XX.
          05 I-ZEROBLANK PC XX.
01 E-LINE.
        03 FILLER PC X(17).
        03 E-CHAINFIELD.
          05 FILLER PC X.
          05 E-CHAINLEVNO PC 9.
        03 E-FROMFILE PC X(6).
        03 FILLER PC XX.
        03 E-TOFILE PC X(6).
        03 FILLER PC XX.
        03 E-TABNAME1 PC XXXXXX.
        03 E-NENTRIES-REC PC 999.
```

```
            03 E-NENTRIES-TAB PC 9999.

03 E-LEN1 PC 999.

03 E-PACKED1 PC X.

03 E-DECPOS1 PC 9.

03 E-SEQUENCE1 PC X.

03 E-TABNAME2 PC X(6).

03 E-LEN2 PC 999.

03 E-PACKED2 PC X.

03 E-DECPOS2 PC 9.

03 E-SEQUENCE2 PC X.

01 L-LINE.

03 FILLER PC X(15).

03 L-FILENAME PC X(6).

03 FILLER PC XX.

03 L-LINECOUNTS OC 12 TIMES.

05 L-LINENO PC 999.

05 L-CHANNELNO PC 99.

01 T-LINE.

03 T-FIRSTHALF PC X(40).

03 T-SECONDHALF PC X(40).

FD SWBP.

01 SWBP-REC PC X(132).

01 SWBP-REC1.

03 FILLER PIC X(40) VA SPACES.

03 SWBP-FIELD PIC X(80).

01 SWBP-REC2.

03 KOPNAME PC XXXXXX.

03 KOPLEN PC 9999.

03 KOPDEC PC X.

03 KOPZBI8 PC XX.
```

```
        03 KOP7BI4 PC 9999.

03 FILLER PC X(115).

FD SWBH

FILE CONTAINS 20 BY 1000 RECORDS
        BLOCK CONTAINS 5 RECORDS

VALUE OF ID IS SOLD-NAME

RECORD CONTAINS 80 CHARACTERS.

01 SWBH-REC.

03 SWBH-SEQNO PC 999999.

03 TO-SOURCE PC X(74).

01 TO-SPECIAL-FOR-TABLD.

03 FILLER PC X(17).

03 TO-TABLE-LIT PC X(40).

03 FILLER PC X(23).

01 TO-LINE VA SPACES.

03 TO-COL PIC X OCCURS 80 TIMES.

FD SWBT

BLOCK CONTAINS 5 RECORDS

VALUE OF ID IS SOLD-NAME.

01 SWBT-REC PC X(80).

01 COBOL-COMPILE.

03 FILLER PC X(6).

03 COMPILE-NAME PC XXXXXX.

03 FILLER PC X(6).

03 COMPILE-L PC X.

03 FILLER PC X(17).

03 COMPILE-N1 PC 9.

03 COMPILE-N2 PC 9.

03 FILLER PC XX.

03 COMPILE-N5 PC 9.
```

```
   03 FILLER PC X(10).

03 COMPILE-D PC X.

03 FILLER PC X.

03 COMPILE-SOLDNAME PC X(6).

03 FILLER PC X(19).

WORKING-STORAGE SECTION.
```

APPENDIX C: PROGRAM LISTING TO EFECT PASS NO. 1

```
PROCEDURE DIVISION.

PRELUDE SECTION 50.
P-BEGIN.

MOVE SPACES TO TO-LINE.

IF SW5=1 OPEN OUTPUT SWBP.

BEGIN-PASS.

OPEN INPUT RPGINT.

PERFORM READ-FROM.

SKIP-HEADER-CARD.

MOVE H-PROGNAME TO COBOL-PROG-NAME.

MOVE H-IRIGHT TO I-RIGHT.  MOVE H-ORIGHT TO O-RIGHT.

MOVE H-CORESIZE TO OBJECT-CORE.

IF H-OBJECT-MACHINE="02" OR " 2" OR "03" OR " 3"
    OR "05" OR " 5" OR "25" MOVE H-OBJECT-MACHINE
    TO OBJECT-MACHINE ELSE MOVE 35 TO OBJECT-MACHINE.

IF H-SOLDNAME NOT=SPACES MOVE H-SOLDNAME TO SOLD-NAME.

IF SW3=1 OPEN OUTPUT SWBT ELSE OPEN OUTPUT SWBH.

MOVE "IDENTIFICATION DIVISION." TO WURD PERFORM PTGA.

MOVE "PROGRAM-ID." TO WURD.  PERFORM PTGA.

MOVE " " TO WURD.  PERFORM GLUE.

MOVE COBOL-PROG-NAME TO WURD.  PERFORM GLUE.

PERFORM GLUE-DOT.

MOVE "DATE-COMPILED." TO WURD.  PERFORM PTGA.
```

```
MOVE "ENVIRONMENT DIVISION." TO WURD, PERFORM PTGA.
IF OBJECT-MACHINE>5 GO TO NO-CONFIG-SECTION.
MOVE "CONFIGURATION SECTION." TO WURD, PERFORM PTGA.
MOVE "SOURCE-COMPUTER." TO WURD, PERFORM PTGA.
IF OBJECT-MACHINE=2 MOVE "B200" TO SYMBOL
    ELSE IF OBJECT-MACHINE=3 MOVE "B300" TO SYMBOL
    ELSE MOVE "B500" TO SYMBOL.
MOVE SYMBOL TO WURD, PERFORM GLUE, PERFORM GLUE-DOT.
MOVE "OBJECT-COMPUTER." TO WURD, PERFORM PTGA.
MOVE SYMBOL TO WURD, PERFORM GLUE.
MOVE "ASSIGN OBJECT-PROGRAM TO DISK-FILE" TO WURD, PERFORM PTGC
MOVE "ASSIGN OBJECT-PROGRAM TO PRINTER" TO WURD, PERFORM PTGC.
PERFORM GLUE-DOT.
IF OBJECT-MACHINE>3 GO TO NO-CONFIG-SECTION.
MOVE "SPECIAL-NAMES." TO WURD, PERFORM PTGA.
PERFORM DECLARE-CHANNEL VARYING IDX FROM 1 BY 1 UNTIL IDX>11.
PERFORM GLUE-DOT.
GO TO NO-CONFIG-SECTION.
DECLARE-CHANNEL.
MOVE "CHANNEL(" TO WURD, PERFORM PTGC.
MOVE IDX TO WURD, PERFORM GLUE.
MOVE ") IS CHANNEL" TO WURD, PERFORM GLUE.
MOVE IDX TO J, MOVE J TO WURD, PERFORM GLUE-STRING.
NO-CONFIG-SECTION.
MOVE "INPUT-OUTPUT SECTION." TO WURD, PERFORM PTGA.
MOVE "FILE-CONTROL." TO WURD, PERFORM PTGA.
PERFORM READ-FROM.
START-ON-F-SPECS.
MOVE 0 TO NSOURCE, L1.
NEXT-FILE-ENTRY.
```

```
IF FORM-TYPE NOT="F" GO TO DONE-FILE-ENTRIES.
MOVE "SELECT " TO WURD, PERFORM PTGC.
IF F-IO="I" AND OBJECT-MACHINE>5
    MOVE "OPTIONAL" TO WURD, PERFORM GLUE.
ADD 1 TO L1. MOVE F-FILENAME TO COPNAME(L1).
MOVE F-FILENAME TO WURD, PERFORM GLUE-FN.
MOVE "ASSIGN TO" TO WURD, PERFORM GLUE.
IF OBJECT-MACHINE>5 GO TO USASI-DEVICES.
IF F-DEVISE="D" MOVE "CARD-READER" TO WURD
    ELSE IF F-DEVISE="N" MOVE "LINE-PRINTER" TO WURD
    ELSE IF F-DEVISE="C" MOVE "CARD-PUNCH" TO WURD
    ELSE IF F-DEVISE="E" MOVE "TAPE-UNIT" TO WURD
    ELSE MOVE "DISK-FILE" TO WURD.
GO TO GLUE-DEVICE.
USASI-DEVICES.
MOVE F-DEVISE TO DEVISE.
IF DEVISE="D" MOVE "READER" TO WURD
    ELSE IF DEVISE="N" MOVE "PRINTER" TO WURD
    ELSE IF DEVISE="C" MOVE "PUNCH" TO WURD
    ELSE IF DEVISE="E" MOVE "TAPE" TO WURD
    ELSE MOVE "DISK" TO WURD.
GLUE-DEVICE.
PERFORM GLUE.
IF DEVISE="D" AND F-ORG=" " MOVE "1" TO F-ORG.
IF F-ORG NOT<"1" AND NOT>"9"
    MOVE "RESERVE" TO WURD, PERFORM GLUE
    MOVE F-ORG TO WURD, PERFORM GLUE
    MOVE "ALTERNATE" TO WURD, PERFORM GLUE.
MOVE " " TO REL.
IF F-ORG="D" MOVE 00 TO PSEUDO-REL
```

```
    ELSE IF F-ORG="I"

IF F-IO="O" MOVE "R" TO REL ELSE

IF F-LR="R" MOVE 50 TO PSEUDO-REL

ELSE IF F-LR="L" MOVE 70 TO PSEUDO-REL..

IF F-IO="U" MOVE "R" TO REL.

IF F-ADDITION="A" MOVE "R" TO REL.

IF F-DESIGNATION="C" MOVE "C" TO REL.

IF REL NOT=" "

MOVE REL TO COPADD(L1)

IF OBJECT-MACHINE>5

MOVE "ACCESS RANDOM ACTUAL KE-" TO WURD PERFORM PTGC

MOVE L1 TO WURD, PERFORM GLUE-STRING.

PERFORM GLUE-DOT.

IF F-ADDITION="A" AND OBJECT-MACHINE>5

MOVE "SELECT" TO WURD, PERFORM PTGC

MOVE "SXO" TO SYMBOL, PERFORM GLUE-ASSOC-FN

MOVE "ASSIGN TO DISK." TO WURD, PERFORM GLUE.

ADD 1 TO NSOURCE, MOVE FROM-LINE TO SAVE-FSPEC(NSOURCE).

PERFORM READ-FROM.

GO TO NEXT-FILE-ENTRY.

GLUE-ASSOC-FN.

MOVE F-FILENAME TO WURD, PERFORM GET-COPX MOVE LL TO NUM-SYM456

MOVE SYMBOL TO WURD, PERFORM GLUE.

DONE-FILE-ENTRIES.

MOVE 1 TO KSOURCE, MOVE SAVE-FSPEC(1) TO SAVE-FSPECO.

OPEN INPUT RPGTAB.

MOVE "DATA DIVISION." TO WURD, PERFORM PTGA.

MOVE "FILE SECTION." TO WURD, PERFORM PTGA.

NEXT-FD-ENTRY.

IF KSOURCE>NSOURCE GO TO IMPFLD-DECLARATION.
```

```
READ RPGTAB.

IF G-AD="D" MOVE 1 TO DEFSENDING.

IF G-DEVISE="K" AND OBJECT-MACHINE NOT>5 MOVE "MD" TO WURD
    ELSE MOVE "FD" TO WURD.

PERFORM PTGA.

MOVE NAYME TO WURD.  PERFORM GLUE-FN.

MOVE G-ENDOFFILE TO COPEOF(LL).

MOVE RL TO COPLEN(L).  MOVE DEVISE TO COPDEC(L).

PERFORM GLUE-VALUE-ID-CLAUSE.

IF OBJECT-MACHINE NOT>5
    MOVE "LABEL RECORD OMITTED" TO WURD.  PERFORM PTGC.

PERFORM GLUE-BLOCK-CLAUSE.

IF G-DEVISE="K" AND OBJECT-MACHINE>5 MOVE
    "FILE CONTAINS 20 BY 2000 RECORDS" TO WURD PERFORM PTGC.

IF OBJECT-MACHINE>5 GO TO NOT-DUD-FD.

MOVE "DATA RECORD" TO WURD.  PERFORM PTGC.

IF G-FORMAT="V" MOVE "REC-" TO WURD.  PERFORM GLUE
    MOVE LL TO WURD.  PERFORM GLUE-STRING
    GO TO NOT-DUD-FD.

MOVE COPNAME(LL) TO WURD1.  PERFORM GLUE-CX.

IF G-KEY-START NOT=SPACES MOVE "YX-" TO WURD.  PERFORM GLUE
    MOVE LL TO WURD.  PERFORM GLUE-STRING.

IF COPADD(LL) NOT=" "
    MOVE "ACCESS RANDOM ACTUAL KE-" TO WURD.  PERFORM PTGC
    MOVE LL TO WURD.  PERFORM GLUE-STRING.

NOT-DUD-FD.

PERFORM GLUE-DOT.

IF G-FORMAT="V" MOVE "01 REC-" TO WURD  PERFORM PTGA
    MOVE NAYME TO WURD.  PERFORM GET-COPX
    MOVE LL TO WURD PERFORM GLUE-STRING.  PERFORM GLUE-DOT
```

```
            MOVE "03 RL-" TO WURD, PERFORM PTGC
            MOVE LL TO WURD, PERFORM GLUE-STRING
            MOVE "PC 9999." TO WURD PERFORM GLUE
            MOVE "V" TO COPDEC(L)
            MOVE "03" TO WURD PERFORM PTGC
        ELSE MOVE "01" TO WURD, PERFORM PTGA.
    IF G-IO="U" MOVE NAYME TO WURD PERFORM GET-COPX
            MOVE "U" TO COPDEC(L).
    MOVE NAYME TO WURD1, PERFORM GLUE-CX.
    IF G-DESIGNATION="R" AND G-ORG="T"
            MOVE "PC 9(8) CMP." TO WURD PERFORM GLUE
            GO TO DONE-FD.
    PERFORM GLUE-DOT.
    MOVE "05" TO WURD, PERFORM PTGC.
    MOVE NAYME TO WURD, PERFORM GLUE-DX.
    IF G-DESIGNATION="R" AND G-ORG NOT="T"
            MOVE "PC X(" TO WURD, PERFORM GLUE
            MOVE G-KEY-LENGTH TO N, MOVE N TO WURD, PERFORM GLUE-STRING
            MOVE ") OCCURS" TO WURD, PERFORM GLUE-STRING
            COMPUTE N=G-PL/G-KEY-LENGTH MOVE N TO WURD PERFORM GLUE
            MOVE "TIMES." TO WURD, PERFORM GLUE
            COMPUTE N=G-KEY-LENGTH
            MOVE "05 FILLER PC X(" TO WURD, PERFORM PTGC
            MOVE N TO WURD, PERFORM GLUE-STRING
            MOVE ")." TO WURD, PERFORM GLUE-STRING
            GO TO DONE-FD-MAIN-RECORD.
    MOVE "PC X OCCURS" TO WURD, PERFORM GLUE.
    IF RL<100 MOVE RL TO J MOVE J TO WURD
            ELSE MOVE PL TO WURD.
    PERFORM GLUE.
```

```
    MOVE "TIMES." TO WURD, PERFORM GLUE.
DONE-FD-MAIN-RECORD.
    IF G-KEY-START NOT=SPACES MOVE "01 YX-" TO WURD PERFORM PTGA
        MOVE LL TO WURD, PERFORM GLUE-STRING PERFORM GLUE-DOT
        MOVE 1 TO FORM-SUBTYPE PERFORM PUT-KEY-DECLARATION.
    IF G-ADDITION="A" AND OBJECT-MACHINE>5 PERFORM PUT-ASSOC-FD.
DONE-FD.
ADD 1 TO NFILES.
ADD 1 TO KSOURCE.  MOVE SAVE-FSPEC(KSOURCE) TO SAVE-FSPECO.
GO TO NEXT-FD-ENTRY.
GLUE-BLOCK-CLAUSE.
    IF G-BL NOT=G-RL AND G-FORMAT NOT="V"
        AND G-BL NOT=SPACES AND G-RL NOT=SPACES
        MOVE "BLOCK CONTAINS" TO WURD, PERFORM PTGC
        COMPUTE N=G-BL/G-RL, MOVE N TO WURD, PERFORM GLUE
        MOVE "RECORDS" TO WURD, PERFORM GLUE.
    IF G-FORMAT="V" MOVE "BLOCK 4 TO" TO WURD, PERFORM PTGC
        COMPUTE N=G-BL -4, MOVE N TO WURD, PERFORM GLUE
        MOVE "RECORD 4 TO" TO WURD, PERFORM GLUE
        MOVE G-RL TO WURD, PERFORM GLUE.
GLUE-VALUE-ID-CLAUSE.
MOVE "VALUE OF ID IS" TO WURD, PERFORM PTGC.
MOVE """" TO WURD, PERFORM GLUE.
MOVE NAYME TO WURD, PERFORM GLUE-STRING.
MOVE """" TO WURD, PERFORM GLUE-STRING.
GLUE-DX.
PERFORM GET-COPX.
MOVE "DX-" TO WURD, PERFORM GLUE.
MOVE LL TO WURD, PERFORM GLUE-STRING.
PUT-ASSOC-FD.
```

```
MOVE "SD SX0" TO WURD.

PERFORM PTGA.

MOVE NAYME TO WURD, PERFORM GET-COPX.

MOVE LL TO WURD, PERFORM GLUE-STRING.

MOVE "FILE CONTAINS 20 BY 2000 RECORDS" TO WURD, PERFORM PTGC.

PERFORM GLUE-BLOCK-CLAUSE. PERFORM GLUE-DOT.

MOVE "01 TX-" TO WURD.

MOVE 2 TO FORM-SUBTYPE.

PERFORM PTGA. MOVE LL TO WURD, PERFORM GLUE-STRING.
PERFORM GLUE-DOT. PERFORM PUT-KEY-DECLARATION.

PUT-KEY-DECLARATION.

COMPUTE N=G-KEY-START -1 IF N>0
    MOVE "03 FILLER PC X(" TO WURD, PERFORM PTGC
    MOVE N TO WURD PERFORM GLUE-STRING
    MOVE ")." TO WURD, PERFORM GLUE-STRING.

IF FORM-SUBTYPE=1 MOVE "03 KX-" TO WURD
    ELSE MOVE "03 KY-" TO WURD.

PERFORM PTGC, MOVE LL TO WURD, PERFORM GLUE-STRING.

MOVE "PC X(" TO WURD, PERFORM GLUE.

COMPUTE N=G-KEY-LENGTH. MOVE N TO WURD PERFORM GLUE-STRING.

MOVE ")." TO WURD, PERFORM GLUE-STRING.

COMPUTE N=RL -G-KEY-START -G-KEY-LENGTH+1  IF N>0
    MOVE "03 FILLER PC X(" TO WURD PERFORM PTGC MOVE N TO WURD
    PERFORM GLUE-STRING. MOVE ")." TO WURD PERFORM GLUE-STRING.

IMPFLD-DECLARATION SECTION 65.

ID-BEGIN.

MOVE "WORKING-STORAGE SECTION." TO WURD PERFORM PTGA.

E-IMPFLDS.

IF FORM-TYPE="L" GO TO L-IMPFLDS.

IF FORM-TYPE NOT="E" GO TO I-IMPFLDS.
```

```
IF E-TABNAME1=SPACES PERFORM READ-FROM GO TO E-IMPFLDS.
IF HAVE-TABLOAD=0 AND E-FROMFILE=SPACES
    MOVE 1 TO HAVE-TABLOAD
    MOVE "01 TAB-LD ." TO WURD, PERFORM PTGA
    MOVE "03 TAB-LL PC X(40)." TO WURD, PERFORM PTGC
    MOVE "03 TAB-DD PC X(40)." TO WURD, PERFORM PTGC.
MOVE "01 IR-" TO WURD, PERFORM PTGA.
MOVE STMT-NO TO WURD, PERFORM GLUE-STRING, PERFORM GLUE-DOT.
MOVE "02 TABENT OCCURS" TO WURD, PERFORM PTGC.
MOVE E-NENTRIES-REC TO WURD, PERFORM GLUE.
MOVE "TIMES." TO WURD, PERFORM GLUE.
MOVE "03" TO WURD, PERFORM PTGC.
PERFORM GLUE-IF-CX.
MOVE I-RIGHT TO SIME-RIGHT.
MOVE E-LEN1 TO LENG, MOVE E-PACKED1 TO PAKD,
    MOVE E-DECPOS1 TO DESPOS, PERFORM PTGC-IF.
IF E-TABNAME2=SPACES GO TO ONLY-ONE-E-IMPFLD.
MOVE "03 IG-" TO WURD, PERFORM PTGC.
MOVE STMT-NO TO WURD, PERFORM GLUE-STRING.
MOVE E-LEN2 TO LENG, MOVE E-PACKED2 TO PAKD,
    MOVE E-DECPOS2 TO DESPOS, PERFORM PTGC-IF.
ONLY-ONE-E-IMPFLD.
IF E-TOFILE=SPACES GO TO NO-OUTTAB-HERE.
MOVE "01 IS-" TO WURD, PERFORM PTGA.
MOVE STMT-NO TO WURD, PERFORM GLUE-STRING.
MOVE "REDEFINES IR-" TO WURD, PERFORM GLUE.
MOVE STMT-NO TO WURD, PERFORM GLUE-STRING PERFORM GLUE-DOT.
MOVE "02 TABENT OCCURS" TO WURD, PERFORM PTGC.
MOVE E-NENTRIES-REC TO WURD, PERFORM GLUE.
MOVE "TIMES." TO WURD, PERFORM GLUE.
```

```
MOVE "03 IT-" TO WORD,  PERFORM PTGC.
MOVE STMT-NO TO WORD.  PERFORM GLUE-STRING.
MOVE O-RIGHT TO SINE-RIGHT.
MOVE E-LEN1 TO LENG.  MOVE E-PACKED1 TO PAKO,
    MOVE E-DECPOS1 TO DESPOS,  PERFORM PTGC-IF.
IF E-TABNAME2=SPACES GO TO NO-OUTTAB-HERE.
MOVE "03 IU-" TO WORD,  PERFORM PTGC.
MOVE STMT-NO TO WORD.  PERFORM GLUE-STRING.
MOVE E-LEN2 TO LENG.  MOVE E-PACKED2 TO PAKO.
    MOVE E-DECPOS2 TO DESPOS,  PERFORM PTGC-IF.
NO-OUTTAB-HERE.
PERFORM READ-FROM  GO TO E-IMPFLDS.
L-IMPFLDS.
IF FORM-TYPE NOT="L" GO TO I-IMPFLDS.
MOVE 1 TO HAVE-LSPECS.
PERFORM READ-FROM  GO TO L-IMPFLDS.
I-IMPFLDS.
MOVE SPACES TO FILE-NAME.
MOVE SPACES TO LEVEL-MEM.
NEXT-I-IMPFLD.
IF FORM-TYPE NOT="I" PERFORM FINISH-IP  GO TO FILE-PASS1.
IF I-FILENAME NOT=SPACES AND FILE-NAME
    MOVE STMT-NO TO STMT
    PERFORM PTGA-IR-CX.  MOVE I-FILENAME TO FILE-NAME.
IF I-FROM=SPACES MOVE 0 TO HLDPOS,  COMPOS
    MOVE SPACES TO SAVE-CHAINLEV
    MOVE SPACES TO SAVE-CTLLEVEL,  SAVE-RELATION
    PERFORM READ-FROM  GO TO NEXT-I-IMPFLD.
IF I-CTLLEVEL NOT=SAVE-CTLLEVEL OR I-RELATION NOT=SAVE-RELATION
    MOVE 0 TO HLDPOS.
```

```
IF I-MATCHCHAIN NOT=SAVE-CHAINLEV OR I-RELATION NOT=
    SAVE-RELATION    MOVE 0 TO COMPOS.
IF I-CTLLEVEL NOT=SPACES AND HLDPOS NOT=0
    MOVE I-CTLLEVEL TO INDICNO, MOVE HLDPOS TO COMPER4
    PERFORM PUT-LEVEL-MEM.
IF I-MC="C" AND COMPOS NOT=0
    MOVE I-MATCHCHAIN TO INDICNO, MOVE COMPOS TO COMPER4
    PERFORM PUT-LEVEL-MEM.
IF I-CTLLEVEL NOT=SPACES  IF I-PACKED="P"
    COMPUTE HLDPOS=HLDPOS+2*(I-TO -I-FROM)+1
    ELSE COMPUTE HLDPOS=HLDPOS+I-TO -I-FROM+1.
IF I-MC="C" IF I-PACKED="P"
    COMPUTE COMPOS=COMPOS+2*(I-TO -I-FROM)+1
    ELSE COMPUTE COMPOS=COMPOS+I-TO -I-FROM+1.
MOVE I-CTLLEVEL TO SAVE-CTLLEVEL, MOVE I-RELATION
    TO SAVE-RELATION.
MOVE I-MATCHCHAIN TO SAVE-CHAINLEV.
COMPUTE NFIL=I-FROM -HOLDPOS -1.
MOVE I-PACKED TO PAKD.
MOVE I-RIGHT TO SIVE-RIGHT.
COMPUTE LENG=I-TO -I-FROM +1. MOVE I-DECPOS TO DESPOS
    PERFORM PTGC-IF.
MOVE I-TO TO HOLDPOS.
PERFORM READ-FROM, GO TO NEXT-I-IMPFLD.
PUT-LEVEL-MEM.
PERFORM DUMMY VARYING I FROM 1 BY 1 UNTIL LEVEL-NAME(I)=SPACES
    OR LEVEL-NAME(I)=INDICNO AND LEVEL-POS(I)=COMPER4.
IF I>MN-SPLITLEVEL GO TO TOO-BIG.
IF LEVEL-NAME(I)=SPACES MOVE INDICNO TO LEVEL-NAME(I)
    MOVE COMPER4 TO LEVEL-POS(I).
```

```
PTGA-IR-CX.

IF FILE-NAME NOT=SPACES PERFORM FINISH-IR.

MOVE 0 TO HOLDPOS.

MOVE "01 IR-" TO WURD, PERFORM PTGA.

MOVE STMT TO WURD, PERFORM GLUE-STRING.

PERFORM GLUE-DOT.

PTGC-FILLER.

IF NFIL<0 ADD HOLDPOS TO NFIL PERFORM PTGA-IR.

IF NFIL>0 MOVE SYMOP TO WURD, PERFORM PTGC
     MOVE "FILLER PC X(" TO WURD, PERFORM GLUE
     MOVE NFIL TO N, MOVE N TO WURD, PERFORM GLUE-STRING
     MOVE ")." TO WURD, PERFORM GLUE-STRING.

FINISH-IR.

MOVE FILE-NAME TO WURD, PERFORM GET-COPX.

COMPUTE N=COPLEN(L) -HOLDPOS, IF N>0
     MOVE "03 FILLER PC X(" TO WURD, PERFORM PTGC
     MOVE N TO WURD, PERFORM GLUE-STRING
     MOVE ")." TO WURD, PERFORM GLUE-STRING.

PTGA-IR.

PERFORM FINISH-IR.

MOVE "01 IR-" TO WURD, PERFORM PTGA.

MOVE STMT-NO TO COMPER4, MOVE COMPER4 TO WURD,
     PERFORM GLUE-STRING.

MOVE "REDEFINES IR-" TO WURD, PERFORM GLUE.

MOVE STMT TO WURD, PERFORM GLUE-STRING.

MOVE STMT-NO TO STMT.

PERFORM GLUE-DOT.

MOVE 0 TO HOLDPOS.

PTGC-IF-START.

PERFORM PTGC-IF-BEGIN.
```

```
MOVE "PC" TO WURD,  PERFORM GLUE.
MOVE " " TO WURD,  PERFORM GLUE.
PTGC-IF-BEGIN.
IF FORM-TYPE NOT="E"
    MOVE "03" TO SYNOP.  PERFORM PTGC-FILLER
    MOVE "03 IF-" TO WURD.  PERFORM PTGC
    MOVE STMT-NO TO WURD,  PERFORM GLUE-STRING.
PTGC-IF SECTION 65.
PIP-BEGIN.
IF PAKD NOT="P" GO TO NOT-PAKD.
PERFORM PTGC-IF-BEGIN,  PERFORM GLUE-DOT.
IF SINE-RIGHT NOT="R" PERFORM PUT-PAKD-SINE
    PERFORM PUT-PAKD-BODY   GO TO PIP-DONE.
PUT-PAKD-BODY.
MOVE "05 BODY PC " TO WURD.  PERFORM PTGC.
MOVE " " TO WURD.  PERFORM GLUE.
IF FORM-TYPE NOT="E" COMPUTE LENG=2*LENG -1.
PERFORM PUT-IMPFLD-NUM-PICTURE.
MOVE "CMP." TO WURD,  PERFORM GLUE.
IF FORM-TYPE NOT="E" COMPUTE LENG=(LENG+1)/2.
PUT-PAKD-SINE.
MOVE "05 SINE PC 9 CMP." TO WURD,  PERFORM PTGC.
DONE-PAKD-SINE.
GO TO PIP-DONE.
NOT-PAKD.
PERFORM PTGC-IF-START.
IF DESPOS=" " MOVE "X(" TO WURD,  PERFORM GLUE
    MOVE LENG TO WURD,  PERFORM GLUE-STRING
    MOVE ")" TO WURD PERFORM GLUE-STRING GO TO PIP-EXIT.
IF SINE-RIGHT="R" AND OBJECT-MACHINE>5 MOVE "J" TO WURD
```

```
        ELSE MOVE "S" TO WURD.
PERFORM GLUE.
PUT-IMPFLD-NUM-PICTURE.
MOVE DESPOS TO SYM6.  COMPUTE N=LENG - NUM-SYM6.
IF N NOT=0 MOVE "9(" TO WURD,  PERFORM GLUE-STRING
    MOVE N TO WURD,  PERFORM GLUE-STRING
    MOVE ")" TO WURD,  PERFORM GLUE-STRING.
IF NUM-SYM6 NOT=0 MOVE "V9(" TO WURD,  PERFORM GLUE-STRING
    MOVE DESPOS TO WURD,  PERFORM GLUE-STRING
    MOVE ")" TO WURD.  PERFORM GLUE-STRING.
DONE-IMPFLD-NUM-PICTURE.
PIP-EXIT.
PERFORM GLUE-DOT.
PIP-DONE.
FILE-PASS1 SECTION 59.
FP1-BEGIN.
READ RPGTAB.
MOVE SPACES TO MATCH-HOLD-MEM,  MOVE 0 TO NSAVE.
NEXT-FIELD-ENTRY.
IF DFFF=9 GO TO DONE-FIELD-ENTRIES.
IF DFFF=6 MOVE 1 TO HAVE-MATCH
    MOVE NAYME TO SYMBOL
    MOVE LENG TO MEM-LEN(NUM-SYM6),  ADD LENG TO NSAVE
    MOVE DESPOS TO MEM-DECPOS(NUM-SYM6),  MOVE DESPOS TO RFL
    GO TO DONE-THISFIELD.
IF DFFF NOT=7 GO TO NOT-TABLE.
    MOVE "01" TO SYMOP,  PERFORM DECLARE-FIELD
    MOVE "01 LX-" TO WURD,  PERFORM PTGA
    MOVE L1 TO WURD,  PERFORM GLUE-STRING
    PERFORM PUT-VA,  PERFORM GLUE-DOT
```

```
        MOVE "03 EX-" TO WURD,  PERFORM PTGA

MOVE L1 TO WURD,  PERFORM GLUE-STRING PERFORM PUT-FIELD-PICT

RE  MOVE "OCCURS" TO WURD,  PERFORM GLUE

IF RL <100 MOVE RL TO J MOVE J TO WURD

ELSE MOVE RL TO WURD.

PERFORM GLUE.

MOVE RL TO COMPER4.

IF L1>MN-COP-EXTENSIONS GO TO TOO-BIG.

MOVE COMPER8 TO COPZBI(L1)

MOVE "TIMES." TO WURD,  PERFORM GLUE

MOVE "01 PX-" TO WURD,  PERFORM PTGA

MOVE L1 TO WURD,  PERFORM GLUE-STRING

IF OBJECT-MACHINE>5 MOVE "PC 9999" TO WURD ELSE MOVE "PC 99"

TO WURD.

PERFORM GLUE.

MOVE "VA 0." TO WURD,  PERFORM GLUE.

GO TO DONE-THISFIELD.

NOT-TABLE.

IF DEFF=2 PERFORM PUT-COPX  GO TO DONE-THISFIELD.

IF NAYME="PAGE" OR "PAGE1" OR "PAGE2"

IF REFF=0 GO TO DONE-THISFIELD.

IF NAYME NOT="UDATE" AND "UMONTH" AND "UDAY" AND "UYEAR"

GO TO NOT-UDATE.

IF HAVE-UDATE=1 OR REFF=0 GO TO DONE-THISFIELD.

MOVE 1 TO HAVE-UDATE.

MOVE "01" TO WURD,  PERFORM PTGA.

MOVE "UDATE" TO NAYME,  MOVE 6 TO LENG.

PERFORM PUT-COPX.

MOVE "UDATE" TO WURD1,  PERFORM GLUE-CX.

MOVE "PC 9(6) CMP." TO WURD.  PERFORM GLUE.
```

```
MOVE "01 UDATE-REDEFFED REDEFINES" TO WURD, PERFORM PTGA.
MOVE "UDATE" TO WURD1, PERFORM GLUE-CX, PERFORM GLUE-DOT.
MOVE "03" TO WURD, PERFORM PTGC.
MOVE "UMONTH" TO NAYME, MOVE 2 TO LENG.
PERFORM PUT-COPX.
MOVE "UMONTH" TO WURD1, PERFORM GLUE-CX.
MOVE "PC 99 CMP." TO WURD, PERFORM GLUE.
MOVE "03" TO WURD, PERFORM PTGC.
MOVE "UDAY" TO NAYME. PERFORM PUT-COPX.
MOVE "UDAY" TO WURD1. PERFORM GLUE-CX.
MOVE "PC 99 CMP." TO WURD, PERFORM GLUE.
MOVE "03" TO WURD, PERFORM PTGC.
MOVE "UYEAR" TO NAYME, PERFORM PUT-COPX.
MOVE "UYEAR" TO WURD1, PERFORM GLUE-CX.
MOVE "PC 99 CMP." TO WURD, PERFORM GLUE.
GO TO DONE-THISFIELD.
NOT-UDATE.
MOVE "01" TO SYMOP.
PERFORM DECLARE-FIELD.
IF DEFF=5 MOVE 1 TO HAVE-CTL
    MOVE "COM" TO NM1 PERFORM DECLARE-FIELD.
IF DEFF=8 MOVE 1 TO HAVE-CHAIN.
DONE-THISFIELD.
READ RPGTAB GO TO NEXT-FIELD-ENTRY.
DECLARE-CX.
MOVE NAYME TO WURD. PERFORM PUT-COPX.
MOVE SYMOP TO WURD, PERFORM PTGA.
MOVE NAYME TO WURD1, PERFORM GLUE-CX.
PERFORM PUT-FIELD-PICTURE.
DECLARE-FIELD.
```

PERFORM DECLARE-CX, PERFORM PUT-VA, PERFORM GLUE-DOT.

PERFORM PUT-NOTE.

IF DEFF=5 OR 8 MOVE NAYME TO SYMBOL PERFORM PUT-HOLD-OFFSETS

VARYING I FROM 1 BY 1 UNTIL LEVEL-NAME(I)=SPACES

MOVE "01" TO WURD, PERFORM PTGA

MOVE SYMBOL TO WURD1, PERFORM GLUE-CX

MOVE "-R0000 REDEFINES" TO WURD, PERFORM GLUE-STRING

MOVE SYMBOL TO WURD1, PERFORM GLUE-CX, PERFORM GLUE-DOT

MOVE "03" TO WURD, PERFORM PTGC
    MOVE SYMBOL TO WURD1, PERFORM GLUE-CX

MOVE "-0000 PC X(" TO WURD, PERFORM GLUE-STRING

MOVE LENG TO WURD, PERFORM GLUE-STRING

MOVE ")." TO WURD, PERFORM GLUE-STRING.

PUT-HOLD-OFFSETS.

IF LEVEL-NAME(I)=SYM56 PERFORM PUT-HOLD-OFFSET.

PUT-HOLD-OFFSET.

MOVE "01" TO WURD, PERFORM PTGA.

MOVE SYMBOL TO WURD1, PERFORM GLUE-CX.

MOVE "-R" TO WURD, PERFORM GLUE-STRING.

MOVE LEVEL-POS(I) TO WURD, PERFORM GLUE-STRING.

MOVE "REDEFINES" TO WURD, PERFORM GLUE.

MOVE SYMBOL TO WURD1, PERFORM GLUE-CX, PERFORM GLUE-DOT.

MOVE "03 FILLER PC X(" TO WURD, PERFORM PTGC.

MOVE LEVEL-POS(I) TO WURD, PERFORM GLUE-STRING.

MOVE ")." TO WURD, PERFORM GLUE-STRING.

MOVE "03" TO WURD, PERFORM PTGC.

MOVE SYMBOL TO WURD1, PERFORM GLUE-CX.

MOVE "-" TO WURD, PERFORM GLUE-STRING.

MOVE LEVEL-POS(I) TO WURD, PERFORM GLUE-STRING.

MOVE "PC X(" TO WURD, PERFORM GLUE.

```
COMPUTE N=LENG -LEVEL-POS(I), MOVE N TO WURD PERFORM GLUE-STRING.
MOVE ")." TO WURD, PERFORM GLUE-STRING.
PUT-NOTE.
MOVE 59 TO NTC, MOVE "NOTE" TO WURD, PERFORM GLUE.
MOVE NAYME TO WURD, PERFORM GLUE, PERFORM GLUE-DOT.
PUT-VA.
IF DESPOS="A" MOVE "VA "" """ TO WURD ELSE MOVE "VA 0" TO WURD.
PERFORM GLUE.
PUT-MATCHHOLD.
IF MEM-DECPOS(IDX) NOT=SPACES
    MOVE "HLD-M" TO SYMBOL, MOVE IDX TO NUM-SYM6
    MOVE SYMBOL TO NAYME, MOVE MEM-DECPOS(IDX) TO DESPOS
    MOVE "03" TO SYMOP
    MOVE MEM-LEN(IDX) TO LENG, PERFORM DECLARE-FIELD.
DONE-FIELD-ENTRIES.
IF HAVE-MATCH=0 GO TO DO-ALWAYS-ENTRIES.
MOVE RPGTAB-REC TO LEVEL-MEM.
MOVE "01" TO WURD, PERFORM PTCA.
MOVE "HLD-MM" TO WURD, PERFORM PUT-COPX.
MOVE "HLD-MM" TO WURD1, PERFORM GLUE-CX, PERFORM GLUE-DOT.
MOVE "HLD-MM" TO NAYME, PERFORM PUT-NOTE.
PERFORM PUT-MATCHHOLD VARYING IDX FROM 9 BY -1 UNTIL IDX=0.
MOVE "01" TO SYMOP.
MOVE "COM-MM" TO NAYME.
MOVE NSAVE TO LENG, MOVE REL TO DESPOS.
PERFORM DECLARE-CX.
IF DESENDING=1 MOVE "VA HIGH-VALUE." TO WURD
    ELSE MOVE "VA LOW-VALUE." TO WURD.
PERFORM GLUE, PERFORM PUT-NOTE.
MOVE "COM-SV" TO NAYME, PERFORM DECLARE-CX.
```

```
IF DEESENDING=1 MOVE "VA LOW-VALUE." TO WURD
    ELSE MOVE "VA HIGH-VALUE." TO WURD.

PERFORM GLUE, PERFORM PUT-NOTE.

MOVE "FIL-SV" TO NAYME, MOVE 2 TO LENG.

MOVE "N" TO DESPOS, PERFORM DECLARE-FIELD.

MOVE "SW1-MR" TO NAYME, MOVE 1 TO LENG, PERFORM DECLARE-FIELD.

MOVE "SW2-MR" TO NAYME, PERFORM DECLARE-FIELD.

MOVE "SW3-MR" TO NAYME, PERFORM DECLARE-FIELD.

MOVE LEVEL-MEM TO RPGTAB-REC.
DO-ALWAYS-ENTRIES.

MOVE "01 RPG-INDICATORS." TO WURD, PERFORM PTGA.

NEXT-IND-ENTRY.

IF REFF=0 AND (NAYME="1P" OR "OF") GO TO DONE-THISIND.

IF NAYME NOT<"L1" AND NOT>"L9"
    IF MAX-LEVNO=0
    IF REFF=0 GO TO DONE-THISIND
    ELSE MOVE HALT-NO TO MAX-LEVNO.

IF NMO="H" COMPUTE I=HALT-NO+1
    MOVE 1 TO HAVE-H(I) PERFORM PUT-OFFIND.

IF NMO="O" MOVE 1 TO HAVE-OF .

IF NAYME="1P" PERFORM PUT-OFFIND.

MOVE NAYME TO SYM56.

IF SYM5="L" PERFORM PUT-OFFIND.

MOVE "IND-" TO SYMBOL, MOVE NAYME TO SYM56.

MOVE SYMBOL TO NAYME, MOVE 1 TO LENG, MOVE "N" TO DESPOS.

MOVE "03" TO WURD, PERFORM PTGC.

MOVE SYM56 TO INDICNO, PERFORM GLUE-INDIC-CX.

MOVE "PG 9 CMP" TO WURD, PERFORM GLUE.

MOVE NAYME TO WURD, PERFORM GET-ZRI.

IF LL NOT=0 AND (NAYME<"IND-H0" OR >"IND-H9")
```

```
    OR NAYME="IND-LO" OR "IND-1F"
        MOVE "VA 1." TO WURD ELSE MOVE "VA 0." TO WURD.
PERFORM GLUE.
PERFORM PUT-NOTE.
DONE-THISIND.
READ RPGTAB AT END GO TO DONE-IND-ENTRIES.
GO TO NEXT-IND-ENTRY.
PUT-OFFIND.
ADD 1 TO NOI, MOVE NAYME TO OFFED-INDIC(NOI).
IF NOI>MN-OFF-INDICS GO TO TOO-BIG.
GET-ZBI.
MOVE WURD TO SYMBOL.
PERFORM DUMMY VARYING IDX FROM 1 BY 1 UNTIL IDX>NZBI
        OR ZBI-NAME(IDX)=SYM56.
IF IDX>NZBI MOVE 0 TO LL
        ELSE MOVE 1 TO LL.
DONE-IND-ENTRIES.
MOVE "N" TO DESPOS.
MOVE 1 TO LENG.
MOVE "OUT-SW" TO NAYME,   PERFORM DECLARE-FIELD.
MOVE "ALL-RY" TO NAYME,   PERFORM DECLARE-FIELD.
MOVE 3 TO LENG.
MOVE "SPC-SK" TO NAYME,   PERFORM DECLARE-FIELD.
MOVE 2 TO LENG.
MOVE "FIL-NO" TO NAYME,   PERFORM DECLARE-FIELD.
MOVE 4 TO LENG.
MOVE "PAR-AM" TO NAYME,   PERFORM DECLARE-FIELD.
MOVE "01 PIKTURE PC X." TO WURD,  PERFORM PTGA.
MOVE "01 REC-NOS VA 0." TO WURD,  PERFORM PTGA.
MOVE "03" TO WURD,  PERFORM PTGC.
```

```
MOVE "REC-NO" TO WURD, PERFORM PUT-COPX.

MOVE "REC-NO" TO WURD1, PERFORM GLUE-CX.

MOVE "PC 99 OCCURS" TO WURD, PERFORM GLUE.

MOVE NFILES TO WURD, PERFORM GLUE.

MOVE "TIMES." TO WURD, PERFORM GLUE.

GO TO REST-IMPFLD-DECLARATIONS.

PUT-COPX SECTION 59.

PCX-BEGIN.

IF CHAR(4)="-" AND DEFF NOT=1 AND 2 GO TO PCX-EXIT.
ADD 1 TO L1.

MOVE NAYME TO COPNAME(L1).

MOVE LENG TO COPLEN(L1).

MOVE DESPOS TO COPDEC(L1).

IF TABZBI NOT=SPACES AND DEFF NOT=7
      ADD 1 TO NZBI
      IF NZBI>MN-ZBI GO TO TOO-BIG ELSE
      MOVE L1 TO ZBFLD-IX(NZBI)
      MOVE TABZBI TO ZBI-NAME(NZBI).

ADD 1 TO L1, MOVE SPACES TO COPNAME(L1), SUBTRACT 1 FROM L1.

PCX-EXIT.

EXIT.

PUT-FIELD-PICTURE SECTION 59.

PFP-BEGIN.

MOVE "PC" TO WURD, PERFORM GLUE.

IF DESPOS="A" OR "N" GO TO NOT-COMP-FIELD.

MOVE "S" TO WURD, PERFORM GLUE.

MOVE DESPOS TO NUM-SYM1, COMPUTE WIDTH=LENG - NUM-SYM1.

IF WIDTH>0 MOVE "9(" TO WURD, PERFORM GLUE-STRING
      MOVE WIDTH TO WURD, PERFORM GLUE-STRING
      MOVE ")" TO WURD, PERFORM GLUE-STRING.
```

```
    IF DESPOS>0  MOVE "V9(" TO WURD, . PERFORM GLUE-STRING

MOVE DESPOS TO WURD, PERFORM GLUE-STRING

MOVE ")" TO WURD. PERFORM GLUE-STRING.

MOVE "CMP" TO WURD, PERFORM GLUE.

GO TO PFP-EXIT.

NOT-COMP-FIELD.

IF DESPOS="A" MOVE "X(" TO WURD, PERFORM GLUE

MOVE LENG TO WURD, PERFORM GLUE-STRING

MOVE ")" TO WURD. PERFORM GLUE-STRING

ELSE MOVE "9(" TO WURD, PERFORM GLUE

MOVE LENG TO WURD, PERFORM GLUE-STRING

MOVE ")" TO WURD. PERFORM GLUE-STRING.

PFP-EXIT.

EXIT.

REST-IMPFLD-DECLARATIONS SECTION 66.

C-IMPFLDS.

IF FORM-TYPE NOT="C" GO TO D-IMPFLDS.

IF C-OP NOT="ENTER" GO TO NOT-ENTER-COBOL.

COPY-TO-FROM-FROM.

PERFORM READ-FROM.

IF FORM-TYPE="C" GO TO IMP-NOT-MOVE.

IF FORM-TYPE NOT="D" GO TO COPY-TO-FROM-FROM.

PERFORM PUNCH-TO. MOVE FROM-LINE TO TO-SOURCE, MOVE 72 TO NTC.

GO TO COPY-TO-FROM-FROM.

NOT-ENTER-COBOL.

IF C-OP="CHAIN" MOVE 1 TO HAVE-CHAIN-CALC.

IF C-OP-LAST2 NOT="E" AND "EL" AND "ZD" GO TO IMP-NOT-MOVE.

MOVE C-FAC2 TO WURD, PERFORM GET-COPX, MOVE LL TO L1.

MOVE C-RESULT TO WURD, PERFORM GET-COPX, MOVE LL TO L2.

IF COPLEN(L1)>COPLEN(L2) MOVE COPLEN(L2) TO N
```

```
        ELSE MOVE COPLEN(L1) TO N.

IF COPLEN(L1)=COPLEN(L2) AND COPDEC(L1)=COPDEC(L2)
        AND C-OP-LAST2 NOT="ZO" GO TO IMP-NOT-MOVE.

MOVE "IF" TO SYMOP.

IF C-OP-LAST2="ZO" MOVE COPLEN(L1) TO N.

MOVE L1 TO LL.  PERFORM PUT-IMPFLD-FOR-MOVE.

MOVE "IT" TO SYMOP.

IF C-OP-LAST2="ZO" MOVE COPLEN(L2) TO N.

MOVE L2 TO LL.  PERFORM PUT-IMPFLD-FOR-MOVE.

IMP-NOT-MOVE.

PERFORM READ-FROM  GO TO C-IMPFLDS.

PUT-IMPFLD-FOR-MOVE SECTION 66.

PIFM-BEGIN.

MOVE "01" TO WURD.  PERFORM PTGA.

MOVE SYMOP TO WURD.  PERFORM GLUE.

MOVE "-" TO WURD.  PERFORM GLUE-STRING.

MOVE STMT-NO TO WURD.  PERFORM GLUE-STRING.

MOVE COPDEC(LL) TO DESPOS, MOVE COPLEN(LL) TO LENG.
        PERFORM PUT-CFIELD-PICTURE.

PERFORM GLUE-DOT.

MOVE "01" TO WURD.  PERFORM PTGA.

IF SYMOP="IF" MOVE "IG" TO WURD ELSE MOVE "IU" TO WURD.

PERFORM GLUE.

MOVE "-" TO WURD.  PERFORM GLUE-STRING.

MOVE STMT-NO TO WURD.  PERFORM GLUE-STRING.

MOVE "REDEFINES" TO WURD.  PERFORM GLUE.

MOVE SYMOP TO WURD.  PERFORM GLUE.

MOVE "-" TO WURD.  PERFORM GLUE-STRING.

MOVE STMT-NO TO WURD.  PERFORM GLUE-STRING.

PERFORM GLUE-DOT.
```

```
COMPUTE WIDTH=COPLEN(LL) -N.

IF WIDTH=0 OR C-OP="MOVEL" GO TO NO-FILLER-HERE.

MOVE-IMPFLD-FILLER.

MOVE "03 FILLER PC" TO WURD.  PERFORM PTGC.

IF COPDEC(LL)="A" MOVE "X(" TO WURD,  ELSE MOVE "9(" TO WURD.

PERFORM GLUE.

MOVE WIDTH TO WURD.  PERFORM GLUE-STRING.

MOVE ")" TO WURD,  PERFORM GLUE-STRING.

PERFORM GLUE-DOT.

NO-FILLER-HERE.

MOVE "03 BODY" TO WURD,  PERFORM PTGC.

PERFORM GLUE-DOT.

IF C-OP-LAST2="ZO"

IF SYMOP="IF" AND ZONE-PICKER(1)="H"

OR SYMOP="IT" AND ZONE-PICKER(2)="H"

PERFORM PUT-BODY-ZONE PERFORM PUT-BODY-FILLER

GO TO DONE-BODY.

PUT-BODY-FILLER.

COMPUTE WIDTH=N -1   IF WIDTH>0

MOVE "05 FILLER PC X(" TO WURD,  PERFORM PTGC

MOVE WIDTH TO WURD.  PERFORM GLUE-STRING

MOVE ")." TO WURD,  PERFORM GLUE-STRING.

PUT-BODY-ZONE.

MOVE "05 ZOHN." TO WURD,  PERFORM PTGC.

MOVE "07 SINE PC 9 CMP." TO WURD,  PERFORM PTGC.

MOVE "07 FILLER PC 9 CMP." TO WURD,  PERFORM PTGC.

DONE-BODY.

COMPUTE WIDTH=COPLEN(LL) -N.

IF WIDTH>0 AND C-OP="MOVEL" PERFORM MOVE-IMPFLD-FILLER.

PUT-CFIELD-PICTURE SECTION 66.
```

```
PFP-BEGIN.

MOVE "PC" TO WURD. PERFORM GLUE.

IF DESPOS="A" OR "M" GO TO NOT-COMP-FIELD.

IF OBJECT-MACHINE>5 MOVE "J" TO WURD ELSE MOVE "S" TO WURD.

PERFORM GLUE.

MOVE DESPOS TO NUM-SYM1, COMPUTE WIDTH=LENG - NUM-SYM1.

IF WIDTH>0 MOVE "9(" TO WURD, PERFORM GLUE-STRING
    MOVE WIDTH TO WURD, PERFORM GLUE-STRING
    MOVE ")" TO WURD. PERFORM GLUE-STRING.

IF DESPOS>0 MOVE "V9(" TO WURD, PERFORM GLUE-STRING
    MOVE DESPOS TO WURD, PERFORM GLUE-STRING
    MOVE ")" TO WURD. PERFORM GLUE-STRING.

GO TO PFP-EXIT.

NOT-COMP-FIELD.

IF DESPOS="A" MOVE "X(" TO WURD, PERFORM GLUE
    MOVE LENG TO WURD, PERFORM GLUE-STRING
    MOVE ")" TO WURD, PERFORM GLUE-STRING
    ELSE MOVE "9(" TO WURD, PERFORM GLUE
    MOVE LENG TO WURD, PERFORM GLUE-STRING
    MOVE ")" TO WURD. PERFORM GLUE-STRING.

PFP-EXIT.

EXIT.

MORE-IMPFLD-DECLARATIONS SECTION 75.

0-IMPFLDS.

MOVE SPACES TO FILE-NAME.

MOVE 0 TO SPC-SK.

NEXT-0-IMPFLD.

IF FORM-TYPE NOT="C" PERFORM FINISH-IOR GO TO DONE-IMPFLDS.

IF O-FILENAME NOT=SPACES AND FILE-NAME
    MOVE STMT-NO TO STMT
```

```
    PERFORM PTGA-IOR-CX, MOVE O-FILENAME TO FILE-NAME.

IF O-ENDPOS=SPACES  PERFORM READ-FROM GO TO NEXT-O-IMPFLD.

IF O-CNST NOT=SPACES
    PERFORM DUMMY VARYING I FROM 26 BY -1 UNTIL O-CHAR(I)="Z"
    COMPUTE LENG=I -2, MOVE " " TO DESPOS GO TO HAVE-ATTRIBUTES.

MOVE O-FLONAME TO WURD,  PERFORM GET-COPX.

MOVE COPLEN(L) TO LENG,  MOVE COPDEC(L) TO DESPOS.

IF DESPOS="A" MOVE " " TO DESPOS.

HAVE-ATTRIBUTES.
MOVE O-PACKED TO PAKD.

COMPUTE NFIL=O-ENDPOS -LENG -HOLDPOS.

PERFORM PTGC-IOF.

MOVE O-ENDPOS TO HOLDPOS.

PERFORM READ-FROM GO TO NEXT-O-IMPFLD.

DONE-IMPFLDS.

CLOSE REGINT,  OPEN INPUT REGINT.

PERFORM READ-FROM.

PERFORM READ-FROM.

GO TO FINISH-FPASS-1.

PTGA-IOR-CX.

IF FILE-NAME NOT=SPACES PERFORM FINISH-IOR.

MOVE 0 TO HOLDPOS.

MOVE "01 IR-" TO WURD,  PERFORM PTGA.

MOVE STMT TO WURD,  PERFORM GLUE-STRING.

PERFORM GLUE-DOT.

PTGC-OFILLER.

IF NFIL<0 ADD HOLDPOS TO NFIL  PERFORM PTGA-IOR.

IF NFIL>0 MOVE SYMOF TO WURD,  PERFORM PTGC
    MOVE "FILLER PC X(" TO WURD,  PERFORM GLUE
    MOVE NFIL TO N,  MOVE N TO WURD,  PERFORM GLUE-STRING
```

```
        MOVE ")." TO WURD, PERFORM GLUE-STRING.

FINISH-IOR.

MOVE FILE-NAME TO WURD. PERFORM GET-COPX.

COMPUTE N=COPLEN(L) -HOLDPOS, IF N>O
        MOVE "03 FILLER PC X(" TO WURD, PERFORM PTGC
        MOVE N TO WURD, PERFORM GLUE-STRING
        MOVE ")." TO WURD, PERFORM GLUE-STRING.

PTGA-IOR.

PERFORM FINISH-IOR.
    MOVE "01 IR-" TO WURD, PERFORM PTGA.

MOVE STMT-NO TO COMPER4, MOVE COMPER4 TO WURD,
        PERFORM GLUE-STRING.

MOVE "REDEFINES IR-" TO WURD, PERFORM GLUE.

MOVE STMT TO WURD, PERFORM GLUE-STRING.

MOVE STMT-NO TO STMT.

PERFORM GLUE-DOT.

MOVE 0 TO HOLDPOS.

PTGC-IOF-START.

PERFORM PTGC-IOF-BEGIN.

MOVE "PC" TO WURD, PERFORM GLUE.

MOVE " " TO WURD, PERFORM GLUE.

PTGC-IOF-BEGIN.

IF FORM-TYPE NOT="C"
        MOVE "03" TO SYMCP, PERFORM PTGC-OFILLER
        MOVE "03 IF-" TO WURD, PERFORM PTGC
        MOVE STMT-NO TO WURD, PERFORM GLUE-STRING.

PTGC-IOF SECTION 75.

PIP-BEGIN.

IF O-CNST NOT=" " AND O-FLDNAME NOT=" "
        GO TO IMPFLD-EDITING.
```

```
IF PAKD NOT="P" GO TO NOT-PAKD.

COMPUTE DISP=(LENG+1)/2,  ADD DISP TO NFIL.

PERFORM PTGC-IDF-BEGIN.  PERFORM GLUE-DOT.

IF O-RIGHT NOT="P" PERFORM PUT-PAKD-SINE

PERFORM PUT-PAKD-BODY  GO TO PIP-DONE.

PUT-PAKD-BODY.

MOVE "05 BODY PC " TO WURD,  PERFORM PTGC.

MOVE " " TO WURD,  PERFORM GLUE.

COMPUTE LENG=LENG/2.

COMPUTE LENG=2*LENG+1.

PERFORM PUT-IMPFLD-NUM-PICTURE.

MOVE "CMP." TO WURD,  PERFORM GLUE.

PUT-PAKD-SINE.

MOVE "05 SINE PC 9 CMP." TO WURD,  PERFORM PTGC.

DONE-PAKD-SINE.

GO TO PIP-DONE.

NOT-PAKD.

IF O-ZSUP=" " GO TO NOT-EDIT-CODE.

IF O-ZSUP="Z" MOVE "Z" TO SUP-MV

ELSE IF O-ZSUP="Y" MOVE "9" TO SUP-MV

ELSE GO TO NOT-XZ.

PERFORM PTGC-IDF-START.

MOVE DESPOS TO NUM-SYM6, COMPUTE N=LENG - NUM-SYM6.

IF N NOT=0 MOVE SUP-MV TO WURD,  PERFORM GLUE-STRING

MOVE "(" TO WURD,  PERFORM GLUE-STRING

MOVE N TO WURD,  PERFORM GLUE-STRING

MOVE ")" TO WURD,  PERFORM GLUE-STRING.

IF NUM-SYM6 NOT=0 MOVE "V" TO WURD,  PERFORM GLUE-STRING

MOVE SUP-MV TO WURD,  PERFORM GLUE-STRING

MOVE "(" TO WURD,  PERFORM GLUE-STRING
```

```
        MOVE DESPOS TO WURD,  PERFORM GLUE-STRING
        MOVE ")" TO WURD,  PERFORM GLUE-STRING.
    GO TO PIP-EXIT.
    NOT-YZ.
    IF O-ZSUP NOT="Y" GO TO NOT-DATE-EDIT.
    COMPUTE DISP= (LENG -1)/2,  ADD DISP TO NFIL.
    PERFORM PTGC-IDF-START.
    PERFORM PUT-DATE-EDIT-CHAR VARYING I FROM 1 BY 1 UNTIL I>LENG.
    GO TO PIP-EXIT.
    PUT-DATE-EDIT-CHAR.
    IF I=1 MOVE "Z" TO WURD
        ELSE MOVE "9" TO WURD.
    PERFORM GLUE-STRING.
    IF I=2 OR 4 MOVE "/" TO WURD.  PERFORM GLUE-STRING.
    NOT-DATE-EDIT.
    MOVE "Z" TO SUP-MV.
    MOVE DESPOS TO NUM-SYM6,  COMPUTE I=LENG -NUM-SYM6.
    COMPUTE DISP= (I -1)/3,  ADD DISP TO NFIL.
    IF NUM-SYM6 NOT=0  ADD 1 TO NFIL.
    IF O-EDCODE-ZONE=CC6 ADD 2 TO NFIL
        ELSE IF O-EDCODE-ZONE=CD8  ADD 1 TO NFIL.
    PERFORM PTGC-IDF-START.
    PUT-CODEC-EDIT-CHAR.
    MOVE SUP-MV TO WURD,  PERFORM GLUE-STRING.
    SUBTRACT 1 FROM I.
    IF I=0 GO TO NEW-DECIMAL-POSITIONS.
    IF O-EDCODE-DIGIT=1 OR 2
        COMPUTE N=I/3,  COMPUTE N=N*3
        IF I=N MOVE "," TO WURD,  PERFORM GLUE-STRING.
    GO TO PUT-CODEC-EDIT-CHAR.
```

NOW-DECIMAL-POSITIONS.

IF O-EDCODE-DIGIT=1 OR 3 MOVE "9" TO SUP-MV.

IF NUM-SYM6 NOT=0 MOVE "." TO WURD, PERFORM GLUE-STRING
    MOVE SUP-MV TO WURD, PERFORM GLUE-STRING
    MOVE "(" TO WURD, PERFORM GLUE-STRING
    MOVE NUM-SYM6 TO WURD, PERFORM GLUE-STRING
    MOVE ")" TO WURD, PERFORM GLUE-STRING.

IF O-EDCODE-ZONE=@CR MOVE "CR" TO WURD, PERFORM GLUE-STRING
    ELSE IF O-EDCODE-ZONE=@DB MOVE "-" TO WURD, PERFORM
    GLUE-STRING.

GO TO PIP-EXIT.

NOT-EDIT-CODE.

PERFORM PTGC-IDF-START.

IF DESPOS=" " MOVE "X(" TO WURD, PERFORM GLUE
    MOVE LENG TO WURD, PERFORM GLUE-STRING
    MOVE ")" TO WURD PERFORM GLUE-STRING GO TO PIP-EXIT.

IF O-RIGHT="R" AND OBJECT-MACHINE>5 MOVE "J" TO WURD
    ELSE MOVE "S" TO WURD.

PERFORM GLUE.

PUT-IMPFLD-NUM-PICTURE.

MOVE DESPOS TO SYM6, COMPUTE N=LENG - NUM-SYM6.

IF N NOT=0 MOVE "9(" TO WURD, PERFORM GLUE-STRING
    MOVE N TO WURD, PERFORM GLUE-STRING
    MOVE ")" TO WURD, PERFORM GLUE-STRING.

IF NUM-SYM6 NOT=0 MOVE "V9(" TO WURD, PERFORM GLUE-STRING
    MOVE DESPOS TO WURD, PERFORM GLUE-STRING
    MOVE ")" TO WURD, PERFORM GLUE-STRING.

DONE-IMPFLD-NUM-PICTURE.

GO TO PIP-EXIT.

IMPFLD-EDITING.

```
MOVE O-FLDNAME TO WURD PERFORM GET-COPX MOVE COPLEN(L) TO LENG.
MOVE O-CNST TO ALPHA-CNST,  PERFORM RPG-TO-COBOL-ALPHA-CNST.
MOVE ALPHA-CNST TO O-CNST,  COMPUTE WIDTH=WIDTH2+2.
MOVE 0 TO I, HAVE-SIG.  MOVE "Z" TO SUP-MV.
MOVE O-FLDNAME TO WURD.  PERFORM GET-COPX.
MOVE COPDEC(L) TO COPDESO,  COMPUTE L2=COPLEN(L) -COPDESO.
MOVE 0 TO NDEC.
MOVE 0 TO DOLLAR-ILLEGAL.
PERFORM SCAN-BODY VARYING NBODY FROM 2 BY 1 UNTIL I=LENG
    OR NBODY=WIDTH.
PERFORM PTGC-IOF-START.
MOVE 0 TO NSTAT.
PERFORM SCAN-STATUS VARYING I FROM NBODY BY 1 UNTIL NSTAT>0.
IF NSTAT=WIDTH GO TO NO-EXPANSION-TO-DECLARE.
MOVE "X(" TO WURD.  PERFORM GLUE.
MOVE WIDTH2 TO WURD,  PERFORM GLUE-STRING.
MOVE ")." TO WURD,  PERFORM GLUE-STRING.
MOVE "03 ID-" TO WURD,  PERFORM PTGC.
MOVE STMT-NO TO COMPER4,  MOVE COMPER4 TO WURD,
    PERFORM GLUE-STRING.
MOVE "REDEFINES IF-" TO WURD,  PERFORM GLUE.
MOVE COMPER4 TO WURD,  PERFORM GLUE-STRING.
PERFORM GLUE-DOT.
MOVE "05 IE-" TO WURD,  PERFORM PTGC.
MOVE COMPER4 TO WURD,  PERFORM GLUE-STRING.
MOVE "PC" TO WURD,  PERFORM GLUE.
MOVE " " TO WURD,  PERFORM GLUE.
NO-EXPANSION-TO-DECLARE.
MOVE 0 TO HAVE-FIXUP.
PERFORM TRANS-BODY VARYING I FROM 2 BY 1 UNTIL I=NBODY.
```

```
PERFORM TRANS-STATUS VARYING I FROM NBODY BY 1 UNTIL I=NSTAT.

PERFORM GLUE-DOT.

MOVE "05" TO SYMOP,  COMPUTE NFIL=WIDTH -NSTAT.

PERFORM PTGC-OFILLER.

IF HAVE-FIXUP=0 GO TO PIP-DONE.

MOVE "03 IB-" TO WURD,  PERFORM PTGC.

MOVE STMT-NO TO WURD.  PERFORM GLUE-STRING.

MOVE "REDEFINES IF-" TO WURD,  PERFORM GLUE.

MOVE STMT-NO TO WURD,  PERFORM GLUE-STRING,   PERFORM GLUE-DOT.
MOVE "05 IC-" TO WURD,  PERFORM PTGC.

MOVE STMT-NO TO WURD.  PERFORM GLUE-STRING.

MOVE "PC X CC" TO WURD,  PERFORM GLUE.

MOVE WIDTH2 TO J, MOVE J TO WURD,  PERFORM GLUE .

MOVE "TIMES." TO WURD,  PERFORM GLUE.

GO TO PIP-DONE.

SCAN-BODY.

IF I=L2 AND NDEC=0 MOVE NBODY TO NDEC.

IF O-CHAR(NBODY)=" " ADD 1 TO I

ELSE IF HAVE-SIG=0

IF O-CHAR(NBODY)="*"

MOVE 1 TO HAVE-SIG,  ADD 1 TO I

MOVE "0" TO O-CHAR(NBODY),  MOVE "*" TO SUP-MV

ELSE IF O-CHAR(NBODY)="0"

MOVE 1 TO HAVE-SIG,  ADD 1 TO I

COMPUTE K=NBODY -1   IF O-CHAR(K)="S"

MOVE " " TO O-CHAR(K) MOVE "S" TO SUP-MV.

SCAN-STATUS.

IF O-CHAR(I)="-" MOVE I TO NSTAT

ELSE IF I=WIDTH COMPUTE NSTAT=NBODY -1

ELSE IF O-CHAR(I)="R" COMPUTE K=I -1
```

```
    IF O-CHAR(K)="C" MOVE 1 TO NSTAT.
IF NSTAT>0 ADD 1 TO NSTAT.
TRANS-BODY.
IF I=NDEC AND O-CHAR(I) NOT="."
    MOVE "V" TO WURD.  PERFORM GLUE-STRING.
PERFORM EDIT-WORD-FIXUP.
IF O-CHAR(I)="+" OR "-"
    MOVE "." TO O-CHAR(I)
    MOVE 1 TO HAVE-FIXUP.
COMPUTE K=I+1.
IF O-CHAR(I)="C" AND O-CHAR(K)="R"  OR O-CHAR(I)="D"
    AND O-CHAR(K)="B" MOVE "/" TO O-CHAR(I),  O-CHAR(K).
IF SUP-MV="S" AND I<4 MOVE " " TO O-CHAR(I).
IF O-CHAR(I)=" " MOVE SUP-MV TO WURD
    ELSE IF O-CHAR(I)="0" MOVE SUP-MV TO WURD MOVE "9" TO SUP-MV
    ELSE IF O-CHAR(I)="&" MOVE "B" TO WURD
    ELSE MOVE O-CHAR(I) TO WURD.
PERFORM CHECK-DOLLAR-NOW-ILLEGAL.
PERFORM GLUE-STRING.
TRANS-STATUS.
PERFORM EDIT-WORD-FIXUP.
IF O-CHAR(I)="&" OR " " MOVE "B" TO WURD ELSE MOVE O-CHAR(I)
    TO WURD.
PERFORM CHECK-DOLLAR-NOW-ILLEGAL.
PERFORM GLUE-STRING.
CHECK-DOLLAR-NOW-ILLEGAL.
IF WURD="9" OR "V" OR "." OR "Z" OR "*" OR "B" OR "0"
    MOVE 1 TO DOLLAR-ILLEGAL.
IF WURD="S" AND DOLLAR-ILLEGAL=1 MOVE "/" TO WURD.
EDIT-WORD-FIXUP.
```

```
IF O-CHAR(I)="J" OR "9" OR "V" OP "S"

OR "Z" OR "*" OR "B" OR "K" OR "P" OR "A"

OR O-CHAR(I)="." AND I NOT=NDEC

MOVE 1 TO HAVE-FIXUP

, MOVE "." TO O-CHAR(I).

PIP-EXIT.

PERFORM GLUE-DOT.

PIP-DONE.

FIN-F1 SECTION 61.

FINISH-FPASS-1.
```

APPENDIX D: PROGRAM LISTING TO EFFECT PASS NO. 2

```
MOVE 1 TO KSAVE.

MOVE 0 TO L1.

IF 1=HAVE-CHAIN OR HAVE-CHAIN-CALC

MOVE "01 CHN-SV PC 99 VA 00." TO WURD.  PERFORM PTGA.

IF HAVE-CHAIN-CALC=1 MOVE "01 CHN-NO PC 99 VA 00." TO WURD

PERFORM PTGA.

NOTHER-RANDOM-FILE.

IF COPADD(KSAVE)>" " AND HAVE-BINSEARCH=0

MOVE 1 TO HAVE-BINSEARCH

MOVE "01 BIN-HI PC 9(8) CMP VA 0." TO WURD PERFORM PTGA

MOVE "01 BIN-LO PC 9(8) CMP VA 0." TO WURD PERFORM PTGA

IF COPADD(KSAVE) NOT=SPACES

MOVE "01 MX-" TO WURD PERFORM PTGA

MOVE KSAVE TO WURD.  PERFORM GLUE-STRING

MOVE "PC 9(8) CMP VA 0." TO WURD,  PERFORM GLUE

MOVE "01 KE-" TO WURD,  PERFORM PTGA

MOVE KSAVE TO WURD,  PERFORM GLUE-STRING

MOVE "PC 9(8) CMP VA 0," TO WURD PERFORM GLUE
```

```
    MOVE COPADD(KSAVE) TO REL,  MOVE PSEUDO-REL TO L2

IF L2=50

MOVE "01 IX-" TO WURD,  PERFORM PTGA

MOVE KSAVE TO WURD,  PERFORM GLUE-STRING

MOVE "PC 99 VA 0." TO WURD,  PERFORM GLUE.

IF COPADD(KSAVE)>" "

MOVE "01 AX-" TO WURD,  PERFORM PTGA

MOVE KSAVE TO WURD,  PERFORM GLUE-STRING

MOVE "PC 9(8) CMP VA 0." TO WURD,  PERFORM GLUE.

IF F-DESIGNATION NOT="C" GO TO NOT-CHAINED.

MOVE "01" TO WURD,  PERFORM PTGA.
MOVE KSAVE TO NUM-SYM3456,  MOVE "CHN-" TO SYM1234.

MOVE SYMBOL TO WURD,  PERFORM GLUE.

MOVE "PC X(" TO WURD,  PERFORM GLUE.

MOVE F-KEY-LENGTH TO COMPER4, MOVE COMPER4 TO WURD,
    PERFORM GLUE-STRING.

MOVE ") VA SPACES." TO WURD,  PERFORM GLUE-STRING.

MOVE "01 NP-" TO WURD,  PERFORM PTGA.

MOVE KSAVE TO WURD,  PERFORM GLUE-STRING.

MOVE "PC 9(8) CMP." TO WURD,  PERFORM GLUE.

MOVE "01 DATAKEYS-" TO WURD,  PERFORM PTGA.

MOVE KSAVE TO WURD,  PERFORM GLUE-STRING.  PERFORM GLUE-DOT.

MOVE "03 DK-" TO WURD,  PERFORM PTGC.

MOVE KSAVE TO WURD,  PERFORM GLUE-STRING.

MOVE "PC X(" TO WURD,  PERFORM GLUE.

MOVE F-KEY-LENGTH TO COMPER4, MOVE COMPER4 TO WURD,
    PERFORM GLUE-STRING.

MOVE ") OCCURS" TO WURD,  PERFORM GLUE-STRING.

COMPUTE COMPER4=OBJECT-CORE*10.

IF F-DATAKEYS NOT = SPACES
```

```
    IF F-DATAKEYS<"A" OR >"Z" COMPUTE COMPER4=F-DATAKEYS
        /F-KEY-LENGTH.
IF COMPER4<10 MOVE 10 TO COMPER4.
MOVE COMPER4 TO WURD, PERFORM GLUE.
MOVE "TIMES." TO WURD, PERFORM GLUE.
NOT-CHAINED.
IF F-DEVISE NOT="N" OR HAVE-LSPECS=0
    GO TO DONE-THIS-FILES-COUNTERS.
ADD 1 TO L1.
IF L1>MN-PRINTFILES GO TO TOO-BIG.
MOVE L1 TO PSEUDO-REL, MOVE REL TO COPADD(KSAVE).
MOVE "F" TO OF-INDICATOR(L1).
IF F-OVERFLOW NOT=SPACES MOVE F-OVERFLOW-SECONDCHAR
    TO OF-INDICATOR(L1).
MOVE 6 TO LINE-COUNTER(L1,1).
MOVE 60 TO LINE-COUNTER(L1,12).
MOVE 30 TO LINE-COUNTER(L1,2).
MOVE 30 TO LINE-COUNTER(L1,3).
MOVE 30 TO LINE-COUNTER(L1,4).
MOVE 30 TO LINE-COUNTER(L1,5).
MOVE 30 TO LINE-COUNTER(L1,6).
MOVE 30 TO LINE-COUNTER(L1,7).
MOVE 30 TO LINE-COUNTER(L1,8).
MOVE 30 TO LINE-COUNTER(L1,9).
MOVE 30 TO LINE-COUNTER(L1,10).
MOVE 30 TO LINE-COUNTER(L1,11).
MOVE "01 LC-" TO WURD, PERFORM PTGA.
MOVE KSAVE TO WURD, PERFORM GLUE-STRING.
MOVE "PC 9999 CMP VA 1." TO WURD, PERFORM GLUE.
DONE-THIS-FILES-COUNTERS.
```

```
ADD 1 TO KSAVE.

PERFORM READ-FROM  IF FORM-TYPE ="F" GO TO NOTHER-RANDOM-FILE..

MOVE "PROCEDURE DIVISION." TO WURD,  PERFORM PTGA.

IF HAVE-DF=0 OR HAVE-LSPECS=1 GO TO START-ON-E-SPECS.

MOVE 1 TO KSAVE.

NOTHER-PRINT-FILE.

IF COPDEC(KSAVE)="N" AND HAVE-PRINTER=0

MOVE 1 TO HAVE-PRINTER

MOVE "DECLARATIVES." TO WURD,  PERFORM PTGA

MOVE "USE-RTN SECTION." TO WURD,  PERFORM PTGA

MOVE "USE END OF PAGE" TO WURD,  PERFORM PTGC.

IF COPDEC(KSAVE)="N"

MOVE COPNAME(KSAVE) TO WURD,  PERFORM GLUE-FN.

ADD 1 TO KSAVE  IF KSAVE NOT>NFILES GO TO NOTHER-PRINT-FILE.

IF HAVE-PRINTER = 0  GO TO START-ON-E-SPECS.

PERFORM GLUE-DOT,  MOVE "E-O-P." TO WURD,  PERFORM PTGA.

MOVE "MOVE 1 TO PAR-AM ." TO WURD.  PERFORM PTGC.

MOVE "END DECLARATIVES." TO WURD.  PERFORM PTGA.

GO TO START-ON-E-SPECS.

EPASS1 SECTION 61.

START-ON-E-SPECS.

MOVE "INITIALIZE SECTION 51." TO WURD,  PERFORM PTGA.

MOVE "UP-START." TO WURD,  PERFORM PTGA.

IF HAVE-TABLOAD=1 MOVE "MOVE 0 TO PAR-AM ." TO WURD

PERFORM PTGC.

NEXT-E-SPEC.

IF FORM-TYPE="L" GO TO START-ON-L-SPECS.

IF FORM-TYPE NOT = "E"  GO TO START-ON-I-SPECS.

IF E-TABNAME1 NOT=SPACES GO TO E-TABLES.

IF E-CHAINFIELD = SPACES
```

```
    MOVE E-FROMFILE TO WURD, PERFORM GET-COPX

MOVE LL TO L1

MOVE E-TOFILE TO WURD, PERFORM GET-COPX

MOVE COPEOF(L1) TO COPEOF(LL)

MOVE COPADD(LL) TO REL COMPUTE PSEUDO-REL=PSEUDO-REL+L1

MOVE REL TO COPADD(LL)

ELSE MOVE E-TOFILE TO WURD, PERFORM GET-COPX

MOVE LL TO CHAINTO-FILE-IX(E-CHAINLEVNO).

PERFORM READ-FROM GO TO NEXT-E-SPEC.

E-TABLES.

IF E-FROMFILE=SPACES GO TO E-WITH-SAME-FILENAME.
    MOVE "OPEN INPUT" TO WURD, PERFORM PTGC.
    MOVE E-FROMFILE TO WURD, PERFORM GLUE-FN, PERFORM GLUE-DOT.
E-WITH-SAME-FILENAME.
    IF E-TOFILE NOT=SPACES MOVE 1 TO HAVE-OUTTAB.
    MOVE 1 TO KSAVE.
    MOVE "MOVE 0 TO" TO WURD, PERFORM PTGC.
    MOVE E-TABNAME1 TO SYMBOL, PERFORM GLUE-TABPT-CX.
    IF E-TABNAME2 NOT = SPACES
            MOVE E-TABNAME2 TO SYMBOL, PERFORM GLUE-TABPT-CX.
    PERFORM GLUE-DOT. ADD 1 TO BYE-NO, PERFORM PTGA-BYEND.
    ADD 1 TO BYE-NO.
    IF E-FROMFILE=SPACES
        MOVE "PERFORM TABLE-LOAD." TO WURD, PERFORM PTGC
        MOVE "MOVE TAB-LD TO IR-" TO WURD, PERFORM PTGC
        MOVE STMT-NO TO WURD PERFORM GLUE-STRING PERFORM GLUE-DOT
        GO TO MOVE-IN-NEXT-TABENTRY.
    MOVE "READ" TO WURD, PERFORM PTGC.
    MOVE E-FROMFILE TO WURD, PERFORM GLUE-FN.
    MOVE "AT END GO TO" TO WURD, PERFORM GLUE.
```

```
PERFORM GLUE-BYEND.  PERFORM GLUE-OUT.

MOVE "MOVE" TO WURD.  PERFORM PTGC.

MOVE E-FROMFILE TO WURD1.  PERFORM GLUE-CX.

MOVE "TO IR-" TO WURD.  PERFORM GLUE.

MOVE STMT-NO TO WURD.  PERFORM GLUE-STRING.  PERFORM GLUE-DOT.

MOVE-IN-NEXT-TABENTRY.

IF E-PACKED1="P" MOVE "IF" TO SYMOP
    PERFORM E-MOVE-TAB-IN  GO TO TAB-DONE-1.

MOVE "MOVE" TO WURD.  PERFORM PTGC

PERFORM GLUE-IF-CX.

MOVE "(" TO WURD.  PERFORM GLUE.

PERFORM GLUE-ENTNO.

MOVE ") TO" TO WURD.  PERFORM GLUE-STRING.

MOVE E-TABNAME1 TO WURD1.  PERFORM GLUE-CX.

PERFORM GLUE-DOT.

TAB-DONE-1.

MOVE "ADD 1 TO" TO WURD.  PERFORM PTGC.

MOVE E-TABNAME1 TO SYMBOL.  PERFORM GLUE-TABPT-CX PERFORM GLUE-DOT

MOVE "MOVE" TO WURD.  PERFORM PTGC.

MOVE E-TABNAME1 TO WURD1.  PERFORM GLUE-CX.

MOVE "TO" TO WURD.  PERFORM GLUE.

MOVE E-TABNAME1 TO WURD1.  PERFORM GLUE-TAB.  PERFORM GLUE-DOT.

IF E-TABNAME2 = SPACES  GO TO ONLY-ONE-TABLE.

IF E-PACKED2="P" MOVE "IG" TO SYMOP
    PERFORM E-MOVE-TAB-IN  GO TO TAB-DONE-2.

MOVE "MOVE IG-" TO WURD.  PERFORM PTGC.

MOVE STMT-NO TO WURD.  PERFORM GLUE-STRING.

MOVE "(" TO WURD.  PERFORM GLUE.

PERFORM GLUE-ENTNO.

MOVE ") TO" TO WURD.  PERFORM GLUE-STRING.
```

```
MOVE E-TABNAME2 TO WURD1, PERFORM GLUE-CX.

PERFORM GLUE-DOT.

TAB-DONE-2.

MOVE "ADD 1 TO" TO WURD, PERFORM PTGC.

MOVE E-TABNAME2 TO SYMBOL, PERFORM GLUE-TABPT-CX.

PERFORM GLUE-DOT, MOVE "MOVE" TO WURD, PERFORM PTGC.

MOVE E-TABNAME2 TO WURD1, PERFORM GLUE-CX.

MOVE "TO" TO WURD, PERFORM GLUE.

MOVE E-TABNAME2 TO WURD1, PERFORM GLUE-TAB, PERFORM GLUE-DOT.

ONLY-ONE-TABLE.

MOVE "IF" TO WURD, PERFORM PTGC.

MOVE E-TABNAME1 TO SYMBOL, PERFORM GLUE-TABPT-CX.

MOVE "NOT <" TO WURD, PERFORM GLUE.

MOVE E-NENTRIES-TAB TO WURD, PERFORM GLUE.

MOVE "GO TO" TO WURD, PERFORM GLUE.

PERFORM GLUE-BYENO, PERFORM GLUE-DOT.

ADD 1 TO KSAVE.

IF KSAVE NOT>E-NENTRIES-REC GO TO MOVE-IN-NEXT-TABENTRY.

MOVE "GO TO" TO WURD. PERFORM PTGC.

SUBTRACT 1 FROM BYE-NO. PERFORM GLUE-BYENO, PERFORM GLUE-DOT.

ADD 1 TO BYE-NO, PERFORM PTGA-BYENO.

MOVE E-FROMFILE TO FILE-NAME, PERFORM READ-FROM.

IF FORM-TYPE = "E" AND E-FROMFILE = FILE-NAME
        GO TO F-WITH-SAME-FILENAME.

IF FILE-NAME=SPACES GO TO NEXT-E-SPEC.

MOVE "CLOSE" TO WURD. PERFORM PTGC.

MOVE FILE-NAME TO WURD, PERFORM GLUE-FN.

MOVE "WITH RELEASE." TO WURD. PERFORM GLUE.

GO TO NEXT-E-SPEC.

GLUE-ENTNO.
```

```
IF OBJECT-MACHINE NOT>5 AND KSAVE <100 MOVE KSAVE TO J
     MOVE J TO WURD ELSE MOVE KSAVE TO WURD.
PERFORM GLUE.
E-MOVE-TAB-IN.
MOVE "MOVE BODY OF" TO WURD. PERFORM PTGC.
MOVE SYMOP TO WURD. PERFORM GLUE.
MOVE "-" TO WURD. PERFORM GLUE-STRING.
MOVE STMT-NO TO WURD. PERFORM GLUE-STRING.
MOVE "(" TO WURD. PERFORM GLUE-STRING.
MOVE KSAVE TO WURD. PERFORM GLUE-STRING.
MOVE ") TO" TO WURD. PERFORM GLUE-STRING.
IF SYMOP="IF" MOVE E-TABNAME1 TO IMP-OBJECT ELSE
     MOVE E-TABNAME2 TO IMP-OBJECT.
MOVE IMP-OBJECT TO WURD1. PERFORM GLUE-CX.
MOVE "IF SINE OF" TO WURD. PERFORM PTGC.
MOVE SYMOP TO WURD. PERFORM GLUE.
MOVE "-" TO WURD. PERFORM GLUE-STRING.
MOVE STMT-NO TO WURD. PERFORM GLUE-STRING.
MOVE "(" TO WURD. PERFORM GLUE-STRING.
MOVE KSAVE TO WURD. PERFORM GLUE-STRING.
MOVE ")=@@ COMPUTE" TO WURD. PERFORM GLUE-STRING.
MOVE IMP-OBJECT TO WURD1. PERFORM GLUE-CX.
MOVE "=-" TO WURD. PERFORM GLUE.
MOVE IMP-OBJECT TO WURD1. PERFORM GLUE-CX. PERFORM GLUE-DOT.
LPASS1 SECTION 61.
START-ON-L-SPECS.
IF FORM-TYPE NOT="L" GO TO START-ON-I-SPECS.
PERFORM READ-FROM CD TO START-ON-L-SPECS.
FIRST-I-PASS SECTION 51.
START-ON-I-SPECS.
```

```
IF HAVE-UDATE=1 MOVE "MOVE TODAYS-DATE TO" TO WURD
    PERFORM PTGC
    MOVE "UDATE" TO WURD1 PERFORM GLUE-CX, PERFORM GLUE-DOT.
MOVE "MOVE 1 TO PAR-AM PERFORM OC-FILES." TO WURD, PERFORM PTGC.
FOUR.
MOVE "RPG-CYCLE SECTION 52." TO WURD, PERFORM PTGA.
MOVE "FOUR." TO WURD, PERFORM PTGA.
MOVE "MOVE 0 TO OUT-SW " TO WURD, PERFORM PTGC.
MOVE "GO TO OUTPUT-DETAIL." TO WURD, PERFORM PTGC.
MOVE "FIVE." TO WURD, PERFORM PTGA.
MOVE "GO TO INPUT-READ." TO WURD, PERFORM PTGC.
MOVE "SEVEN." TO WURD, PERFORM PTGA.
IF HAVE-HALTS = ZEROES MOVE "EXIT." TO WURD, PERFORM PTGC
    GO TO ELEVEN.
MOVE "IF" TO WURD, PERFORM PTGC.
MOVE 0 TO HAVE-AND.
PERFORM PUT-HALTCHECK VARYING I FROM 1 BY 1 UNTIL I>10.
MOVE "DISPLAY ""HALT""" TO WURD, PERFORM PTGC.
PERFORM GLUE-HALTIND VARYING I FROM 1 BY 1 UNTIL I>10.
MOVE "ELSE GO TO ELEVEN." TO WURD, PERFORM PTGC.
MOVE "ACCEPT PAR-AM ." TO WURD, PERFORM PTGC.
MOVE "IF PAR-AM NOT < ""STOP"" GO TO TEN."
    TO WURD, PERFORM PTGC.
ELEVEN.
MOVE "ELEVEN." TO WURD, PERFORM PTGA.
MOVE "PERFORM OFF-INDICS." TO WURD, PERFORM PTGC.
MOVE "GO TO INPUT-CHECK." TO WURD, PERFORM PTGC.
MOVE "NINETEEN." TO WURD, PERFORM PTGA.
MOVE "IF ALL-BY = 0 GO TO TWENTY-FOUR." TO WURD, PERFORM PTGC.
MOVE "GO TO CALC-TOTAL." TO WURD, PERFORM PTGC.
```

```
    MOVE "TWENTY-FOUR." TO WURD, PERFORM PTGA.
    IF HAVE-CTL=0 MOVE "MOVE 1 TO ALL-RY ." TO WURD PERFORM PTGC.
    MOVE "IF IND-LR = 1 GO TO FIFTY-THREE." TO WURD, PERFORM PTGC.
    IF HAVE-OF=0 GO TO TWENTY-SIX.
    MOVE "MOVE 1 TO OUT-SW GO TO OUTPUT-TOTAL." TO WURD
         PERFORM PTGC.
TWENTY-SIX.
    MOVE "TWENTY-SIX." TO WURD, PERFORM PTGA.
    IF HAVE-MATCH = 1 MOVE "MOVE SW1-MR TO IND-MR ." TO WURD
            PERFORM PTGC.
    MOVE "PERFORM INPUT-MOVE." TO WURD, PERFORM PTGC.
    IF HAVE-CHAIN=1 MOVE "PERFORM GET-CHAIN." TO WURD PERFORM PTGC.
    MOVE "GO TO CALC-DETAIL." TO WURD, PERFORM PTGC.
    MOVE "TEN." TO WURD, PERFORM PTGA.
    MOVE "MOVE 1 TO IND-LR ." TO WURD, PERFORM PTGC.
    IF MAX-LEVNO>0 MOVE "MOVE 9 TO PAR-AM PERFORM CTL-BREAK."
         TO WURD, PERFORM PTGC.
    MOVE "GO TO NINETEEN."                       TO WURD, PERFORM PTGC
    MOVE "FINALIZE SECTION 51." TO WURD, PERFORM PTGA.
    MOVE "FIFTY-THREE." TO WURD, PERFORM PTGA.
    MOVE "MOVE 2 TO PAR-AM PERFORM CC-FILES." TO WURD, PERFORM PTGC.
    IF HAVE-OUTTAB=1 MOVE "PERFORM TABLE-OUTPUT." TO WURD
         PERFORM PTGC.
    MOVE "STOP RUN." TO WURD, PERFORM PTGC.
    MOVE "INPUT-MOVE SECTION 52." TO WURD, PERFORM PTGA.
    MOVE "IM-BEGIN." TO WURD, PERFORM PTGA.
    MOVE SPACES TO FILE-NAME, MOVE 0 TO FIL-NO.
    MOVE 0 TO NSAVF, MOVE 1 TO REC-NO.
NEXT-REC-SPEC.
    IF FORM-TYPE NOT="I" GO TO FINISCH-I-SPECS.
```

```
IF I-FILENAME NOT=SPACES AND I-FILENAME NOT=FILE-NAME
    MOVE I-FILENAME TO WURD, PERFORM GET-COPX
    ADD 1 TO NSAVE. MOVE LL TO SAVEDIX(NSAVE)
    IF NSAVE>MN-INPFILES GO TO TOO-BIG ELSE
    PERFORM PUT-FILNO-CHECK-IM.
MOVE 0 TO HOLDPOS, MOVE SPACES TO SAVE-RELATION, SAVE-CTLLEVEL.
MOVE 0 TO COMPOS, MOVE SPACES TO SAVE-CHAINLEV.
IF I-SEQNO ALPHABETIC MOVE REC-NO TO RECNO-1(FIL-NO)
        ELSE IF I-OPTIONAL = " "
        MOVE REC-NO TO RECNO-2(FIL-NO)
        IF RECNO-3(FIL-NO)=0 MOVE REC-NO TO RECNO-3(FIL-NO).
MOVE 0 TO HAVE-CTL-THISREC.
NOTHER-REC-SPEC.
IF I-RESIND NOT=SPACES PERFORM REMEMBER-RESIND.
PERFORM READ-FROM.
IF I-SEQNO="NO" OR "R " GO TO NOTHER-REC-SPEC.
MOVE "IF" TO WURD, PERFORM PTGC. PERFORM GLUE-RECNO-IM.
MOVE "NOT =" TO WURD. PERFORM GLUE.
MOVE REC-NO TO WURD, PERFORM GLUE.
ADD 1 TO REC-NO.
MOVE "GO TO" TO WURD, PERFORM GLUE.
ADD 1 TO BYE-NO.
PERFORM GLUE-BYENO.
PERFORM GLUE-DOT.
NEXT-IFIELD-SPEC.
IF FORM-TYPE NOT="I" OR I-FLDNAME = SPACES GO TO FINISCH-THISREC.
IF I-CTLLEVEL NOT= SAVE-CTLLEVEL OR I-RELATION NOT= SAVE-RELATION
        MOVE 0 TO HOLDPOS.
IF I-MC="C" AND I-MATCHCHAIN NOT=SAVE-CHAINLEV
    OR I-RELATION NOT=SAVE-RELATION MOVE 0 TO COMPOS.
```

```
    IF SAVE-RELATION NOT= I-RELATION PERFORM MAYBE-SET-ALLRY
        IF SAVE-RELATION NOT= SPACES PERFORM PTGA-BIENO.
    IF I-RELATION NOT=SAVE-RELATION AND SPACES
        MOVE "IF" TO WURD, PERFORM PTGC
        MOVE I-RELATION TO INDICNO. PERFORM GLUE-INDIC-CX
        MOVE "= 0 GO TO" TO WURD, PERFORM GLUE
        ADD 1 TO BIE-NO, PERFORM GLUE-BIENO, PERFORM GLUE-DOT.
    IF I-PACKED="P"
        MOVE "MOVE BODY OF" TO WURD, PERFORM PTGC
        PERFORM GLUE-IF-CX
        MOVE "TO" TO WURD, PERFORM GLUE
        MOVE I-FLDNAME TO WURD1, PERFORM GLUE-CX
        MOVE "IF SINE OF" TO WURD, PERFORM PTGC
        PERFORM GLUE-IF-CX
        MOVE "=@D@ COMPUTE" TO WURD, PERFORM GLUE
        MOVE I-FLDNAME TO WURD1, PERFORM GLUE-CX
        MOVE "=-" TO WURD, PERFORM GLUE
        MOVE I-FLDNAME TO WURD1, PERFORM GLUE-CX, PERFORM GLUE-DOT
        GO TO DONE-IM-MOVE.
MOVE "MOVE" TO WURD, PERFORM PTGC.
PERFORM GLUE-IF-CX.
MOVE "TO" TO WURD, PERFORM GLUE.
MOVE I-FLDNAME TO WURD1, PERFORM GLUE-CX.
PERFORM GLUE-DOT.
DONE-IM-MOVE.
IF I-CTLLEVEL=SPACES GO TO NO-CTL-THISFIELD.
MOVE 1 TO HAVE-CTL-THISREC.
MOVE "MOVE" TO WURD, PERFORM PTGC.
MOVE I-FLDNAME TO WURD1, PERFORM GLUE-CX.
MOVE "TO" TO WURD, PERFORM GLUE.
```

```
MOVE "HLD-" TO SYMBOL.  MOVE I-CTLLEVEL TO SYM56.
MOVE SYMBOL TO WURD1,  PERFORM GLUE-CX .
MOVE "=" TO WURD,  PERFORM GLUE-STRING.
    MOVE HOLDPOS TO WURD,  PERFORM GLUE-STRING.
PERFORM GLUE-DOT.
MOVE I-FLDNAME TO WURD,  PERFORM GET-COPX.
COMPUTE HOLDPOS=HOLDPOS+COPLEN(L).
NO-CTL-THISFIELD.
IF I-MC NOT="C" GO TO NO-CHAIN-THISFIELD.
MOVE "HLD-" TO SYMBOL,  MOVE I-MATCHCHAIN TO SYM56.
MOVE "MOVE" TO WURD,  PERFORM PTGC.
MOVE I-FLDNAME TO WURD1,  PERFORM GLUE-CX.
MOVE "TO" TO WURD,  PERFORM GLUE.
MOVE SYMBOL TO WURD1,  PERFORM GLUE-CX.
MOVE "=" TO WURD,  PERFORM GLUE-STRING.
    MOVE COMPOS TO WURD,  PERFORM GLUE-STRING.
PERFORM GLUE-DOT.
MOVE I-FLDNAME TO WURD,  PERFORM GET-COPX.
COMPUTE COMPOS=COMPOS+COPLEN(L).
NO-CHAIN-THISFIELD.
IF I-FIELD-RESINDS=SPACES GO TO NO-FIELD-RESINDS.
MOVE "MOVE 0 TO" TO WURD,  PERFORM PTGC.
IF I-PLUS NOT=SPACES MOVE I-PLUS TO INDICNO
    PERFORM GLUE-INDIC-CX.
IF I-MINUS NOT=SPACES MOVE I-MINUS TO INDICNO
    PERFORM GLUE-INDIC-CX.
IF I-ZEROBLANK NOT=SPACES MOVE I-ZEROBLANK TO INDICNO
    PERFORM GLUE-INDIC-CX.
PERFORM GLUE-DOT.
IF I-PLUS NOT = SPACES
```

```
        MOVE ">" TO REL,  MOVE I-PLUS TO INDICNO
        PERFORM GLUE-INDIC-ELSE.
IF I-MINUS NOT = SPACES
        MOVE "<" TO REL,  MOVE I-MINUS TO INDICNO
        PERFORM GLUE-INDIC-ELSE.
IF I-ZEROBLANK NOT = SPACES
        MOVE "=" TO REL,  MOVE I-ZEROBLANK TO INDICNO
        PERFORM GLUE-INDIC-ELSE.
NO-FIELD-RESINDS.
MOVE I-CTLLEVEL TO SAVE-CTLLEVEL, MOVE I-RELATION TO SAVE-RELATIO
    N.
IF I-MC="C" MOVE I-MATCHCHAIN TO SAVE-CHAINLEV.
PERFORM READ-FROM  GO TO NEXT-IFIELD-SPEC.
FINISCH-THISREC.
MAYBE-SET-ALLRY.
IF HAVE-CTL-THISREC=1 MOVE "MOVE 1 TO ALL-RY ." TO WURD PERFORM
    PTGC.
MOVE 0 TO HAVE-CTL-THISREC.
FINISH-BIENDS.
IF SAVE-RELATION NOT=SPACES PERFORM PTGA-BIEND.
MOVE "GO TO IM-EXIT." TO WURD,  PERFORM PTGC.
PERFORM PTGA-BYEND.
GO TO NEXT-REC-SPEC.
FINISCH-I-SPECS.
MOVE "EXIT." TO WURD,  PERFORM PTGC.
PERFORM PTGA-BIYND.
MOVE "EXIT." TO WURD,  PERFORM PTGC.
MOVE "IM-EXIT." TO WURD,  PERFORM PTGA.
MOVE "EXIT." TO WURD,  PERFORM PTGC.
MOVE "TURN-OFF-INDS SECTION 52." TO WURD,  PERFORM PTGA.
```

```
MOVE "OFF-INDICS." TO WURD,  PERFORM PTGA.

MOVE 1 TO KSAVE,  MOVE "MOVE 0 TO" TO WURD PERFORM PTGC.

MOVE 0 TO HAVE-SIG.

NEXT-OFF-INDIC.

IF OFFED-INDIC(KSAVE)="LO" MOVE 1 TO HAVE-SIG
    ELSE MOVE OFFED-INDIC(KSAVE) TO INDICNO,
        PERFORM GLUE-INDIC-CX.

ADD 1 TO KSAVE  IF KSAVE NOT>NOI  GO TO NEXT-OFF-INDIC.

PERFORM GLUE-DOT.

IF HAVE-SIG=1 MOVE "MOVE 1 TO IND-LO ." TO WURD PERFORM PTGC.

CLOSE RPGINT.
OPEN INPUT RPGINT.

PERFORM READ-FROM PERFORM READ-FROM.

GO TO F-PASS-2.

GLUE-RECNO-IM.

MOVE "REC-NO (" TO WURD,  PERFORM GLUE.

MOVE FIL-NO TO WURD,  PERFORM GLUE.

MOVE ")" TO WURD,  PERFORM GLUE.

PUT-FILNO-CHECK-IM.

IF FILE-NAME NOT=SPACES MOVE "EXIT." TO WURD,  PERFORM PTGC
    PERFORM PTGA-BIYNO.

MOVE I-FILENAME TO FILE-NAME.

MOVE "IF FIL-NO NOT =" TO WURD,  PERFORM PTGC.

ADD 1 TO FIL-NO,  MOVE FIL-NO TO WURD,  PERFORM GLUE.

MOVE "GO TO " TO WURD,  PERFORM GLUE.

ADD 1 TO BIY-NO,  PERFORM GLUE-BIYNO,  PERFORM GLUE-DOT.

MOVE 1 TO REC-NO.

MOVE 0 TO RECNO-1(FIL-NO).

MOVE 0 TO RECNO-3(FIL-NO).

MOVE 99 TO RECNO-2(FIL-NO).
```

```
PUT-HALTCHECK.
IF HAVE-H(I)=1   IF HAVE-AND=1
    MOVE "OR" TO WURD PERFORM PTGC ELSE MOVE 1 TO HAVE-AND.
IF HAVE-H(I)=1 PERFORM GLUE-HALTIND
    MOVE "= 1" TO WURD, PERFORM GLUE.
GLUE-HALTIND.
IF HAVE-H(I)=1 MOVE "H" TO INDICNO-1 COMPUTE INDICNO-2
    =I -1 PERFORM GLUE-INDIC-CX
    ELSE MOVE "0" TO WURD, PERFORM GLUE.
REMEMBER-RESIND.
PERFORM DUMMY VARYING IDX FROM 1 BY 1 UNTIL
    OFFED-INDIC(IDX)=I-RESIND OR IDX>NOI.
IF IDX>NOI ADD 1 TO NOI
    MOVE I-RESIND TO OFFED-INDIC(NOI)
    IF NOI>MN-OFF-INDICS GO TO TOO-BIG.
GLUE-INDIC-ELSE.
MOVE "IF" TO WURD, PERFORM PTGC.
MOVE I-FLDNAME TO WURD1, PERFORM GLUE-CX.
MOVE REL TO WURD, PERFORM GLUE.
IF COPDEC(L) = "A" MOVE "SPACES" TO WURD ELSE MOVE "0" TO WURD.
PERFORM GLUE, MOVE "MOVE 1 TO" TO WURD, PERFORM GLUE.
PERFORM GLUE-INDIC-CX.
PERFORM GLUE-DOT.
F-PASS2 SECTION 60.
F-PASS-2.
```

APPENDIX E: PROGRAM LISTING TO EFFECT PASS NO. 3

```
MOVE "OC-FILES SECTION 51." TO WURD, PERFORM PTGA.
MOVE "CF-BEGIN." TO WURD, PERFORM PTGA.
F2-CARD.
IF FORM-TYPE NOT="F" GO TO FINISH-FPASS-2.
```

```
IF F-DESIGNATION = "T" PERFORM READ-FROM GO TO F2-CARD.
ADD 1 TO BYE-NO.
MOVE "IF PAR-AM = 2 CLOSE" TO WURD, PERFORM PTGC.
MOVE F-FILENAME TO WURD, PERFORM GLUE-FN.
IF F-CLOSECODE="P" AND OBJECT-MACHINE>5 MOVE "PURGE" TO WURD
    PERFORM GLUE
    ELSE IF F-CLOSECODE="U" AND OBJECT-MACHINE>5 MOVE "LOCK" TO
    WURD PERFORM GLUE
    ELSE IF F-CLOSECODE="N" MOVE "NO REWIND" TO WURD
    PERFORM GLUE
    ELSE IF OBJECT-MACHINE>5 MOVE "RELEASE" TO WURD, PERFORM
    GLUE.
IF F-ADDITION NOT="A" GO TO NO-SORT-NEEDED.
MOVE "IF AX-" TO WURD, PERFORM PTGC.
MOVE LL TO WURD, PERFORM GLUE-STRING.
MOVE "NOT > MX-" TO WURD, PERFORM GLUE.
MOVE LL TO WURD, PERFORM GLUE-STRING.
MOVE "GO TO" TO WURD, PERFORM GLUE.
PERFORM GLUE-BYEND.
MOVE "ELSE" TO WURD, PERFORM GLUE.
IF OBJECT-MACHINE>5
    MOVE "SORT SX0" TO WURD, PERFORM PTGC
    MOVE LL TO WURD, PERFORM GLUE-STRING
    MOVE "ASCENDING KY-" TO WURD, PERFORM GLUE
    MOVE LL TO WURD, PERFORM GLUE-STRING
    MOVE "USING FX0" TO WURD, PERFORM PTGC
    MOVE LL TO WURD, PERFORM GLUE-STRING
    MOVE "GIVING FX0" TO WURD, PERFORM GLUE
    MOVE LL TO WURD, PERFORM GLUE-STRING
    ELSE MOVE "DISPLAY ""YOU MUST SORT THE FILE" TO WURD
```

```
    PERFORM PTGC, MOVE F-FILENAME TO WURD, PERFORM GLUE
    MOVE """" TO WURD, PERFORM GLUE.
NO-SORT-NEEDED.
MOVE "GO TO" TO WURD, PERFORM PTGC.
PERFORM GLUE-BYEND, PERFORM GLUE-DOT.
IF F-DESIGNATION NOT="C" AND F-ADDITION NOT="A" AND F-ORG NOT="I"
    OR F-IO NOT="O" GO TO NORMAL-OPEN.
MOVE "DISPLAY """ TO WURD, PERFORM PTGC.
MOVE F-FILENAME TO WURD, PERFORM GLUE-STRING.
MOVE " -- CREATE OR EXTEND?""." TO WURD, PERFORM GLUE-STRING.
MOVE "ACCEPT SPC-SK ." TO WURD, PERFORM PTGC.
MOVE "IF SPC-SK <""EXT"" OPEN OUTPUT" TO WURD, PERFORM PTGC.
MOVE F-FILENAME TO WURD, PERFORM GLUE-FN.
MOVE "GO TO" TO WURD, PERFORM GLUE.
PERFORM GLUE-BYEND, PERFORM GLUE-DOT.
MOVE "OPEN I-O" TO WURD, PERFORM PTGC.
MOVE F-FILENAME TO WURD, PERFORM GLUE-FN, PERFORM GLUE-DOT.
GO TO NEED-LAST-ACTUAL.
NORMAL-OPEN.
MOVE "OPEN" TO WURD, PERFORM PTGC.
IF F-IO="O" MOVE "OUTPUT" TO WURD
    ELSE IF F-IO="U" MOVE "I-O" TO WURD
    ELSE MOVE "INPUT" TO WURD.
PERFORM GLUE.
MOVE F-FILENAME TO WURD, PERFORM GLUE-FN, PERFORM GLUE-DOT.
IF F-DESIGNATION="R"
    MOVE "MOVE SPACES TO" TO WURD, PERFORM PTGC
    MOVE F-FILENAME TO WURD1, PERFORM GLUE-CX, PERFORM GLUE-DOT.
MOVE F-FILENAME TO WURD, PERFORM GET-COPX.
IF COPADD(LL) NOT>" "
```

GO TO DONT-NEED-LAST-ACTUAL.

NEED-LAST-ACTUAL.

MOVE "MOVE 0 TO BIN-LO" TO WURD, PERFORM PTGC.

MOVE "MOVE HIGH-VALUE TO BIN-HI ." TO WURD, PERFORM PTGC.

ADD 1 TO BIE-NO, PERFORM PTGA-BIENO.

MOVE "COMPUTE KE-" TO WURD, PERFORM PTGC.

MOVE LL TO WURD, PERFORM GLUE-STRING.

MOVE "=( BIN-LO + BIN-HI )/2." TO WURD, PERFORM PTGC.

MOVE "READ" TO WURD, PERFORM PTGC.

MOVE F-FILENAME TO WURD, PERFORM GLUE-FN.

MOVE "INVALID MOVE KE-" TO WURD, PERFORM GLUE.

MOVE LL TO WURD, PERFORM GLUE-STRING.
MOVE "TO BIN-HI ELSE MOVE KE-" TO WURD, PERFORM PTGC.

MOVE LL TO WURD, PERFORM GLUE-STRING.

MOVE "TO BIN-LO ." TO WURD, PERFORM PTGC.

MOVE "IF BIN-HI NOT= BIN-LO +1 GO TO" TO WURD PERFORM PTGC.

PERFORM GLUE-BIENO, PERFORM GLUE-DOT.

MOVE "MOVE BIN-LO TO MX-" TO WURD, PERFORM PTGC.

MOVE LL TO WURD, PERFORM GLUE-STRING.

MOVE "AX-" TO WURD, PERFORM GLUE.

MOVE LL TO WURD, PERFORM GLUE-STRING.

IF F-IO NOT="O" MOVE "MOVE 0 TO" TO WURD PERFORM GLUE.

MOVE "KE-" TO WURD, PERFORM GLUE.

MOVE LL TO WURD, PERFORM GLUE-STRING. PERFORM GLUE-DOT.

IF F-DESIGNATION NOT="C" GO TO DONT-NEED-LAST-ACTUAL.

MOVE "COMPUTE NP-" TO WURD, PERFORM PTGC.

MOVE LL TO WURD, PERFORM GLUE-STRING.

MOVE "=MX-" TO WURD, PERFORM GLUE.

MOVE LL TO WURD, PERFORM GLUE-STRING.

MOVE "/" TO WURD, PERFORM GLUE.

```
COMPUTE COMPER4=OBJECT-CORE+10.
IF F-DATAKEYS NOT = SPACES
    IF F-DATAKEYS<"A" OR >"Z"
    COMPUTE COMPER4=F-DATAKEYS/F-KEY-LENGTH.
IF COMPER4<10 MOVE 10 TO COMPER4.
MOVE COMPER4 TO WURD, PERFORM GLUE.
MOVE "+1." TO WURD, PERFORM GLUE.
MOVE "MOVE 1 TO BIN-LO MOVE NP-" TO WURD, PERFORM PTGC.
MOVE LL TO WURD, PERFORM GLUE-STRING.
MOVE "TO KE-" TO WURD, PERFORM GLUE.
MOVE LL TO WURD, PERFORM GLUE-STRING, PERFORM GLUE-DOT.
ADD 1 TO BIE-NO, PERFORM PTGA-BIENO.
MOVE "READ" TO WURD, PERFORM PTGC.
MOVE F-FILENAME TO WURD, PERFORM GLUE-FN, PERFORM GLUE-DOT.
MOVE "MOVE KX-" TO WURD, PERFORM PTGC.
MOVE LL TO WURD, PERFORM GLUE-STRING.
MOVE "TO DK-" TO WURD, PERFORM GLUE.
MOVE LL TO WURD, PERFORM GLUE-STRING.
MOVE "( BIN-LO )" TO WURD, PERFORM GLUE.
MOVE "ADD 1 TO BIN-LO ADD NP-" TO WURD, PERFORM PTGC.
MOVE LL TO WURD, PERFORM GLUE-STRING.
MOVE "TO KE-" TO WURD, PERFORM GLUE.
MOVE LL TO WURD, PERFORM GLUE-STRING, PERFORM GLUE-DOT.
MOVE "IF KE-" TO WURD, PERFORM PTGC.
MOVE LL TO WURD, PERFORM GLUE-STRING.
MOVE "<MX-" TO WURD, PERFORM GLUE.
MOVE LL TO WURD, PERFORM GLUE-STRING.
MOVE "GO TO" TO WURD, PERFORM GLUE.
PERFORM GLUE-BIENO, PERFORM GLUE-DOT.
MOVE "MOVE HIGH-VALUE TO DK-" TO WURD, PERFORM PTGC.
```

```
MOVE LL TO WURD, PERFORM GLUE-STRING.

MOVE "( BIN-LO )." TO WURD, PERFORM GLUE.

MOVE "MOVE 0 TO KE-" TO WURD, PERFORM PTGC.

MOVE LL TO WURD, PERFORM GLUE-STRING, PERFORM GLUE-DOT.

DONT-NEED-LAST-ACTUAL.

PERFORM PTGA-BYEND.

PERFORM READ-FROM  GO TO F2-CARD.

FINISH-FPASS-2.

MOVE "EXIT." TO WURD, PERFORM PTGC.

EPASS2 SECTION 62.

START-EPASS-2.

IF HAVE-OUTTAB=1 MOVE "TABLE-OUTPUT SECTION 51." TO WURD
    PERFORM PTGA, MOVE "TO-BEGIN." TO WURD, PERFORM PTGA.

NECKST-E-SPEC.

IF FORM-TYPE="L" GO TO SECOND-PASS-OVER-L.

IF FORM-TYPE NOT="E" GO TO SECOND-PASS-OVER-I.

IF E-TABNAME1 NOT=SPACES MOVE E-TABNAME1 TO WURD, PERFORM
    GET-COPX  IF E-SEQUENCE1="D" MOVE 1 TO COPDEE(LL)
    ELSE MOVE 0 TO COPDEE(LL).

IF E-TABNAME2 NOT=SPACES MOVE E-TABNAME2 TO WURD PERFORM
    GET-COPX   IF E-SEQUENCE2 ="D" MOVE 1 TO COPDEE(LL)
    ELSE MOVE 0 TO COPDEE(LL).

IF E-TOFILE=SPACES OR E-TABNAME1=SPACES
    PERFORM READ-FROM, GO TO NECKST-E-SPEC.

MOVE "OPEN OUTPUT" TO WURD, PERFORM PTGC.

MOVE E-TOFILE TO WURD, PERFORM GLUE-FN, PERFORM GLUE-DOT.

E-WYTH-SAME-FILENAME.

MOVE 1 TO KSAVE.

MOVE "MOVE 0 TO" TO WURD, PERFORM PTGC.

MOVE E-TABNAME1 TO SYMBOL, PERFORM GLUE-TABPT-CX.
```

```
IF E-TABNAME2 NOT=SPACES
    MOVE E-TABNAME2 TO SYMBOL, PERFORM GLUE-TABPT-CX.
PERFORM GLUE-DOT. ADD 1 TO BIE-NO, PERFORM PTGA-BIENO.
MOVE "MOVE SPACES TO IR-" TO WURD, PERFORM PTGC.
MOVE STMT-NO TO WURD. PERFORM GLUE-STRING, PERFORM GLUE-DOT.
ADD 1 TO BYE-NO.
MOVE-INN-NEXT-TABENTRY.
MOVE "IF" TO WURD, PERFORM PTGC.
MOVE E-TABNAME1 TO SYMBOL, PERFORM GLUE-TABPT-CX.
MOVE "NOT <" TO WURD, PERFORM GLUE.
MOVE E-NENTRIES-TAB TO WURD, PERFORM GLUE.
MOVE "GO TO" TO WURD. PERFORM GLUE.
PERFORM GLUE-BYENO, PERFORM GLUE-DOT.
MOVE "ADD 1 TO" TO WURD, PERFORM PTGC.
MOVE E-TABNAME1 TO SYMBOL PERFORM GLUE-TABPT-CX PERFORM GLUE-DOT.
MOVE "MOVE" TO WURD, PERFORM PTGC.
MOVE E-TABNAME1 TO WURD1, PERFORM GLUE-TAB.
MOVE "TO" TO WURD, PERFORM GLUE.
MOVE E-TABNAME1 TO WURD1, IMP-OBJECT, PERFORM GLUE-CX,
    PERFORM GLUE-DOT.
IF E-PACKED1="P" MOVE "IT" TO SYMOP
    PERFORM E-MOVE-TAB-OUT  GO TO TAB-DUN-1.
MOVE "MOVE" TO WURD, PERFORM PTGC.
MOVE E-TABNAME1 TO WURD1, PERFORM GLUE-CX.
MOVE "TO IT-" TO WURD, PERFORM GLUE.
MOVE STMT-NO TO WURD. PERFORM GLUE-STRING.
MOVE "(" TO WURD, PERFORM GLUE.
PERFORM GLUE-ENTNUM.
MOVE ")." TO WURD. PERFORM GLUE-STRING.
TAB-DUN-1.
```

```
IF E-TABNAME2 = SPACES GO TO ONLY-WUN-TABLE.

MOVE "ADD 1 TO" TO WURD, PERFORM PTGC.

MOVE E-TABNAME2 TO SYMBOL, PERFORM GLUE-TABPT-CX, PERFORM GLUE-D
    OT.

MOVE "MOVE" TO WURD, PERFORM PTGC.

MOVE E-TABNAME2 TO WURD1, PERFORM GLUE-TAB.

MOVE "TO" TO WURD, PERFORM GLUE.

MOVE E-TABNAME2 TO WURD1, IMP-OBJECT,

PERFORM GLUE-CX, PERFORM GLUE-DOT.

IF E-PACKED2="P" MOVE "IU" TO SYMOP

PERFORM E-MOVE-TAB-OUT GO TO ONLY-WUN-TABLE.

MOVE "MOVE" TO WURD, PERFORM PTGC.

MOVE E-TABNAME2 TO WURD1, PERFORM GLUE-CX.

MOVE "TO IU-" TO WURD, PERFORM GLUE.

MOVE STMT-NO TO WURD, PERFORM GLUE-STRING.

MOVE "(" TO WURD, PERFORM GLUE.

PERFORM GLUE-ENTNUM.

MOVE ")." TO WURD, PERFORM GLUE-STRING.

ONLY-WUN-TABLE.

ADD 1 TO KSAVE.

IF KSAVE NOT> E-NENTRIES-REC GO TO MOVE-INN-NEXT-TABENTRY.

PERFORM PTGA-BYEND.

MOVE "MOVE IR-" TO WURD, PERFORM PTGC.

MOVE STMT-NO TO WURD, PERFORM GLUE-STRING.

MOVE "TO" TO WURD, PERFORM GLUE.

MOVE E-TOFILE TO WURD1, PERFORM GLUE-CX, PERFORM GLUE-DOT.

MOVE "WRITE" TO WURD, PERFORM PTGC.

MOVE E-TOFILE TO WURD1, PERFORM GLUE-CX, PERFORM GLUE-DOT.

MOVE "IF" TO WURD, PERFORM PTGC.

MOVE E-TABNAME1 TO SYMBOL, PERFORM GLUE-TABPT-CX.
```

```
MOVE "<" TO WURD, PERFORM GLUE.

MOVE E-NENTRIES-TAB TO WURD, PERFORM GLUE.

MOVE "GO TO" TO WURD, PERFORM PTGC.

PERFORM GLUE-BIENO. PERFORM GLUE-DOT.

MOVE E-TOFILE TO FILE-NAME PERFORM READ-FROM.

IF FORM-TYPE="E" AND E-TOFILE=FILE-NAME
    GO TO E-WYTH-SAME-FILENAME.

MOVE "CLOSE" TO WURD, PERFORM PTGC.

MOVE FILE-NAME TO WURD, PERFORM GLUE-FN.

IF OBJECT-MACHINE>5 MOVE "WITH RELEASE" TO WURD, PERFORM GLUE.

PERFORM GLUE-DOT.

GO TO NECKST-E-SPEC.

GLUE-ENTNUM.

IF OBJECT-MACHINE NOT>5 AND KSAVE<100 MOVE KSAVE TO J
    MOVE J TO WURD ELSE MOVE KSAVE TO WURD.

PERFORM GLUE.

E-MOVE-TAB-OUT.

MOVE "MOVE" TO WURD, PERFORM PTGC.

MOVE IMP-OBJECT TO WURD1, PERFORM GLUE-CX.

MOVE "TO BODY OF" TO WURD, PERFORM GLUE.

MOVE SYMOP TO WURD, PERFORM GLUE.

MOVE "-" TO WURD, PERFORM GLUE-STRING.

MOVE STMT-NO TO WURD, PERFORM GLUE-STRING.

MOVE "(" TO WURD, PERFORM GLUE-STRING.

MOVE KSAVE TO WURD, PERFORM GLUE-STRING.

MOVE ") IF" TO WURD, PERFORM GLUE-STRING.

MOVE IMP-OBJECT TO WURD1, PERFORM GLUE-CX.

MOVE "<0 MOVE @0@ TO SINE OF" TO WURD, PERFORM PTGC.

MOVE SYMOP TO WURD, PERFORM GLUE.

MOVE "-" TO WURD, PERFORM GLUE-STRING.
```

```
MOVE STMT-NO TO WURD, PERFORM GLUE-STRING.

MOVE "(" TO WURD, PERFORM GLUE.

MOVE KSAVE TO WURD, PERFORM GLUE.

MOVE ") ELSE MOVE @C@ TO SINE OF" TO WURD, PERFORM GLUE.

MOVE SYMOP TO WURD, PERFORM GLUE.

MOVE "-" TO WURD, PERFORM GLUE-STRING.

MOVE STMT-NO TO WURD, PERFORM GLUE-STRING.

MOVE "(" TO WURD, PERFORM GLUE-STRING.

MOVE KSAVE TO WURD, PERFORM GLUE-STRING.

MOVE ")." TO WURD, PERFORM GLUE-STRING.

LPASS2 SECTION 62.

SECOND-PASS-OVER-L.

NEXT-L-SPEC.

IF FORM-TYPE NOT ="L" GO TO SECOND-PASS-OVER-I.

IF L-FILENAME = SPACES PERFORM SET-COUNTERS-FROM-LSPEC
      VARYING LL FROM 1 BY 1 UNTIL LL>NFILES
      ELSE MOVE L-FILENAME TO WURD, PERFORM GET-COPX
      PERFORM SET-COUNTERS-FROM-LSPEC.

PERFORM READ-FROM  GO TO NEXT-L-SPEC.

SET-COUNTERS-FROM-LSPEC.

IF COPDEC(LL)="N"
      MOVE COPADD(LL) TO REL
      PERFORM SET-LCOUNTR VARYING IDX FROM 1 BY 1 UNTIL IDX>12.

SET-LCOUNTR.

IF L-CHANNELNO(IDX) NOT=SPACES MOVE L-CHANNELNO(IDX) TO I
      MOVE L-LINENO(IDX) TO LINE-COUNTER(PSEUDO-REL,I).

SECOND-PASS-OVER-I SECTION 52.

SPOI-BEGIN.

MOVE "INPUT-CHECK SECTION 52." TO WURD, PERFORM PTGA.

MOVE "IC-TOP." TO WURD, PERFORM PTGA.
```

```
MOVE 1 TO REC-NO.  MOVE 0 TO FIL-NO.
MOVE 0 TO PRIMARY-MATCHING-FILNO.
MOVE SPACES TO SAVE-FORGOTTEN.
MOVE SPACES TO FILE-NAME.
MOVE "99" TO SAVE-SEQNO.
MOVE "IF" TO WURD  PERFORM PTGC.
MOVE 0 TO HAVE-PRINTER.  MOVE 1 TO FORM-SUBTYPE.  PERFORM CHECK-A
    LL-FNDFILES-BLANK VARYING IDX FROM 1 BY 1 UNTIL IDX>NSAVE.
PERFORM GLUE-RECNO-EOF-CHECK VARYING IDX FROM 1 BY 1 UNTIL
    IDX>NSAVE.
MOVE "GO TO TEN." TO WURD.  PERFORM PTGC.
NEXT-I-SPEC.
IF FORM-TYPE NOT = "I"  GO TO FINISH-I-SPECS.
IF I-FILENAME NOT=SPACES AND I-FILENAME NOT= FILE-NAME
        PERFORM PUT-FILNO-CHECK
    MOVE "MOVE" TO WURD.  PERFORM PTGC
    MOVE I-FILENAME TO WURD1.  PERFORM GLUE-CX
    MOVE "TO IR-" TO WURD.  PERFORM GLUE
    MOVE STMT-NO TO STMT.  MOVE STMT TO WURD.
    PERFORM GLUE-STRING.  PERFORM GLUE-DOT.
MOVE I-FORGOTTEN TO SAVE-FORGOTTEN.
NEXT-IREC-SPEC.
IF I-FLDNAME NOT = SPACES  GO TO FINISH-ALL-REC-SPECS.
IF I-RESIND NOT=SPACES MOVE I-RESIND TO SAVE-RESIND.
IF RECID-CODES=SPACES  MOVE 1 TO FORM-SUBTYPE
        GO TO FINISH-THIS-REC-CARD ELSE MOVE 2 TO FORM-SUBTYPE.
PERFORM PUNCH-TO.
MOVE "IF" TO WURD.  PERFORM GLUE.
TRANSLATE-AND-INFO.
MOVE 0 TO HAVE-AND.
```

```
PERFORM PUT-RECID-CHECK VARYING IDX FROM 1 BY 1 UNTIL IDX>3.

FINISH-THIS-REC-CARD.

PERFORM READ-FROM.

IF I-SEQNO = "ND"
    MOVE "AND" TO WURD PERFORM GLUE GO TO TRANSLATE-AND-INFO.

PERFORM PUNCH-TO.

ADD 1 TO BYE-NO.

IF SAVE-RESIND=SPACES
    IF FORM-SUBTYPE=1 GO TO THRU-INPUT-FIELD-SPECS
    ELSE MOVE "NEXT SENTENCE" TO WURD, PERFORM GLUE
    GO TO NEED-ELSE.

MOVE "MOVE 1 TO " TO WURD, PERFORM GLUE.

MOVE SAVE-RESIND TO INDICNO PERFORM GLUE-INDIC-CX.

MOVE 0 TO HAVE-MATCH-THISREC.

IF FORM-SUBTYPE=1 PERFORM GLUE-DOT GO TO THRU-INPUT-FIELD-SPECS.

NEED-ELSE.

MOVE "ELSE" TO WURD, PERFORM GLUE    .

IF I-SEQNO="R " GO TO NEXT-IREC-SPEC.

FINISH-ALL-REC-SPECS.

MOVE "GO TO" TO WURD, PERFORM GLUE.

PERFORM GLUE-BYENO, PERFORM GLUE-DOT.

THRU-INPUT-FIELD-SPECS.

IF SAVE-ONEN="1" AND SAVE-SEQNO NUMERIC
    AND (REC-NO NOT=RECNO-3(FIL-NO) OR RECNO-2(FIL-NO) )
        MOVE "IF" TO WURD, PERFORM PTGC, PERFORM GLUE-RECNO
        MOVE "=" TO WURD, PERFORM GLUE
        MOVE REC-NO TO WURD, PERFORM GLUE
        MOVE "GO TO SEQ-ERR." TO WURD, PERFORM GLUE.

IF SAVE-SEQNO NUMERIC GO TO NUMERIC-SEQUENCE.

IF RECNO-1(FIL-NO)+2>RECNO-2(FIL-NO) GO TO DONE-SEQUENCE.
```

```
IF RECNO-2(FIL-NO)=99 GO TO DONE-SEQUENCE.
        MOVE "IF" TO WURD,  PERFORM PTGC,  PERFORM GLUE-RECNO
        MOVE ">" TO WURD,  PERFORM GLUE
        MOVE RECNO-1(FIL-NO) TO WURD,  PERFORM GLUE
        MOVE "AND <" TO WURD,  PERFORM GLUE
        MOVE RECNO-2(FIL-NO) TO WURD,  PERFORM GLUE
MOVE "GO TO SEQ-ERR." TO WURD,  PERFORM GLUE.
GO TO DONE-SEQUENCE.
NUMERIC-SEQUENCE.
IF REC-NO+2>RECNO-2(FIL-NO) GO TO DONE-SEQUENCE.
IF RECNO-2(FIL-NO)=99 GO TO DONE-SEQUENCE.
MOVE "IF" TO WURD,  PERFORM PTGC,  PERFORM GLUE-RECNO.
        MOVE ">" TO WURD,  PERFORM GLUE
        MOVE REC-NO TO WURD,  PERFORM GLUE
     MOVE "AND <" TO WURD,  PERFORM GLUE
     MOVE RECNO-2(FIL-NO) TO WURD,  PERFORM GLUE
        MOVE "GO TO SEQ-ERR." TO WURD,  PERFORM GLUE.
DONE-SEQUENCE.
IF HAVE-MATCH=1 MOVE "MOVE 0 TO SW3-MR ." TO WURD PERFORM PTGC.
MOVE SPACES TO SAVE-RELATION.
MOVE 0 TO HOLDPOS.
THRU-ONE-LEVEL.
IF FORM-TYPE NOT="I" OR I-FLDNAME=SPACES GO TO FINISH-THIS-REC.
IF I-CTLLEVEL NOT= SAVE-CTLLEVEL OR I-RELATION NOT=
     SAVE-RELATION  PERFORM FINISH-THIS-LEVEL.
IF I-RELATION NOT=SAVE-RELATION AND NOT=SPACES
     PERFORM MAYBE-SET-MATCHSWITCH.
PERFORM MAYBE-RELATION-IF.
COMPUTE DISP=I-FROM - 1,  COMPUTE WIDTH=I-TO - I-FROM + 1.
IF I-MC="M" AND PRIMARY-MATCHING-FILNO=0
```

```
        MOVE FIL-NO TO PRIMARY-MATCHING-FILNO.
IF I-MC NOT="M" GO TO NO-MATCH-MOVE.
        MOVE 1 TO HAVE-MATCH-THISREC
        MOVE "HLD-" TO SYMBOL, MOVE I-MATCHCHAIN TO SYM56
        MOVE SPACES TO I-MATCHCHAIN
        MOVE "MOVE" TO WURD, PERFORM PTGC
IF I-PACKED ="P" MOVE "BODY OF" TO WURD, PERFORM GLUE.
        PERFORM GLUE-IF-CX
        MOVE "TO" TO WURD, PERFORM GLUE
     MOVE SYMBOL TO WURD1, PERFORM GLUE-CX, PERFORM GLUE-DOT.
NO-MATCH-MOVE.
IF I-CTLLEVEL=SPACES GO TO BLANK-CTL.
MOVE "COM-" TO SYMBOL, MOVE I-CTLLEVEL TO SYM56.
MOVE "MOVE" TO WURD, PERFORM PTGC.
IF I-PACKED="P" MOVE "BODY OF" TO WURD, PERFORM GLUE.
PERFORM GLUE-IF-CX.
MOVE "TO" TO WURD, PERFORM GLUE.
MOVE SYMBOL TO WURD1, PERFORM GLUE-CX.
MOVE "-" TO WURD, PERFORM GLUE-STRING.
    MOVE HOLDPOS TO WURD, PERFORM GLUE-STRING.
PERFORM GLUE-DOT.
MOVE I-FLDNAME TO WURD, PERFORM GET-COPX.
COMPUTE HOLDPOS=HOLDPOS+COPLEN(L).
BLANK-CTL.
MOVE I-RELATION TO SAVE-RELATION.
MOVE I-CTLLEVEL TO SAVE-CTLLEVEL.
PERFORM READ-FROM GO TO THRU-ONE-LEVEL.
FINISH-THIS-LEVEL.
IF HOLDPOS NOT=0
    MOVE 0 TO HOLDPOS
```

```
        MOVE "IF" TO WURD, PERFORM PTGC
        MOVE "COM-" TO SYMBOL, MOVE SAVE-CTLLEVEL TO SYM56
        MOVE SYMBOL TO WURD1, PERFORM GLUE-CX
        MOVE "NOT =" TO WURD, PERFORM GLUE
        MOVE "HLD-" TO SYMBOL, MOVE SAVE-CTLLEVEL TO SYM56
        MOVE SYMBOL TO WURD1, PERFORM GLUE-CX
        MOVE "MOVE" TO WURD, PERFORM GLUE
        MOVE SAVE-LEVNO TO WURD, PERFORM GLUE
        MOVE "TO PAR-AM PERFORM CTL-BREAK." TO WURD PERFORM PTGC
        IF SAVE-LEVNO > MAX-LEVNO MOVE SAVE-LEVNO TO MAX-LEVNO.
FINISH-THIS-REC.
PERFORM FINISH-THIS-LEVEL.
PERFORM MAYBE-SET-MATCHSWITCH.
IF SAVE-RELATION NOT = SPACES PERFORM PTGA-BIENO.
IF HAVE-MATCH=1
    MOVE FILE-NAME TO WURD, PERFORM GET-COPX
    IF COPADD(LL) NOT="C"
    MOVE "IF SW3-MR = 0 MOVE 0 TO SW1-MR" TO WURD, PERFORM PTGC
    MOVE "ELSE IF HLD-MM NOT = COM-MM" TO WURD PERFORM PTGC
    MOVE "PERFORM MATCH-RECORD GO TO" TO WURD, PERFORM PTGC
    PERFORM GLUE-BIYNO, PERFORM GLUE-DOT.
PERFORM PUNCH-TO, MOVE "MOVE" TO WURD, PERFORM GLUE.
MOVE REC-NO TO WURD, PERFORM GLUE.
MOVE "TO" TO WURD, PERFORM GLUE.
PERFORM GLUE-RECNO.
PERFORM GLUE-DOT.
MOVE "GO TO IC-DONE." TO WURD, PERFORM PTGC.
PERFORM PTGA-BYENO.
IF SAVE-OPTIONAL = " " AND SAVE-SEQNO NUMERIC
        MOVE "IF" TO WURD, PERFORM PTGC
```

```
        PERFORM GLUE-RECNO
    MOVE "<" TO WURD,  PERFORM GLUE
        MOVE REC-NO TO WURD,  PERFORM GLUE
        MOVE "GO TO SEQ-ERR." TO WURD,  PERFORM GLUE .
ADD 1 TO REC-NO.
MOVE SPACES TO SAVE-FORGOTTEN.
GO TO NEXT-I-SPEC.
MAYBE-SET-MATCHSWITCH.
IF HAVE-MATCH-THISREC=1
    MOVE "MOVE 1 TO SW3-MR ." TO WURD,  PERFORM PTGC
    MOVE 0 TO HAVE-MATCH-THISREC.
GLUE-ORHEX.
MOVE """" TO WURD,  PERFORM GLUE.
MOVE REL TO WURD,  PERFORM GLUE-STRING.
MOVE """" TO WURD,  PERFORM GLUE-STRING.
MAYBE-RA-FILE.
IF COPADD(LL) NOT=" " AND <"A" MOVE COPADD(LL) TO REL
    MOVE PSEUDO-REL TO LL
    IF LL>50 SUBTRACT 50 FROM LL
    IF LL>20 SUBTRACT 20 FROM LL.
CHECK-ALL-ENDFILES-BLANK.
MOVE SAVEDIX(IDX) TO LL.
PERFORM MAYBE-RA-FILE.
IF COPEOF(LL)="E" MOVE 1 TO HAVE-PRINTER.
MAYBE-RELATION-IF.
IF SAVE-RELATION NOT=I-RELATION AND SAVE-RELATION NOT=SPACES
    IF COBOL-SEQNO=HOLD-STMT-NO PERFORM UNGLUE
    ELSE PERFORM PTGA-BIENO.
IF I-RELATION NOT=SAVE-RELATION AND I-RELATION NOT=SPACES
    MOVE "IF" TO WURD,  PERFORM PTGC
```

```
        MOVE COBOL-SEQNO TO HOLD-STMT-NO
        MOVE I-RELATION TO INDICNO,  PERFORM GLUE-INDIC-CX
        MOVE "= 0 GO TO" TO WURD,  PERFORM GLUE
        ADD 1 TO BIE-NO, PERFORM GLUE-BIENO, PERFORM GLUE-DOT.
UNGLUE.
MOVE SPACES TO TO-LINE,  MOVE 11 TO NTC.
GLUE-RECNO.
MOVE "REC-NO (" TO WURD,  PERFORM GLUE.
MOVE FIL-NO TO WURD,  PERFORM GLUE.
MOVE ")" TO WURD,  PERFORM GLUE.
GLUE-ART-IMPFLD.
MOVE "DX-" TO WURD,  PERFORM GLUE.
MOVE FILE-NAME TO WURD,  PERFORM GET-COPX.
MOVE LL TO WURD,  PERFORM GLUE-STRING.
MOVE "(" TO WURD,  PERFORM GLUE.
IF OBJECT-MACHINE NOT>5 AND DISP<100 MOVE DISP TO J
        MOVE J TO WURD ELSE MOVE DISP TO WURD.
PERFORM GLUE.
MOVE ")" TO WURD,  PERFORM GLUE.
PUT-FILNO-CHECK.
IF FILE-NAME NOT=SPACES MOVE "GO TO IDENT-ERR." TO WURD
        PERFORM PTGC  PERFORM PTGA-BIYNO.
IF I-FILENAME NOT=SPACES MOVE I-FILENAME TO FILE-NAME.
MOVE "IF FIL-NO NOT =" TO WURD,  PERFORM PTGC.
ADD 1 TO FIL-NO, MOVE FIL-NO TO WURD,  PERFORM GLUE.
MOVE "GO TO" TO WURD,  PERFORM GLUE.
ADD 1 TO BIY-NO, PERFORM GLUE-BIYNO, PERFORM GLUE-DOT.
MOVE 1 TO REC-NO.
MOVE FILE-NAME TO WURD,  PERFORM GET-COPX.
IF COPADD(LL)="C" MOVE "IF CHN-SV =0" TO WURD PERFORM PTGC
```

```
    ELSE MOVE "IF" TO WURD,  PERFORM PTGC
    PERFORM GLUE-RECNO
    MOVE "= 99" TO WURD,  PERFORM GLUE.
MOVE "ADD 1 TO FIL-NO GO TO" TO WURD,  PERFORM PTGC.
PERFORM GLUE-BIYNO.  PERFORM GLUE-DOT.
GLUE-RECNO-EOF-CHECK SECTION 52.
GREC-BEGIN.
MOVE SAVEDIX(IDX) TO LL.
PERFORM MAYBE-RA-FILE.
IF COPEOF(LL) = SPACES
    IF HAVE-PRINTER=1 OR COPADD(LL)="C" GO TO GREC-EXIT.
IF FORM-SUBTYPE=2 MOVE "AND" TO WURD PERFORM GLUE.
MOVE 2 TO FORM-SUBTYPE.
MOVE "REC-NO" TO WURD1,  PERFORM GLUE-CX.
MOVE "(" TO WURD,  PERFORM GLUE.
MOVE IDX TO J, MOVE J TO WURD,  PERFORM GLUE-STRING.
MOVE ") = 99" TO WURD,  PERFORM GLUE.
GREC-EXIT.
EXIT.
PUT-RECID-CHECK SECTION 52.
PRC-BEGIN.
IF RECID-CODE(IDX) = SPACES  GO TO PRC-EXIT.
IF HAVE-AND=1 MOVE "AND" TO WURD,  PERFORM PTGC.
MOVE 1 TO HAVE-AND.
IF KNOT(IDX) = "N"  MOVE "NOT" TO WURD,  PERFORM GLUE.
MOVE "(" TO WURD,  PERFORM GLUE.
MOVE POSN(IDX) TO DISP,  PERFORM GLUE-ART-IMPFLD.
IF CZD(IDX) NOT="C" GO TO NOTC.
MOVE "= """ TO WURD,  PERFORM GLUE.
MOVE ICHAR(IDX) TO WURD,  PERFORM GLUE-STRING.
```

```
IF WURD=SPACES PERFORM GLUE.
MOVE """" TO WURD, PERFORM GLUE-STRING.
NOTC.
IF CZD(IDX) NOT = "Z"  GO TO NOTZ.
IF ICHAR(IDX) ="&" OR NOT<"+" AND NOT>"
    "=""&"" OR NOT<""+"" AND NOT>""
    ELSE IF ICHAR(IDX)="-" OR NOT<"x" AND NOT>"?" MOVE
    "=""-"" OR NOT<""x"" AND NOT>""?""" TO WURD PERFORM GLUE
    ELSE IF ICHAR(IDX)=" " OR NOT<"0" AND NOT>"?" MOVE
    "=""" "" OR NOT<""0"" AND NOT>""?""" TO WURD PERFORM GLUE
    ELSE MOVE "NOT<" TO WURD,  PERFORM GLUE
    MOVE ICHAR(IDX) TO REL
    MOVE @0@ TO REL-DIGIT,  PERFORM GLUE-ORHEX
    MOVE "AND NOT>" TO WURD,  PERFORM GLUE
    MOVE @F@ TO REL-DIGIT,  PERFORM GLUE-ORHEX.
NOTZ.
IF CZD(IDX) = "D"  MOVE "=" TO WURD,  PERFORM GLUE
        MOVE ICHAR(IDX) TO REL-DIGIT
        MOVE @C@ TO REL-ZONE,  PERFORM GLUE-ORHEX
    MOVE "OR" TO WURD,  PERFORM GLUE
        MOVE @D@ TO REL-ZONE,  PERFORM GLUE-ORHEX
    MOVE "OR" TO WURD,  PERFORM GLUE
        MOVE @E@ TO REL-ZONE,  PERFORM GLUE-ORHEX
    MOVE "OR" TO WURD,  PERFORM GLUE
        MOVE @F@ TO REL-ZONE,  PERFORM GLUE-ORHEX  .
MOVE ")" TO WURD,  PERFORM GLUE.
PRC-EXIT.
EXIT.
FINISH-I-SPECS SECTION 63.
FIS-BEGIN.
```

```
MOVE "GO TO IDENT-ERR." TO WURD,  PERFORM PTGC.

PERFORM PTGA-BIYNO.

IF HAVE-MATCH=0  GO TO NO-MATCH.

MOVE "MOVE COM-SV TO COM-MM ."           TO WURD PERFORM PTGC.

MOVE "MOVE 0 TO FIL-SV ."                TO WURD PERFORM PTGC.

IF DEESENDING=1 MOVE "MOVE LOW-VALUE" TO WURD
        ELSE MOVE "MOVE HIGH-VALUE" TO WURD.

PERFORM PTGC, MOVE "TO COM-SV ." TO WURD,  PERFORM PTGC.

MOVE "MOVE SW2-MR TO SW1-MR ."           TO WURD PERFORM PTGC.

MOVE "MOVE 0 TO SW2-MR ."                TO WURD PERFORM PTGC.

NO-MATCH.

MOVE "MOVE 1 TO FIL-NO GO TO IC-TOP." TO WURD,  PERFORM PTGC.

IF HAVE-MATCH=0  GO TO NO-MACH.

MOVE "MATCH-RECORD." TO WURD,  PERFORM PTGA.

MOVE "IF HLD-MM " TO WURD,  PERFORM PTGC.

IF DEESENDING=1 MOVE ">" TO WURD ELSE MOVE "<" TO WURD.

PERFORM GLUE.

MOVE "COM-MM DISPLAY ""MSEQ""" TO WURD,  PERFORM PTGC.

MOVE "GO TO RECOVER." TO WURD,  PERFORM PTGC.

MOVE "IF FIL-SV NOT = 0 AND" TO WURD,  PERFORM PTGC.

MOVE "FIL-SV NOT = FIL-NO" TO WURD,  PERFORM GLUE.

MOVE "AND (" TO WURD,  PERFORM PTGC.

MOVE PRIMARY-MATCHING-FILNO TO WURD,  PERFORM GLUE.

MOVE "= FIL-SV OR FIL-NO )" TO WURD,  PERFORM GLUE.

MOVE "AND HLD-MM = COM-SV MOVE 1 TO SW2-MR ." TO WURD PERFORM
        PTGC, MOVE "IF HLD-MM " TO WURD  PERFORM PTGC.

IF DEESENDING=1 MOVE ">" TO WURD ELSE MOVE "<" TO WURD.

PERFORM GLUE, MOVE " COM-SV MOVE HLD-MM TO COM-SV " TO WURD
        PERFORM PTGC.

MOVE "MOVE FIL-NO TO FIL-SV ."           TO WURD PERFORM PTGC.
```

```
MOVE "PERFORM OFF-INDICS." TO WURD, PERFORM PTGC.
MOVE "ADD 1 TO FIL-NO ."                    TO WURD PERFORM PTGC.
NO-MACH.
MOVE "SEQ-ERR." TO WURD, PERFORM PTGA.
IF 1=HAVE-CHAIN OR HAVE-CHAIN-CALC MOVE
    "IF CHN-SV NOT=0 GO TO IC-DONE." TO WURD, PERFORM PTGC.
MOVE "DISPLAY ""SEQ""." TO WURD, PERFORM PTGC.
MOVE "GO TO RECOVER." TO WURD, PERFORM PTGC.
MOVE "IDENT-ERR." TO WURD, PERFORM PTGA.
MOVE "DISPLAY ""IDENT""." TO WURD, PERFORM PTGC.
MOVE "RECOVER." TO WURD, PERFORM PTGA.
MOVE "ACCEPT PAR-AM ." TO WURD, PERFORM PTGC.
MOVE "IF PAR-AM NOT < ""STOP"" GO TO TEN."
    TO WURD, PERFORM PTGC.
MOVE "PERFORM INPUT-READ THRU IR-DONE." TO WURD, PERFORM PTGC.
MOVE "GO TO ELEVEN." TO WURD, PERFORM PTGC.
MOVE "IC-DONE." TO WURD, PERFORM PTGA.
MOVE "EXIT." TO WURD, PERFORM PTGC.
MOVE "IC-EXIT." TO WURD, PERFORM PTGA.
MOVE "GO TO NINETEEN." TO WURD, PERFORM PTGC.
IF 0=HAVE-CHAIN AND HAVE-CHAIN-CALC GO TO NO-CHAIN.
MOVE "GET-CHAIN SECTION 52." TO WURD, PERFORM PTGA.
MOVE "GC-BEGIN." TO WURD, PERFORM PTGA.
MOVE "MOVE FIL-NO TO CHN-SV ." TO WURD, PERFORM PTGC.
MOVE "GC-TOP." TO WURD, PERFORM PTGA.
IF HAVE-CHAIN-CALC=0 GO TO DONT-NEED-CHN-CHECK.
MOVE "IF CHN-NO =99 MOVE 0 TO CHN-NO " TO WURD, PERFORM PTGC.
IF CHAINLEV-FILENAME-LINKS NOT=ZEROES
    MOVE "MOVE SPACES TO" TO WURD, PERFORM PTGC
    PERFORM GLUE-CHOLD VARYING IDX FROM 1 BY 1 UNTIL IDX>9.
```

```
MOVE "GO TO GC-DONE." TO WURD, PERFORM PTGC.

DONT-NEED-CHN-CHECK.

MOVE 1 TO L1.

NEW-CHAINED-FILE.

IF CCPADD(L1) NOT="C" GO TO NOT-THIS-LEVEL.

PERFORM DUMMY VARYING FIL-NO FROM 1 BY 1 UNTIL FIL-NO>NSAVE
    OR SAVEDIX(FIL-NO)=L1.

IF FIL-NO>NSAVE GO TO NOT-THIS-LEVEL.

MOVE COPNAME(L1) TO FILE-NAME.

MOVE L1 TO NUM-SYM3456, MOVE "CHN-" TO SYM1234.

MOVE SYMBOL TO COPNAM1.

MOVE 0 TO HAVE-AND.

PERFORM PUT-CHOLD-CHECKS VARYING IDX FROM 1 BY 1 UNTIL IDX>9.

IF HAVE-CHAIN-CALC=0 GO TO DONT-NEED-CHAIN-CHECK.

IF HAVE-AND=1 MOVE "ELSE" TO WURD, PERFORM PTGC.

MOVE 1 TO HAVE-AND.

MOVE "IF CHN-NO =" TO WURD, PERFORM PTGC.

MOVE L1 TO WURD, PERFORM GLUE.

MOVE "MOVE 99 TO CHN-NO" TO WURD, PERFORM GLUE.

DONT-NEED-CHAIN-CHECK.

IF HAVE-AND=1 MOVE "ELSE" TO WURD, PERFORM PTGC.

MOVE "GO TO" TO WURD, PERFORM GLUE.

ADD 1 TO BIY-NO PERFORM GLUE-BIYNO PERFORM GLUE-DOT.

MOVE "MOVE" TO WURD, PERFORM PTGC.

MOVE FIL-NO TO WURD, PERFORM GLUE.

MOVE "TO FIL-NO ." TO WURD, PERFORM PTGC.

MOVE "MOVE 0 TO REC-NO ( FIL-NO )." TO WURD, PERFORM PTGC.

MOVE SAVEDIX(FIL-NO) TO LL, MOVE COPNAME(LL) TO FILE-NAME.

MOVE LL TO L1.

MOVE "MOVE 0 TO BIN-LO COMPUTE BIN-HI =MX-" TO WURD PERFORM PTGC.
```

```
MOVE L1 TO WURD, PERFORM GLUE-STRING.
MOVE "/NP-" TO WURD, PERFORM GLUE.
MOVE L1 TO WURD, PERFORM GLUE-STRING.
MOVE "+2." TO WURD, PERFORM GLUE.
ADD 1 TO BIE-NO, PERFORM PTGA-BIENO.
MOVE "COMPUTE KE-" TO WURD, PERFORM PTGC.
MOVE L1 TO WURD, PERFORM GLUE-STRING.
MOVE "=( BIN-LO + BIN-HI )/2." TO WURD, PERFORM PTGC.
MOVE "IF" TO WURD, PERFORM PTGC.
MOVE COPNAM1 TO WURD1, PERFORM GLUE-CX.
MOVE ">OK-" TO WURD, PERFORM GLUE.
MOVE L1 TO WURD, PERFORM GLUE-STRING.
MOVE "(KE-" TO WURD, PERFORM GLUE.
MOVE L1 TO WURD, PERFORM GLUE-STRING.
MOVE ") MOVE KE-" TO WURD, PERFORM GLUE.
MOVE L1 TO WURD, PERFORM GLUE-STRING.
MOVE "TO BIN-LO ELSE MOVE KE-" TO WURD, PERFORM PTGC.
MOVE L1 TO WURD, PERFORM GLUE-STRING.
MOVE "TO BIN-HI ." TO WURD, PERFORM PTGC.
MOVE "IF BIN-LO +2 NOT> BIN-HI GO TO" TO WURD PERFORM PTGC.
PERFORM GLUE-BIENO, PERFORM GLUE-DOT.
MOVE "COMPUTE BIN-HI = BIN-HI*NP-" TO WURD, PERFORM PTGC.
MOVE L1 TO WURD, PERFORM GLUE-STRING.
MOVE "+1." TO WURD, PERFORM GLUE.
MOVE "IF BIN-HI >MX-" TO WURD, PERFORM PTGC.
MOVE L1 TO WURD, PERFORM GLUE-STRING.
MOVE "COMPUTE BIN-HI =MX-" TO WURD, PERFORM PTGC.
MOVE L1 TO WURD, PERFORM GLUE-STRING.
MOVE "+1." TO WURD, PERFORM GLUE.
MOVE "COMPUTE BIN-LO = BIN-LO*NP-" TO WURD, PERFORM PTGC.
```

```
MOVE L1 TO WURD, PERFORM GLUE-STRING, PERFORM GLUE-DOT.
ADD 1 TO BIE-NO, PERFORM PTGA-BIENO.
MOVE "COMPUTE KE-" TO WURD, PERFORM PTGC.
MOVE L1 TO WURD, PERFORM GLUE-STRING.
MOVE "=( BIN-LO + BIN-HI )/2." TO WURD, PERFORM PTGC.
MOVE "READ" TO WURD, PERFORM PTGC.
MOVE FILE-NAME TO WURD, PERFORM GLUE-FN, PERFORM GLUE-DOT.
MOVE "IF" TO WURD, PERFORM PTGC.
MOVE COPNAM1 TO WURD1, PERFORM GLUE-CX.
MOVE ">KX-" TO WURD, PERFORM GLUE.
MOVE L1 TO WURD, PERFORM GLUE-STRING.
MOVE "MOVE KE-" TO WURD, PERFORM GLUE.
MOVE L1 TO WURD, PERFORM GLUE-STRING.
MOVE "TO BIN-LO ELSE IF" TO WURD, PERFORM PTGC.
MOVE COPNAM1 TO WURD1, PERFORM GLUE-CX.
MOVE "<KX-" TO WURD, PERFORM GLUE.
MOVE L1 TO WURD, PERFORM GLUE-STRING.
MOVE "MOVE KE-" TO WURD, PERFORM GLUE.
MOVE L1 TO WURD, PERFORM GLUE-STRING.
MOVE "TO BIN-HI ELSE GO TO" TO WURD, PERFORM PTGC.
ADD 1 TO BYE-NO, PERFORM GLUE-BYENO, PERFORM GLUE-DOT.
MOVE "IF BIN-LO > BIN-HI STOP 1" TO WURD, PERFORM PTGC.
MOVE "ELSE IF BIN-LO +2 NOT> BIN-HI GO TO" TO WURD PERFORM PTGC.
PERFORM GLUE-BIENO, PERFORM GLUE-DOT.
MOVE "MOVE HX-" TO WURD, PERFORM PTGC.
MOVE L1 TO WURD, PERFORM GLUE-STRING.
MOVE "TO KE-" TO WURD, PERFORM GLUE.
MOVE L1 TO WURD, PERFORM GLUE-STRING, PERFORM GLUE-DOT.
ADD 1 TO BIE-NO, PERFORM PTGA-BIENO.
MOVE "ADD 1 TO KE-" TO WURD, PERFORM PTGC.
```

```
MOVE L1 TO WURD, PERFORM GLUE-STRING. PERFORM GLUE-DOT.
MOVE "READ" TO WURD , PERFORM PTGC.
MOVE FILE-NAME TO WURD, PERFORM GLUE-FN..
MOVE "INVALID GO TO GC-TOP." TO WURD, PERFORM GLUE .
MOVE "IF" TO WURD, PERFORM PTGC.
MOVE COPNAM1 TO WURD1, PERFORM GLUE-CX.
MOVE "NOT=KX=" TO WURD, PERFORM GLUE.
MOVE L1 TO WURD, PERFORM GLUE-STRING .
MOVE "GO TO" TO WURD, PERFORM GLUE.
PERFORM GLUE-BIEND, PERFORM GLUE-DOT.
PERFORM PTGA-BYEND.
MOVE "PERFORM INPUT-CHECK THRU IC-DONE," TO WURD PERFORM PTGC.
MOVE "IF REC-NO ( FIL-NO ) NOT=0" TO WURD, PERFORM PTGC.
MOVE "PERFORM INPUT-MOVE." TO WURD, PERFORM GLUE.
MOVE "GO TO GC-TOP." TO WURD, PERFORM PTGC.
PERFORM PTGA-BIYND.
NOT-THIS-LEVEL.
ADD 1 TO L1  IF L1 NOT>NFILES GO TO NEW-CHAINED-FILE.
IF HAVE-CHAIN-CALC=1 MOVE "GC-DONE." TO WURD, PERFORM PTGA.
MOVE "MOVE CHN-SV TO FIL-NO ." TO WURD, PERFORM PTGC.
MOVE "MOVE 0 TO CHN-SV ." TO WURD, PERFORM PTGC.
MOVE "GC-EXIT." TO WURD, PERFORM PTGA.
MOVE "EXIT." TO WURD, PERFORM PTGC.
NO-CHAIN.
IF MAX-LEVNO=0 GO TO NO-CTL-LEVELS-USED.
MOVE "CTL-BREAK SECTION 52." TO WURD, PERFORM PTGA.
MOVE "CB-BEGIN." TO WURD, PERFORM PTGA.
MOVE "GO TO" TO WURD, PERFORM PTGC.
MOVE 0 TO HAVE-AND.
PERFORM GLUE-CTL-LABEL VARYING KSAVE FROM 1 BY 1 UNTIL KSAVE >
```

```
        MAX-LEVNO.
MOVE MAX-LEVNO TO KSAVE  PERFORM GLUE-CTL-LABEL.
MOVE "DEPENDING ON" TO WURD,  PERFORM GLUE.
MOVE "PAR-AM" TO WURD1,  PERFORM GLUE-CX.
PERFORM GLUE-DOT.
PERFORM PUT-CTL-SET-PARA VARYING KSAVE FROM MAX-LEVNO BY -1
        UNTIL KSAVE = 0.
GO TO NO-CTL-LEVELS-USED.
PUT-CHOLD-CHECKS.
IF CHAINED-FILE-IX(IDX)=L1 PERFORM PUT-CHOLD-CHECK.
PUT-CHOLD-CHECK.
IF HAVE-AND =1 MOVE "ELSE" TO WURD,  PERFORM PTGC.
MOVE 1 TO HAVE-AND.
MOVE "IF" TO WURD,  PERFORM PTGC.
PERFORM GLUE-CHOLD.
MOVE "NOT=SPACES MOVE" TO WURD,  PERFORM GLUE.
PERFORM GLUE-CHOLD.
MOVE "TO" TO WURD,  PERFORM GLUE.
MOVE COPNAM1 TO WURD1,  PERFORM GLUE-CX.
MOVE "MOVE SPACES TO" TO WURD,  PERFORM PTGC.
PERFORM GLUE-CHOLD.
GLUE-CHOLD.
IF CHAINED-FILE-IX(IDX) NOT=0
    MOVE "HLD-C" TO SYMBOL,  MOVE IDX TO NUM-SYM6
    MOVE SYMBOL TO WURD1,  PERFORM GLUE-CX.
GLUE-CTL-LABEL.
IF HAVE-AND=1 MOVE "," TO WURD,  PERFORM GLUE.
MOVE 1 TO HAVE-AND.
MOVE "CB-" TO SYMBOL,  MOVE KSAVE TO NUM-SYM456.
MOVE SYMBOL TO WURD,  PERFORM GLUE.
```

```
PUT-CTL-SET-PARA.

MOVE "CB-" TO SYMBOL,  MOVE KSAVE TO NUM-SYM456.

MOVE SYMBOL TO WURD,  PERFORM PTGA.

PERFORM GLUE-DOT.

MOVE "MOVE 1 TO" TO WURD,  PERFORM PTGC.

MOVE "L" TO INDICNO-1,  MOVE KSAVE TO INDICNO-2.

PERFORM GLUE-INDIC-CX.

PERFORM GLUE-DOT.

FINFIN-ISPECS SECTION 55.

NO-CTL-LEVELS-USED.

MOVE "INPUT-READ SECTION 52." TO WURD,  PERFORM PTGA.

ADD 1 TO BYE-NO,  PERFORM PTGA-BYENO.

MOVE 1 TO FIL-NO.

NEXT-FILNO.

MOVE SAVEDIX(FIL-NO) TO I,  MOVE COPNAME(I) TO COPNAM1.

MOVE "IF FIL-NO NOT = 0 AND" TO WURD,  PERFORM PTGC.

MOVE FIL-NO TO WURD,  PERFORM GLUE.

MOVE "GO TO" TO WURD,  PERFORM GLUE.

ADD 1 TO BYE-NO  PERFORM GLUE-BYENO  PERFORM GLUE-DOT.

MOVE COPNAM1 TO WURD,  PERFORM GET-COPX.

IF COPADD(LL) NOT<"A"

MOVE "ADD 1 TO KF-" TO WURD,  PERFORM PTGC

MOVE LL TO WURD,  PERFORM GLUE-STRING

PERFORM GLUE-DOT,  MOVE "IF KE-" TO WURD,  PERFORM PTGC

MOVE LL TO WURD,  PERFORM GLUE-STRING

MOVE "> MX-" TO WURD,  PERFORM GLUE

MOVE LL TO WURD,  PERFORM GLUE-STRING

PERFORM GLUE-MOVE-FNDFILE

MOVE "ELSE READ" TO WURD,  PERFORM PTGC

MOVE COPNAM1 TO WURD,  PERFORM GLUE-FN
```

```
        GO TO DONE-THIS-FILNO.
IF COPADD(LL)=" "
        MOVE "READ" TO WURD, PERFORM PTGC
        MOVE COPNAM1 TO WURD, PERFORM GLUE-FN
        MOVE "AT END" TO WURD, PERFORM GLUE
        PERFORM GLUE-MOVE-ENDFILE
        GO TO DONE-THIS-FILNO.
MOVE LL TO L1.
MOVE COPADD(LL) TO RFL, MOVE PSEUDO-REL TO LL.
IF LL>50 GO TO INDEXED-SEQ-RA.
MOVE COPNAME(LL) TO COPNAM2.
MOVE "READ" TO WURD, PERFORM PTGC.
MOVE COPNAM2 TO WURD, PERFORM GLUE-FN.
MOVE "AT END" TO WURD, PERFORM GLUE.
PERFORM GLUE-MOVE-ENDFILE.
MOVE "ELSE MOVE" TO WURD, PERFORM GLUE.
MOVE COPNAM2 TO WURD1, PERFORM GLUE-CX.
MOVE "TO KE-" TO WURD, PERFORM GLUE.
MOVE L1 TO WURD, PERFORM GLUE-STRING.
MOVE "READ" TO WURD, PERFORM PTGC.
MOVE COPNAM1 TO WURD, PERFORM GLUE-FN.
GO TO DONE-THIS-FILNO.
INDEXED-SEQ-RA.
IF LL<71 GO TO RANDOM-RETRIEVAL.
SUBTRACT 70 FROM LL, MOVE COPNAME(LL) TO COPNAM2.
MOVE "ADD 1 TO KE-" TO WURD, PERFORM PTGC.
MOVE L1 TO WURD, PERFORM GLUE-STRING.
MOVE "READ" TO WURD, PERFORM PTGC.
MOVE COPNAM1 TO WURD, PERFORM GLUE-FN.
MOVE "INVALID NEXT SENTENCE ELSE IF KX-" TO WURD PERFORM PTGC.
```

```
MOVE L1 TO WURD, PERFORM GLUE-STRING.
MOVE "NOT>DX-" TO WURD, PERFORM PTGC.
MOVE COPNAM2 TO WURD PERFORM GET-COPX MOVE LL TO L2.
MOVE L2 TO WURD, PERFORM GLUE-STRING.
MOVE "(2) GO TO" TO WURD, PERFORM GLUE-STRING.
PERFORM GLUE-BYEND, PERFORM GLUE-DOT.
MOVE "READ" TO WURD, PERFORM PTGC.
MOVE COPNAM2 TO WURD, PERFORM GLUE-FN.
MOVE "AT END" TO WURD, PERFORM GLUE.
PERFORM GLUE-MOVE-ENDFILE.
MOVE "GO TO" TO WURD, PERFORM GLUE.
PERFORM GLUE-BYEND, PERFORM GLUE-DOT.
MOVE "MOVE 0 TO BIN-LO COMPUTE BIN-HI =MX=" TO WURD PERFORM PTGC.
MOVE L1 TO WURD, PERFORM GLUE-STRING.
MOVE "+1," TO WURD, PERFORM GLUE.
ADD 1 TO BIE-NO, PERFORM PTGA-BIENO.
MOVE "COMPUTE KE-" TO WURD, PERFORM PTGC.
MOVE L1 TO WURD, PERFORM GLUE-STRING.
MOVE "=( BIN-HI + BIN-LO )/2." TO WURD, PERFORM PTGC.
MOVE "READ" TO WURD, PERFORM PTGC.
MOVE COPNAM1 TO WURD, PERFORM GLUE-FN, PERFORM GLUE-DOT.
MOVE "IF KX-" TO WURD, PERFORM PTGC.
MOVE L1 TO WURD, PERFORM GLUE-STRING.
MOVE ">DX-" TO WURD, PERFORM GLUE.
MOVE L2 TO WURD, PERFORM GLUE-STRING.
MOVE "(01) MOVE KE-" TO WURD, PERFORM GLUE-STRING.
MOVE L1 TO WURD, PERFORM GLUE-STRING.
MOVE "TO BIN-HI ELSE IF KX-" TO WURD, PERFORM PTGC.
MOVE L1 TO WURD, PERFORM GLUE-STRING.
MOVE "<DX-" TO WURD, PERFORM GLUE.
```

```
MOVE L2 TO WURD,  PERFORM GLUE-STRING.

MOVE "(01) MOVE KE-" TO WURD,  PERFORM GLUE-STRING.

MOVE L1 TO WURD,  PERFORM GLUE-STRING.

MOVE "TO BIN-LO ELSE SUBTRACT 1 FROM KE-" TO WURD PERFORM PTGC.

MOVE L1 TO WURD,  PERFORM GLUE-STRING.

MOVE "GO TO" TO WURD,  PERFORM GLUE.

SUBTRACT 1 FROM BYE-NO.  PERFORM GLUE-BYENO,  PERFORM GLUE-DOT.

MOVE "IF BIN-LO NOT< BIN-HI STOP 1." TO WURD PERFORM PTGC.

MOVE "IF BIN-LO +2> BIN-HI MOVE BIN-LO TO KE-" TO WURD PERFORM
     PTGC .

MOVE L1 TO WURD,  PERFORM GLUE-STRING.

MOVE "GO TO" TO WURD,  PERFORM GLUE.

PERFORM GLUE-BYENO,  PERFORM GLUE-DOT ADD 1 TO BYE-NO.

MOVE "GO TO" TO WURD,  PERFORM PTGC.

PERFORM GLUE-BIENO.

GO TO DONE-THIS-FILNO.

RANDOM-RETRIEVAL.

SUBTRACT 50 FROM LL,  MOVE COPNAME(LL) TO COPNAM2.

MOVE LL TO L2.

MOVE "ADD 1 TO IX-" TO WURD,  PERFORM PTGC.

MOVE L1 TO WURD,  PERFORM GLUE-STRING,  PERFORM GLUE-DOT.

MOVE "IF" TO WURD,  PERFORM PTGC.

PERFORM GLUE-DX-IX.

MOVE " SPACES READ" TO WURD,  PERFORM GLUE-STRING.

MOVE COPNAM2 TO WURD,  PERFORM GLUE-FN.

MOVE "AT END" TO WURD,  PERFORM GLUE.

PERFORM GLUE-MOVE-ENDFILE.

MOVE "GO TO" TO WURD,  PERFORM GLUE.

PERFORM GLUE-BYENO.

MOVE "ELSE MOVE 0 TO IX-" TO WURD,  PERFORM PTGC.
```

```
MOVE L1 TO WURD, PERFORM GLUE-STRING.
MOVE "GO TO" TO WURD, PERFORM GLUE.
SUBTRACT 1 FROM BYE-NO PERFORM GLUE-BYENO  ADD 1 TO BYE-NO.
PERFORM GLUE-DOT.
MOVE "MOVE 0 TO BIN-LO COMPUTE BIN-HI =MX-" TO WURD PERFORM PTGC.
MOVE L1 TO WURD, PERFORM GLUE-STRING.
MOVE "+1." TO WURD, PERFORM GLUE.
ADD 1 TO BIE-NO, PERFORM PTGA-BIENO.
MOVE "COMPUTE KE-" TO WURD, PERFORM PTGC.
MOVE L1 TO WURD, PERFORM GLUE-STRING.
MOVE "=( BIN-LO + BIN-HI )/2." TO WURD, PERFORM PTGC.
MOVE "READ" TO WURD, PERFORM PTGC.
MOVE COPNAM1 TO WURD, PERFORM GLUE-FN, PERFORM GLUE-DOT.
MOVE "IF" TO WURD, PERFORM PTGC.
PERFORM GLUE-DX-IX.
MOVE ">KX-" TO WURD, PERFORM GLUE.
MOVE L1 TO WURD, PERFORM GLUE-STRING.
MOVE "MOVE KE-" TO WURD, PERFORM GLUE.
MOVE L1 TO WURD, PERFORM GLUE-STRING.
MOVE "TO BIN-LO ELSE IF" TO WURD, PERFORM PTGC.
PERFORM GLUE-DX-IX.
MOVE "<KX-" TO WURD, PERFORM GLUE.
MOVE L1 TO WURD, PERFORM GLUE-STRING.
MOVE "MOVE KE-" TO WURD, PERFORM GLUE.
MOVE L1 TO WURD, PERFORM GLUE-STRING.
MOVE "TO BIN-HI ELSE GO TO" TO WURD, PERFORM PTGC.
PERFORM GLUE-BYENO, PERFORM GLUE-DOT.
MOVE "IF BIN-LO > BIN-HI STOP 1 ELSE" TO WURD, PERFORM PTGC.
MOVE "IF BIN-LO +2> BIN-HI" TO WURD, PERFORM PTGC.
MOVE "GO TO RA-ERR." TO WURD, PERFORM PTGC.
```

```
MOVE 1 TO HAVE-RANDOM-IS.

MOVE "GO TO" TO WURD, PERFORM PTGC.

PERFORM GLUE-BJENO.

DONE-THIS-FILNO.

PERFORM GLUE-DOT.

PERFORM PTGA-BYENO.

ADD 1 TO FIL-NO. IF FIL-NO NOT > NSAVF GO TO NEXT-FILNO.

MOVE "IF FIL-NO = 0 MOVE 1 TO FIL-NO ." TO WURD, PERFORM PTGC.

MOVE "IR-DONE." TO WURD, PERFORM PTGA.

MOVE "EXIT." TO WURD, PERFORM PTGC.

MOVE "IR-EXIT." TO WURD, PERFORM PTGA.

MOVE "GO TO SEVEN." TO WURD, PERFORM PTGC.

IF HAVE-RANDOM-IS=1

MOVE "RA-ERR." TO WURD PERFORM PTGA

MOVE "DISPLAY ""PA"" ACCEPT PAR-AM ." TO WURD PERFORM PTGC

MOVE "IF PAR-AM NOT<""STOP"" GO TO TEN"

TO WURD  PERFORM PTGC

MOVE "ELSE GO TO IR-BEGIN." TO WURD, PERFORM GLUE.

GO TO START-ON-C-SPECS.

GLUE-DX-IX.

MOVE "DX-" TO WURD, PERFORM GLUE.

MOVE L2 TO WURD, PERFORM GLUE-STRING.

MOVE "(IX-" TO WURD, PERFORM GLUE-STRING.

MOVE L1 TO WURD, PERFORM GLUE-STRING.

MOVE ")" TO WURD, PERFORM GLUE-STRING.

GLUE-MOVE-ENDFILE.

MOVE "MOVE 99 TO REC-NO (" TO WURD, PERFORM PTGC

MOVE FIL-NO TO WURD, PERFORM GLUE-STRING.

MOVE ")" TO WURD, PERFORM GLUE-STRING.

START-ON-C-SPECS.
```

```
MOVE "CALC-DETAIL SECTION 52." TO WURD, PERFORM PTGA.

MOVE "CD-BEGIN."              TO WURD, PERFORM PTGA.

MOVE 1 TO FORM-SUBTYPE.

C-SPECS SECTION 54.

NECKST-CALC-SPEC.

IF FORM-TYPE NOT = "C" GO TO FINISCH-CALC-SPECS.

MOVE C-COMMENTS TO WURD, PERFORM PUT-COBOL-COMMENT.

IF C-OP NOT="ENTER" GO TO NOT-ENTER-RPG.

COPY-FROM-TO-TO.

PERFORM READ-FROM. IF FORM-TYPE ="C" GO TO C-DONE.

IF FORM-TYPE="D" GO TO COPY-FROM-TO-TO.

PERFORM PUNCH-TO. MOVE FROM-LINE TO TO-SOURCE. MOVE 72 TO NTC.
GO TO COPY-FROM-TO-TO.

NOT-ENTER-RPG.

IF C-CTLLEVEL NOT = SPACES  AND  FORM-SUBTYPE = 1
        PERFORM END-AND-BEGIN-CALC.

IF C-OP="EXIT" OR "RLABL" OR "ULABL" GO TO C-DONE.

PERFORM PUNCH-TO.

IF C-OP NOT="TAG" AND "BEGSR" AND "ENDSR" GO TO NOT-TAG.

IF C-OP NOT="BEGSR" GO TO NOT-BEGSR.

MOVE C-FAC1 TO SAVE-SUBNAME.

IF FORM-SUBTYPE=1 PERFORM END-AND-BEGIN-CALC.

IF FORM-SUBTYPE=2 PERFORM END-CALCTOT.

IF FORM-SUBTYPE NOT=3
    MOVE 3 TO FORM-SUBTYPE
    MOVE "CALC-ROUTINES SECTION 52." TO WURD, PERFORM PTGA.

NOT-BEGSR.

IF C-FAC1 NOT=SPACES
    PERFORM PUNCH-TO, MOVE 7 TO NTC
    MOVE C-FAC1 TO WURD1, PERFORM GLUE-CX, PERFORM GLUE-DOT.
```

```
IF C-OP NOT="ENDSR" GO TO C-DONE.

PERFORM PUNCH-TO, MOVE 7 TO NTC.

MOVE SAVE-SUBNAME TO WURD1, PERFORM GLUE-CX.

MOVE "-DONE." TO WURD, PERFORM GLUE-STRING.

MOVE "EXIT." TO WURD, PERFORM PTGC.

PERFORM PUNCH-TO, MOVE 7 TO NTC.

MOVE SAVE-SUBNAME TO WURD1, PERFORM GLUE-CX.

MOVE "-EXIT." TO WURD, PERFORM GLUE-STRING.

MOVE "EXIT." TO WURD, PERFORM PTGC.

GO TO C-DONE.

NOT-TAG.

IF C-CTLLEVEL="SR" MOVE "   " TO C-CTLLEVEL.

IF C-CONTROLLERS NOT= SPACES MOVE "IF" TO WURD, PERFORM GLUE.

MOVE 0 TO CONDITION-TYPE.

IF C-CTLLEVEL NOT = SPACES

MOVE 1 TO CONDITION-TYPE

MOVE C-CTLLEVEL TO INDICNO, PERFORM GLUE-INDIC-CX

MOVE "= 1" TO WURD, PERFORM GLUE

IF C-INDICATORS NOT = SPACES  MOVE "AND" TO WURD,

PERFORM GLUE.

IF C-INDICATORS NOT = SPACES  PERFORM TRANSLATE-INDIC-SPECS.

IGNORE-CALC-CTI.

IF C-OP = "GOTO"

MOVE "GO TO" TO WURD, PERFORM GLUE

MOVE C-FAC2 TO WURD1, PERFORM GLUE-CX

GO TO C-DOT.

IF C-OP="EXSR"

MOVE "PERFORM" TO WURD, PERFORM PTGC

MOVE C-FAC2 TO WURD1, PERFORM GLUE-CX

MOVE "THRU" TO WURD, PERFORM GLUE

MOVE C-FAC2 TO WURD1, PERFORM GLUE-CX
```

```
    MOVE "-DONE" TO WURD, PERFORM GLUE-STRING
    GO TO C-DOT.
IF C-OP="EXCPT"
    MOVE "MOVE 2 TO OUT-SW" TO WURD, PERFORM PTGC
    MOVE "PERFORM OUTPUT-TOTAL THRU OT-DONE." TO WURD PERFORM
    PTGC  GO TO C-DONE.
IF C-OP NOT="CHAIN" GO TO NOT-CHAIN-CALC.
CALC-OVLY SECTION 99.
CO-BEGIN.
MOVE C-FAC2 TO WURD, PERFORM GET-COPX.
MOVE LL TO L1, NUM-SYM3456, MOVE "CHN-" TO SYM1234.
MOVE "MOVE" TO WURD, PERFORM PTGC.
MOVE C-FAC1 TO WURD1, PERFORM GLUE-CX.
MOVE "TO" TO WURD, PERFORM GLUE.
MOVE SYMBOL TO WURD1, PERFORM GLUE-CX.
MOVE "MOVE" TO WURD, PERFORM PTGC.
MOVE L1 TO WURD, PERFORM GLUE.
MOVE "TO CHN-NO PERFORM GET-CHAIN" TO WURD, PERFORM GLUE.
IF C-RESINDS=SPACES GO TO C-DOT.
MOVE "IF" TO WURD, PERFORM PTGC.
MOVE SYMBOL TO WURD1, PERFORM GLUE-CX.
MOVE "=KX=" TO WURD, PERFORM GLUE.
MOVE L1 TO WURD, PERFORM GLUE-STRING.
MOVE "MOVE 0 TO" TO WURD, PERFORM GLUE.
MOVE C-RESIND(1) TO INDICNO PERFORM GLUE-INDIC-CX.
MOVE "ELSE MOVE 1 TO" TO WURD, PERFORM PTGC.
PERFORM GLUE-INDIC-CX.
GO TO C-DOT.
CALC-CONTINUE SECTION 54.
NOT-CHAIN-CALC.
```

```
IF C-OP = "SETON"  MOVE "MOVE 1 TO" TO WURD,  PERFORM GLUE
    PERFORM CONCATENATE-INDICATORS,  GO TO C-DOT   .

IF C-OP = "SETOF"  MOVE "MOVE 0 TO" TO WURD,  PERFORM GLUE
    PERFORM CONCATENATE-INDICATORS,  GO TO C-DOT   .

IF C-CONTROLLERS=SPACES GO TO DONT-NEED-GOTO.

IF C-RESINDS NOT=SPACES GO TO NEED-GOTO.

IF C-OP-LAST2 NOT="E " AND "EL" AND "ZO"
    GO TO DONT-NEED-GOTO.

MOVE C-FAC2 TO WURD,  PERFORM GET-COPX.

IF COPDEC(L) NOT="A" GO TO DONT-NEED-GOTO.

MOVE C-RESULT TO WURD,  PERFORM GET-COPX.

IF COPDEC(L)="A" GO TO DONT-NEED-GOTO.

NEED-GOTO.

MOVE "NEXT SENTENCE" TO WURD,  PERFORM PTGC.

INDIRECT-CONDITIONS.

MOVE 2 TO CONDITION-TYPE.

MOVE "ELSE GO TO" TO WURD,  PERFORM PTGC.

IF NEED-BYNUM=0
    MOVE 1 TO NEED-BYNUM
    ADD 1 TO BYE-NO.

PERFORM GLUE-BYENO,  PERFORM GLUE-DOT.

DONT-NEED-GOTO.

IF C-OP-LAST2="E " OR "EL" OR "ZO"
    MOVE C-FAC2 TO FLOOR,  MOVE C-RESULT TO IMP-OBJECT
    PERFORM PUT-MOVE
    GO TO FINISH-ARITH-OP.

IF C-OP NOT = "LOKUP"  GO TO NOT-LOKUP.

MOVE C-FAC2 TO WURD,  PERFORM GET-COPX.

MOVE COPZBI(LL) TO COMPER8.

IF COPDEE(LL) =1 AND C-RESIND(2) NOT=SPACES OR
```

```
    COPDEE(LL) NOT=1 AND C-RESIND(1) NOT=SPACES
        MOVE 1 TO DEESENDING ELSE MOVE 0 TO DEESENDING.
MOVE "MOVE" TO WURD, PERFORM PTGC.
IF DEESENDING=1 ADD 1 TO COMPER4 MOVE COMPER4 TO WURD
        ELSE MOVE "0" TO WURD.
PERFORM GLUE. MOVE "TO" TO WURD, PERFORM GLUE.
MOVE C-FAC2 TO SYMBOL, PERFORM GLUE-TABPT-CX, PERFORM GLUE-DOT.
ADD 1 TO BIE-NO PERFORM PTGA-BIENO.
IF DEESENDING=1 MOVE "SUBTRACT 1 FROM" TO WURD
        ELSE MOVE "ADD 1 TO" TO WURD.
PERFORM PTGC.
MOVE C-FAC2 TO SYMBOL, PERFORM GLUE-TABPT-CX, PERFORM GLUE-DOT.
MOVE ">" TO REL MOVE C-RESIND(1) TO INDICNO PERFORM GLUE-TAB-ELSE
MOVE "<" TO REL MOVE C-RESIND(2) TO INDICNO PERFORM GLUE-TAB-ELSE
MOVE "=" TO REL MOVE C-RESIND(3) TO INDICNO PERFORM GLUE-TAB-ELSE
MOVE "IF" TO WURD, PERFORM PTGC.
MOVE C-FAC2 TO SYMBOL, PERFORM GLUE-TABPT-CX.
IF DEESENDING =1 MOVE "> 1" TO WURD, PERFORM GLUE
        ELSE MOVE "<" TO WURD, PERFORM GLUE
        MOVE COMPER4 TO WURD, PERFORM GLUE.
MOVE "GO TO" TO WURD, PERFORM GLUE.
PERFORM GLUE-BIENO.
MOVE "ELSE GO TO" TO WURD, PERFORM PTGC.
ADD 1 TO BIE-NO, PERFORM GLUE-BIENO, PERFORM GLUE-DOT.
MOVE "MOVE" TO WURD, PERFORM PTGC.
MOVE C-FAC2 TO WURD1, PERFORM GLUE-TAB .
MOVE "TO" TO WURD, PERFORM GLUE.
MOVE C-FAC2 TO WURD1, PERFORM CHECK-GLUE-CX, PERFORM GLUE-DOT.
IF C-RESULT=SPACES GO TO FINISH-LOKUP.
MOVE "MOVE" TO WURD, PERFORM PTGC.
```

```
MOVE C-FAC2 TO SYMBOL, PERFORM GLUE-TABPT-CX.

MOVE "TO" TO WURD, PERFORM GLUE.

MOVE C-RESULT TO SYMBOL PERFORM GLUE-TABPT-CX PERFORM GLUE-DOT.

MOVE "MOVE" TO WURD, PERFORM PTGC.

MOVE C-RESULT TO WURD1, PERFORM GLUE-TAB.

MOVE "TO" TO WURD, PERFORM GLUE.

MOVE C-RESULT TO WURD1, PERFORM CHECK-GLUE-CX, PERFORM GLUE-DOT.

FINISH-LOKUP.

PERFORM PTGA-BIEND.

GO TO C-FINISH.

NOT-LOKUP.

IF C-OP = "COMP"

MOVE "MOVE 0 TO" TO WURD, PERFORM PTGC

PERFORM CONCATENATE-INDICATORS, PERFORM GLUE-DOT

PERFORM PUT-IF-COMP VARYING IDX FROM 1 BY 1 UNTIL IDX>3

GO TO C-FINISH.

IF C-OP = "TESTZ"

MOVE "MOVE" TO WURD, PERFORM PTGC

MOVE C-RESULT TO WURD1, PERFORM GLUE-CX

MOVE "TO PIKTURE." TO WURD, PERFORM GLUE

MOVE "MOVE 0 TO" TO WURD , PERFORM PTGC

PERFORM CONCATENATE-INDICATORS, PERFORM GLUE-DOT, PERFORM

PUT-IF-ZONE VARYING IDX FROM 1 BY 1 UNTIL IDX>3

GO TO C-FINISH.

IF C-OP="Z-ADD" MOVE "ADD" TO C-OP MOVE "0" TO C-FAC1.

IF C-OP="Z-SUB" MOVE "SUB" TO C-OP MOVE "0" TO C-FAC1.

IF C-OP="ADD" MOVE "ADD" TO WURD

ELSE IF C-OP="SUB" MOVE "SUBTRACT" TO WURD

ELSE IF C-OP="MULT" MOVE "MULTIPLY" TO WURD

ELSE MOVE "DIVIDE" TO WURD.
```

```
PERFORM PTGC.
IF C-OP="MVR" MOVE "MOD" TO WURD, PERFORM GLUE
    MOVE SAVE-FAC1 TO C-FAC1, MOVE SAVE-FAC2 TO C-FAC2.
MOVE C-FAC2 TO WURD1. PERFORM CHECK-GLUE-CX.
IF C-OP="ADD" MOVE " " TO WURD
    ELSE IF C-OP="SUB" MOVE "FROM" TO WURD
    ELSE IF C-OP="MULT" MOVE "BY" TO WURD
    ELSE MOVE "INTO" TO WURD.
PERFORM GLUE.
MOVE C-FAC1 TO WURD1. PERFORM CHECK-GLUE-CX.
MOVE "GIVING" TO WURD, PERFORM GLUE.
MOVE C-RESULT TO WURD1. PERFORM CHECK-GLUE-CX.
IF C-HALF="H" MOVE "ROUNDED" TO WURD, PERFORM GLUE.
FINISH-ARITH-OP.
IF C-RESINDS NOT=SPACES MOVE "MOVE 0 TO" TO WURD PERFORM PTGC
    PERFORM CONCATENATE-INDICATORS, PERFORM GLUE-DOT, PERFORM
    PUT-IF-RESULT VARYING IDX FROM 1 BY 1 UNTIL IDX>3.
C-FINISH.
IF C-OP NOT="LOKUP"
    MOVE C-RESULT TO SYMBOL
    IF SYM123="TAB" MOVE "MOVE" TO WURD, PERFORM PTGC
    MOVE C-RESULT TO WURD1
    PERFORM CHECK-GLUE-CX, MOVE "TO" TO WURD, PERFORM GLUE
    MOVE C-RESULT TO WURD1, PERFORM GLUE-TAB.
C-DONE.
C-DOT.
MOVE C-FAC1 TO SAVE-FAC1.
MOVE C-FAC2 TO SAVE-FAC2.
MOVE C-RESULT TO SAVE-RESULT.
PERFORM READ-FROM.
```

```
IF C-INDIC(1) NOT = " *"  GO TO NO-ATTEMPT-TO-CONTINUE.
IF CONDITION-TYPE=1 PERFORM INDIRECT-CONDITIONS.
MOVE " " TO C-INDIC(1).
GO TO NECKST-CALC-SPEC.
NO-ATTEMPT-TO-CONTINUE.
COMPUTE J=NTC -1.
IF TO-COL(J) NOT="." PERFORM GLUE-DOT.
IF NEED-BYNUM=1
    PERFORM PTGA-BYENO
    MOVE 0 TO NEED-BYNUM.
GO TO NECKST-CALC-SPEC.
FINISCH-CALC-SPECS.
IF FORM-SUBTYPE=1  PERFORM END-AND-BEGIN-CALC.
IF FORM-SUBTYPF=2 PERFORM END-CALCTOT.
GO TO START-ON-O-SPECS.
END-CALCTOT.
MOVE "MOVE 0 TO OUT-SW " TO WURD,  PERFORM PTGC.
MOVE "GO TO OUTPUT-TOTAL." TO WURD,  PERFORM PTGC.
ECT-END.
END-AND-BEGIN-CALC.
MOVE 2 TO FORM-SUBTYPE.
MOVE "GO TO FOUR." TO WURD,  PERFORM PTGC.
MOVE "CALC-TOTAL SECTION 52." TO WURD,  PERFORM PTGA.
MOVE "CT-BEGIN." TO WURD,  PERFORM PTGA.
PUT-COBOL-COMMENT.
IF WURD NOT=SPACES PERFORM PUNCH-TO
    MOVE 55 TO NTC,  PERFORM GLUE
    MOVE "*" TO TO-COL(7),  PERFORM PUNCH-TO.
CHECK-GLUE-CX.
PERFORM GLUE-CX.
```

```
CONCATENATE-INDICATORS.
IF C-RESIND(1) NOT=SPACES MOVE C-RESIND(1) TO INDICNO PERFORM GLU
-    E-INDIC-CX.
IF C-RESIND(2) NOT=SPACES MOVE C-RESIND(2) TO INDICNO PERFORM GLU
-    E-INDIC-CX.
IF C-RESIND(3) NOT=SPACES MOVE C-RESIND(3) TO INDICNO PERFORM GLU
-    E-INDIC-CX.
GLUE-RELATION.
IF IDX=1 MOVE ">" TO WURD ELSE IF IDX=2 MOVE "<" TO WURD
     ELSE MOVE "=" TO WURD.
GLUE-TAB-ELSE.
IF INDICNO NOT = SPACES
         MOVE "IF" TO WURD, PERFORM PTGC
         MOVE C-FAC1 TO WURD1, PERFORM CHECK-GLUE-CX
         MOVE REL TO WURD, PERFORM GLUE
         MOVE C-FAC2 TO WURD1, PERFORM GLUE-TAB
         MOVE "MOVE 1 TO" TO WURD, PERFORM GLUE
         PERFORM GLUE-INDIC-CX
         MOVE "ELSE MOVE 0 TO" TO WURD, PERFORM PTGC
         PERFORM GLUE-INDIC-CX.
PUT-MOVE SECTION 54.
PMV-BEGIN.
MOVE FLOOR TO WURD, PERFORM GET-COPX. MOVE LL TO L1.
MOVE IMP-OBJECT TO WURD, PERFORM GET-COPX.
IF COPLEN(L)=COPLEN(L1) AND COPDEC(L)=COPDEC(L1)
     AND C-OP-LAST2 NOT="ZO" MOVE "MOVE" TO WURD PERFORM PTGC
     MOVE FLOOR TO WURD1, PERFORM GLUE-CX
     MOVE "TO" TO WURD, PERFORM GLUE
     MOVE IMP-OBJECT TO WURD1, PERFORM GLUE-CX  GO TO PMV-EXIT.
MOVE "MOVE" TO WURD, PERFORM PTGC.
```

```
MOVE FLOOR TO WURD1, PERFORM GLUE-CX.

MOVE "TO" TO WURD, PERFORM GLUE.

PERFORM GLUE-IF-CX.

MOVE "MOVE" TO WURD, PERFORM PTGC.

MOVE IMP-OBJECT TO WURD1, PERFORM GLUE-CX.

MOVE "TO IT-" TO WURD, PERFORM GLUE.

MOVE STMT-NO TO WURD, PERFORM GLUE-STRING.

IF C-OP-LAST2="ZO" GO TO DONT-MOVE-BODY.

MOVE "MOVE BODY OF IG-" TO WURD, PERFORM PTGC.

MOVE STMT-NO TO WURD, PERFORM GLUE-STRING.

MOVE "TO BODY OF IU-" TO WURD, PERFORM GLUE.

MOVE STMT-NO TO WURD, PERFORM GLUE-STRING.

DONT-MOVE-BODY.

MOVE "MOVE SINE OF IG-" TO WURD, PERFORM PTGC.

MOVE STMT-NO TO WURD, PERFORM GLUE-STRING.

MOVE "TO SINE OF IU-" TO WURD, PERFORM GLUE.

MOVE STMT-NO TO WURD, PERFORM GLUE-STRING.

MOVE "MOVE IT-" TO WURD, PERFORM PTGC.

MOVE STMT-NO TO WURD, PERFORM GLUE-STRING.

MOVE "TO" TO WURD, PERFORM GLUE.

MOVE IMP-OBJECT TO WURD1, PERFORM GLUE-CX.

IF OBJECT-MACHINE>5 AND COPDEC(LL) NOT="A" AND COPDEC(L1)="A"
        MOVE "IF SINE OF IU-" TO WURD, PERFORM PTGC
        MOVE STMT-NO TO WURD, PERFORM GLUE-STRING
        MOVE "<@A@ IF SINE OF IU-" TO WURD, PERFORM PTGC
        MOVE STMT-NO TO WURD, PERFORM GLUE-STRING
        MOVE "=@6@ COMPUTE" TO WURD, PERFORM PTGC
        MOVE IMP-OBJECT TO WURD1, PERFORM GLUE-CX
        MOVE "=0 -" TO WURD, PERFORM GLUE
        MOVE IMP-OBJECT TO WURD1, PERFORM GLUE-CX
```

```
        MOVE "ELSE COMPUTE" TO WURD,  PERFORM PTGC
        MOVE IMP-OBJECT TO WURD1,  PERFORM GLUE-CX
        MOVE "=0 +" TO WURD.  PERFORM GLUE
        MOVE IMP-OBJECT TO WURD1,  PERFORM GLUE-CX
        PERFORM GLUE-DOT.
PMV-EXIT.
PUT-IF-RESULT SECTION 54.
PIR-BEGIN.
IF C-RESIND(IDX) = SPACES  GO TO PIR-EXIT.
MOVE "IF" TO WURD,  PERFORM PTGC.
MOVE C-RESULT TO WURD1,  PERFORM GLUE-CX.
PERFORM GLUE-RELATION.
PERFORM GLUE.
IF COPDEC(L) = "A" MOVE "SPACES" TO WURD, ELSE MOVE "0" TO WURD.
PERFORM GLUE,  MOVE "MOVE 1 TO" TO WURD,  PERFORM GLUE.
MOVE C-RESIND(IDX) TO INDICNO, PERFORM GLUE-INDIC-CX, PERFORM
        GLUE-DOT.
PIR-EXIT.
EXIT.
PUT-IF-ZONE SECTION 54.
PIZ-BEGIN.
IF C-RESIND(IDX)=SPACES GO TO PIZ-EXIT.
MOVE "IF PIKTURE" TO WURD,  PERFORM PTGC.
IF IDX=1 MOVE
    "=""&"" OR NOT<""+"" AND NOT>"""
    ELSE IF IDX=2 MOVE
    "=""-"" OR NOT<""×"" AND NOT>""?""" TO WURD
    ELSE MOVE
    "NOT=""&"" AND ""-"" AND" TO WURD,  PERFORM GLUE
    MOVE "(PIKTURE<""+"" OR>""?"")" TO WURD.
```

```
    PERFORM PTGC.  MOVE "MOVE 1 TO" TO WURD.  PERFORM PTGC.
MOVE C-RESIND(IDX) TO INDICNO. PERFORM GLUE-INDIC-CX PERFORM
     GLUE-DOT.
PIZ-EXIT.
EXIT.
PUT-IF-COMP SECTION 54.
PIC-BEGIN.
IF C-RESIND(IDX) = SPACES  GO TO PIC-EXIT.
MOVE "IF" TO WURD.  PERFORM PTGC.
MOVE C-FAC1 TO WURD1.  PERFORM GLUE-CX.
PERFORM GLUE-RELATION.
PERFORM GLUE, MOVE C-FAC2 TO WURD1, PERFORM GLUE-CX.
MOVE "MOVE 1 TO" TO WURD.  PERFORM GLUE
MOVE C-RESIND(IDX) TO INDICNO  PERFORM GLUE-INDIC-CX.
PERFORM GLUE-DOT.
PIC-EXIT.
EXIT.
FINISH-UP-CEES SECTION 53.
START-ON-O-SPECS.
MOVE SPACES TO FILE-NAME.
MOVE "OUTPUT-DETAIL SECTION 52." TO WURD.  PERFORM PTGA.
MOVE "OD-BEGIN." TO WURD.  PERFORM PTGA.
IF HAVE-OF=1 AND HAVE-LSPECS=0
     MOVE "MOVE 0 TO PAR-AM ." TO WURD.  PERFORM PTGC.
MOVE 1 TO FORM-SUBTYPE.
O-SPECS SECTION 53.
OUT-FILE-SPEC.
IF FORM-TYPE NOT="O" GO TO END-FILE-ON-FROM.
IF O-FILENAME NOT=SPACES AND FILE-NAME MOVE O-FILENAME TO
     FILE-NAME
```

```
    MOVE STMT-NO TO STMT.

IF FORM-SUBTYPE=1 AND (O-TYPE="T" OR "E")
    GO TO END-AND-BEGIN-OUTPUT.

CONTINUE-WITH-OUTPUT-TOTAL.

MOVE O-TYPE TO HDTE.

MOVE 0 TO SPC-SK.

MOVE 0 TO HAVE-VARYING-SPCSK.

MOVE "010000" TO SPC-SK-INFO(1).

MOVE 0 TO MAX-FNDPOS.

NEW-FILE-COND-CARD.

MOVE "IF" TO WURD.  PERFORM PTGC.

ADD 1 TO SPC-SK.

IF SPC-SK>MN-SPCSK GO TO TOO-BIG.

IF O-SPACE-SKIP=SPACES MOVE SPC-SK-INFO(1) TO SPC-SK-INFO(SPC-SK
    ELSE EXAMINE O-SPACE-SKIP REPLACING " " BY "0"
        MOVE O-SPACE-SKIP TO SPC-SK-INFO(SPC-SK).

IF SPC-SK-INFO(SPC-SK) NOT=SPC-SK-INFO(1)
    MOVE 1 TO HAVE-VARYING-SPCSK.

NO-SPCSK-OVLY.

MOVE FILE-NAME TO WURD.  PERFORM GET-COPX.

IF COPDEC(L)="C" MOVE O-STACK TO SPC-AF(SPC-SK).

MOVE 0 TO OUT-SW.

PERFORM TRANSLATE-INDIC-SPECS.

CHECK-AND-ON-FILE.

PERFORM READ-FROM.

IF O-TYPE = "N"
        MOVE "AND" TO WURD.  PERFORM GLUE
        PERFORM TRANSLATE-INDIC-SPECS
        GO TO CHECK-AND-ON-FILE.

IF HAVE-AND=1 MOVE "AND" TO WURD PERFORM GLUE.
```

```
MOVE "OUT-SW =" TO WURD,  PERFORM PTGC.

IF HOTE="E" MOVE 2 TO OUT-SW.

MOVE OUT-SW TO WURD,  PERFORM GLUE.

MOVE FILE-NAME TO WURD,  PERFORM GET-COPX.

IF COPDEC(L)="U" AND SPC-AF(SPC-SK)="D"
     MOVE "MOVE SPACES TO" TO WURD,  PERFORM PTGC
     MOVE FILE-NAME TO WURD1,  PERFORM GLUE-CX.

MOVE "MOVE" TO WURD,  PERFORM GLUE.

MOVE SPC-SK TO WURD,  PERFORM GLUE.

MOVE "TO" TO WURD,  PERFORM GLUE.

MOVE "SPC-SK" TO WURD1  PERFORM GLUE-CX.

MOVE "ELSE" TO WURD,  PERFORM PTGC.

IF O-TYPE = "R"  GO TO NEW-FILE-COND-CARD.

OUT-FILE-FINISH.

MOVE "GO TO" TO WURD.  PERFORM PTGC.

ADD 1 TO BYE-NO, PERFORM GLUE-BYENO,  PERFORM GLUE-DOT.

MOVE FILE-NAME TO WURD,  PERFORM GET-COPX.

MOVE "MOVE" TO WURD,  PERFORM PTGC.

IF COPDEC(L)="U" MOVE FILE-NAME TO WURD1 PERFORM GLUE-CX
     ELSE MOVE "SPACES" TO WURD,  PERFORM GLUE.

MOVE "TO IR-" TO WURD,  PERFORM GLUE.

MOVE STMT TO WURD,  PERFORM GLUE-STRING.

IF COPDEC(L)="N" MOVE FILE-NAME TO WURD1  PERFORM GLUE-CX
     PERFORM PUT-SPCSK-BEFORE
     VARYING IDX FROM 1 BY 1 UNTIL IDX>SPC-SK.

OUT-FIELD-SPEC.

MOVE 0 TO CONDITION-TYPE.

IF FORM-TYPE NOT="O" OR O-TYPE NOT=" " GO TO OUT-RECD-FINISH.

IF O-INDICATORS = "  "  GO TO NO-CONDITIONS.

MOVE "IF" TO WURD,  PERFORM PTGC.
```

```
NEW-FIELD-COND-CARD.

PERFORM TRANSLATE-INDIC-SPECS.

IF O-PACKED NOT="P" AND
    (O-CNST=SPACES OR O-FLDNAME=SPACES)
    GO TO DONT-NEED-GOTO.

MOVE "NEXT SENTENCE" TO WURD, PERFORM PTGC.

NEXT-SENTENCE.

MOVE 2 TO CONDITION-TYPE.

MOVE "ELSE GO TO" TO WURD, PERFORM PTGC.

IF NEED-BYNUM=0
    MOVE 1 TO NEED-BYNUM
    ADD 1 TO BIE-NO.

PERFORM GLUE-BIEND, PERFORM GLUE-DOT.

DONT-NEED-GOTO.

NO-CONDITIONS.

IF O-ENDPOS>MAX-ENDPOS MOVE O-ENDPOS TO MAX-ENDPOS.

IF O-FLDNAME NOT="PAGE" AND "PAGE1" AND "PAGE2" GO TO NOT-PAGE.

IF O-INDICATORS NOT= SPACES MOVE "MOVE 0 TO" TO WURD
    PERFORM GLUE,
    MOVE O-FLDNAME TO WURD1, PERFORM GLUE-CX,
    PERFORM GLUE-DOT.

MOVE "ADD 1 TO" TO WURD, PERFORM PTGC.

MOVE O-FLDNAME TO WURD1, PERFORM GLUE-CX.

NOT-PAGE.

IF O-FLDNAME = SPACES

MOVE O-CNST TO IMP-OBJECT, GO TO FINISH-FIELD-SPEC.

MOVE O-FLDNAME TO WURD, PERFORM GET-COPX, MOVE COPLEN(L)
        TO WIDTH.

MOVE O-FLDNAME TO IMP-OBJECT.

IF O-CNST = SPACES  GO TO FINISH-FIELD-SPEC.
```

```
MOVE O-CNST TO ALPHA-CNST,   PERFORM RPG-TO-COBOL-ALPHA-CNST.

MOVE ALPHA-CNST TO O-CNST,   COMPUTE WIDTH=WIDTH2+2.

MOVE 0 TO I, HAVE-SIG.

MOVE O-FLDNAME TO WURD,  PERFORM GET-COPX.

MOVE COPDEC(L) TO COPDESO,   COMPUTE L2=COPLEN(L) -COPDESO.

MOVE 0 TO NDEC.

PERFORM SCANO-BODY VARYING NBODY FROM 2 BY 1 UNTIL
     I=COPLEN(L) OR NBODY=WIDTH.

MOVE 0 TO NSTAT.

PERFORM SCANO-STATUS VARYING I FROM NBODY BY 1 UNTIL NSTAT>0.

IF NSTAT=WIDTH GO TO NO-EXPANSION-TO-MOVE.

MOVE "MOVE" TO WURD,  PERFORM PTGC.

MOVE O-CNST TO WURD1.  PERFORM GLUE-CX.

MOVE "TO" TO WURD.  PERFORM GLUE.

PERFORM GLUE-IF-CX.

NO-EXPANSION-TO-MOVE.

MOVE "MOVE" TO WURD,  PERFORM PTGC.

MOVE O-FLDNAME TO WURD1,  PERFORM GLUE-CX.

IF NSTAT=WIDTH MOVE "TO IF-" TO WURD ELSE MOVE "TO IE-" TO WURD.

PERFORM GLUE.

MOVE STMT-NO TO COMPER4,   MOVE COMPER4 TO WURD,
     PERFORM GLUE-STRING.

PERFORM FIXUP-BODY VARYING I FROM 2 BY 1 UNTIL I=NBODY.

PERFORM FIXUP-STATUS VARYING I FROM NBODY BY 1 UNTIL I=NSTAT.

GO TO FINISHED-MOVE.

FINISH-FIELD-SPEC.

IF O-PACKED="P"
     MOVE "MOVE" TO WURD,  PERFORM PTGC
     MOVE O-FLDNAME TO WURD1,  PERFORM GLUE-CX
     MOVE "TO BODY OF" TO WURD,  PERFORM GLUE
```

```
        PERFORM GLUE-IF-CX.
        MOVE "IF" TO WURD.  PERFORM PTGC
        MOVE O-FLDNAME TO WURD1,  PERFORM GLUE-CX
        MOVE "<O MOVE @C@ TO SINE OF" TO WURD,  PERFORM GLUE
        PERFORM GLUE-IF-CX
        MOVE "ELSE MOVE @C@ TO SINE OF" TO WURD,  PERFORM PTGC
        PERFORM GLUE-IF-CX,  PERFORM GLUE-DOT
        GO TO FINISHED-MOVE.
MOVE "MOVE" TO WURD,  PERFORM PTGC.
MOVE IMP-OBJECT TO WURD1,  PERFORM GLUE-CX.
MOVE "TO" TO WURD,  PERFORM GLUE.
    PERFORM GLUE-IF-CX.
    FINISHED-MOVE.
    IF O-BLANKAFTER NOT="B" GO TO NOT-BLANKAFTER.
    MOVE O-FLDNAME TO WURD,  PERFORM GET-COPX.
    IF COPDEC(L)="A" MOVE "MOVE "" """ TO WURD ELSE
        MOVE "MOVE O" TO WURD.
    PERFORM PTGC.
    MOVE "TO" TO WURD,  PERFORM GLUE.
            MOVE O-FLDNAME TO WURD1,  PERFORM GLUE-CX
    PERFORM DUMMY VARYING IDX FROM 1 BY 1 UNTIL IDX>NZBI
        OR ZBFLD-IX(IDX)=LL.
    IF IDX NOT>NZBI
        MOVE "MOVE 1 TO" TO WURD,  PERFORM GLUE
        MOVE ZBI-NAME(IDX) TO INDICNO,  PERFORM GLUE-INDIC-CX.
    NOT-BLANKAFTER.
    PERFORM READ-FROM.
    IF O-INDIC(1) NOT=" *" OR
        O-TYPE NOT=" "  GO TO NO-CONTINUE.
    IF CONDITION-TYPE=1  PERFORM NEXT-SENTENCE.
```

```
MOVE " " TO O-INDIC(1).

GO TO OUT-FIELD-SPEC.

NO-CONTINUE.

COMPUTE J=NTC -1.

IF TC-COL(J) NOT="." PERFORM GLUE-DOT.

IF NFED-BYNUM=1
    MOVE 0 TO NEED-BYNUM
    PERFORM PTGA-PIENO.

GO TO OUT-FIELD-SPEC.

OUT-RECD-FINISH.

MOVE "MOVE IR-" TO WURD, PERFORM PTGC.
MOVE STMT TO WURD, PERFORM GLUE-STRING.
MOVE "TO" TO WURD, PERFORM GLUE.
MOVE FILE-NAME TO WURD1, PERFORM GLUE-CX, PERFORM GLUE-DOT.
IF COPDEC(L)="V" MOVE "MOVE" TO WURD, PERFORM PTGC
    ADD 4 TO MAX-ENDPOS MOVE MAX-ENDPOS TO WURD PERFORM GLUE
    MOVE "TO RL-" TO WURD, PERFORM GLUE
    MOVE LL TO WURD, PERFORM GLUE-STRING
    MOVE "WRITE REC-" TO WURD PERFORM GLUE
    MOVE LL TO WURD PERFORM GLUE-STRING PERFORM
    GLUE-DOT ELSE PERFORM PUT-SPCSK-AFTER
    VARYING IDX FROM 1 BY 1 UNTIL IDX>SPC-SK.

IF O-INDIC(1)=" *"
    MOVE " " TO O-INDIC(1)
    SUBTRACT 1 FROM BYE-NO
    ELSE PERFORM PTGA-RYENO.

GO TO OUT-FILE-SPEC.

FINISH-OUTPUT-SECTION SECTION 76.

END-FILE-ON-FROM.

IF FORM-SUBTYPE = 1  PERFORM END-AND-BEGIN-OUTPUT.
```

```
MOVE "IF OUT-SW = 1 GO TO OUTPUT-DETAIL." TO WURD, PERFORM PTGC.
IF HAVE-OF=1 IF HAVE-LSPECS=0
    MOVE "IF PAR-AM = 1 MOVE 1 TO IND-OF ." TO WURD, PERFORM PTGC
    ELSE PERFORM MAYBE-OVERFLOW
    VARYING IDX FROM 1 BY 1 UNTIL IDX>NFILES.
MOVE "OT-DONE." TO WURD, PERFORM PTGA.
MOVE "EXIT." TO WURD, PERFORM PTGC.
MOVE "OT-EXIT." TO WURD, PERFORM PTGA.
MOVE "GO TO TWENTY-FOUR." TO WURD, PERFORM PTGC.
GO TO CLOSEOUT.
END-AND-BEGIN-OUTPUT.
MOVE "IF OUT-SW = 1 GO TO TWENTY-SIX." TO WURD, PERFORM PTGC.
IF HAVE-OF=1 IF HAVE-LSPECS=0
    MOVE "MOVE PAR-AM TO IND-OF ." TO WURD, PERFORM PTGC
    ELSE PERFORM MAYBE-OVERFLOW
    VARYING IDX FROM 1 BY 1 UNTIL IDX>NFILES.
MOVE "GO TO FIVE." TO WURD, PERFORM PTGC.
MOVE 2 TO FORM-SUBTYPE.
MOVE "OUTPUT-TOTAL SECTION 52." TO WURD, PERFORM PTGA.
MOVE "OT-BEGIN." TO WURD, PERFORM PTGA.
IF HAVE-OF=1 AND HAVE-LSPECS=0
    MOVE "MOVE 0 TO PAR-AM ." TO WURD, PERFORM PTGC.
EABC-END.
GO TO CONTINUE-WITH-OUTPUT-TOTAL.
OSPEC-ROUTINES SECTION 53.
SCAND-BODY.
IF O-CHAR(NBODY)=" " ADD 1 TO I
    ELSE IF HAVE-SIG=0
        IF O-CHAR(NBODY)="0" OR "*"
        MOVE "0" TO O-CHAR(NBODY)
```

```
        MOVE 1 TO HAVE-SIG   ADD 1 TO I.
IF I=L2 AND NDEC=0 COMPUTE NDEC=NBODY+1.
SCANO-STATUS.
IF O-CHAR(I)="-" MOVE I TO NSTAT
    ELSE IF I=WIDTH COMPUTE NSTAT=NBODY -1
    ELSE IF O-CHAR(I)="R" COMPUTE K=I -1
       IF O-CHAR(K)="C" MOVE I TO NSTAT.
IF NSTAT>0 ADD 1 TO NSTAT.
FIXUP-STATUS.
MOVE 0 TO HAVE-FIXUP,  PERFORM CHECK-ILLEGAL-EDIT-CHAR.
IF HAVE-FIXUP=1  PERFORM PUT-FIXUP-MOVE.
FIXUP-BODY.
MOVE 0 TO HAVE-FIXUP,  PERFORM CHECK-ILLEGAL-EDIT-CHAR.
IF HAVE-FIXUP=1 OR C-CHAR(I)="+" OR "-"
    PERFORM PUT-FIXUP-MOVE.
CHECK-ILLEGAL-EDIT-CHAR.
IF O-CHAR(I)="J" OR "9" OR "V" OR "S"
    OR "Z" OR "*" OR "B" OR "K" OR "P" OR "A"
    OR O-CHAR(I)="." AND I NOT=NDEC
    MOVE 1 TO HAVE-FIXUP.
PUT-FIXUP-MOVE ,
MOVE "IF IC-" TO WURD,  PERFORM PTGC.
MOVE STMT-NO TO WURD.  PERFORM GLUE-STRING.
MOVE "(" TO WURD,  PERFORM GLUE.
COMPUTE J=I -2,  MOVE J TO WURD,  PERFORM GLUE-STRING.
MOVE ") NOT = SPACES MOVE """ TO WURD,  PERFORM GLUE.
MOVE O-CHAR(I) TO WURD,  PERFORM GLUE-STRING.
MOVE """ TO IC-" TO WURD,  PERFORM GLUE-STRING.
MOVE STMT-NO TO WURD,  PERFORM GLUE-STRING.
MOVE "(" TO WURD,  PERFORM GLUE.
```

```
COMPUTE J=I -1, MOVE J TO WURD, PERFORM GLUE-STRING.
MOVE ")" TO WURD, PERFORM GLUE-STRING, PERFORM GLUE-DOT.
PUT-SPCSK-BEFORE.
MOVE SKP-BE(IDX) TO SKP, MOVE SPC-BE(IDX) TO SPC.
IF ZEROES NOT=SPC OR SKP PERFORM PUT-SPCSK.
PUT-SPCSK-AFTER.
MOVE SKP-AF(IDX) TO SKP, MOVE SPC-AF(IDX) TO SPC.
PERFORM PUT-SPCSK.
PUT-SPCSK SECTION 53.
PS-BEGIN.
IF HAVE-VARYING-SPCSK=0 IF IDX=1
    GO TO NO-SPCSK-IF-NEEDED ELSE GO TO PS-EXIT.
MOVE "IF" TO WURD, PERFORM PTGC.
MOVE "SPC-SK" TO WURD1, PERFORM GLUE-CX.
MOVE "=" TO WURD, PERFORM GLUE.
MOVE IDX TO WURD, PERFORM GLUE.
NO-SPCSK-IF-NEEDED.
MOVE FILE-NAME TO WURD, PERFORM GET-COPX.
IF COPADD(LL) NOT<"A" AND COPDEC(L) NOT="U"
    MOVE "ADD 1 TO KE-" TO WURD, PERFORM PTGC
    MOVE LL TO WURD, PERFORM GLUE-STRING.
IF SPC="D" MOVE "ADD 1 TO AX-" TO WURD PERFORM PTGC
    MOVE LL TO WURD, PERFORM GLUE-STRING
    MOVE "MOVE KE-" TO WURD, PERFORM PTGC
    MOVE LL TO WURD, PERFORM GLUE-STRING
    MOVE "TO BIN-LO" TO WURD, PERFORM GLUE
    MOVE "MOVE AX-" TO WURD, PERFORM PTGC
    MOVE LL TO WURD, PERFORM GLUE-STRING
    MOVE "TO KE-" TO WURD, PERFORM GLUE
    MOVE LL TO WURD, PERFORM GLUE-STRING.
```

```
MOVE "WRITE" TO WURD, PERFORM PTGC.
MOVE FILE-NAME TO WURD1, PERFORM GLUE-CX.
IF SPC="0"
    MOVE "MOVE BIN-LO TO KE-" TO WURD, PERFORM PTGC
    MOVE LL TO WURD, PERFORM GLUE-STRING.
IF COPDEC(L)="C"
    IF SPC="2" MOVE "TO AUXILIARY" TO WURD PERFORM GLUE
    ELSE IF SPC="3" MOVE "TO ERROR" TO WURD PERFORM GLUE.
IF COPDEC(L) NOT="N" PERFORM GLUE-DOT GO TO PS-EXIT.
MOVE "BEFORE" TO WURD , PERFORM GLUE.
MOVE SPC TO WURD, PERFORM GLUE.
IF HAVE-LSPECS=0 GO TO DONE-COUNTER-INCREMENT.
MOVE "ADD" TO WURD, PERFORM PTGC.
MOVE SPC TO WURD, PERFORM GLUE.
MOVE "TO LC-" TO WURD, PERFORM GLUE.
MOVE LL TO WURD, PERFORM GLUE-STRING.
DONE-COUNTER-INCREMENT.
IF SKP =ZEROES GO TO DONE-SKIPPING.
IF HAVE-LSPECS=0 GO TO DONE-COUNTER-SET.
        MOVE "MOVE" TO WURD, PERFORM PTGC
    MOVE COPADD(LL) TO REL
        MOVE LINE-COUNTER(PSEUDO-REL,SKP) TO WURD, PERFORM GLUE
        MOVE "TO LC-" TO WURD, PERFORM GLUE
MOVE LL TO WURD, PERFORM GLUE-STRING.
DONE-COUNTER-SET.
        MOVE "MOVE SPACES TO" TO WURD, PERFORM PTGC
        MOVE FILE-NAME TO WURD1, PERFORM GLUE-CX
        MOVE "WRITE" TO WURD, PERFORM GLUE
        MOVE FILE-NAME TO WURD1, PERFORM GLUE-CX
        MOVE "BEFORE CHANNEL" TO WURD, PERFORM GLUE
```

```
MOVE SKP TO WURD.

IF OBJECT-MACHINE>3 PERFORM GLUE ELSE PERFORM GLUE-STRING.

DONE-SKIPPING.

PERFORM GLUE-DOT.

PS-EXIT.

MAYBE-OVERFLOW SECTION 76.

MO-BEGIN.

IF COPDEC(IDX) NOT="N" GO TO MO-EXIT.

MOVE COPADD(IDX) TO REL.

MOVE "IF LC-" TO WURD, PERFORM PTGC.

MOVE IDX TO WURD, PERFORM GLUE-STRING.

MOVE ">" TO WURD, PERFORM GLUE.

MOVE LINE-COUNTER(PSEUDO-REL,12) TO WURD, PERFORM GLUE.

MOVE "MOVE 1 TO" TO WURD, PERFORM GLUE.

MOVE "0" TO INDICNO-1, MOVE OF-INDICATOR(PSEUDO-REL)
    TO INDICNO-2 , PERFORM GLUE-INDIC-CX.

IF FORM-SUBTYPE=1 MOVE "ELSE MOVE 0 TO" TO WURD, PERFORM PTGC
    PERFORM GLUE-INDIC-CX.

PERFORM GLUE-DOT.

MO-EXIT.

EXIT.

CLOSEOUT SECTION 76.

CO-BEGIN.

IF FORM-TYPE="0" GO TO NO-TABLOAD.

MOVE 1 TO TABLE-SWITCH.

PERFORM READ-FROM, MOVE 0 TO PAR-AM.

MOVE "TABLE-LOAD SECTION 51." TO WURD, PERFORM PTGA.

MOVE "TL-BEGIN." TO WURD, PERFORM PTGA.

MOVE "ADD 1 TO PAR-AM ." TO WURD, PERFORM PTGC.

IF PPGINT-REC=ZEROES GO TO NO-TABLOAD.
```

```
NEXT-LOAD-MOVE.
MOVE "IF PAR-AM =" TO WURD, PERFORM PTGC.
ADD 1 TO PAR-AM, MOVE PAR-AM TO WURD, PERFORM GLUE.
MOVE "MOVE" TO WURD, PERFORM PTGC.
MOVE """" TO WURD, PERFORM GLUE.
MOVE T-FIRSTHALF TO TO-TABLE-LIT.
MOVE 58 TO NTC.
MOVE """" TO WURD, PERFORM GLUE-STRING.
MOVE "TO TAB-LI" TO WURD, PERFORM GLUE.
MOVE "MOVE" TO WURD, PERFORM PTGC
MOVE """" TO WURD, PERFORM GLUE.
MOVE T-SECONDHALF TO TO-TABLE-LIT.
MOVE 58 TO NTC.
MOVE """" TO WURD, PERFORM GLUE-STRING.
MOVE "TO TAB-DD ," TO WURD, PERFORM GLUE.
PERFORM READ-FROM  IF RPGINT-REC NOT=ZEROES GO TO NEXT-LOAD-MOVE.
NO-TABLOAD.
MOVE "END-OF-JOB." TO WURD, PERFORM PTGA.
PERFORM PUNCH-TO.
MOVE "COMPILE RPGOBJ COBOLL LIBRARY VALUE 0=210000 FILE SOLD=RPGL
    "OB." TO COBOL-COMPILE.
IF SW3=1 CLOSE SWBT WITH RELEASE
    MOVE " " TO COMPILE-L, MOVE "T" TO COMPILE-D
    MOVE 1 TO COMPILE-N1
    ELSE CLOSE SWBH WITH RELEASE.
MOVE SOLD-NAME TO COMPILE-SOLDNAME.
IF COBOL-PROG-NAME NOT=SPACES MOVE COBOL-PROG-NAME
    TO COMPILE-NAME.
IF SW4=1 MOVE 0 TO COMPILE-N2, MOVE 1 TO COMPILE-N5.
IF SW4 NOT=2 ZIP COBOL-COMPILE.
```

```
IF SW5=0 GO TO CLOSEUP.
IF SW5 NOT=1 OPEN OUTPUT SWBP GO TO COP-OUT.
MOVE 1 TO LL.
SPIT-OUT-COP.
MOVE SPACES TO SWBP-REC2.
MOVE COPNAME(LL) TO KOPNAME.
MOVE COPLEN(LL) TO KOPLEN.
MOVE COPDEC(LL) TO KOPDEC.
IF LL NOT>MN-COP-EXTENSIONS MOVE COPZRI(LL) TO COMPER8, KOPZBI8.
MOVE COMPER4 TO KOPZRI4.
WRITE SWBP-REC2. .
ADD 1 TO LL IF COPNAME(LL) NOT=SPACES GO TO SPIT-OUT-COP
COP-OUT.
CLOSE RPGINT.
OPEN INPUT RPGINT.
SPIT-OUT-FROM.
READ RPGINT AT END GO TO START-SPITTING-TO.
WRITE SWBP-REC FROM RPGINT-REC.
GO TO SPIT-OUT-FROM.
START-SPITTING-TO.
IF SW3 NOT=1 OPEN INPUT SWBH GO TO SPIT-OUT-TO.
IF SW4 NOT=2 GO TO CLOSEUP.
OPEN INPUT SWBT.
SPIT-TAPE-TO.
READ SWBT AT END GO TO CLOSEUP.
WRITE SWBP-REC FROM SWBT-REC.
GO TO SPIT-TAPE-TO.
SPIT-OUT-TO.
READ SWBH AT END GO TO CLOSEUP.
WRITE SWBP-REC FROM SWBH-REC.
```

```
GO TO SPIT-OUT-TO.

TOO-BIG.

DISPLAY "PROGRAM TOO BIG." .

CLOSEUP.

CLOSE RPGINT WITH PURGE.

CLOSE RPGTAB WITH PURGE.

STOP RUN.
```

APPENDIX F: ROUTINES CALLED FOR BY PASS NOS. 1-3

```
ROUTINES SECTION.

GLUE-A.

MOVE 7 TO NTC, PERFORM GLUE.

GLUE-FN.
MOVE "FXO" TO SYMBOL.

PERFORM GET-COPX, MOVE LL TO NUM-SYM456.

MOVE SYMBOL TO WURD, PERFORM GLUE.

GLUE-IF-CX.

MOVE "IF-" TO WURD, PERFORM GLUE.

MOVE STMT-NO TO WURD, PERFORM GLUE-STRING.

GLUE-INDIC-CX.

MOVE "IND-" TO SYMBOL, MOVE INDICNO TO SYM56.

MOVE SYMBOL TO WURD1, PERFORM GLUE-CX.

GLUE-TABPT-CX.

MOVE SYMBOL TO WURD, PERFORM GET-COPX.

MOVE "PX-" TO SYMBOL, MOVE LL TO NUM-SYM456.

MOVE SYMBOL TO WURD, PERFORM GLUE.

GLUE-TAB.

MOVE WURD1 TO ALPHA-CNST.

PERFORM GET-COPX.
MOVE "EX-" TO SYMBOL. MOVE LL TO NUM-SYM456.

MOVE SYMBOL TO WURD, PERFORM GLUE.
```

```
MOVE "(" TO WURD,  PERFORM GLUE.

MOVE ALPHA-CNST TO SYMBOL,  PERFORM GLUE-TABPT-CX.

MOVE ")" TO WURD,  PERFORM GLUE.

GLUE-DOT.

MOVE "." TO WURD,  PERFORM GLUE-STRING.

DUMMY.

GET-COPX.

PERFORM DUMMY VARYING L FROM 1 BY 1 UNTIL
    COPNAME(L)=WURD-FIRST6 OR SPACES.

IF COPNAME(L)=SPACES   SET L TO 0
    IF CHAR(1)="≥"
    MOVE WURD TO ALPHA-CNST, PERFORM RPG-TO-COBOL-ALPHA-CNST
    MOVE ALPHA-CNST TO WURD
    MOVE "A" TO COPDFCO,  MOVE WIDTH2 TO COPLENO
    ELSE MOVE 0 TO HAVE-DOT, COPDESO,  MOVE 40 TO COPLENO
    PERFORM GET-DECPOS VARYING K FROM 1 BY 1 UNTIL K>40
    EXAMINE WURD TALLYING ALL " ",  SUBTRACT TALLY FROM COPLENO
    EXAMINE WURD TALLYING ALL ".",  SUBTRACT TALLY FROM COPLENO
    EXAMINE WURD TALLYING ALL "-",  SUBTRACT TALLY FROM COPLENO
    EXAMINE WURD TALLYING ALL "+",  SUBTRACT TALLY FROM COPLENO .

SET LL TO L.

GET-DECPOS.

IF CHAR(K)="." MOVE 1 TO HAVE-DOT
    ELSE IF CHAR(K) NOT=" " AND HAVE-DOT=1   ADD 1 TO COPDESO.

PTGA.

PERFORM PUNCH-TO.

PERFORM GLUE-A.

RPG-TO-COBOL-ALPHA-CNST.

PERFORM TRANS-CHAR VARYING J FROM 1 BY 1 UNTIL J > 30.

IF WIDTH2>40 GO TO TOO-BIG.
```

SUBTRACT 2 FROM WIDTH2.

TRANS-CHAR.

IF ALPHA-CHAR(J) = "≥"

MOVE J TO WIDTH2, COMPUTE K=J + 1

IF ALPHA-CHAR(K) = "≥"

PERFORM MOVE-CNST-CHAR VARYING K FROM K BY 1

UNTIL K>50 ELSE MOVE """" TO ALPHA-CHAR(J)

ELSE IF ALPHA-CHAR(J)="""" PERFORM MOVE-CNST-CHAR-FORWARD

VARYING K FROM 59 BY -1 UNTIL K<J, ADD 1 TO J.

MOVE-CNST-CHAR-FORWARD.

COMPUTE M=K+1, MOVE ALPHA-CHAR(K) TO ALPHA-CHAR(M).

MOVE-CNST-CHAR.

COMPUTE M = K + 1, MOVE ALPHA-CHAR(M) TO ALPHA-CHAR(K).

GLUE-BIYNO.

MOVE "BIY-" TO WURD, PERFORM GLUE.

MOVE BIY-NO TO WURD, PERFORM GLUE-STRING.

PTGA-BIYNO.

MOVE "BIY-" TO WURD, PERFORM PTGA.

MOVE BIY-NO TO WURD, PERFORM GLUE-STRING, PERFORM GLUE-DOT.

GLUE-BYENO.

MOVE "BYE-" TO WURD, PERFORM GLUE.

MOVE BYE-NO TO WURD, PERFORM GLUE-STRING.

PTGA-BYENO.

PERFORM PUNCH-TO.

MOVE "BYE-" TO WURD, PERFORM GLUE-A.

MOVE BYE-NO TO WURD, PERFORM GLUE-STRING, PERFORM GLUE-DOT.

GLUE-BIENO.

MOVE "BIE-" TO WURD, PERFORM GLUE.

MOVE BIE-NO TO WURD, PERFORM GLUE-STRING.

PTGA-BIENO.

```
MOVE "BIE-" TO WURD.  PERFORM PTGA.

MOVE BIE-NO TO WURD.  PERFORM GLUE-STRING.  PERFORM GLUE-DOT.

GLUE-STRING.

SUBTRACT 1 FROM NTC.

IF NTC<12 AND TO-COL(8)=" "  MOVE 11 TO NTC MOVE "-" TO TO-COL(7).

PERFORM GLUE.

READ-FROM SECTION.

RF-BEGIN.

READ RPGINT AT END MOVE ZEROES TO RPGINT-REC.

IF SW5=1 WRITE SWBP-REC FROM RPGINT-REC.

IF TABLE-SWITCH=0
    MOVE STMT-NO TO COMPER4.  MOVE COMPER4 TO STMT-NO.
IF COMMENT-IF-ASTERISK="*"
    PERFORM PUNCH-TO.  MOVE FROM-LINE TO TO-SOURCE
    MOVE 72 TO NTC.  PERFORM PUNCH-TO.  GO TO RF-BEGIN.

PTGC SECTION.

PTGC-BEGIN.

PERFORM PUNCH-TO.  PERFORM GLUE.

GLUE-CX SECTION.

GC-BEGIN.

PERFORM GET-COPX.

IF LL=0 PERFORM GLUE
    ELSE PERFORM CHECK-LEGAL-DATANAME VARYING K FROM 2 BY 1 UNTIL
    K>6 OR K<2  IF K>6 AND CHAR(1) NOT<"A" AND NOT>"Z"
        PERFORM GLUE MOVE "-X" TO WURD PERFORM GLUE-STRING
        ELSE MOVE "CX-" TO SYMBOL.  MOVE LL TO NUM-SYM456.
        MOVE SYMBOL TO WURD.  PERFORM GLUE.

GO TO GCX-EXIT.

CHECK-LEGAL-DATANAME.

IF CHAR(K) NOT ALPHABETIC
```

```
    IF CHAR(K) NOT NUMERIC
    MOVE 0 TO K.
GCX-EXIT.
EXIT.
TRANSLATE-INDIC-SPECS SECTION.
TIS-BEGIN.
PERFORM PUNCH-TO.
IF FORM-TYPE = "O"  MOVE O-INDICATORS TO SPEC-INDICATORS
       ELSE MOVE C-INDICATORS TO SPEC-INDICATORS.
MOVE 0 TO HAVE-AND.
PERFORM GLUE-INDIC-LOOK VARYING IDX FROM 1 BY 1 UNTIL IDX>3.
GLUE-INDIC-LOOK SECTION.
GIL-BEGIN.
IF SPEC-INDIC(IDX)=SPACES GO TO GIL-EXIT.
MOVE 1 TO CONDITION-TYPE.
IF HAVE-AND=1 MOVE "AND" TO WURD.  PERFORM GLUE.
MOVE 1 TO HAVE-AND.
MOVE SPEC-INDIC(IDX) TO INDICNO.
PERFORM GLUE-INDIC-CX.
IF SPEC-NOT(IDX)="N" MOVE "NOT" TO WURD,  PERFORM GLUE
    ELSE IF INDICNO-1="0" MOVE 1 TO OUT-SW.
MOVE "= 1" TO WURD,  PERFORM GLUE.
GIL-EXIT.
EXIT.
PUNCH-TO SECTION.
PT-BEGIN.
IF TO-LINE=SPACES GO TO PT-EXIT.
ADD 100 TO COBOL-SEQNO,  MOVE COBOL-SEQNO TO SWBH-SEQNO.
IF SW3=1 WRITE SWBT-REC FROM SWBH-REC ELSE WRITE SWBH-REC.
IF SW5=1 MOVE SPACES TO SWBP-REC1,
```

```
     MOVE TO-LINE TO SWBP-FIELD,  WRITE SWBP-REC1.

PT-EXIT.

MOVE SPACES TO TO-LINE.

MOVE 11 TO NTC.

GLUE SECTION.

G-BEGIN.

IF CHAR(1)="""" PERFORM DUMMY VARYING K1 FROM 40 BY -1 UNTIL

CHAR(K1) NOT=" "  ADD 1 TO K1 ELSE MOVE 99 TO K1.

MOVE 1 TO J,K.

NEW-CARD-TO-GLFU.

PERFORM MOVE-WORD-INTO-LINE VARYING J FROM J BY 1 UNTIL J>K1

OR NTC>71  OR K=0 AND K1=99.

IF NTC<72  GO TO G-FINISH.

IF TO-COL(72) NOT=" " AND CHAR(J) NOT=" "

PERFORM PUNCH-TO

MOVE "-" TO TO-COL(7) ELSE PERFORM PUNCH-TO.

GO TO NEW-CARD-TO-GLEU.

MOVE-WORD-INTO-LINE.

ADD 1 TO NTC,  MOVE CHAR(J) TO TO-COL(NTC).

IF CHAR(J)=" " COMPUTE K=J+1

IF CHAR(K)=" " ADD 1 TO K

IF CHAR(K)=" " ADD 1 TO K

IF CHAR(K)=" " MOVE 0 TO K.

G-FINISH.

EXIT.

END-OF-JOB.

3794 RECORDS
```

What is claimed is:

1. An information processing system responsive to its particular machine language code to translate a routine from a first source higher level language code to a second source higher level language code where said second source higher level language is COBOL, said system comprising:

storage means to receive a first plurality of sets of signals representing a routine in a first source code; and processor means, coupled to said receiving storage means and responsive to programmed signals in said particular machine language code to sense said first plurality of sets of signals in a sequence of passes and to generate a second plurality of sets of signals representing said routine in a second source code, said processor means operating to generate, each time during a first pass, sets of signals in said second plurality of sets of signals to represent those commands having direct correspondence to commands represented by sets of said first plurality of sets of signals, said processor means then operating to generate, during a second pass, sets of signals in said second plurality of sets of signals for those commands called for by commands represented by said first plurality of sets of signals but not having direct correspondence thereto and to transmit the second plurality of sets of signals thus generated to said storage means;

said processor means being further responsive to programmed signals to generate, in response to said second plurality of sets of signals, a third plurality of sets of signals representing said routine in said particular machine language.

2. An information processing system according to claim 1 wherein said first source language code implies a general algorithm characteristic of said first code, and wherein:

said processor means is adapted to generate in said second plurality of sets of signals including sets of signals representing said general algorithm as required by said first plurality of sets of signals.

3. An information processing system according to claim 1 wherein:

said processor means is adapted to generate sets of signals, for said second plurality of sets of signals, representing definitions of data fields and files called for by the program represented by said first plurality of sets of signals.

4. An information processing system according to claim 1 wherein:

said processor means are adapted to sense said received sets of said first plurality of sets of signals for comparison against acceptable sequences of such sets representing a program free of syntax error.

5. An information processing system according to claim 4 including:

means, coupled to said sense and generating means, to print-out a warning message should said received sets of signals contain a syntax error.

6. An information processing system for the translation of a routine from a first higher level program language to a second higher level program language and execution of said routine in a particular machine language for that system, said first higher level language implying a general algorithm characteristic of said first program language and said second higher level language being COBOL, said system comprising:

storage means to receive a first plurality of sets of signals representing a routine in said first program language; and processor means, coupled to said storage means, to generate each time a second plurality of sets of signals including sets of signals representing said general algorithm as required by said first plurality of sets of signals;

said processor means being responsive to programmed signals to generate, in response to said second plurality of sets of signals, a third plurality of sets of signals representing said routine in said particular machine language and to execute said routine in response to said third plurality of sets of signals.

7. An information processing system according to claim 6 wherein:

said processor means is adapted to sense said received sets of said first plurality of sets of signals for comparison against acceptable sequences of such sets representing a program free of syntax error.

8. An information processing system according to claim 7 including:

means, coupled to said processor means, to print-out a warning message should said received sets of signals contain a syntax error.

9. In a data processing apparatus responsive to its particular machine language, the method for the translation of a routine from a first higher level program language to a second higher level program language, compiling said routine from said second higher level language into said particular machine language, and activating said apparatus to execute said particular machine language routine, said first higher level language implying a general algorithm characteristic of said first program language and said second higher level language being COBOL, said method comprising:

receiving a first plurality of sets of signals representing a routine in said first language;

generating, each time, in response to the receipt of said received first plurality of sets of signals, a second plurality of sets of signals including sets of signals representing said general algorithm as required by said first plurality of sets of signals;

receiving said second plurality of sets of signals and generating, in response thereto, a third plurality of sets of signals representing said routine in said particular machine language code; and executing said routine in response to said third plurality of sets of signals in said apparatus.

10. A method according to claim 9 including:

sensing said received sets of said first plurality of sets of signals for comparison against acceptable sequences of such sets representing a program free of syntax error.

11. A method according to claim 10 including:

printing out a warning message should said received sets of signals contain a syntax error.

12. In a data processing apparatus responsive to its particular machine language, the method for the translation of a routine from a first higher level program language to a second higher level program language and compiling said routine from said second higher level language into said particular machine language where said first language is RPG and said second language is COBOL, said method comprising:

receiving a first plurality of sets of signals representing a program in a first program source language;

sensing at least some sets of said first plurality of sets of signals and generating each time a second plurality of sets of signals whose commands having direct correspondence to commands represented by said first plurality of sets of signals;

again sensing said sets of said first plurality of sets of signals and generating in said second plurality of sets of signals those commands required by the first plurality of sets of signals but not generated during the preceding step of the method; and receiving said second plurality of sets of signals and generating, in response thereto, a third plurality of sets of signals representing said routine in said particular machine language code.

13. A method according to claim 12 wherein said first source language code implements a general algorithm characteristic of such first source code, said method including:
    generating in response to the receipt of said first plurality of sets of signals, a second plurality of sets of signals including sets of signals representing said general algorithm as required by said first plurality of sets of signals.

14. A method according to claim 12 including:
    generating sets of signals, for said second plurality of sets of signals, representing definitions of data fields and files called for by the program represented by said first plurality of sets of signals.

15. A method according to claim 12 including:
    sensing said received sets of said first plurality of sets of signals for comparison against acceptable sequences of such sets representing a program free of syntax error.

16. A method according to claim 15 including:
    printing out a warning message should said received sets of signals contain a syntax error.

17. In a data processing apparatus responsive to a particular machine language, the method for the translation of a routine from a first higher level program language to a second higher level program language and compiling said routine from said second higher level language into said particular machine language, said method comprising:
    receiving a first plurality of sets of signals representing a program in a first program source language;
    sensing at least some sets of said first plurality of sets of signals and generating each time a second plurality of sets of signals whose commands having direct correspondence to commands represented by said first plurality of sets of signals and generating, for intermediate storage, data information for other commands;
    again sensing said sets of said first plurality of sets of signals and generating in said second plurality of sets of signals those commands for which intermediate information was generated during the preceding step of the method; and
    receiving said second plurality of sets of signals and generating, in response thereto, a third plurality of sets of signals representing said routine in said particular machine language code.

18. A method according to claim 17 including:
    sensing in sequence, each of said sets of first plurality of sets of signals for comparison against acceptable sequences of such sets representing a program free of syntax error.

19. A method according to claim 18 wherein said system includes a storage unit for intermediate files, said method including:
    transferring to said storage unit, the data table definitions called for by said program and represented by particular sets of signals in said first plurality of sets of signals.

* * * * *